(12) United States Patent
Park

(10) Patent No.: US 12,335,619 B2
(45) Date of Patent: Jun. 17, 2025

(54) CAMERA MODULE AND OPTICAL DEVICE INCLUDING THE SAME CAPABLE OF PERFORMING ACCURATE OIS FEEDBACK OPERATION

(71) Applicant: LG INNOTEK CO., LTD., Seoul (KR)

(72) Inventor: Tae Bong Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 99 days.

(21) Appl. No.: 17/997,311

(22) PCT Filed: Jun. 2, 2021

(86) PCT No.: PCT/KR2021/006832
§ 371 (c)(1),
(2) Date: Oct. 27, 2022

(87) PCT Pub. No.: WO2021/256736
PCT Pub. Date: Dec. 23, 2021

(65) Prior Publication Data
US 2023/0171498 A1    Jun. 1, 2023

(30) Foreign Application Priority Data

Jun. 17, 2020 (KR) .................. 10-2020-0073491
Jun. 18, 2020 (KR) .................. 10-2020-0074226

(51) Int. Cl.
*H04N 23/68* (2023.01)
*H04N 25/79* (2023.01)

(52) U.S. Cl.
CPC ....... *H04N 23/687* (2023.01); *H04N 23/6812* (2023.01); *H04N 25/79* (2023.01)

(58) Field of Classification Search
CPC .. H04N 23/687; H04N 23/6812; H04N 23/54; H04N 23/57; G02B 27/646
See application file for complete search history.

(56) References Cited

U.S. PATENT DOCUMENTS

| 2013/0016428 A1 | 1/2013 | Sugawara et al. |
| 2015/0212291 A1 | 7/2015 | Lee |
| 2016/0165125 A1 | 6/2016 | Kim |
| 2017/0045753 A1 | 2/2017 | Enta |
| 2018/0320119 A1 | 11/2018 | Evans |

(Continued)

FOREIGN PATENT DOCUMENTS

| JP | 2013-24944 A | 2/2013 |
| JP | 6311434 B2 | 4/2018 |

(Continued)

*Primary Examiner* — Nicholas G Giles
(74) *Attorney, Agent, or Firm* — Birch, Stewart, Kolasch & Birch, LLP

(57) ABSTRACT

Embodiments provide a camera module including a stationary part including a magnet, and a movable part including a first circuit board, which is spaced apart from the stationary part, a position sensor disposed on the first circuit board, a coil disposed so as to face the magnet, and a spacer disposed between the first circuit board and the coil, wherein the spacer has a hole, and the position sensor is disposed such that at least a portion thereof is disposed in the hole of the spacer and overlaps the magnet in an optical-axis direction.

17 Claims, 58 Drawing Sheets

(56) References Cited

U.S. PATENT DOCUMENTS

| | | |
|---|---|---|
| 2019/0020822 A1 | 1/2019 | Sharma et al. |
| 2019/0238728 A1 | 8/2019 | Hwang et al. |
| 2021/0014423 A1* | 1/2021 | Kimura ................. H04N 23/55 |
| 2021/0325628 A1 | 10/2021 | Min |
| 2023/0336856 A1* | 10/2023 | Park ........................ G03B 5/00 |

FOREIGN PATENT DOCUMENTS

| | | |
|---|---|---|
| KR | 10-2015-0089648 A | 8/2015 |
| KR | 10-2017-0021682 A | 2/2017 |
| KR | 10-2019-0092803 A | 8/2019 |
| KR | 10-2020-027741 A | 3/2020 |
| KR | 10-2020-0052063 A | 5/2020 |
| KR | 10-2020-0058815 A | 5/2020 |
| KR | 10-2117094 B1 | 5/2020 |
| WO | WO 2019/065829 A1 | 4/2019 |

\* cited by examiner

| DRIVE VALUE | CORRECTION VALUE |
|---|---|
| A1 | C1 |
| A2 | C2 |
| ⋮ | ⋮ |
| An | Cn |

| DRIVE VALUE | FIRST CORRECTION VALUE | SECOND CORRECTION VALUE | THIRD CORRECTION VALUE |
|---|---|---|---|
| A1 | B1 | M1 | B1-M1 |
| A2 | B2 | M1 | B2-M1 |
| ⋮ | ⋮ | ⋮ | ⋮ |
| An | Bn | M1 | Bn-M1 |

FIG.58

| DRIVE VALUE | OUTPUT OF POSITION SENSOR | CORRECTED OUTPUT VALUE OF POSITION SENSOR |
|---|---|---|
| A1 | H1 | H1-C1 |
| A2 | H2 | H2-C2 |
| ⋮ | ⋮ | ⋮ |
| An | Hn | Hn-Cn |

FIG.59

| DRIVE VALUE | OUTPUT OF POSITION SENSOR | CORRECTED OUTPUT VALUE OF POSITION SENSOR |
|---|---|---|
| A1 | H1 | H1-B1+M1 |
| A2 | H2 | H2-B2+M1 |
| ⋮ | ⋮ | ⋮ |
| An | Hn | Hn-Bn+M1 |

| DRIVE VALUE | DISPLACEMENT IN X-AXIS DIRECTION | CODE VALUE |
|---|---|---|
| A1 | DP1 | Code_1 |
| A2 | DP2 | Code_2 |
| ⋮ | ⋮ | ⋮ |
| An | DPn | Code_n |

CAMERA MODULE AND OPTICAL DEVICE INCLUDING THE SAME CAPABLE OF PERFORMING ACCURATE OIS FEEDBACK OPERATION

CROSS REFERENCE TO RELATED APPLICATIONS

This application is the National Phase of PCT/KR2021/006832 filed on Jun. 2, 2021, which claims priority under 35 U.S.C. § 119(a) to Patent Application Nos. 10-2020-0073491 and 10-2020-0074226 filed in the Republic of Korea on Jun. 17, 2020 and Jun. 18, 2020, respectively, all of which are hereby expressly incorporated by reference into the present application.

TECHNICAL FIELD

Embodiments relate to a camera module and an optical device including the same.

BACKGROUND

It is difficult to apply technology of a voice coil motor (VCM) used in existing general camera modules to a sub-miniature, low-power camera module, and therefore research related thereto has been actively conducted.

Demand for and production of electronic products, such as smartphones and mobile phones equipped with cameras have increased. Cameras for mobile phones are trending toward increased resolution and miniaturization. As a result, an actuator has also been miniaturized, increased in diameter, and been made multifunctional. In order to realize a high-resolution camera for mobile phones, improvement in performance of the camera for mobile phones and additional functions thereof, such as autofocusing, handshake correction, and zooming, are required.

SUMMARY

Embodiments provide a camera module and an optical device including the same, which are capable of performing accurate OIS feedback operation and thus of ensuring reliability of OIS operation.

In an embodiment, a camera module includes a stationary part including a magnet, and a movable part including a first circuit board, which is spaced apart from the stationary part, a position sensor disposed on the first circuit board, a coil disposed so as to face the magnet, and a spacer disposed between the first circuit board and the coil, wherein the spacer has a hole, and the position sensor is disposed such that at least a portion thereof is disposed in the hole of the spacer and overlaps the magnet in an optical-axis direction.

The hole of the spacer may overlap at least a portion of the coil in the optical-axis direction. The position sensor may not overlap the coil in the optical-axis direction. The coil may have a hole formed in the center thereof, and the hole of the spacer may overlap the hole of the coil in the optical-axis direction. The position sensor may overlap both the hole of the coil and the hole of the spacer in the optical-axis direction.

A space may be defined between the magnet and the position sensor. The camera module may further include an elastic support member coupled both to the stationary part and to the movable part. The stationary part may include a second circuit board, and the elastic support member may conductively connect the first circuit board to the second circuit board. The coil may be coupled to the spacer, and may be conductively connected to the first circuit board.

In another embodiment, a camera module includes a lens, an image sensor disposed at a position corresponding to the lens, a drive unit configured to move the image sensor, a circuit board disposed so as to be spaced apart from the lens, a position sensor disposed on the circuit board, and a spacer disposed on the circuit board, wherein the drive unit includes a magnet and a coil which faces the magnet, wherein the spacer is disposed between the circuit board and the coil so as to space the coil apart from the position sensor, and wherein the image sensor is moved in a direction perpendicular to an optical-axis direction.

In a further embodiment, a camera module includes a stationary part including a magnet, a movable part including a first circuit board disposed so as to be spaced apart from the stationary part, a holder disposed on the first circuit board, a coil disposed on the holder so as to face the magnet, and a position sensor disposed on the first circuit board so as to face the magnet, and a support member coupled both to the stationary part and to the movable part, wherein the movable part is moved in a direction perpendicular to an optical-axis direction by the interaction between the magnet and the coil, and the coil does not overlap the coil in the direction perpendicular to the optical-axis direction.

The position sensor may be mounted on the first circuit board, and may not overlap the coil in the optical-axis direction. The stationary part may include a second circuit board disposed so as to be spaced apart from the first circuit board. The support member may be coupled at one end thereof to the second circuit board and at the other end thereof to the first circuit board. The support member may connect the first circuit board to the second circuit board.

The coil may have a hole formed in the center thereof, and the position sensor may be disposed under the hole of the coil, and may overlap the hole of the coil in the optical-axis direction.

The holder may have therein a through hole, which corresponds to the position sensor in the optical-axis direction, and the position sensor may be disposed in the through hole in the holder. The holder may include a coupling protrusion projecting from the upper surface thereof, and the coil may be coupled to the coupling protrusion.

The movable part may include an image sensor mounted on the first circuit board. The four corners of the first circuit board may be provided with projections, which project from the lateral side surface of the first circuit board, and the lower surface of the holder may have seating grooves in which the projections of the first circuit board are disposed.

The coil may include first to fourth coil units, which are respectively disposed at first to fourth corners of the holder, the magnet may include a first magnet corresponding to the first coil unit, a second magnet corresponding to the second coil unit, a third magnet corresponding to the third coil unit, and a fourth magnet corresponding to the fourth coil unit, and the position sensor may include a first sensor disposed under the first coil unit, a second sensor disposed under the second coil unit, and a third sensor disposed under the third coil unit. The first to fourth coil units may be individually activated.

The first to third coil units may be individually activated, and the fourth coil unit may be activated together with one of the first to third coil units.

In yet a further embodiment, a camera module includes a stationary part including a magnet, and a movable part including a first circuit board disposed so as to be spaced apart from the stationary part, a coil disposed so as to face the magnet, a holder disposed between the first circuit board and the coil, and a position sensor disposed on the first circuit board so as to face the magnet, wherein the coil has therein a first hole, the holder has therein a second hole formed at a position corresponding to the first hole, and at least a portion of the position sensor is disposed in the second hole in the holder.

BRIEF DESCRIPTION OF THE DRAWINGS

Arrangements and embodiments may be described in detail with reference to the following drawings in which like reference numerals refer to like elements and wherein:

FIG. 58 is a table illustrating an embodiment of correcting the output of the OIS position sensor;

FIG. 59 is a table illustrating another embodiment of correcting the output of the OIS position sensor;

DESCRIPTION OF SPECIFIC EMBODIMENTS

Figure 1:
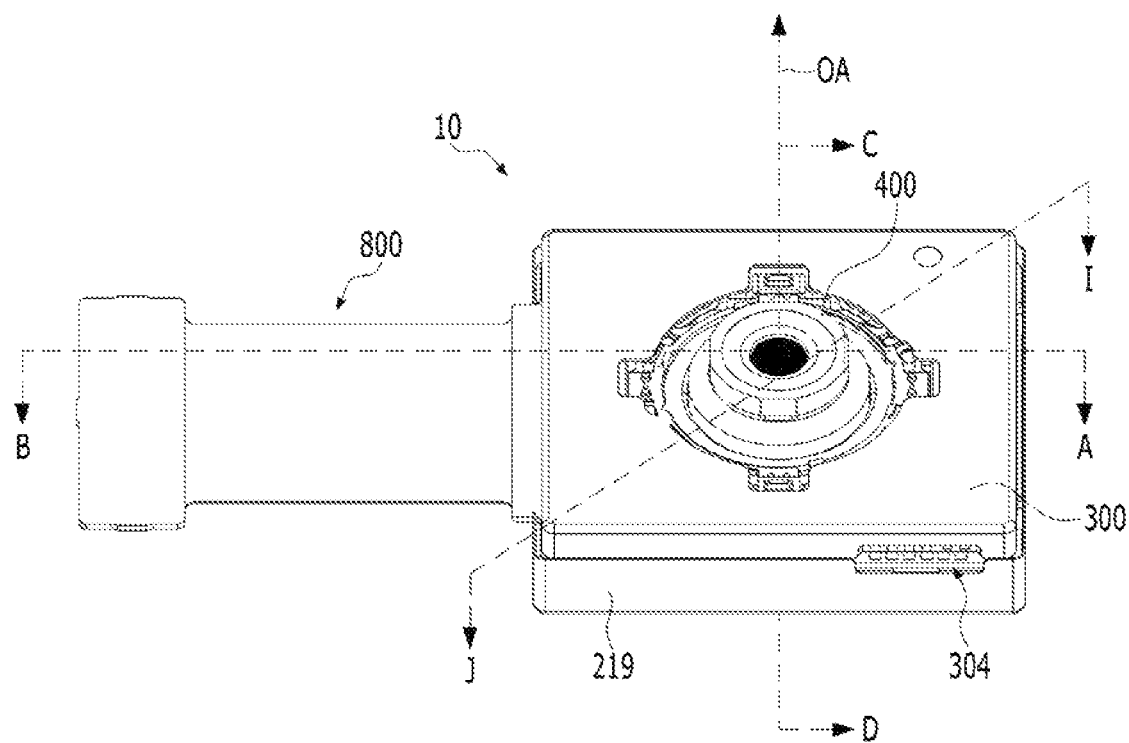
FIG. 1 is a perspective view of a camera module according to an embodiment of the present invention.

Hereinafter, embodiments of the present invention will be described in detail with reference to the accompanying drawings.

The technical idea of the present invention may be embodied in many different forms, and should not be construed as being limited to the following embodiments set forth herein. One or more of components of the embodiments may be selectively combined with each other or replaced without departing from the technical spirit and scope of the present invention.

Unless otherwise particularly defined, terms (including technical and scientific terms) used in the embodiments of the present invention have the same meanings as those commonly understood by one of ordinary skill in the art to which this invention belongs. It will be further understood that commonly used terms, such as those defined in dictionaries, should be interpreted as having meanings consistent with their meanings in the context of the relevant art.

The terminology used in the embodiments of the present invention is for the purpose of describing particular embodiments only, and is not intended to limit the present invention. As used in the disclosure and the appended claims, the singular forms are intended to include the plural forms as well, unless the context clearly indicates otherwise. The phrase "at least one (or one or more) of A, B and C" may be interpreted as including one or more of all combinations of A, B and C.

Furthermore, when describing the components of the present invention, terms such as "first", "second", "A", "B", "(a)" or "(b)" may be used. Since these terms are provided merely for the purpose of distinguishing the components from each other, they do not limit the nature, sequence or order of the components.

It should be understood that, when an element is referred to as being "linked", "coupled" or "connected" to another element, the element may be directly "linked", "coupled" or "connected" to the another element, or may be "linked", "coupled" or "connected" to the another element via a further element interposed therebetween. Furthermore, it will be understood that, when an element is referred to as being formed "on" or "under" another element, it can be directly "on" or "under" the other element, or can be indirectly disposed with regard thereto, with one or more intervening elements therebetween. In addition, it will also be understood that "on" or "under" the element may mean an upward direction or a downward direction based on the element.

Hereinafter, an AF operation unit may be alternatively referred to as a "lens moving unit", a "VCM (Voice Coil Motor)", an "actuator" or a "lens moving device". Hereinafter, the term "coil" may be interchangeably used with "coil unit", and the term "elastic member" may be interchangeably used with "elastic unit" or "spring".

In the follow description, the "terminal" may be alternatively referred to as a "pad", "electrode", "conductive layer" or "bonding portion".

Hereinafter, the "code value" may be alternatively referred to as a "data value" or a "digital value".

Hereinafter, the "camera module" may be alternatively referred to as a "camera", an "imaging device" or a "camera device".

For the convenience of description, although the camera module according to an embodiment is described using a rectangular coordinate system (x, y, z), the lens moving apparatus may be described using some other coordinate systems, and the embodiments are not limited thereto. In the respective drawings, the X-axis direction and the Y-axis direction mean directions perpendicular to an optical axis, i.e. the Z-axis. The Z-axis direction, which is the direction of the optical axis OA, may be referred to as a "first direction", the X-axis direction may be referred to as a "second direction", and the Y-axis direction may be referred to as a "third direction".

The camera module according to an embodiment of the present invention is capable of performing an "auto-focusing function". Here, the "auto-focusing function" serves to automatically focus an image of a subject on an image sensor surface.

In addition, the camera module according to the embodiment may perform a function of "handshake correction". Here, the function of "handshake correction" may serve to prevent the contour line of a captured image from being blurred due to vibration caused by shaking of the user's hand when capturing a still image.

Figure 2:
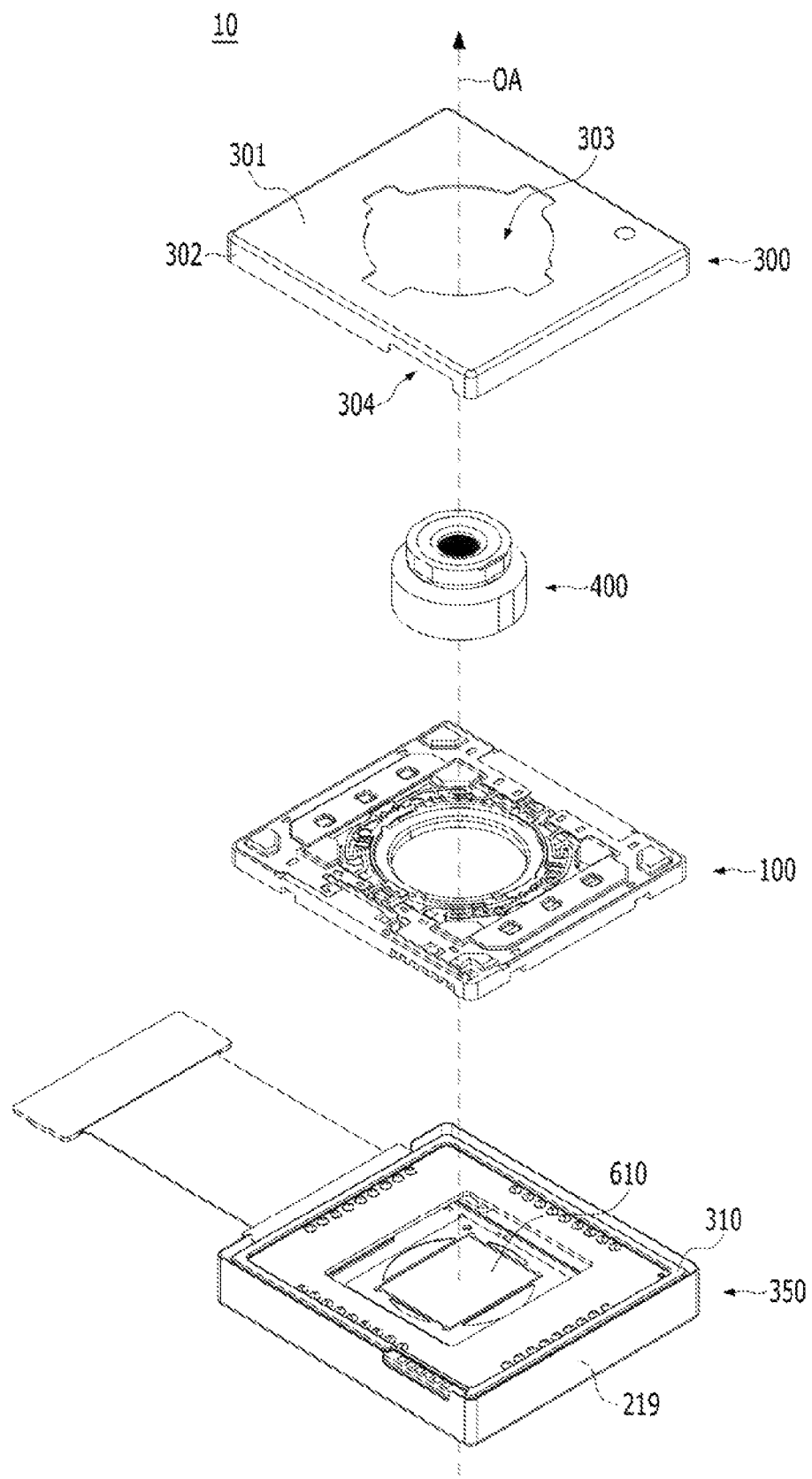
FIG. 2 is an exploded perspective view of the camera module shown in FIG. 1.
Figure 3:
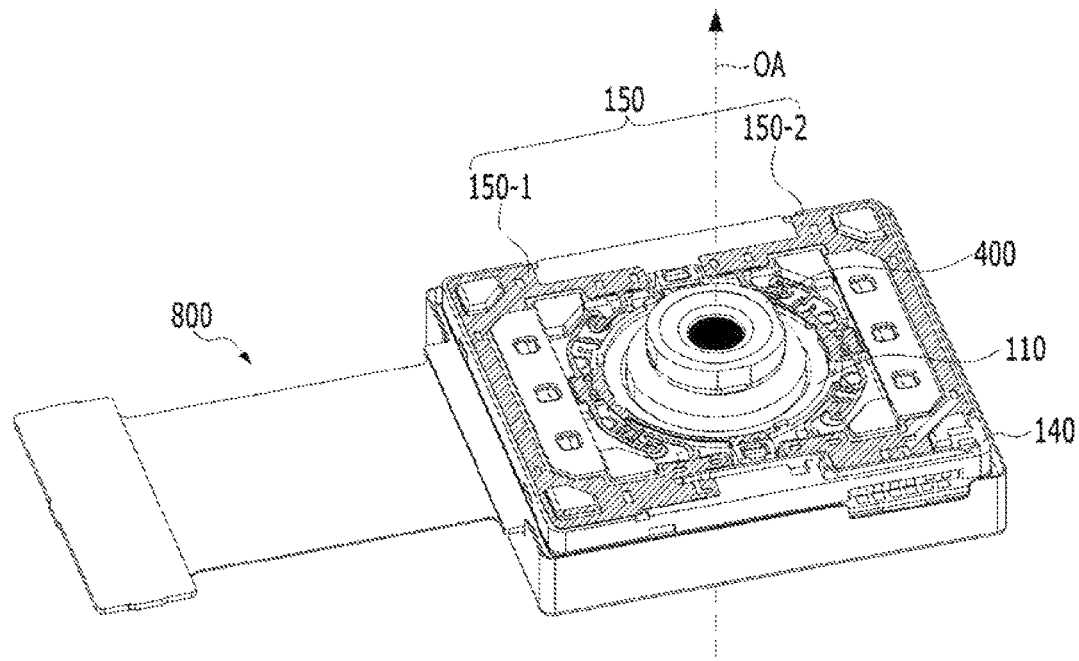
FIG. 3 is an assembled perspective view of the camera module shown in FIG. 1, from which a cover member is removed.
Figure 4:
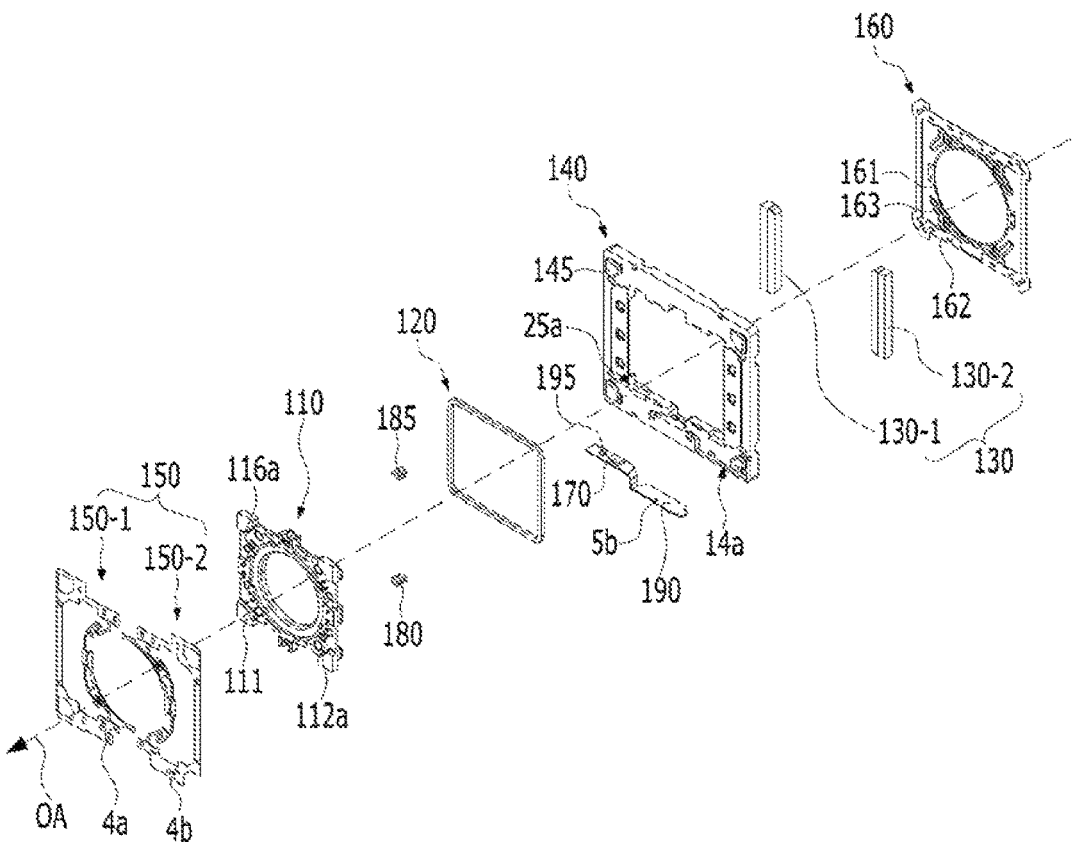
FIG. 4 is an exploded perspective view of the AF operation unit shown in FIG. 2.
Figure 5:
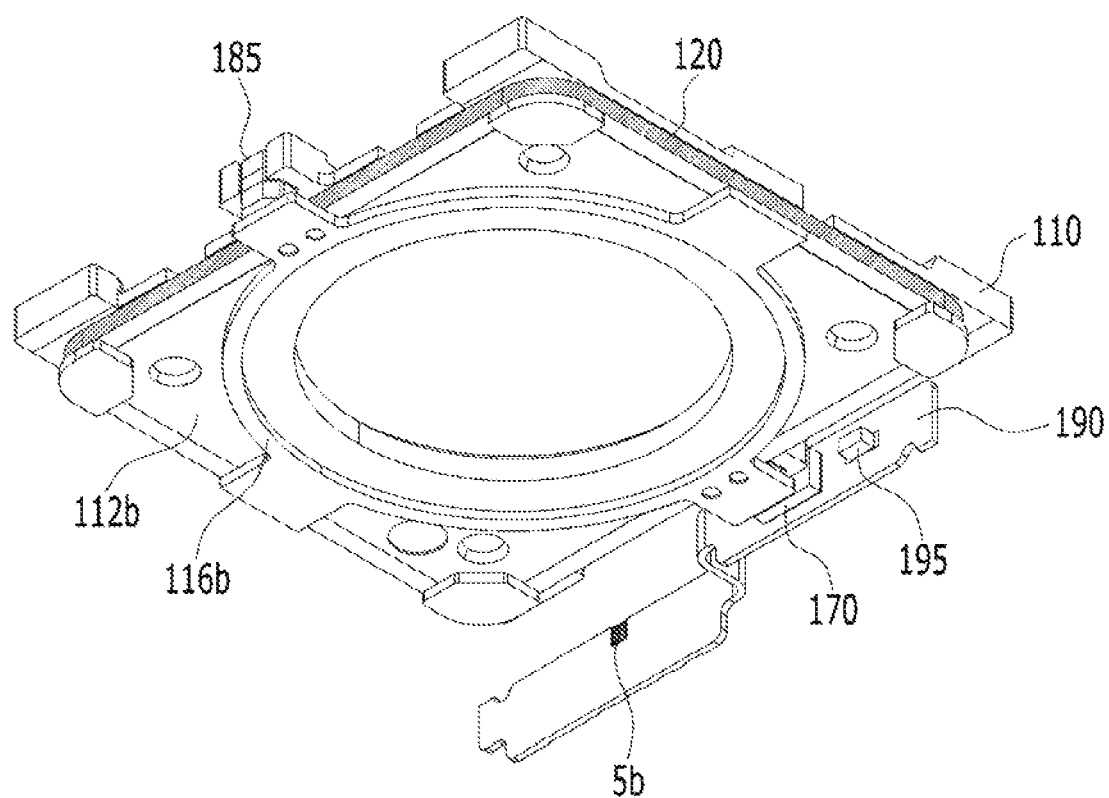
FIG. 5 is a perspective view of the bobbin, the sensing magnet, the balancing magnet, the first coil, the circuit board, the first position sensor, and the capacitor shown in FIG. 4.
Figure 6:
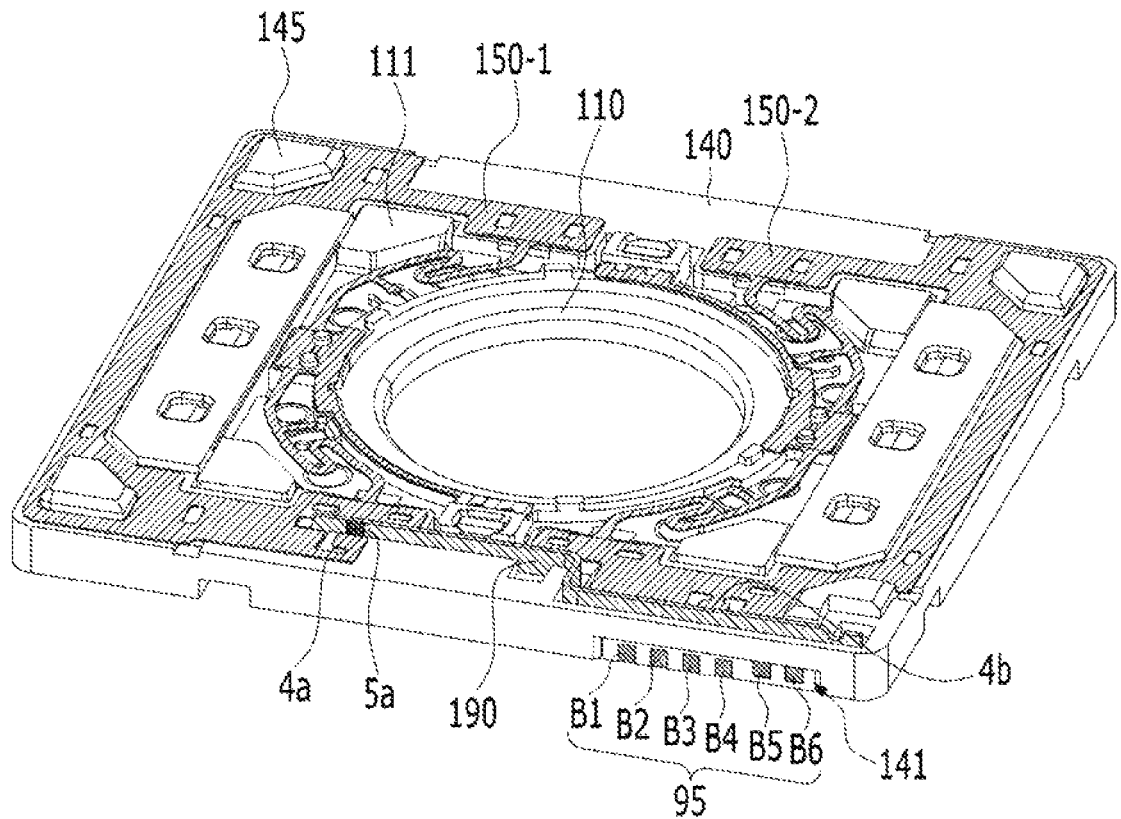
FIG. 6 is a perspective view of the bobbin, the housing, the circuit board, and the upper elastic member.
Figure 7:
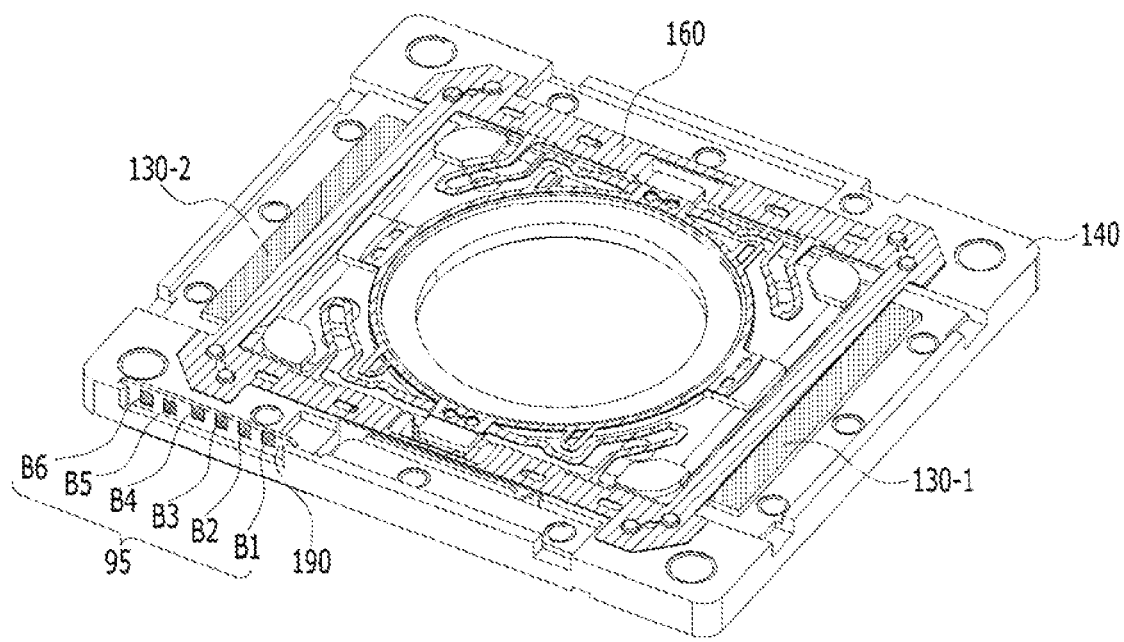
FIG. 7 is a bottom perspective view of the housing, the bobbin, the lower elastic member, the magnet, and the circuit board.

FIG. 1 is a perspective view of the camera module 10 according to the embodiment of the present invention. FIG. 2 is an exploded perspective view of the camera module 10 shown in FIG. 1. FIG. 3 is an assembled perspective view of the camera module shown in FIG. 1, from which a cover member 300 is removed. FIG. 4 is an exploded perspective view of the AF operation unit 100 shown in FIG. 2. FIG. 5 is a perspective view of the bobbin 110, the sensing magnet 180, the balancing magnet 185, the first coil 120, the circuit board 190, the first position sensor 170, and the capacitor 195 shown in FIG. 4. FIG. 6 is a perspective view of the bobbin 110, the housing 140, the circuit board 190, and the upper elastic member 150. FIG. 7 is a bottom perspective view of the housing 140, the bobbin 110, the lower elastic member 160, the magnet 130, and the circuit board 190.

Referring to FIGS. 1 to 7, the camera module 10 may include the AF operation unit 100 and an image sensor unit 350.

The camera module 10 may further include at least one of the cover member 300, a lens module 400, a base 210, and a bottom cover 219. The cover member 300, the base 210, and the bottom cover 219 may define the case.

The AF operation unit 100 may be coupled to the lens module 400, and may move the lens module 400 in the direction of the optical axis OA or in a direction parallel to the optical axis in order to perform an autofocusing function of the camera module 10.

The image sensor unit 350 may include an image sensor 810, and may move the image sensor 810 in a direction perpendicular to the optical axis or may tilt or rotate the image sensor 810 relative to the optical axis. The imager sensor unit 350 may perform a function of handshake correction.

For example, the image sensor 810 may be rotated about at least one of the x-axis, the y-axis and the z-axis.

For example, the image sensor 810 may be moved in at least one direction among the x-axis direction, the y-axis direction and the z-axis direction.

For example, the image sensor 810 may be tilted relative to at least one of the x-axis, the y-axis and the z-axis.

The AF operation unit 100 may be alternatively referred to as a "lens moving unit" or a "lens moving apparatus". Alternatively, the AF operation unit 100 may be alternatively referred to as a "first actuator" or an "AF operation drive unit".

For motion of OIS (Optical Image Stabilization), the image sensor 810 rather than the lens module 400 may be moved in a direction perpendicular to the optical axis by the image sensor unit 350.

The image sensor unit 350 may be alternatively referred to as an "image-sensor moving unit" or an "image-sensor shift unit", a "sensor moving unit" or a "sensor shift unit". Alternatively, the image sensor unit 350 may be alternatively referred to as a "second actuator" or an "OIS drive unit".

Referring to FIG. 4, the AF operation unit 100 may include the bobbin 110, the first coil 120, the magnet 130, and the housing 140.

The AF operation unit 100 may further include the upper elastic member 150 and the lower elastic member 160.

The AF operation unit 100 may include a first position sensor 170, the circuit board 190, and the sensing magnet 180 for AF feedback operation. The AF operation unit 100 may further include at least one of the balancing magnet 185 and the capacitor 195.

The bobbin 110 may be disposed in the housing 140 so as to be movable in the optical-axis direction OA or the first direction (for example, the Z-axis direction) by the electromagnetic interaction between the first coil 120 and the magnet 130.

The bobbin 110 may have a bore to which a lens module 400 is coupled or mounted. For example, the bore in the bobbin 110 may be a through hole formed through the bobbin 110 in the optical-axis direction, and may have a circular shape, an elliptical shape or a polygonal shape, without being limited thereto.

The lens module 400 may include at least one lens and/or a lens barrel.

For example, the lens module 400 may include at least one lens and a lens barrel receiving the at least one lens. However, the configuration of the lens module is not limited to the lens barrel, and the lens module may have any configuration, as long as the configuration is capable of supporting the at least one lens.

For example, the lens module 400 may be threadedly engaged with the bobbin 110. Alternatively, the lens module 400 may be coupled to the bobbin 110 using, for example, an adhesive (not shown). The light that has passed through the lens module 400 may be radiated to the image sensor 810 through a filter 610.

The bobbin 110 may include a projection 111 provided on the outer surface thereof.

For example, although the projection 111 may project in a direction that is parallel to a line perpendicular to the optical axis OA, but the disclosure is not limited thereto.

The projection 111 of the bobbin 110 may correspond to a groove 25a in the housing 140, and may be disposed in the groove 25a in the housing 140 so as to minimize or prevent rotation of the bobbin 110 about the optical axis beyond a predetermined range.

Furthermore, the projection 111 may serve as a stopper configured to cause the bobbin 110 to move within a predetermined range in the optical-axis direction (for example, in a direction toward the lower elastic member 160 from the upper elastic member 150) in response to an external impact or the like.

The bobbin 110 may have formed in the upper surface thereof a first escape groove 112a for avoiding spatial interference with a first frame connector 153 of the upper elastic member 150. The bobbin 110 may have formed in the lower surface thereof a second escape groove 112b for avoiding spatial interference with a second frame connector 163 of the lower elastic member 160.

The bobbin 110 may include a first coupler 116a, configured to be coupled and fixed to the upper elastic member 150. For example, although the first coupler 116a of the bobbin 110 may have a flat shape, the disclosure is not limited thereto. In another embodiment, the first coupler 116a of the bobbin 110 may have the shape of a protrusion or a groove.

The bobbin 110 may include a second coupler 116b configured to be coupled and fixed to the lower elastic member 160. For example, although the second coupler 116b may have a flat shape, the disclosure is not limited thereto. In another embodiment, the second coupler 116b may have the shape of a protrusion or a groove.

Referring to FIG. 5, the outer surface of the bobbin 110 may have formed therein a groove in which the first coil 120 is seated, fitted or disposed. The groove in the bobbin 110 may have a shape corresponding to the shape of the first coil 120, that is, a closed curve shape (for example, a ring shape).

The bobbin 110 may be provided therein with a first seating groove in which the sensing magnet 180 is seated, fitted, fixed, or disposed. Furthermore, the bobbin 110 may be provided in the outer surface thereof with a second seating groove in which the balancing magnet 185 is seated, fitted, fixed or disposed. For example, the first and second seating grooves in the bobbin 110 may be formed in outer surfaces of the bobbin 110 that are opposite each other.

The first coil 120 may be disposed at the bobbin 110, or may be coupled to the bobbin 110. For example, the first coil 120 may be disposed on the outer surface of the bobbin 110.

The first coil 120 may surround the outer surface of the bobbin 110 about the optical axis OA in a winding direction, without being limited thereto.

Although the first coil 120 may be directly wound around the outer surface of the bobbin 110, the disclosure is not limited thereto. In another embodiment, the first coil 120 may be embodied as a coil ring, which is wound around the bobbin 110, or as a coil block having an angled shape.

A power or drive signal may be supplied to the coil 120.

The power or drive signal supplied to the first coil 120 may be a DC signal, an AC signal or a signal containing both DC and AC components, and may be of a voltage type or a current type.

When a drive signal (for example, drive current) is supplied to the first coil 120, it is possible to create electromagnetic force resulting from the electromagnetic interaction with the first magnet, thereby moving the bobbin 110 in the direction of the optical axis OA by virtue of the created electromagnetic force.

At the initial position of the AF operation unit, the bobbin 110 may be moved upwards or downwards, which is referred to as bidirectional driving of the AF operation unit. Alternatively, at the initial position of the AF operation unit, the bobbin 110 may be moved upwards (or forwards), which is referred to as unidirectional driving.

At the initial position of the AF operation unit, the first coil 120 may be disposed so as to correspond to the magnet 130 disposed at the housing 140 in a direction parallel to a line which is perpendicular to the optical axis OA and extends through the optical axis.

For example, the AF operation unit may include the bobbin 110 and the components (for example, the first coil 120, the sensing magnet 180 and the balancing magnet 185) coupled to the bobbin 110. The AF operation unit may further include the lens module 400.

The initial position of the AF operation unit may be the original position of the AF operation unit in the state in which no electric power is applied to the first coil 120 or the position at which the AF operation unit is located as the result of the upper and lower elastic members 150 and 160 being elastically deformed due only to the weight of the AF operation unit.

In addition, the initial position of the bobbin 110 may be the position at which the AF operation unit is located when gravity acts in the direction from the bobbin 110 to the base 210 or when gravity acts in the direction from the base 210 to the bobbin 110.

The sensing magnet 180 may provide a magnetic field, which is detected by the first position sensor 170, and the balancing magnet 185 may serve to cancel out the influence of the magnetic field of the sensing magnet 180, and establishes weight equilibrium with respect to the sensing magnet 180.

The sensing magnet 180 may be alternatively referred to as a "sensor magnet".

The sensing magnet 180 may be disposed at the bobbin 110, or may be coupled to the bobbin 110.

The sensing magnet 180 may be disposed so as to face the first position sensor 170.

The balancing magnet 185 may be disposed at the bobbin 110, or may be coupled to the bobbin 110. For example, the balancing magnet 185 may be disposed opposite the sensing magnet 180.

Although each of the sensing magnet and the balancing magnet 180 and 185 may be a monopolar magnetized magnet having one N pole and one S pole, the disclosure is not limited thereto. In another embodiment, each of the sensing magnet and the balancing magnet 180 and 185 may be a bipolar magnetized magnet, which has two N poles and two S poles, or a tetrapolar magnetized magnet.

The sensing magnet 180 may be moved together with the bobbin 110 in the optical-axis direction, and the first position sensor 170 may detect the intensity or magnetic force of the magnetic field of the sensing magnet 180, which is moved in the optical-axis direction, and may output an output signal corresponding to the result of the detection.

For example, in accordance with displacement of the bobbin 110 in the optical-axis direction, the intensity or magnetic force of the magnetic field detected by the first position sensor 170 may vary. Consequently, the first position sensor 170 may output an output signal proportional to the detected intensity of the magnetic field, and the displacement of the bobbin 110 in the optical-axis direction may be detected using the output signal from the first position sensor 170.

The housing 140 accommodates therein the bobbin 110, and supports the magnet 130, the first position sensor 170, and the circuit board 190.

Referring to FIGS. 4, 6 and 7, the housing 140 may be configured to have a hollow column overall. For example, the housing 140 may have a polygonal (for example, a rectangular or octagonal) or circular bore, and the bore in the housing 140 may be a through hole, which is formed through the housing 140 in the optical-axis direction.

The housing 140 may include side portions, which correspond to or face the side plate 302 of the cover member 300, and corners, which correspond to or face the corners of the cover member 300.

In order to prevent a direct collision with the inner surface of the upper plate 301 of the cover member 300, the housing 140 may include a stopper 145 provided at the upper portion, the upper surface or the upper end thereof.

In order to prevent the lower surface of the housing 140 from colliding with the circuit board 800 of the image sensor 350, the housing 140 may further include a stopper projecting from the lower surface thereof. Here, the stopper 145 may be alternatively referred to as a "boss" or a "protrusion".

Referring to FIG. 4, the housing 140 may have a mounting groove (or a seating groove) 14a configured to receive the circuit board 190 therein. The mounting groove 14a may have a shape corresponding to the shape of the circuit board 190.

Referring to FIG. 6, the housing 140 may have an opening 141 through which terminals B1 to B6 of a terminal member 95 of the circuit board 190 are exposed. The opening 141 may be formed in the side portion of the housing 140.

The upper portion, the upper end or the upper surface of the housing 140 may be provided with at least one first coupler, which is to be coupled to a first outer frame 152 of the upper elastic member 150.

The lower portion, the lower end or the lower surface of the housing 140 may be provided with a second coupler, which is to be coupled and fixed to a second outer frame 162 of the lower elastic member 160. For example, each of the first and second couplers of the housing 140 may have the shape of a protrusion, a groove, or a flat surface.

The magnet 130 may be disposed at the housing 140. For example, the magnet 130 may be disposed at the side portion of the housing 140. The magnet 130 may be an AF operation magnet for AF operation.

For example, although the magnet 130 may include first and second magnets 130-1 and 130-2, which are disposed at two side portions, which are positioned opposite each other, the disclosure is not limited thereto. In another embodiment, the magnet 130 may be disposed at the corner of the housing 140.

The magnet 130 may include two or more magnets.

At the initial position of the AF operation unit, the first magnet 130 may be disposed at the housing so as to partially overlap the first coil 120 in a direction parallel to a line which is perpendicular to the optical axis OA and extends through the optical axis OA.

Although each of the first and second magnets 130-1 and 130-2 may be a monopolar magnetized magnet, the disclosure is not limited thereto. In another embodiment, each of the first and second magnets 130-1 and 130-2 may be a bipolar magnetized magnet, which has two N poles and two S poles, or a tetrapolar magnetized magnet.

The circuit board 190 may be disposed at the housing 140, and the first position sensor 170 may be disposed at or mounted to the circuit board 190. For example, the circuit board 190 may be disposed in the mounting groove 14a in the housing 140, and the terminals of the circuit board 190 may be exposed to the outside of the housing 140 through the opening 141 in the housing 140.

The circuit board 190 may include the terminal member (or terminal unit) 95 including the plurality of terminals B1 to B6, which are to be conductively connected to external terminals or external devices, and the plurality of terminals B1 to B6 may be conductively connected to the first position sensor 170.

The first position sensor 170 may be disposed on a first surface of the circuit board 190, and the plurality of terminals B1 to B6 may be disposed on a second surface of the circuit board 190. Here, the second surface of the circuit board 190 may be the surface opposite the first surface of the circuit board 190. For example, the first surface of the circuit board 190 may be the surface of the circuit board 190 that faces the bobbin 110 or the sensing magnet 180.

For example, the circuit board 190 may be embodied as a printed circuit board or an FPCB.

The circuit board 190 may include a circuit pattern or a wire (not shown) for conductively connecting the first to sixth terminals B1 to B6 to the first position sensor 170.

The first position sensor 170 may detect the magnetic field or the intensity of the magnetic field of the sensing magnet 180 mounted on the bobbin 110 during movement of the bobbin 110, and may output an output signal corresponding to the result of the detection.

The first position sensor 170 may be embodied as only a single Hall sensor. The first position sensor 170 may include two input terminals, to which drive signals or power are supplied, and two output terminals, through which a sensing voltage (or an output voltage) is output.

For example, drive signals may be supplied to the first position sensor 170 through the first and second terminals B1 and B2 of the circuit board 190, and the output of the first position sensor 170 may be output to the outside through the third and fourth terminals B3 and B4.

The fifth and sixth terminals B5 and B6 of the circuit board 190 may be conductively connected to at least one of the upper elastic member 150 and the lower elastic member 160 so as to supply drive signals to the first coil 120.

For example, the fifth and sixth terminals B5 and B6 of the circuit board 190 may be conductively connected to first and second elastic members 150-1 and 150-2 of the upper elastic member 150 so as to supply drive signals to the first coil 120 through the first and second elastic members 150-1 and 150-2.

In another embodiment, the first position sensor 170 may be embodied as a driver IC including a Hall sensor. For example, the first position sensor 170 may include a Hall sensor and a driver. Here, the first position sensor 170 may include the first to fourth terminals, through which data is transmitted to and received from the outside through data communication using a protocol such as, for example, I2C communication, and the fifth and sixth terminals, through which drive signals are directly supplied to the first coil 120. The first to fourth terminals of the first position sensor 170 may be conductively connected to the first to fourth terminals B1 to B4 of the circuit board 190.

The fifth and sixth terminals of the first position sensor 170 may be conductively connected to the first coil 120 through at least one of the upper elastic member 150 and the lower elastic member 160 so as to supply drive signals to the first coil 120. For example, the fifth and sixth terminals of the first position sensor 170 may be conductively connected to the first and second elastic members 150-1 and 150-2 so as to supply drive signals to the first coil 120. The capacitor 195 may be disposed or mounted on the first surface of the circuit board 190.

The capacitor 195 may be configured to have a chip shape. Here, the chip may include a first terminal, which corresponds to one end of the capacitor 195, and a second terminal, which corresponds to the other end of the capacitor 195. The capacitor 195 may be alternatively referred to as a "capacitive element" or "condenser".

The capacitor 195 may be conductively connected in parallel to first and second terminals B1 and B2 of the circuit board 190 through which power (or a drive signal) is supplied to the position sensor 170 from the outside. Alternatively, the capacitor 195 may be conductively connected in parallel to the terminals of the first position sensor 170, which is conductively connected to the first and second terminals B1 and B2 of the circuit board 190.

Since the capacitor 195 is conductively connected in parallel to the first and second terminals B1 and B2 of the circuit board 190, the capacitor 195 is capable of serving as a smoothing circuit for eliminating ripple components included in the power signals GND and VDD, which are supplied to the first position sensor 170 from the outside, and is thus capable of supplying stable and consistent power signals to the first position sensor 170.

The upper elastic member 150 may be coupled to the upper portion, the upper end or the upper surface of the bobbin 110 and the upper portion, the upper end or the upper surface of the housing 140, and the lower elastic member 160 may be coupled to the lower portion, the lower end or the lower surface of the bobbin 110 or the upper portion, the upper end or the upper surface of the housing 140.

The upper elastic member 150 and the lower elastic member 160 may elastically support the bobbin 110 with respect to the housing 140.

For example, the upper elastic member 150 may include the first and second elastic members 150-1 and 150-2. Although the lower elastic member 160 is embodied as a single unit or a single structure in FIG. 4, the disclosure is not limited thereto.

In another embodiment, at least one of the upper elastic member and the lower elastic member may include a plurality of elastic units or springs, which are conductively isolated or spaced apart from each other.

The upper elastic member 150 may further include a first inner frame 151 coupled or fixed to the upper portion, the upper surface or the upper end of the bobbin 110, a first outer frame 152 coupled or fixed to the upper portion, the upper surface or the upper end of the housing 140, and a first frame connector 153 connecting the first inner frame 151 to the first outer frame 152.

The lower elastic member 160 may include a second inner frame 161 coupled or fixed to the lower portion, the lower surface or the lower end of the bobbin 110, a second outer frame 162 coupled or fixed to the lower portion, the lower surface or the lower end of the housing 140, and a second frame connector 163 connecting the second inner frame 161 to the second outer frame 162.

Each of the first and second frame connectors 153 and 163 may be bent or curved (or may be formed into a curved line) at least once so as to define a predetermined pattern.

Each of the upper elastic member 150 and the lower elastic member 160 may be made of a conductive material.

Referring to FIGS. 4 and 5, the circuit board 190 may include two pads 5a and 5b. For example, although the first pad 5a may be disposed on the second surface of the circuit board 190 and the second pad 5b may be disposed on the first surface of the circuit board 190, the disclosure is not limited thereto. In another embodiment, both the first and second pads may be formed on only one of the first and second surfaces of the circuit board 190.

The first and second pads 5a and 5b may be conductively connected to the fifth and sixth terminals B5 and B6 of the circuit board 190. For example, the first pad 5a may be coupled to the first elastic member 150-1, and the second pad 5b may be coupled to the second elastic member 150-2.

For example, the first outer frame of the first elastic member 150-1 may include a first coupler 4a, configured to be coupled to the first pad 5a, and the first outer frame of the second elastic member 150-2 may include a second coupler 4b, configured to be coupled to the second pad 5b.

For example, one end of the first coil 120 may be coupled to the first elastic member 150-1, and the other end of the first coil 120 may be coupled to the second elastic member 150-2.

In another embodiment, the upper elastic member 150 may be coupled to the first pad 5a of the circuit board 190 so as to be conductively connected thereto, and the lower elastic member 160 may be coupled to the second pad 5b of the circuit board 190 so as to be conductively connected thereto. In a further embodiment, the lower elastic member 160 may include two lower elastic members, and each of the two lower elastic members may be coupled or conductively connected to a corresponding one of the first and second pads 5a and 5b of the circuit board 190. The first coil 120 may be conductively connected to the two lower elastic members.

Figure 8:
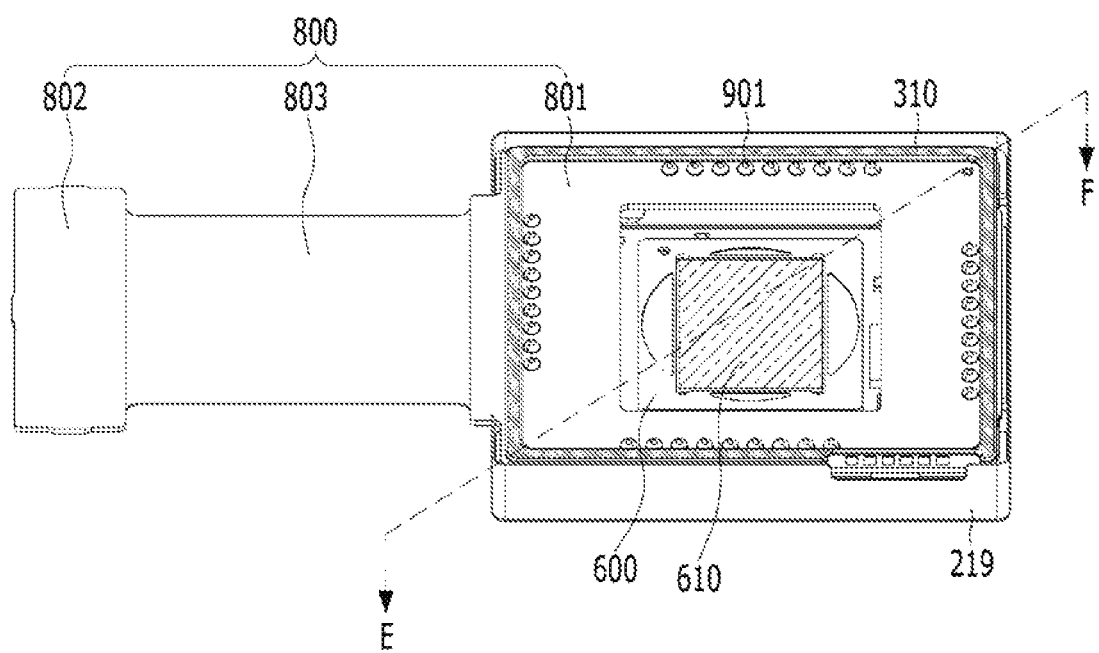
FIG. 8 is a plan view of the image sensor unit.
Figure 9:
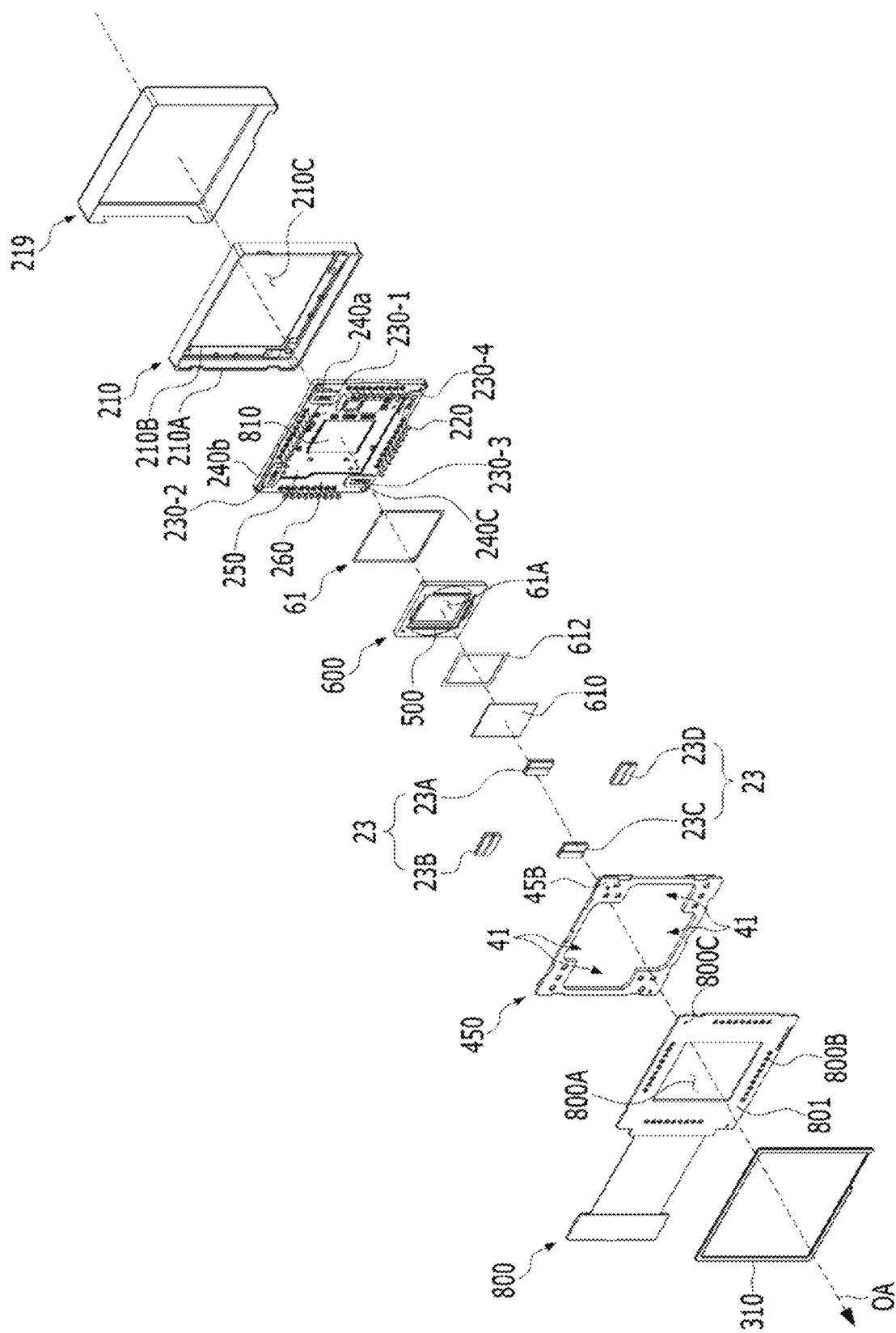
FIG. 9 is an exploded perspective view of the image sensor unit.
Figure 10:
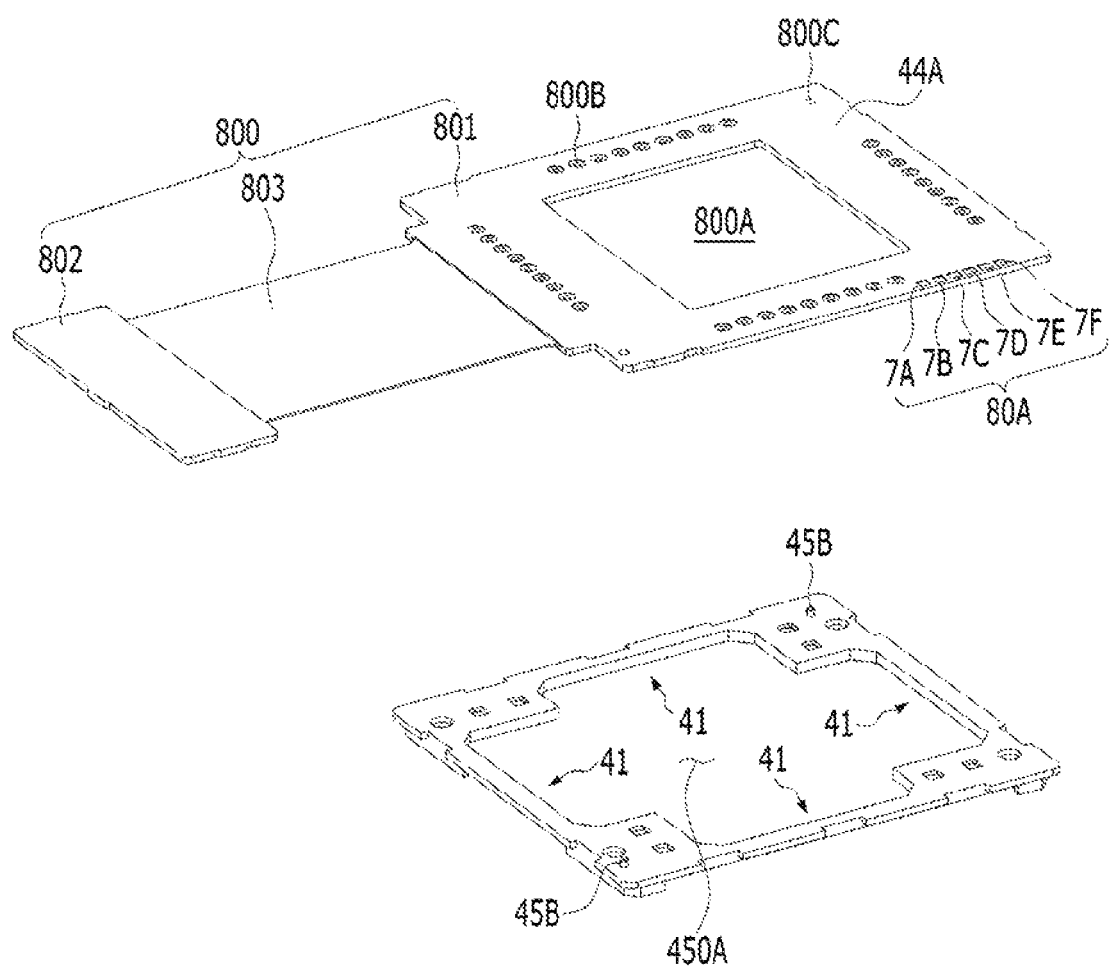
FIG. 10 is a perspective view of the second circuit board and the housing shown in FIG. 9.
Figure 11:
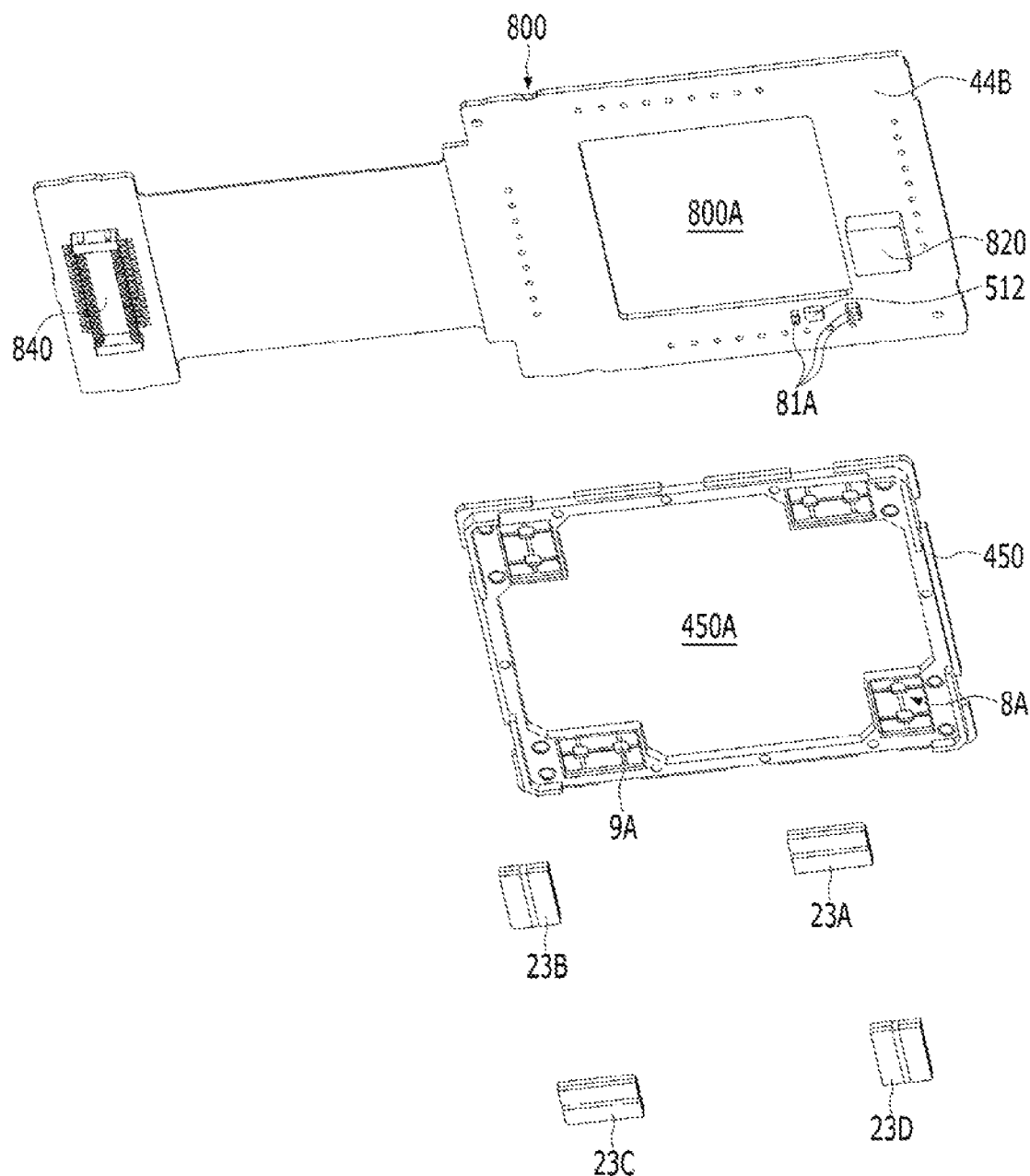
FIG. 11 is a perspective view of the second circuit board, the housing, and the magnet shown in FIG. 9.
Figure 12A:
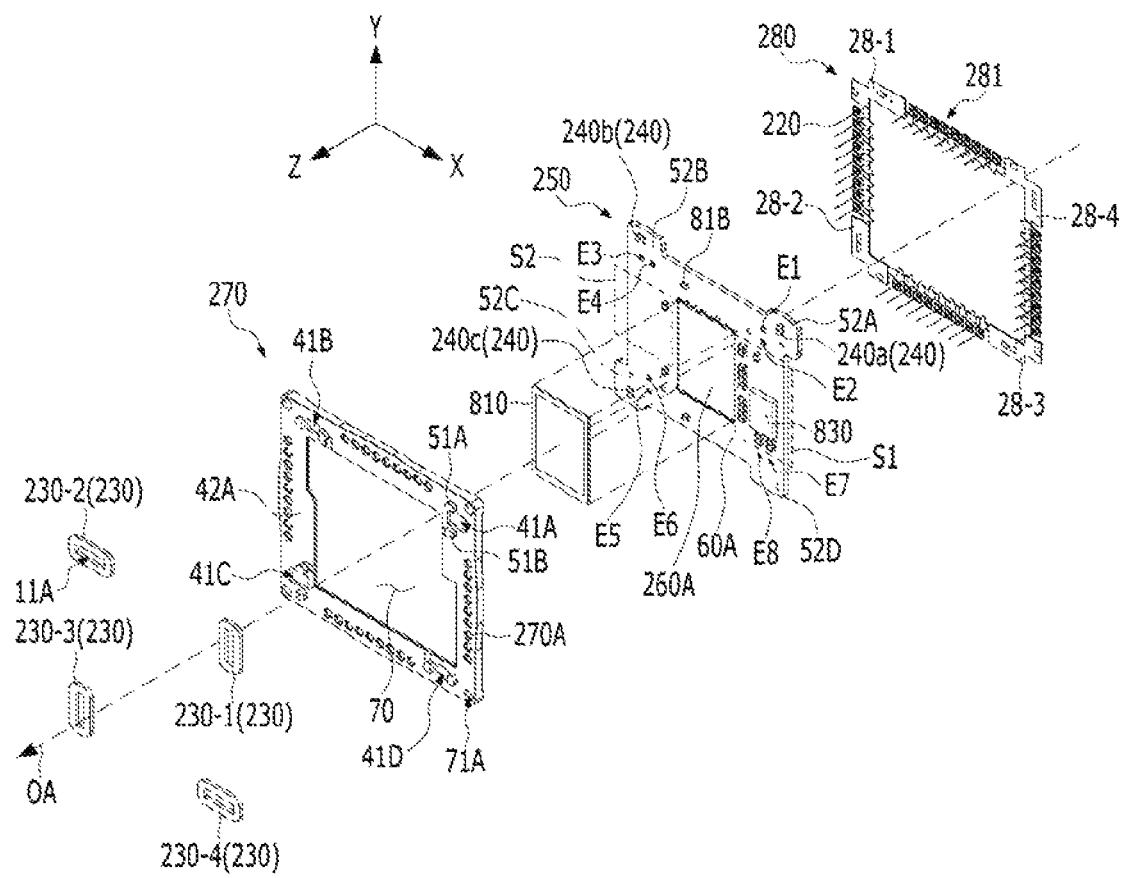
FIG. 12A is an exploded perspective view of a holder, a second coil, a first circuit board, a second position sensor, the image sensor, a support member, and a connective elastic member.
Figure 12B:
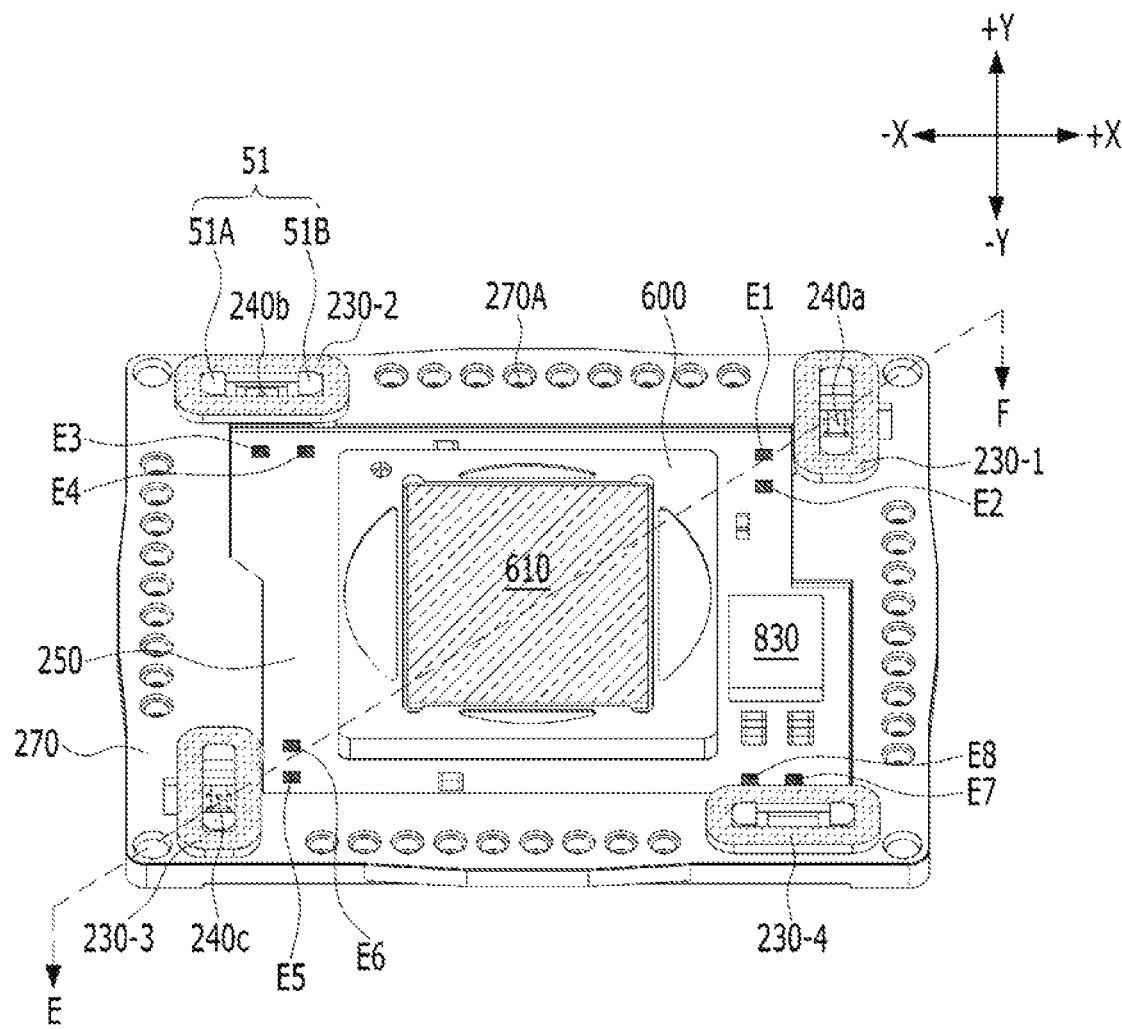
FIG. 12B is a perspective view of the holder, the second coil, the first circuit board, the second position sensor, the filter holder, and the filter shown in FIG. 12A.
Figure 13A:
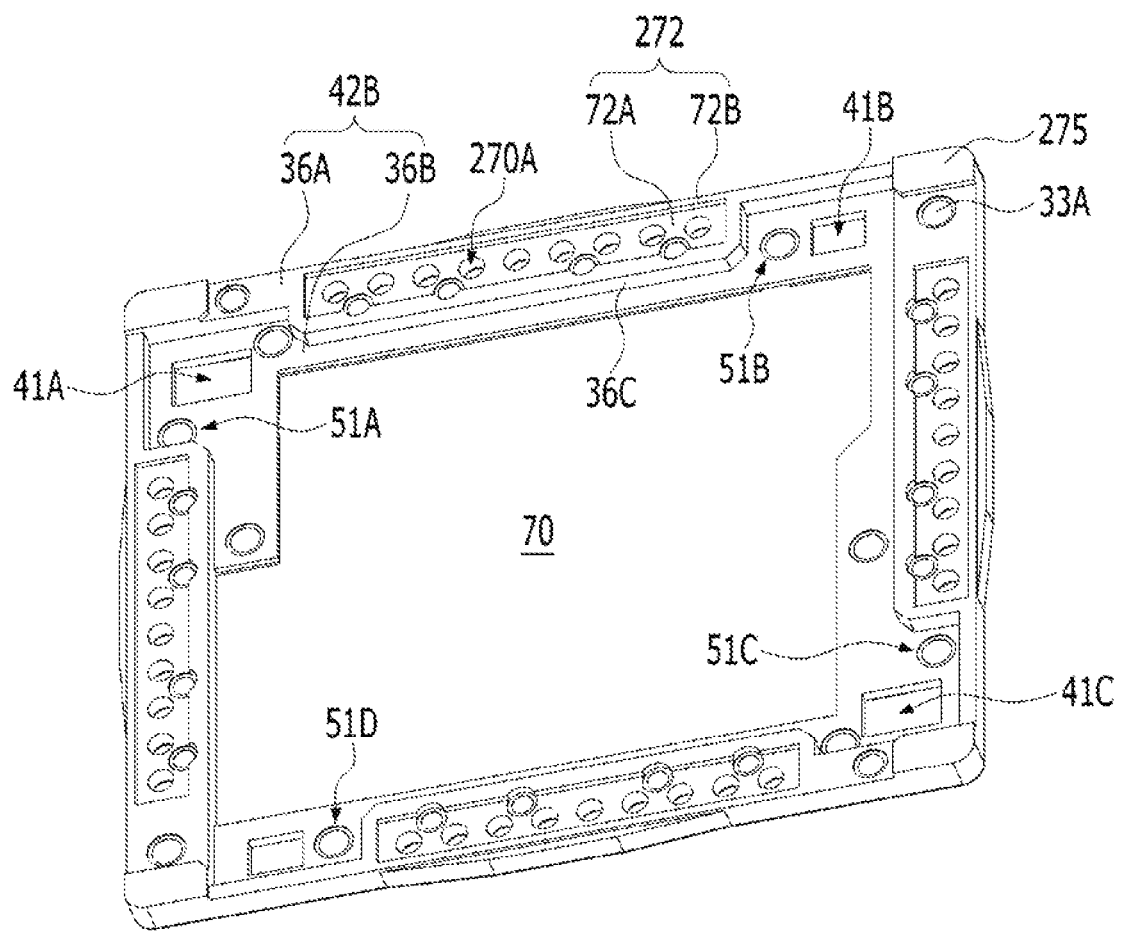
FIG. 13A is a bottom perspective view of the holder shown in FIG. 12A.
Figure 13B:
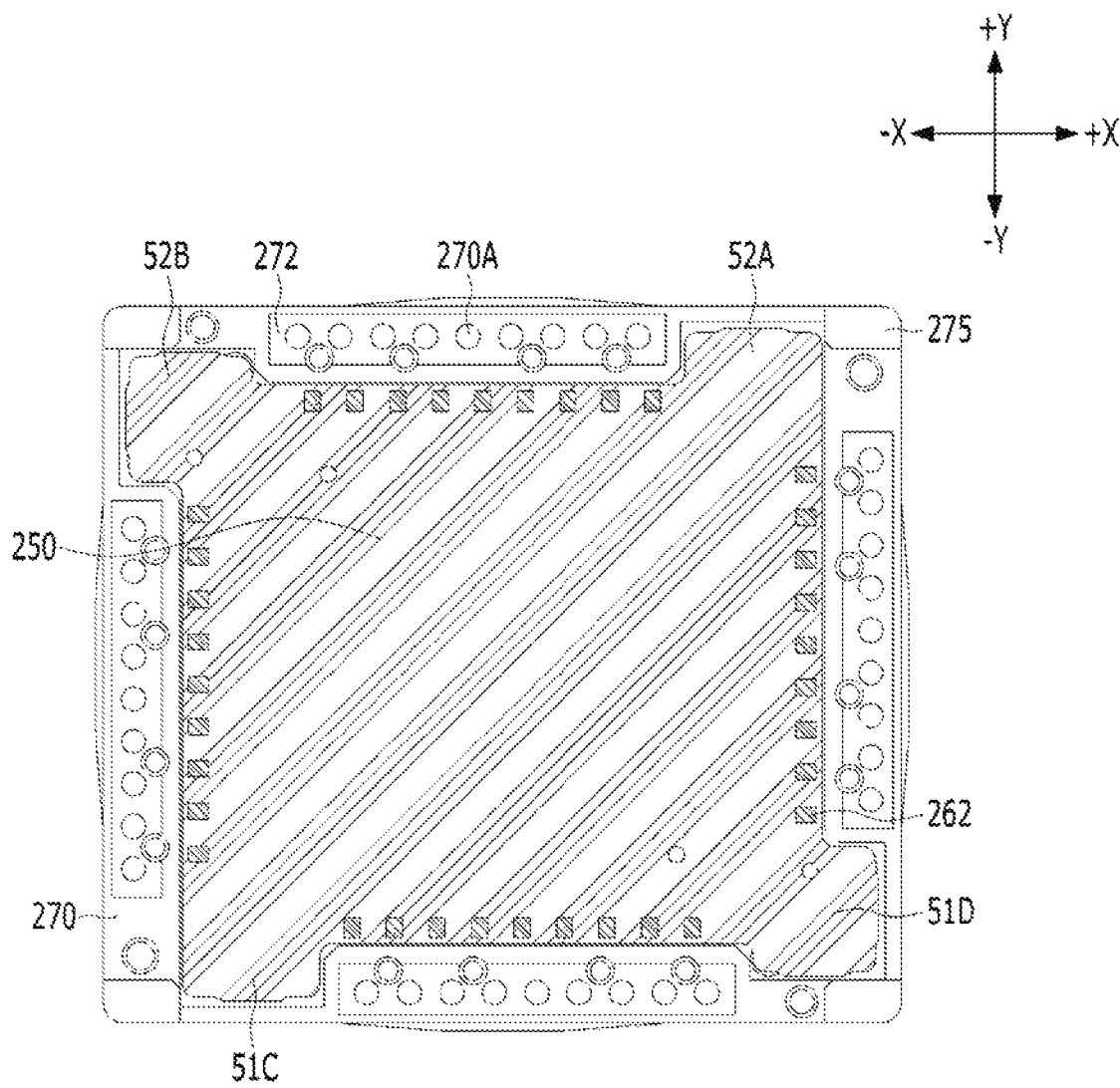
FIG. 13B is a bottom view of the holder and the first circuit board.
Figure 14:
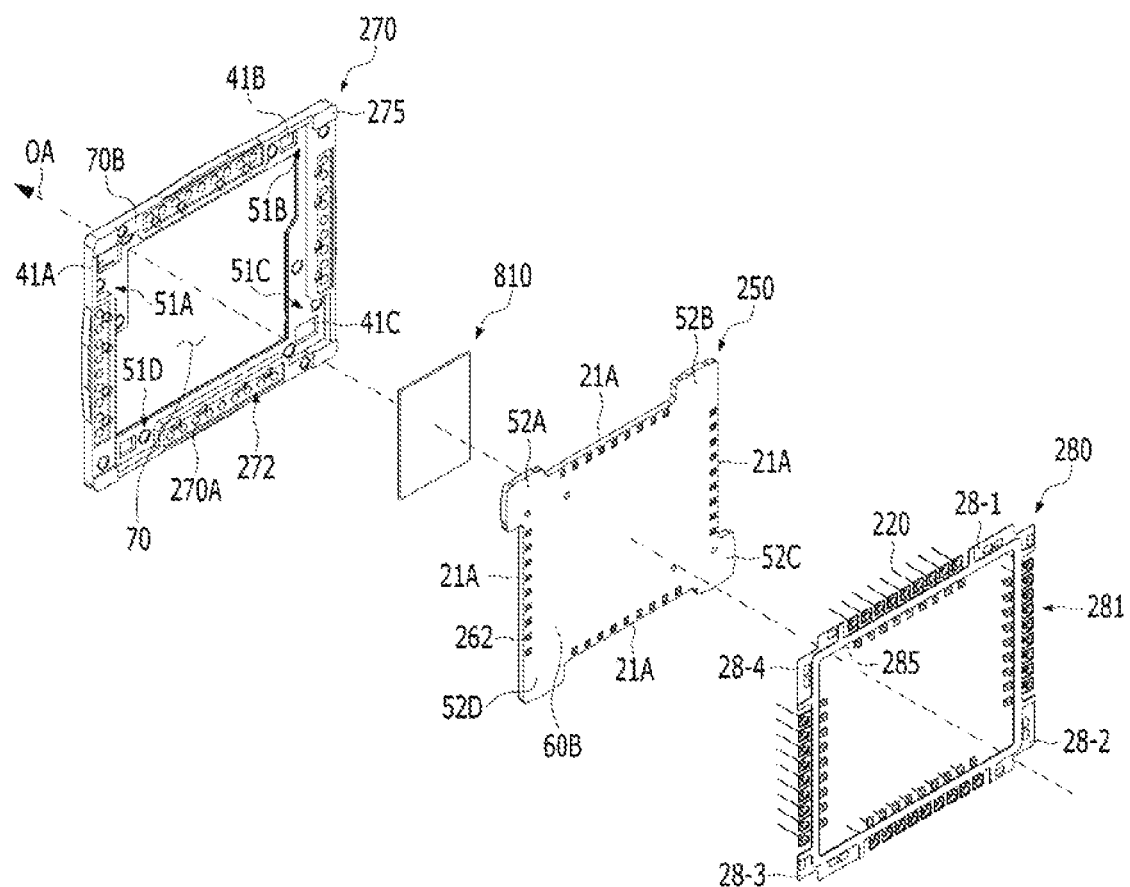
FIG. 14 is an exploded perspective view of the holder, the image sensor, the first circuit board, the support member, and the connective elastic member.
Figure 15:
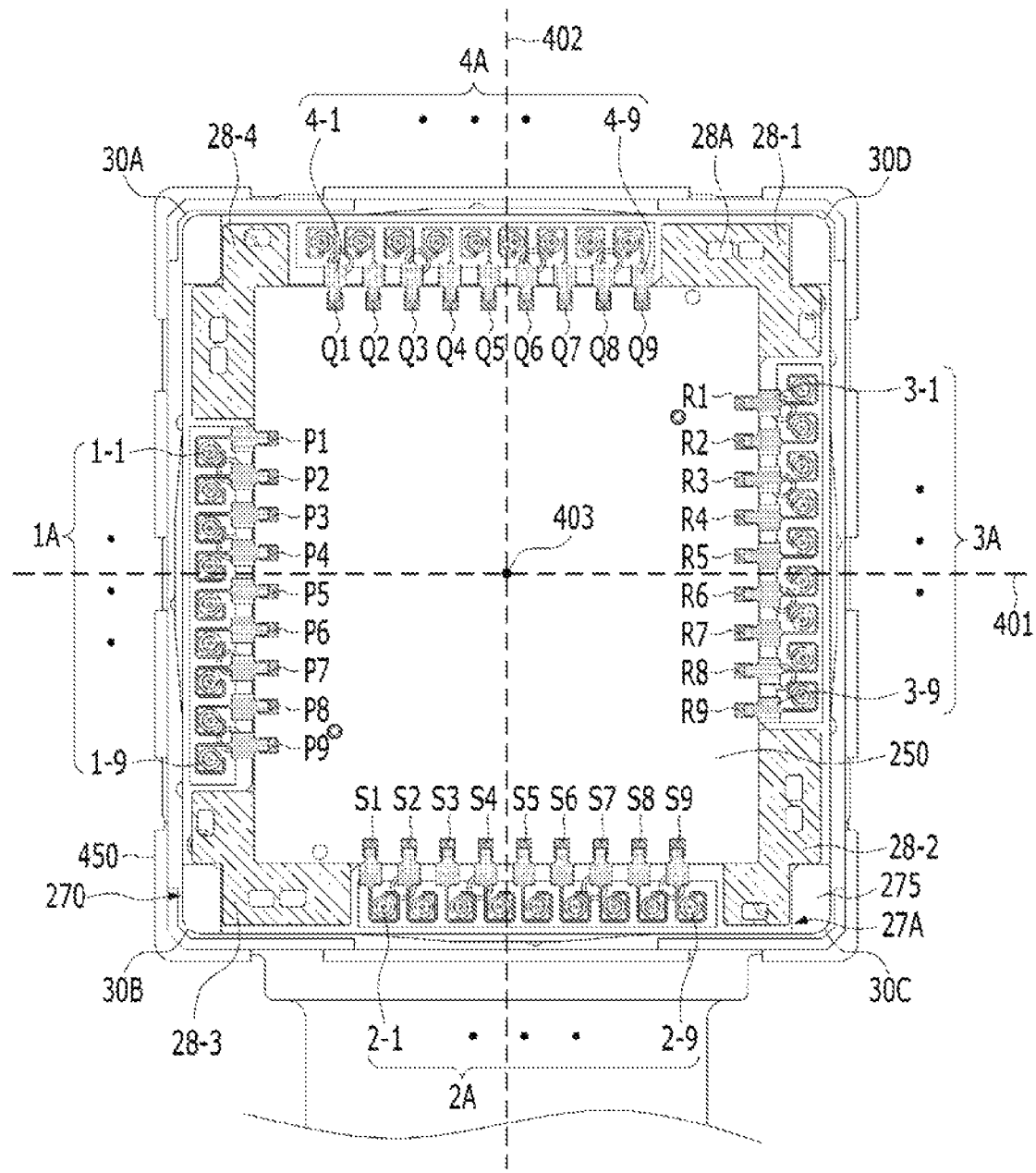
FIG. 15 is a bottom view of the holder, the first circuit board, and the connective elastic member.
Figure 16:
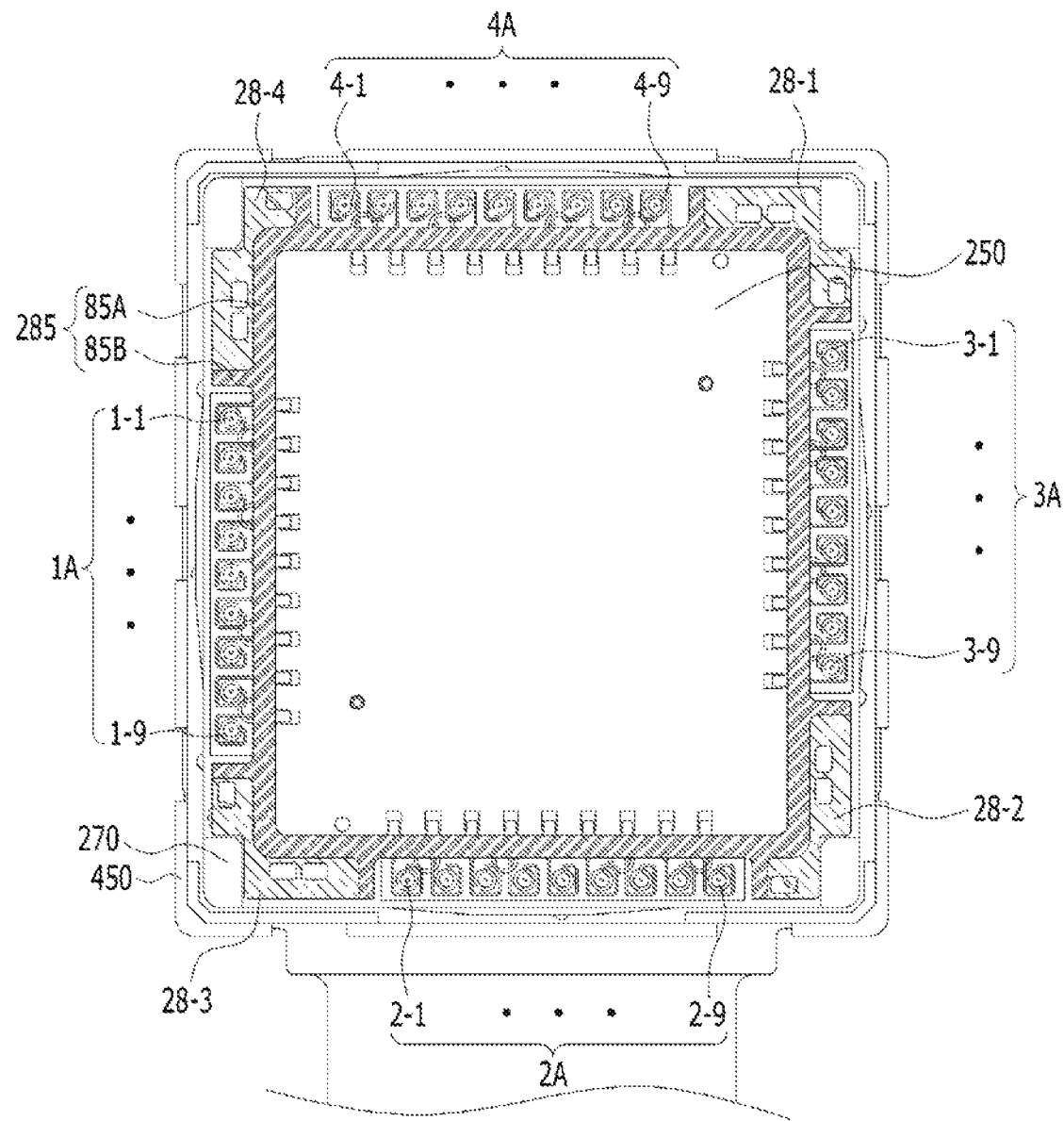
FIG. 16 is a bottom view of the holder, the first circuit board, the connective elastic member, and an insulation member.
Figure 17:
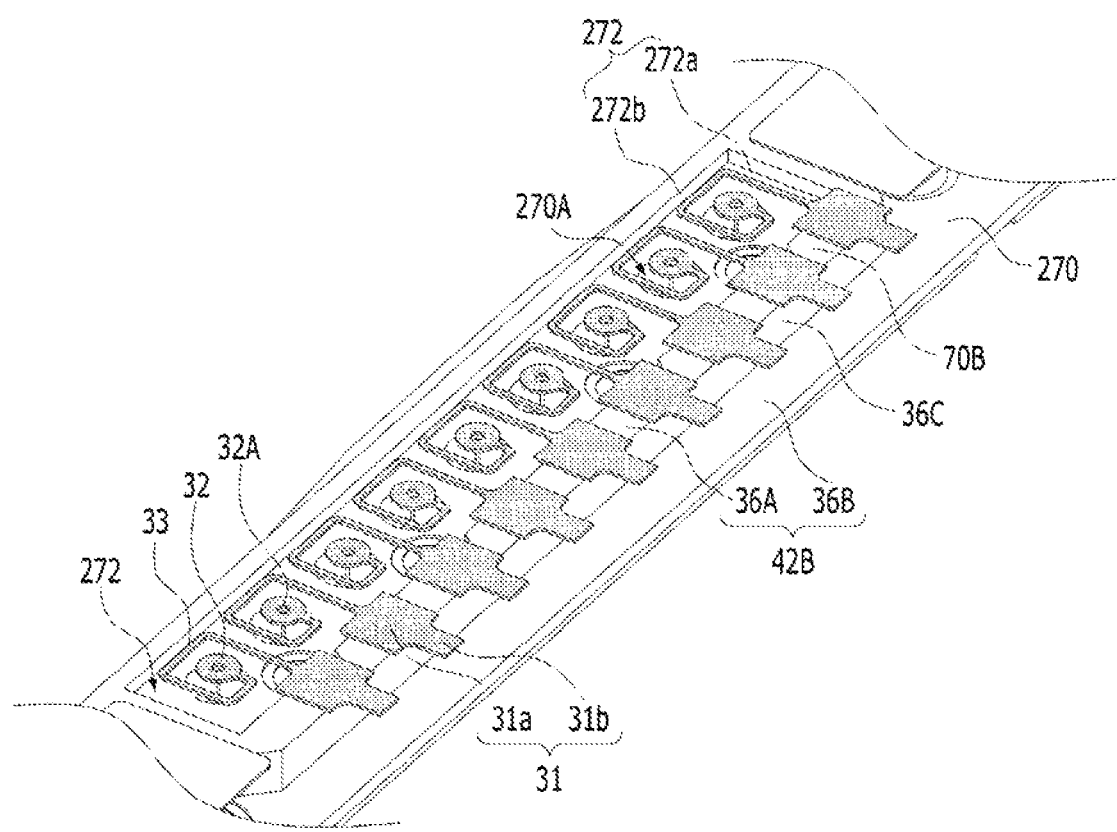
FIG. 17 is a fragmentary enlarged view of the connective elastic member.
Figure 18:
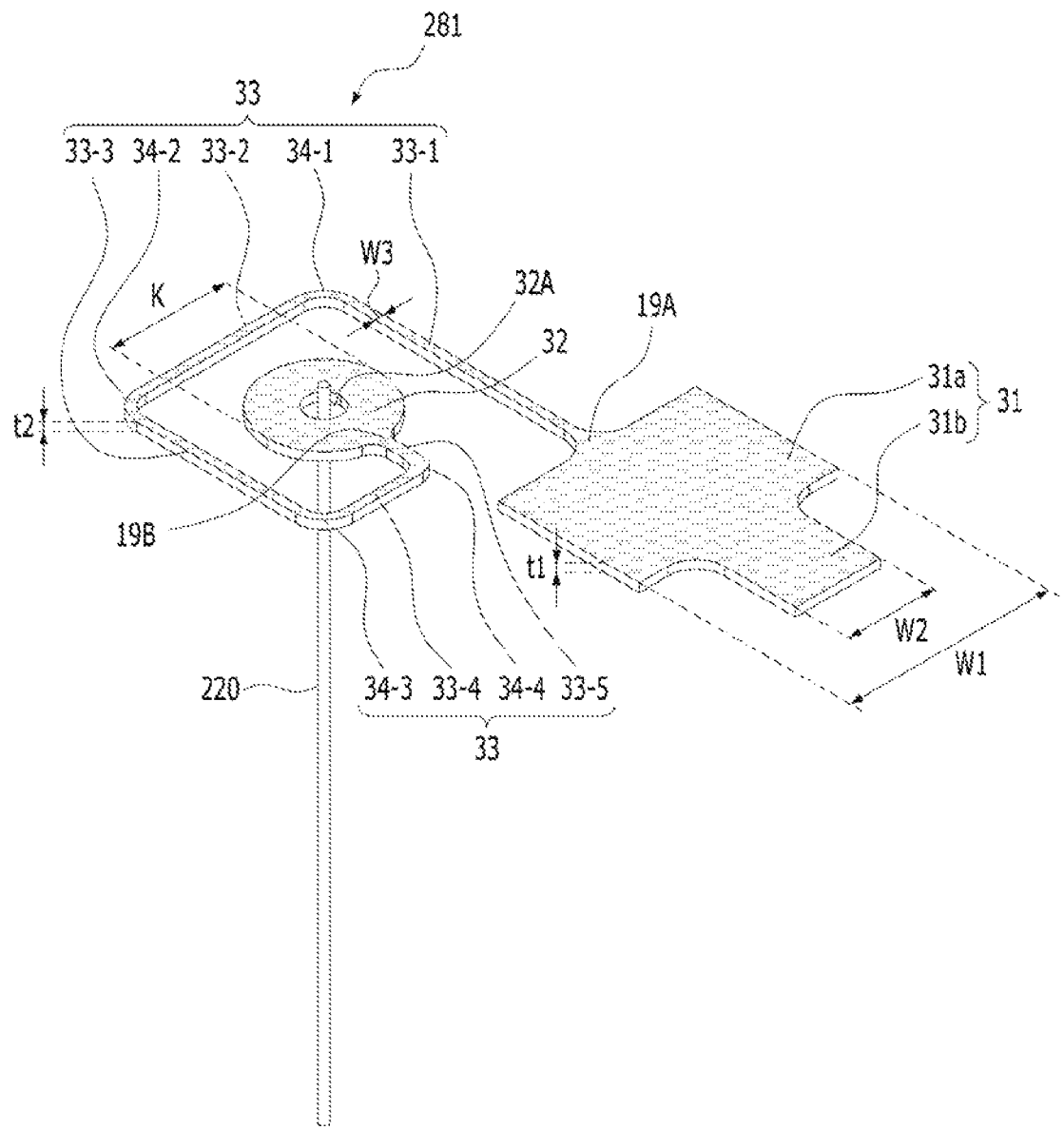
FIG. 18 is a perspective view of one connecting spring and one support member.
Figure 19A:
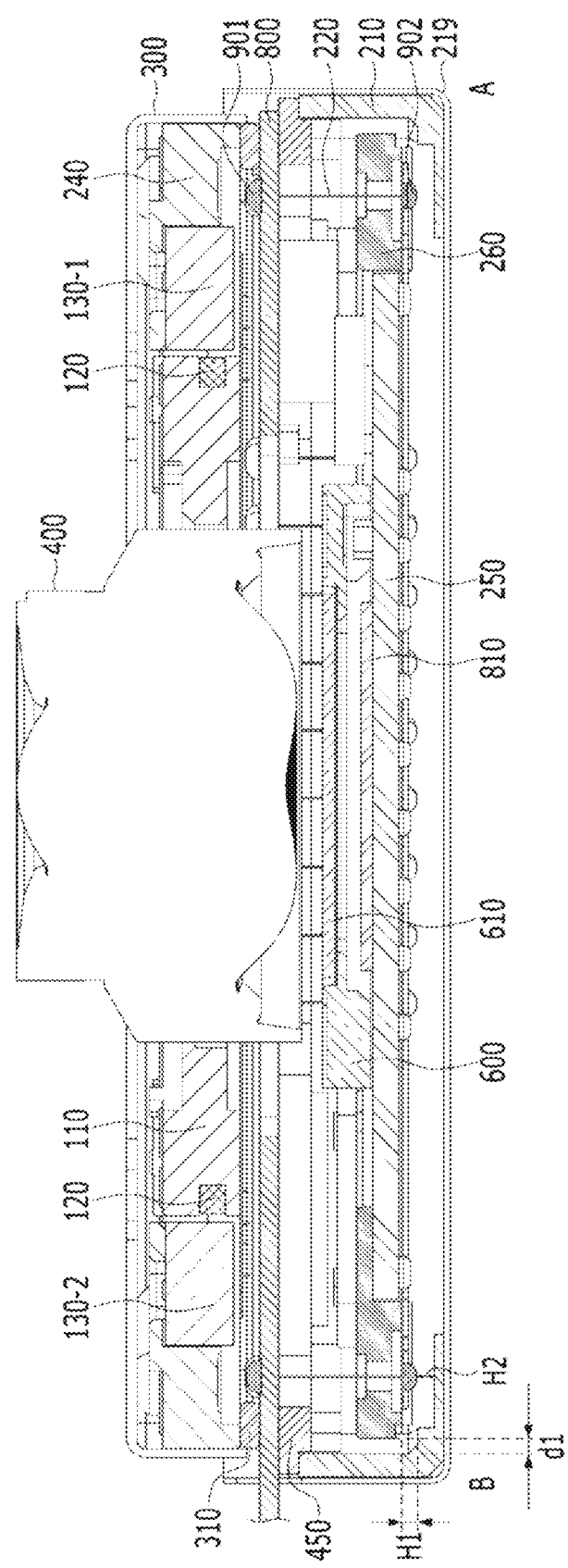
FIG. 19A is a cross-sectional view of the camera module shown in FIG. 1, taken along line A-B.
Figure 19B:
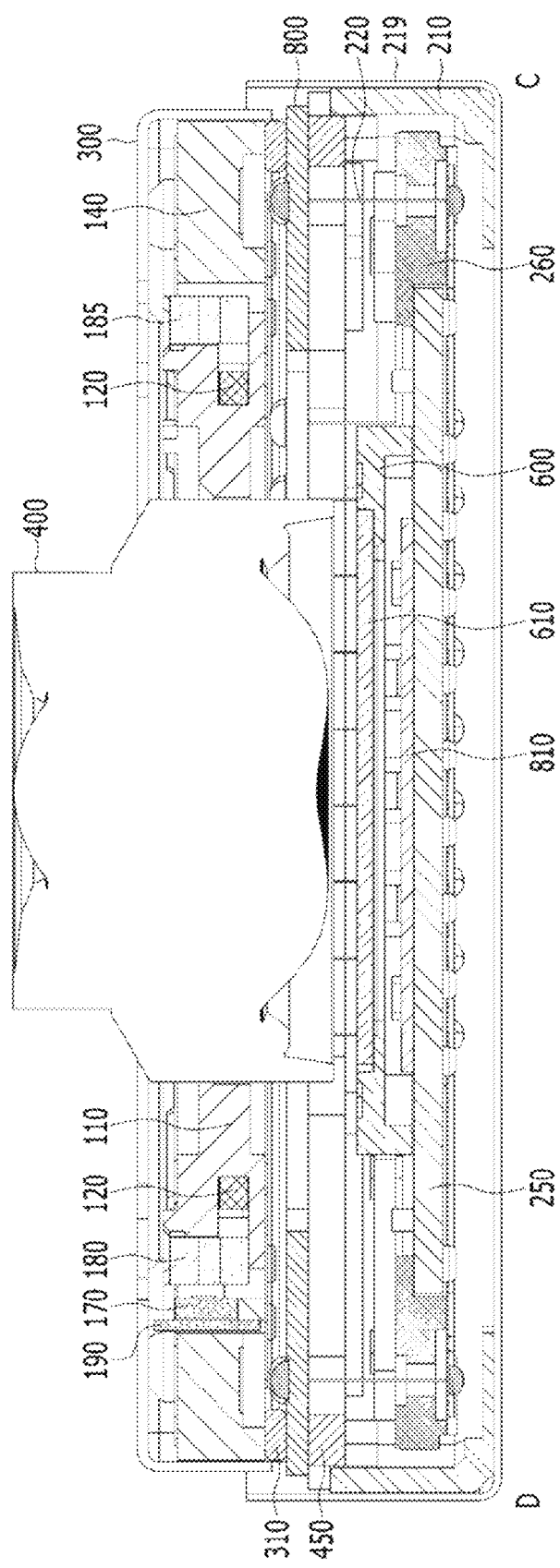
FIG. 19B is a cross-sectional view of the camera module shown in FIG. 1, taken along line C-D.
Figure 20:
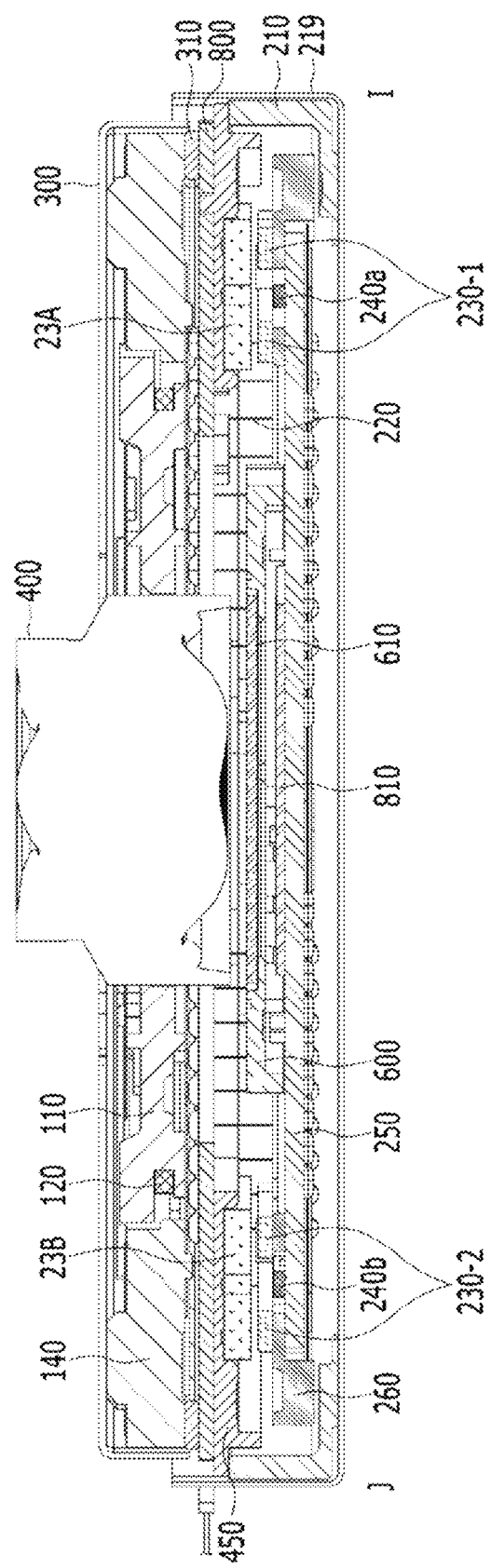
FIG. 20 is a cross-sectional view of the camera module shown in FIG. 1, taken along line I-J.
Figure 21:
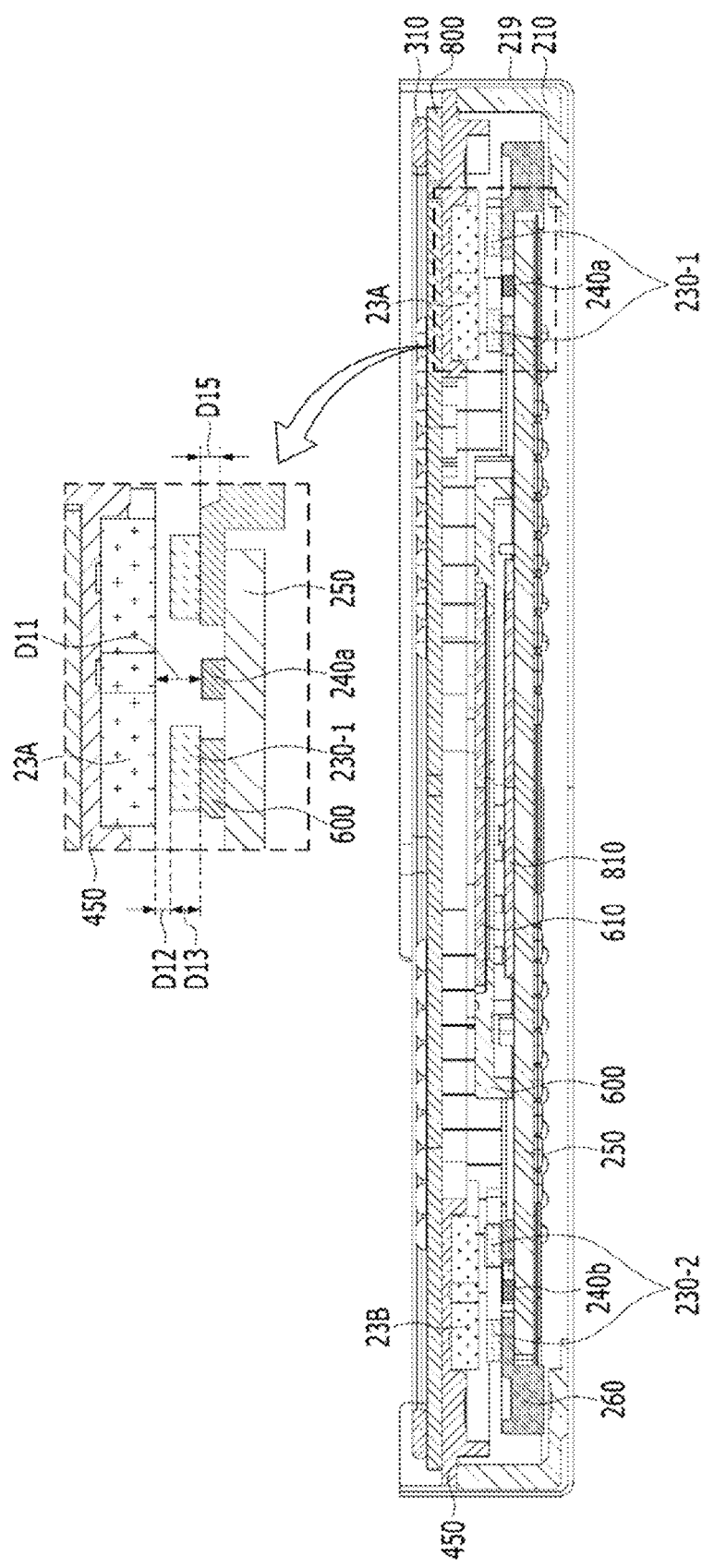
FIG. 21 is a cross-sectional view of the image sensor unit shown in FIG. 8, taken along line E-F.

FIG. 8 is a plan view of the image sensor unit 350. FIG. 9 is an exploded perspective view of the image sensor unit 350. FIG. 10 is a perspective view of the second circuit board 800 and the housing 450 shown in FIG. 9. FIG. 11 is a perspective view of the second circuit board 800, the housing 450, and the magnet 23 shown in FIG. 9. FIG. 12A is an exploded perspective view of a holder 270, a second coil 230, a first circuit board 250, a second position sensor 240, the image sensor 810, a support member 220, and a connective elastic member 280. FIG. 12B is a perspective view of the holder 270, the second coil 230, the first circuit board 250, the second position sensor 240, the filter holder 600, and the filter 610 shown in FIG. 12A. FIG. 13A is a bottom perspective view of the holder 270 shown FIG. 12A. FIG. 13B is a bottom view of the holder 270 and the first circuit board 250. FIG. 14 is an exploded perspective view of the holder 270, the image sensor 810, the first circuit board 250, the support member 220, and the connective elastic member 280. FIG. 15 is a bottom view of the holder 270, the first circuit board 250, and the connective elastic member 280. FIG. 16 is a bottom view of the holder 270, the first circuit board 250, the connective elastic member 280, and an insulation member 285. FIG. 17 is a fragmentary enlarged view of the connective elastic member 280. FIG. 18 is a perspective view of one connecting spring 281 and one support member 220. FIG. 19A is a cross-sectional view of the camera module shown in FIG. 1, taken along line A-B. FIG. 19B is a cross-sectional view of the camera module 10 shown in FIG. 1, taken along line C-D. FIG. 20 is a cross-sectional view of the camera module 10 shown in FIG. 1, taken along line I-J. FIG. 21 is a cross-sectional view of the image sensor unit 350 shown in FIG. 8, taken along line E-F.

Referring to FIGS. 8 to 21, the image sensor unit 350 may include a stationary part including the magnet 23 and a movable part including the first circuit board 250, which is spaced apart from the stationary part, the second position sensor 240 disposed on the first circuit board 250, the second coil 230 disposed so as to face the magnet 23, and a spacer disposed between the first circuit board 250 and the second coil 230.

The spacer may be, for example, a holder 270. The holder 270 may also be interchangeably used with the spacer. The spacer may include one or more holes 41A to 41C.

At least a portion of the second position sensor 240 may be disposed in the holes 41A to 41C in the spacer, and may overlap the magnet 23 in the optical-axis direction.

The holes 41A to 41C in the spacer may overlap at least a portion of the second coil 230 in the optical-axis direction.

The second position sensor 240 may not overlap the second coil 230 in the optical-axis direction.

The second coil 230 may have a hole 11A formed in the center thereof, and each of the holes 41A to 41C in the spacer may overlap the hole 11A in the second coil 230 in the optical-axis direction.

The second position sensor 240 may overlap the hole 11A in the second coil 230 and each of the holes 41A to 41C in the spacer in the optical-axis direction.

A space may be defined between the magnet 130 and the second position sensor 240. For example, at least a portion of the second coil 230 and/or at least a portion of the spacer may not be interposed or disposed in the space between the magnet 130 and the second position sensor 240.

The image sensor unit 250 may include an elastic support member 220 and 280 coupled both to the stationary part and to the movable part. The elastic support member 220 and 280 may flexibly support the movable part with respect to the stationary part. The elastic support member 220 and 280 may be alternatively referred to as a "support member" or an "elastic member".

The stationary part may include the second circuit board 800, which is spaced apart from the first circuit board 250, and the elastic support member 220 and 280 may conductively connect the first circuit board 250 to the second circuit board 800.

The second coil 230 may be coupled to the spacer, and may be conductively connected to the first circuit board 250.

The camera module according to an embodiment of the present invention may include the lens module (or the lens)

400, the image sensor 810 disposed at a position corresponding to the lens, a drive unit configured to move the image sensor 810, the first circuit board 250, which is spaced apart from the lens, the second position sensor 240 disposed on the first circuit board 250, and the spacer disposed on the first circuit board 250. For example, the drive unit may include the magnet 23 and the second coil 230 disposed so as to face the magnet 23, and the spacer may be disposed between the first circuit board 250 and the second coil 230 so as to space the second coil 230 apart from the second position sensor 240. The image sensor 810 may be moved in a direction perpendicular to the optical-axis direction.

Alternatively, the image sensor unit according to an embodiment of the present invention may include the stationary part including the magnet 23, the movable part including the first circuit board 250, which is spaced apart from the stationary part, the holder 270 disposed on the first circuit board 250, the second coil 230, which is disposed on the holder 270 so as to face the magnet 23, and the second position sensor 240, which is disposed on the first circuit board 250 so as to face the magnet 23, and the elastic support member 220 and 280 coupled both to the stationary part and to the movable part.

The movable part may be moved in a direction perpendicular to the optical axis by the interaction between the magnet 23 and the second coil 230, and the second coil 230 may not overlap the second position sensor 240 in a direction perpendicular to the optical-axis direction.

The elastic support member 220 and 280 may be coupled at one end thereof to the second circuit board 800 and at the other end thereof to the first circuit board 250. In other words, the elastic support member 220 and 280 may connect the first circuit board 250 to the second circuit board 800.

The second coil 230 may have the hole 11A formed in the center thereof, and the second position sensor 240 may be disposed under the hole 11A in the second coil 230 so as to overlap the hole 11A in the optical-axis direction.

The holder 270 may have therein a through hole corresponding to the second position sensor 240, and the second position sensor 240 may be disposed in the through hole in the holder 270. For example, the second position sensor 240 may overlap the holder 270 in a direction perpendicular to the optical axis.

The four corners of the first circuit board 260 may be provided with projections 52A to 52D, which project from the lateral side surface of the first circuit board, and the lower surface of the holder 270 may have formed therein seating grooves 53A to 53D, in which the projections 52A to 52D of the first circuit board 250 are disposed.

The second coil 230 may include first to fourth coil units 230-1 to 230-4, which are disposed at the first to fourth corners of the holder 270, and the magnet 23 may include a first magnet 23A corresponding to the first coil unit 230-1, a second magnet 23B corresponding to the second coil unit 230-2, a third magnet 23C corresponding to the third coil unit 230-3, and a fourth magnet 23D corresponding to the fourth coil unit 230-4.

The second position sensor 240 may include a first sensor 240a disposed under the first coil unit 230-1, a second sensor 240b disposed under the second coil unit 230-2, and a third sensor 240c disposed under the third coil unit 230-3.

For example, each of the first to fourth coil units 230-1 to 230-4 may be independently activated. In other words, the first to fourth coil units 230-1 to 230-4 may be activated by respective drive signals.

In another embodiment, the first to third coil units 230-1 to 230-3 may be independently activated, and the fourth coil unit 230-4 may be activated together with one of the first to third coil units 230-1 to 230-3. For example, the first to third coil units 230-1 to 230-3 may be activated by different drive signals, and the fourth coil unit 230-4 may be activated together with one of the first to third coil units 230-1 to 230-3 by the same drive signal.

For example, the image sensor unit 350 may include the second circuit board 800, the magnet 23, the holder 270, the first circuit board 250, the second coil 230, the second position sensor 240, and the image sensor 810. The image sensor unit 350 may further include a connective elastic member 280 and a support member 220.

The image sensor unit 350 may further include the housing 450, configured to receive at least a portion of the second circuit board 800.

The second circuit board 800 may serve to supply a signal to the image sensor unit 350 from the outside, or to output a signal to the outside from the image sensor unit 350.

The second circuit board 800 may be alternatively referred to as a stationary circuit board, a subsidiary circuit board, a stationary board or the like.

Referring to FIGS. 9 and 10, the second circuit board 800 may include a first region 801 corresponding to the AF operation unit 100, a second region 802 at which a connector 840 is disposed, and a third region 803 connecting the first region 801 to the second region 802. The connector 840 may be conductively connected to the second region 802 of the second circuit board 800, and may include a port configured to be conductively connected to an external device.

Although each of the first region 801 and the second region 802 of the second circuit board 800 may include a flexible substrate and a rigid substrate and the third region 803 may include a flexible substrate, the disclosure is not limited thereto. In another embodiment, at least one of the first to third regions 801 to 803 of the second circuit board 800 may include at least one of a rigid substrate and a flexible substrate.

The first region 801 may alternatively be referred to as a first substrate, the second region 802 may alternatively be referred to as a second substrate, and the third region 803 may alternatively be referred to as a third substrate.

The second circuit board 800 may have a bore 800A corresponding to the bore in the bobbin 110, the lens module 400 and/or the image sensor 810. For example, the bore 800A in the second circuit board 800 may be formed in the first region 801.

Referring to FIGS. 10, 11 and 19A, at least a portion of the lens module 400 may extend through the bore 800A in the second circuit board 800, and may be positioned under a second surface 44B of the second circuit board 800.

The lens module 400 may be disposed on the first circuit board 250. For example, the lens module 400 may be positioned on the filter 610 disposed at the filter holder 600.

For example, the lower portion, the lower end, or the lower surface of the lens or the lens barrel of the lens module 400 may extend through the bore 800A in the second circuit board 800, and may be positioned under the second surface 44B of the second circuit board 800.

For example, the lower portion, the lower end, or the lower surface of the lens or the lens barrel of the lens module 400 may be positioned above a first surface 60A of the first circuit board 250.

Furthermore, the lower portion, the lower end, or the lower surface of the lens or the lens barrel of the lens module 400 may be positioned above the bore 70 in the holder 270.

Although the second circuit board 800 may be configured to have a polygonal shape (for example, a quadrangular shape, a rectangular shape, or a square shape) when viewed from above, the disclosure is not limited thereto. In another embodiment, the second circuit board 800 may be configured to have another shape, such as a circular shape. Furthermore, although the bore 800A in the second circuit board 800 may be configured to have a polygonal shape (for example, a quadrangular shape, a square shape, or a rectangular shape), the disclosure is not limited thereto. In another embodiment, the bore 800A may be configured to have another shape, such as a circular shape.

The second circuit board 800 may include at least one pad corresponding to the support member 220. For example, the at least one of the second circuit board 800 may include a plurality of pads 800B. Here, the pad 800B may be alternatively referred to as a "lead pattern", a "lead member" or a "hole".

The second circuit board 800 may have at least one hole corresponding to the support member 220, and the hole may be formed through the second circuit board 800. For example, the second circuit board 800 may include a plurality of through holes corresponding to a plurality of support members.

For example, each of the plurality of pads 800B may have a hole formed through the second circuit board 800 in the optical-axis direction.

Each of the plurality of pads 800B may be formed so as to surround the hole in the second circuit board 800, and may further include a lead pattern or a conductive layer.

The support member 220 may be soldered to the pad 800B in the state of extending through the hole in the second circuit board 800, and may be conductively connected to the lead pattern disposed around the pad 800B.

For example, the plurality of pads 800B may be spaced apart from each other at a predetermined interval so as to surround the bore 800A in the second circuit board 800. For example, the plurality of pads 800B may be disposed between the bore 800A in the second circuit board 800 and the sides of the second circuit board 800.

The second circuit board 800 may have at least one coupling hole 800C configured to be coupled to a coupling protrusion 45B of the housing 450. Although the coupling hole 800C may be a through hole formed through the second circuit board 800, the disclosure is not limited thereto. In another embodiment, the coupling hole 800C may be a groove.

For example, although the coupling hole 800C may be embodied as a plurality of coupling holes, which are formed in corners of the second circuit board 800 that are opposite each other in a diagonal direction, the disclosure is not limited thereto. The coupling holes may be positioned near sides of the second circuit board 800 or between the sides of the second circuit board 800 and the bore 800A.

The second circuit board 800 may include at least one terminal, for example, a plurality of terminals 7A to 7F.

The plurality of terminals 7A to 7F may be formed on the first surface (for example, the upper surface) 44A of the second circuit board 800. For example, the plurality of terminals 7A to 7F may be disposed at one side of the second circuit board 800 adjacent to one corner of the second circuit board 800.

Each of the plurality of terminals 7A to 7F may be conductively connected to a corresponding one of the terminals B1 to B6 of the circuit board 190 via a conductive adhesive member or solder.

For example, the second circuit board 800 may include a terminal member 80A at which the plurality of terminals 7A to 7F is formed. Although the terminal member 80A projects from one side of the second circuit board 800 in a direction perpendicular to the optical axis, the disclosure is not limited thereto. In another embodiment, the terminal member 80A may not project from one side of the second circuit board 800.

The image sensor unit 350 may further include the housing 450 in which the second circuit board 800 is disposed, seated or received.

The housing 450 may be coupled to at least a portion of the second circuit board 800. The housing 450 may receive the magnet 23 therein, and may be alternatively referred to as a "magnet holder".

For example, the second circuit board 800 may be disposed under the AF operation unit 100, and may be coupled to the AF operation unit 100. For example, an adhesive member 310 may be disposed between the second circuit board 800 and the AF operation unit 100 so as to couple them to each other.

For example, the adhesive member 310 may be disposed between the first surface 44A of the second circuit board 800 and the lower portion, the lower surface or the lower end of the housing 140 of the AF operation unit 100 so as to couple the same to each other.

In another embodiment, the housing 140 of the AF operation unit 100 may also be coupled to the housing 450 of the image sensor unit 350. For example, the upper portion, the upper end, or the upper surface of the image sensor unit 350 may also be coupled to the lower portion, the lower end, or the lower surface of the housing 140 of the AF operation unit 100 via an adhesive member or a coupling structure.

The housing 450 may be disposed under the second circuit board 800. For example, the AF operation unit 100 may be disposed above the second circuit board 800, and the housing 450 may be disposed under the second circuit board 800.

The housing 450 may have a shape that corresponds to or coincides with the first region 801 of the second circuit board 800. Although the housing 450 may be configured to have a polygonal shape (for example, a quadrangular shape, a square shape, or a rectangular shape) when viewed from above, the disclosure is not limited thereto. In another embodiment, the housing 450 may be configured to have a circular shape or an elliptical shape.

The housing 450 may have formed therein a bore 450A. At least a portion of the bore 450A in the housing 450 may correspond to or overlap the bore 800A in the second circuit board 800.

Although the bore 450A in the housing 450 may be configured to have a polygonal shape (for example, a quadrangular shape or an octagonal shape), a circular shape or a crisscross shape when viewed from above, the disclosure is not limited thereto. The bore 450A in the housing 450 may be a through hole formed through the housing 450 in the optical-axis direction.

The housing 450 may include at least one coupling protrusion 45B, which projects from the upper surface of the body 42 thereof. For example, the coupling protrusion 45B may project from the upper surface of the housing 450 in a direction toward the second surface (for example, the lower surface) 44B of the second circuit board 800 from the upper surface of the housing 450.

The housing 450 may include escape regions 45 corresponding to the plurality of pads 800B. The escape regions 45 may be formed at positions corresponding to the support members 220 so as to avoid spatial interference between the housing 450 and the support members 220.

Referring to FIGS. 1 to 10, the second circuit board 800 may include the terminals 7A to 7F corresponding to the terminals B1 to B6 of the circuit board 190 of the AF operation unit 100.

Each of the terminals 7A to 7F of the second circuit board 800 may be conductively connected to a corresponding one of the terminals B1 to B6 of the circuit board 190 of the AF operation unit 100. Drive signals or power may be supplied to the first position sensor 170 through the second circuit board 800, and the output of the first position sensor 170 may be output to the second circuit board 800. Furthermore, drive signals or power may be supplied to the first coil 120 through the second circuit board 800.

Referring to FIG. 11, the second circuit board 800 may include the connector 840 disposed in the second region 802. For example, the connector 840 may be disposed on one surface (for example, the lower surface or the upper surface) of the second region 802 of the second circuit board 800.

The housing 450 may include a seating portion 8A, in which the magnet 23 is received, disposed or seated. The seating portion 8A may be formed in the lower surface of the housing 450.

For example, the seating portion 8A may be a groove depressed from the lower surface of the housing 450, and may have a shape corresponding to the shape of the magnet 23.

For example, although the seating portion 8A may be formed in a corner of the housing 450, the disclosure is not limited thereto. In another embodiment, the seating portion 8A may be formed in a side of the housing 450.

For example, although the housing 450 may include four seating portions 8A, which are respectively formed in the four corners thereof, the disclosure is not limited thereto. In another embodiment, the housing 450 may include a number of seating portions corresponding to the number of magnets 23.

The magnet 23 may be attached or coupled to the seating portion 8A of the housing 450 via an adhesive member. Here, a guide groove 9A may be formed in the seating portion 8A of the housing 450 so as to guide an adhesive member. The guide groove 9A may serve to uniformly disperse an adhesive member in the seating portion 8A.

The magnet 23 may be disposed at the housing 450. For example, although the magnet 23 may be disposed at a corner of the housing 140, the disclosure is not limited thereto. In another embodiment, the magnet 23 may be disposed at a side portion of the housing 450.

The magnet 23 may serve to provide a magnetic field, which interacts with the second coil 230 in order to perform OIS (Optical Image Stabilization) for the purpose of handshake correction.

For example, the magnet 23 may include a plurality of magnets 23A to 23D. Each of the magnets 23A to 23D may be disposed at a corresponding one of the corners of the housing 450.

Although each of the magnets 23A to 23D may be a monopolar magnetized magnet having one N pole and one S pole, the disclosure is not limited thereto. In another embodiment, each of the magnets 23A to 23D may be a bipolar magnetized magnet, which has two N poles and two S poles, or a tetrapolar magnetized magnet.

When each of the magnets 23A to 23D is a bipolar magnetized magnet, each of the magnets 23A to 23D may include a first magnet part, a second magnet part and a partition wall disposed between the first magnet part and the second magnet part. Here, the partition wall may also be alternatively referred to as "nonmagnetic partition wall".

For example, each of the first magnet part and the second magnet part may include an N pole, an S pole and an interface portion between the N pole and the S pole. The interface portion may be a portion that has substantially no magnetism and has a zone having almost no polarity, and may be a portion which is naturally formed in order to form a magnet composed of one N pole and one S pole.

The partition wall may separate or isolate the first magnet part and the second magnet part from each other, and may be a portion having substantially no magnetism or polarity. For example, the partition wall may be a nonmagnetic material, air or the like. The nonmagnetic partition wall may be considered a "neutral zone" or a "neutral portion".

The partition wall may be a portion that is artificially formed when the first magnet part and the second magnet part are magnetized, and the width of the partition wall may be larger than the width of the interface portion.

For example, although the partition wall of each of the magnets 23A to 23D may be oriented in a direction parallel to the second circuit board 800 or the first circuit board 250, the disclosure is not limited thereto. In another embodiment, the partition wall may be oriented in a direction perpendicular to the second circuit board 800 or the first circuit board 250.

For example, each of the four magnets 23A to 23D may be disposed at a corresponding one of the four corners of the housing 450. For example, although two magnets (for example, 23A and 23B), which are disposed at two adjacent corners of the housing 450, may be oriented so as to be perpendicular to each other and two magnets (for example, 23A and 23C; 23B and 23D), which are disposed at two corners of the housing 450 which face each other in a diagonal direction, may be oriented so as to be parallel to each other, the disclosure is not limited thereto.

For example, the inner portions of the magnets 23A to 23D may have the same polarity. Furthermore, the outer portions of the magnets 23A to 23D may have the same polarity.

For example, the inner portion of each of the magnets 23A to 23D may be magnetized into an N pole, and the outer portion of each of the magnets 23A to 23D may be magnetized into an S pole. In a modification, the inner portion of each of the magnets 23A to 23D may be magnetized into an S pole, and the outer portion of each of the magnets 23A to 23D may be magnetized into an N pole.

The holder 270 may be disposed under the second circuit board 800. The holder 270 may be spaced apart from the second circuit board 800, and may be coupled to the first circuit board 250.

The holder 270 may receive the second coil 230 therein or may support the second coil 230. The holder 270 may serve to support the second coil 230 such that the second coil 230 is spaced apart from the circuit board 250.

For example, the lower portion, the lower surface, or the lower end of the holder 270 may be coupled to the upper portion, the upper surface, or the upper end of the first circuit board 250.

Referring to FIGS. 13A and 13B, the lower surface 42B of the holder 270 may include a first surface 36A and a second surface 36B. The second surface 36B may have a height difference with respect to the first surface 36A in the optical-axis direction. For example, the second surface 36B may be positioned above the first surface 36A. For example, the second surface 36B may be positioned closer to the upper surface 42A of the holder 270 than the first surface 36A. For example, the distance between the upper surface 42A of the holder 270 and the second surface 36B may be less than the distance between the upper surface 42A of the holder 270 and the first surface 36A.

The holder 270 may include a third surface 36C connecting the first surface 36A to the second surface 36B. For example, although the first surface 36A and the second surface 36B may be parallel to each other and the third surface 36C may be perpendicular to the first surface 36A and/or the second surface 36B, the disclosure is not limited thereto. In another embodiment, the included angle defined between the third surface 36C and the first surface 36A (or the second surface 36B) may be an acute angle or an obtuse angle.

The first surface 36A may be positioned at the periphery of the lower surface 42B of the holder 270, and the second surface 36B may be positioned in the central region of the holder 270.

The holder 270 may have therein the bore 70 corresponding to a region of the upper surface of the circuit board 250.

Although the bore 70 in the holder 270 may have a polygonal shape, for example, a quadrangular shape, a circular shape, or an elliptical shape when viewed from above, the disclosure is not limited thereto. The bore 70 may have any of various shapes.

For example, the bore 70 in the holder 270 may be configured to have such a shape or a size as to expose the image sensor 810 and some of the elements disposed on the first circuit board 250. For example, the surface area of the bore 70 in the holder 270 may be smaller than the surface area of the first surface 60A of the first circuit board 250.

For example, the bore 70 may be formed through the second surface 36B of the lower surface 42B of the holder 270.

The holder 270 may have therein the holes 41A, 41B and 41C corresponding to the second position sensors 240. For example, the holder 270 may have therein the holes 41A, 41B and 41C, which are formed at positions respectively corresponding to the first to third sensors 240a, 240b and 240c.

For example, the holes 41A, 41B and 41C may be positioned adjacent to the corners of the holder 270. The holder 270 may further have a dummy hole 41D formed adjacent to the corner of the holder 270, which does not correspond to any of the second position sensors 240. The dummy hole 41D may be intended to achieve weight equilibrium of the OIS movable unit during OIS operation. In another embodiment, the dummy hole 41D may not be formed.

The holes 41A, 41B and 41C may be formed through the holder 270 in the optical-axis direction. For example, although the holes 41A, 41B and 41C may be formed in the second surface 36B of the lower surface 42B of the holder 270, the disclosure is not limited thereto. In another embodiment, the holes 41A, 41B and 41C in the holder 270 may be omitted.

An injection hole 33A may be formed in the lower surface 42B of the holder 270 so as to correspond to an injection hole in a mold configured to inject a material for formation of the holder 270.

The first circuit board 250 may be disposed on the second surface 36B of the lower surface 42B of the holder 270. The first circuit board 250 may be alternatively referred to as a "sensor board", a "main board", a "main circuit board", a "sensor circuit board", or a "movable circuit board".

In all the embodiments, the first circuit board 250 may be alternatively referred to as a "second board" or a "second circuit board", and the second circuit board 800 may be alternatively referred to as a "first board" or a "first circuit board".

The first surface 60A of the first circuit board 250 may be coupled or attached to the second surface 36B of the lower surface 42B of the holder 270 via an adhesive member.

Here, the first surface 60A of the circuit board 250 may be a surface that faces the second circuit board 800 or the AF operation unit 100 and on which the image sensor 810 is disposed. The second surface 60B of the circuit board 250 may be the surface opposite the first surface 60A of the circuit board 250.

The lower surface 42B of the holder 270 may be provided therein with the seating grooves 53A to 53D, in which at least a portion of the circuit board 250 is fitted and disposed.

The seating grooves 53A to 53D may be respectively formed in the four corners of the lower surface 42B of the holder 270 so as to correspond to the projections 52A to 52D of the first circuit board 250.

For example, the first surface 36A of the lower surface 42B of the holder 270 may surround the projections 52A to 52D of the circuit board 250, and the lateral side surfaces 52A to 52D of the first circuit board 250 may face the third surface 36C of the holder 270. An adhesive member may be disposed between the projections 52A to 52D of the first circuit board 250 and the seating grooves 53A to 53D in the holder 270 so as to couple the projections to the seating grooves.

The projections 52A to 52D of the first circuit board 250 may serve to increase the coupling force between the holder 2170 and the first circuit board 250 and to prevent the circuit board 250 from being rotated and thus misaligned.

The projections 52A to 52D of the first circuit board 250 may overlap the seating grooves 51A to 51D in the holder 270 in the optical-axis direction. Furthermore, the holes 41A, 41B and 41C may overlap at least portions of the seating grooves 53A, 53B and 53C in the holder 270 in the optical-axis direction. Furthermore, the holes 41A, 41B and 41C may overlap at least portions of the projections 52A to 52C on the first circuit board 250.

At least one groove 272 may be formed in the first surface 36A of the lower surface 42B of the holder 270 so as to be depressed therefrom. For example, the holder 270 may have a plurality of grooves (for example, four grooves) corresponding to a plurality of sides (for example, four sides) of the lower surface 42B.

The groove 272 may include a bottom 72A, which is depressed from the first surface 36A of the lower surface 42B of the holder 270 so as to have a height difference therebetween in the optical-axis direction, and a lateral side wall 72B connecting the bottom 72A to the first surface 36A.

For example, the bottom 72A of the groove 272 may be positioned closer to the upper surface 42A of the holder 270 than to the first surface 36A of the lower surface 42B of the holder 270. Furthermore, the bottom 72A of the groove 272 may be positioned between the first surface 36A and the second surface 36B of the lower surface 42B of the holder 270.

The holder 270 may have at least one hole 270A through which the support member 220 extends. For example, the holder 270 may have a plurality of holes 270A corresponding to a plurality of support members 220. The holes 270A may serve to avoid spatial interference with the support members. In another embodiment, the holder 270 may have escape grooves or escape portions in place of the holes in order to avoid spatial interference with the support members.

For example, the plurality of holes 270A may be disposed or arranged so as to surround the bore 70 in the holder 270 and to be spaced apart from each other at regular intervals. For example, the plurality of holes 270A may be disposed in the region between the bore 70 in the holder 270 and the sides of the holder 270.

For example, the holes 270A may be through holes formed through the holder 270. The plurality of holes 270A in the holder 270 may overlap the groove 272 in the holder 270 in the optical-axis direction. For example, each of the plurality of the holes 270A may be open at the bottom 72A of the groove 272. The ends of the plurality of holes 270A, which are open at the bottom 72A of the groove 272, may be positioned so as to have a height difference with respect to the first surface 36A of the lower surface 42B of the holder 270 in the optical-axis direction.

For example, the plurality of holes 270A may be formed through the bottom 72A of the groove 272 in the holder 270.

The groove 272 in the holder 270 is intended to avoid spatial interference with the holder 270 when the connective elastic member 280 is elastically deformed during OIS operation, thereby allowing the connective elastic member 280 to be elastically deformed with ease.

The lower surface 42B of the holder 270 may be provided with a projection 275. For example, the projection 275 may be formed on the first surface 36A of the lower surface 42B of the holder 270.

The projection 275 of the holder 270 may project from the first surface 36A of the lower surface 42B of the holder 270 in a direction toward the bottom of the base 210.

The projection 275 of the holder 270 may project further than the connective elastic member 280 in a direction toward the bottom of the base 210. Alternatively, the projection 275 of the holder 270 may project further than solder 902 coupling the connective elastic member 280 to the support member 220 in a direction toward the bottom of the base 210.

For example, the first distance between the projection 275 of the holder 270 and the bottom of the base 210 in the optical-axis direction may be less than the second distance between the connective elastic member 280 and the bottom of the base 210. For example, the first distance may be less than the third distance between the solder 902 and the bottom of the base 210.

The projection 275 may serve as a stopper configured to prevent the first surface 36A of the lower surface 42B of the holder 270, the connective elastic member 280 and/or the solder 902 from colliding with the bottom of the base 210 in the event of an external impact.

For example, although the projection 275 may be disposed at a corner of the lower surface 42B of the holder 270, the disclosure is not limited thereto. In another embodiment, the projection 275 may be disposed at a side of the lower surface 42B of the holder 270 or between a side of the lower surface 42B of the holder 270 and the bore 70.

The first circuit board 250 may be disposed under the second circuit board 800.

For example, the first circuit board 250 may be disposed under the holder 270.

Although the first circuit board 250, at which the image sensor 810 is disposed, is composed of a single board in FIG. 12A, the disclosure is not limited thereto. In another embodiment, the first circuit board 250 may include a third board, at which the image sensor 810 is disposed, and a fourth board, conductively connected to the third board. The fourth board may be conductively connected to the second circuit board 800 via the support member 220 and the connective elastic member 280.

Although the first circuit board 250, for example, the periphery of the first circuit board 250 may have a shape that coincides with or corresponds to the lower surface 42B of the holder 270 when viewed from above, the disclosure is not limited thereto.

The first circuit board 250 may include one or more projections 52A to 52D projecting from the lateral side surface 21A thereof.

For example, the projections 52A to 52D may be respectively formed at the four corners of the first circuit board 250.

Referring to FIG. 13B, the first circuit board 250 may include the first to fourth projections 52A to 52D, which are respectively formed at the four corners thereof.

Each of the first to fourth projections 52A to 52D may project from the lateral side surface 21A of the first circuit board 250 in at least one direction among a +x-axis direction, a −x-axis direction, a +y-axis direction and a −y-axis direction.

For example, each of the first projection 52A and the third projection 52C may project from the lateral side surface 21A of the first circuit board 250 in both the x-axis direction and the y-axis direction. Each of the second projection 52B and the fourth projection 52D may each project in the y-axis direction, and may project in opposite directions relative to each other.

The first circuit board 250 may include at least one terminal 262 corresponding to the support member 220 or the connecting spring 281 of the connective elastic member 280.

For example, the first circuit board 250 may include a plurality of terminals 262, which are disposed or arranged on the second surface 60B of the first circuit board 250 so as to be spaced apart from each other. For example, the terminals 262 may be disposed adjacent to the lateral side surface 21A of the first circuit board 250. The number of terminals 262 is not limited to that shown in FIG. 14, and may be more or less than the number of terminals 262 shown in FIG. 14.

For example, the terminal 262 of the first circuit board 250 may be conductively connected to the support member 220. For example, the terminal 262 of the first circuit board 250 may be conductively connected to the connecting spring 281.

The first circuit board 250 may include terminals E1 to E8, configured to be conductively connected to the second coil 230. Here, the terminals E1 to E8 may be alternatively referred to as "pads" or "bonding portions". The terminals E1 to E8 of the first circuit board 250 may be disposed or arranged on the first surface 60A of the first circuit board 250.

The first circuit board 250 may be a printed circuit board (PCB) or a flexible printed circuit board (FPCB).

The first circuit board 250 may have a seating region 260A in which the image sensor 810 is disposed. For example, the seating region 260A may be provided on the first surface (for example, the upper surface) 60A of the first circuit board 250. For example, the bore 70 in the holder 270 may open or expose the image sensor 810 disposed in the seating region 260A therethrough.

The second coil 230 may be disposed at the holder 270. For example, the second coil 230 may be disposed on the upper surface 42A of the holder 270.

The second coil 230 may be disposed under the housing 450. The second coil 230 may be disposed under the magnet 23.

For example, the second coil 230 may be disposed on the upper surface 42A of the holder 270 so as to correspond to, face, or overlap the magnet 23 disposed at the housing 450 in the direction of the optical axis OA.

The second coil 230 may be coupled to the holder 270. For example, the second coil 230 may be coupled to the upper surface 42A of the holder 270. The upper surface 42A of the holder 270 may be provided with at least one coupling protrusion, configured to be coupled to the second coil 230.

The coupling protrusion 51 may project from the upper surface 42A of the holder 270 in a direction toward the second circuit board 800. For example, the coupling protrusion 51 may be formed adjacent to each of the holes 41A to 41D in the holder 270.

For example, two coupling protrusions 51A and 51B may be disposed or arranged at the holder 270 so as to correspond to each of the holes 41A to 41D, and one hole (for example, 41A) may be formed between the two coupling protrusions 51A and 51B.

For example, the second coil 230 may include the plurality of coil units 230-1 to 230-4. For example, although the second coil 230 may include four coil units, the disclosure is not limited thereto.

Each of the plurality of coil units 230-1 to 230-4 may face or overlap a corresponding one of the magnets 23A to 23D disposed at the housing 450 in the direction of the optical axis (OA).

Although each of the coil units 230-1 to 230-4 may be configured to have the form of a coil block having a closed curve shape or a ring shape, the disclosure is not limited thereto. For example, each of the coil units 230-1 to 230-4 may be composed of an FP (fine pattern) coil. In another embodiment, the coil units 230-1 to 230-4 may be formed at an additional circuit member other than the first circuit board 250.

For example, each of the four coil units 230-1 to 230-4 may be disposed at a corresponding one of the four corners of the holder 270.

Each of the coil units 230-1 to 230-4 may be coupled to two coupling protrusions 51A and 51B of the holder 270 corresponding thereto. For example, each of the coil units 230-1 to 230-4 may be directly wound around two corresponding coupling protrusions 51A and 51B of the holder 270.

The coil units 230-1 to 230-4 may correspond to or face respective projections 52A to 52D of the circuit board 250 in the optical-axis direction. For example, at least a portion of each of the coil units 230-1 to 230-4 may overlap a corresponding one of the projections 52A to 42D of the circuit board 250 in the optical-axis direction.

The second coil 230 may be conductively connected to the first circuit board 250 such that power or drive signals are supplied to the second coil 230 through the first circuit board 250.

The power or drive signal supplied to the second coil 230 may be a DC signal, an AC signal or a signal containing both DC and AC components, and may be of a voltage type or a current type.

Here, current may be independently applied to at least three coil units, among the four coil units.

In a first embodiment, the second coil 230 may be controlled through three channels.

For example, only the first to third coil units among the first to fourth coil units may be conductively isolated from each other, and the fourth coil unit may be conductively connected to one of the first to third coil units in series. Here, three pairs of lead wires, that is, a total of six lead wires, may be taken from the second coil 230.

In a second embodiment, the second coil 230 may be controlled through four individual channels. Here, the four coil units may be conductively isolated from each other. One of forward current and reverse current may be selectively applied to each of the coil units. Here, four pair of lead wires, that is, a total of eighth lead wires may be taken from the second coil 230.

For example, two coil units 230-1 and 230-3, which face each other in a diagonal direction, may extend or be oriented in a first axial direction (for example, in the y-axis direction), and two other coil units 230-2 and 230-4, which face each other in a diagonal direction, may extend or be oriented in a second axial direction (for example, in the x-axis direction). Here, the first axial direction may be perpendicular to the second axial direction.

The long side of the first coil unit 230-1 and the long side of the third coil unit 230-3 may be disposed parallel to each other. The long side of the second coil unit 230-2 and the long side of the fourth coil unit 230-4 may be disposed parallel to each other. The long side of the first coil unit 230-1 and the long side of the second coil unit 230-2 may not be disposed parallel to each other. Here, the long side of the first coil unit 230-1 and the long side of the second coil unit 230-2 may be disposed such that the imaginary lines extending therefrom intersect each other. For example, the direction in which the first coil unit 230-1 is oriented and the direction in which the second coil unit 230-2 is oriented may be perpendicular to each other.

In another embodiment, at least one of the four coil units may be driven separately from the rest. In a further embodiment, the four coil units may be individually driven.

For example, one end of the first coil unit 230-1 may be connected to the first terminal E1, and the other end of the first coil unit 230-1 may be connected to the second terminal E2. The first and second terminals E1 and E2 may be provided with a first drive signal for activating the first coil unit 230-1. The first and second terminals E1 and E2 may be arranged so as to be spaced apart from each other in a direction parallel to the long side of the first coil unit 230-1 (for example, in the y-axis direction).

One end of the second coil unit 230-2 may be connected to the third terminal E3, and the other end of the second coil unit 230-2 may be connected to the fourth terminal E4. The third and fourth terminals E3 and E4 may be provided with a second drive signal for activating the second coil unit 230-2. The third and fourth terminals E3 and E4 may be arranged so as to be spaced apart from each other in a direction parallel to the long side of the second coil unit 230-2 (for example, in the x-axis direction).

One end of the third coil unit 230-3 may be connected to the fifth terminal E5, and the other end of the third coil unit 230-3 may be connected to the sixth terminal E6. The fifth and sixth terminals E5 and E6 may be provided with a third drive signal for activating the third coil unit 230-3. The fifth and sixth terminals E5 and E6 may be arranged so as to be spaced apart from each other in a direction parallel to the long side of the third coil unit 230-3 (for example, in the y-axis direction).

One end of the fourth coil unit 230-4 may be connected to the seventh terminal E7, and the other end of the fourth coil unit 230-4 may be connected to the eighth terminal E8. The seventh and eighth terminals E7 and E8 may be provided with a fourth drive signal for activating the fourth coil unit 230-4. The seventh and eighth terminals E7 and E8 may be arranged so as to be spaced apart from each other in a direction parallel to the long side of the fourth coil unit 230-4 (for example, in the x-axis direction).

The first to eighth terminals E1 to E8 may be disposed in one region of the upper surface 60A of the first circuit board 250 between the coil units 230-1 to 230-4 and the image sensor 810.

The bore 70 in the holder 270 may expose the terminals E1 to E8 of the first circuit board 250. The lower surfaces of the coil units 230-1 to 230-4 may be positioned higher than the terminals E1 to E8 of the first circuit board 250.

For example, the terminals E1 to E8 of the first circuit board 250 may be positioned lower than the upper surface 60A of the holder 270.

In an embodiment, two coil units (for example, 230-1 and 230-3), which face each other in a diagonal direction, may be directly connected to each other in series, and may be activated by a single drive signal. Meanwhile, two coil units (for example, 230-2 and 230-4), which face each other in a diagonal direction, may be conductively isolated from each other, and may be individually activated by different drive signals.

In a further embodiment, the four coil units 230-1 to 230-4 may be conductively isolated from one another, and may be individually activated by different respective drive signals.

Each of the coil units 230-1 to 230-4 may have an opening or a hole formed in the center thereof, and two coupling protrusions 51A and 51B may be fitted into the opening 11A (see FIG. 12A) in each of the coil units 230-1 to 230-4 and coupled thereto.

For example, at least a portion of each of the coil units 230-1 to 230-4 may overlap a corresponding one of the magnets 23A to 23D disposed at the housing 450.

The OIS movable unit including the image sensor 810 may be moved in the second and/or third direction, for example, in the x-axis direction and/or in the y-axis direction, by the interaction between the magnets 23A to 23D and the coil units 230-1 to 230-4, with drive signals being applied thereto, thereby performing handshake correction. A description of the OIS movable unit will be given later.

The second position sensor 240 may be disposed, coupled or mounted to the first surface (for example, the upper surface) 60A of the first circuit board 250. The second position sensor 240 may detect displacement of the OIS movable unit in a direction perpendicular to the optical axis OA, for example, shifting or tilting of the OIS movable unit in a direction perpendicular to the optical axis, or rotation of the OIS movable unit about the optical axis.

Here, the first position sensor 170 may be alternatively referred to as an "AF position sensor", and the second position sensor 240 may be alternatively referred to as an "OIS position sensor".

For example, the second position sensor 240 may be disposed at each of the projections 52A to 52C of the first circuit board 250.

The second position sensor 240 may be disposed under the second coil 230.

The second position sensor 240 may not overlap the second coil 230 in a direction perpendicular to the optical axis. For example, a sensing element of the second position sensor 240 may not overlap the second coil 230 in a direction perpendicular to the optical axis. The sensing element may be an element configured to detect a magnetic field.

For example, the center of the second position sensor 240 may not overlap the second coil 230 in a direction perpendicular to the optical axis. For example, the center of the second position sensor 240 may be the spatial center in x-axis and y-axis directions on the x-y coordinate plane perpendicular to the optical axis. Alternatively, the center of the second position sensor 240 may be the spatial center in x-axis, y-axis and z-axis directions.

In another embodiment, at least a portion of the second position sensor 240 may overlap the second coil 230 in a direction perpendicular to the optical axis. For example, at least a portion of an upper region 2A (see FIG. 26) of the second position sensor 240 may overlap the second coil 230 in a direction perpendicular to the optical axis. A lower region 2B of the second position sensor 240 may overlap the second coil 230 in a direction perpendicular to the optical axis. The upper region 2A may be a region between the midpoint of the length of the second position sensor 240 and the upper surface of the second position sensor 240, and the lower region 2B may be the remaining region of the second position sensor 240, which is positioned under the upper region 2A.

For example, the second position sensor 240 may overlap the holes 41A to 41C in the holder 270 in the optical-axis direction. For example, the second position sensor 240 may overlap the opening 11A or the hole in the second coil 230 in the optical-axis direction. For example, at least a portion of the holes 41A to 41C in the holder 270 may overlap the opening 11A or the hole in the second coil 230 in the optical-axis direction.

The second position sensor 240 may include one or more sensors 240a, 240b and 240c. For example, the second position sensor 230 may include three sensors 240a, 240b and 240c.

Each of the first to third sensors 240a, 240b and 240c may be embodied as only one Hall sensor, or may be embodied as a driver IC including a Hall sensor. The description of the first position sensor 170 may be applied to the first to third sensors 240a, 240b and 240c with or without modification.

Each of the first to third sensors 240a, 240b and 240c may be conductively connected to predetermined corresponding terminals, among the terminals 262 of the first circuit board 250. For example, respective drive signals may be applied to each of the first to third sensors 240a, 240b and 240c via the terminals 262, and the output signal of each of the first to third sensors may be output to other predetermined terminals, among the terminals 262.

For example, six or four different terminals, among the terminals 262 of the first circuit board 250, may be allocated to each of the first to third sensors 240a, 240b and 240c.

For example, when each of the first to third sensors 240a, 240b and 240c is a Hall sensor, four terminals may be allocated to each of the first to third sensors 240a, 240b, and 240c. For example, the four terminals may be two input terminals and two output terminals.

For example, when each of the first to third sensors 240a, 240b and 240c is a drive IC including a Hall sensor, six terminals may be allocated to each of the first to third sensors 240a, 240b and 240c. The description of the position sensor 170 may be applied to the conductive connection between each of the first to third sensors 240a, 240b and 240c and the terminals 262 of the first circuit board 250 and the relationships between drive signals and output of the position sensor, with or without modification.

For example, because four coil units 230-1 to 230-4 are controlled through three channels, each of the first to third sensors 240a, 240b and 240c may be disposed in a corresponding one of the three coil units 230-1 to 230-3, and the remaining coil unit 230-4 may not be provided with a sensor.

For example, each of the coil units 230-1 to 230-4 may be configured to have the form of a ring having therein an opening 11A (see FIG. 12A), a hole or a cavity. For example, each of the first to third sensors 240a, 240b and 240c may be disposed under the opening 11A, the hole or the cavity in a corresponding one of the coil units 230-1 to 230-3.

For example, each of the first to third sensors 240a, 240b and 240c may be disposed in a corresponding one of the holes 41A to 41C in the holder 270.

For example, each of the first to third sensors 240a, 240b and 240c may not overlap a corresponding one of the coil units 230-1 to 230-3 in a direction perpendicular to the optical axis. The first to third sensors 240a, 240b and 240c may overlap the holder 270 in a direction perpendicular to the optical axis.

For example, the coil units 230-1 to 230-4 may be disposed on the upper surface 42A of the holder 270, and the first to third sensors 240a, 240b and 240c may be disposed on the first surface 60A of the first circuit board 250. The upper surface 42A of the holder 270 may be positioned higher than the first surface 60A of the first circuit board 250.

For example, the upper surface 42A of the holder 270 may have a height difference with respect to the first surface 60A of the first circuit board 250.

For example, the height difference between the upper surface 42a of the holder 270 and the first surface 60A of the first circuit board 250 in the optical-axis direction may be greater than the length of each of the first to third sensors 240a, 240b and 240c in the optical-axis direction. In another embodiment, the height difference between the upper surface 42a of the holder 270 and the first surface 60A of the first circuit board 250 in the optical-axis direction may be equal to the length of each of the first to third sensors 240a, 240b and 240c in the optical-axis direction.

All of movement of the image sensor 810 in the x-axis and y-axis directions and rotation of the image sensor 810 about the z-axis may be detected by the three sensors 240a, 240b and 240c.

One (for example, 240a) of the three sensors 240a, 240b and 240c may detect a movement amount and/or displacement of the OIS movable unit in the x-axis direction. Another one (for example, 240b) of the three sensors 240a, 240b and 240c may detect a movement amount and/or displacement of the OIS movable unit in the y-axis direction. The remaining one of the three sensors 240a, 240b and 240c may detect a movement amount and/or displacement of the OIS movable unit in the x-axis direction and/or in the y-axis direction. It is possible to detect rotational movement of the OIS movable unit about the z-axis using the outputs of two or more of the three sensors 240a, 240b and 240c.

Referring to FIG. 12B, when a drive signal (for example, drive current) is applied to the first coil unit 230-1 and the third coil unit 230-3 but is not applied to the second coil unit 230-2 or to the fourth coil unit 230-4, the direction of first electromagnetic force resulting from the interaction between the first coil unit 230-1 and the first magnet 23A and the direction of third electromagnetic force resulting from the interaction between the third coil unit 230-3 and the third magnet 23C may be the same direction, for example, the x-axis direction (for example, the +x-axis direction or the −x-axis direction), and the OIS movable unit may be moved (shifted) in the x-axis direction (for example, in the +x-axis direction or in the −x-axis direction).

For example, when a drive signal (for example, drive current) is applied to the second coil unit 230-2 and the fourth coil unit 230-4 but is not applied to the first coil unit 230-1 or to the third coil 230-3, the direction of second electromagnetic force resulting from the interaction between the second coil unit 230-2 and the second magnet 23B and the direction of fourth electromagnetic force resulting from the interaction between the fourth coil unit 230-4 and the fourth magnet 23D may be the same direction, for example, the y-axis direction (for example, the +y-axis direction or the −y-axis direction), and the OIS movable unit may be moved (shifted) in the y-axis direction (for example, in the +y-axis direction or in the −y-axis direction).

For example, when a drive signal is applied to each of the first to fourth coil units 230-1 to 230-4, the direction of the first electromagnetic force and the direction of the third electromagnetic force are opposite each other, the direction of second electromagnetic force and the direction of fourth electromagnetic force are opposite each other, and the rotational direction of the OIS movable unit due to the first electromagnetic force and the third electromagnetic force and the rotational direction of the OIS movable unit due to the second electromagnetic force and the fourth electromagnetic force are the same, the OIS movable unit may be rotated or rolled about the optical axis or the z-axis.

When the second coil 230 is controlled through three channels, it is possible to cause the OIS movable unit to be rolled using the first and third coil units 230-1 and 230-3 or the second and fourth coil units 230-2 and 230-4.

In the embodiment shown in FIGS. 12A and 12B, the second position sensor 240 may include three sensors 240a, 240b and 240c.

For example, the first sensor 240a may be disposed at the first corner of the first surface 60A of the first circuit board 250, the second sensor 240b may be disposed at the second corner of the first surface 60A of the first circuit board 250, and the third sensor 240c may be disposed at the third corner of the first surface 60A of the first circuit board 250. No sensor may be disposed at the fourth corner of the first surface 60A of the first circuit board 250.

The first corner and the third corner of the first surface 60A of the first circuit board 250 may face each other in a diagonal direction, and the second corner and the fourth corner of the first surface 60A may face each other in a diagonal direction.

For example, the first sensor 240a may be disposed on the first surface (or the upper surface) 60A of the first projection 52A of the first circuit board 250, and may overlap the first projection 52A in the optical-axis direction.

The second sensor 240b may be disposed on the first surface (or the upper surface) 60A of the second projection 52B of the first circuit board 250, and may overlap the second projection 52B in the optical-axis direction.

The third sensor 240c may be disposed on the first surface (or the upper surface) 60A of the third projection 52C of the first circuit board 250, and may overlap the third projection 52C in the optical-axis direction.

For example, although the first sensor 240a may not overlap the first coil unit 230-1 in the direction of the optical axis OA, the second sensor 240b may not overlap the second coil unit 230-2 in the direction of the optical axis OA, and the third sensor 240c may not overlap the third coil unit 230-3 in the direction of the optical axis OA, the disclosure is not limited thereto. In another embodiment, at least a portion of each of the first to third sensors may overlap a corresponding one of the first to third coil units in the optical-axis direction.

The first sensor 240a may overlap the first magnet 23A in the optical-axis direction, the second sensor 240b may overlap the second magnet 23B in the optical-axis direction, and the third sensor 240c may overlap the third magnet 23C in the optical-axis direction.

Although the second position sensor 240 includes three sensors, the second position sensor 240 may include two sensors in another embodiment. For example, one of the first sensor 240a and the third sensor 240c may be omitted in another embodiment.

The image sensor unit 350 may include at least one of a motion sensor 820, a controller 830, a memory 512, and capacitors 81A and 81B.

The motion sensor 820, the controller 830, the memory 512, and the capacitors 81A and 81B may be disposed or mounted to one of the second circuit board 800 and the first circuit board 250.

For example, the motion sensor 820, the memory 512, and the capacitor 81A may be disposed on the second surface 44B of the second circuit board 800.

The controller 830 and the capacitor 81B may be disposed on the first surface 60A of the first circuit board 250. For example, the controller 830 may be disposed in a first region S1 (see FIG. 12A) of the first circuit board 250. The first region S1 may be a region positioned between the image sensor 810 and the first lateral side surface or the first side of the first circuit board 250.

A second region S2 of the first circuit board 250 may be provided with wires or data lines, through which data of the image sensor 810 is transmitted to the second circuit board 800. The first region S1 may be a region opposite the second region S2 with respect to the image sensor 810. The second region S2 may be a region adjacent to the third region 803 of the second circuit board 800. The image sensor 810 may be sensitively affected by noise generated by the wires or the data lines, and the operation and performance of the image sensor 810 may be deteriorated by the noise.

When the controller 830 is disposed in the second region S2 of the first circuit board 250, noise may be generated by the wires or the data lines due to the presence of the controller 830, thereby deteriorating the operation and performance of the image sensor 810.

For example, the motion sensor 820 disposed at the second circuit board 800 may be conductively connected to the controller 830 disposed at the first circuit board 250 via the support member 220 and the connective elastic member 280.

The motion sensor 820 may output information about a rotational angular speed caused by motion of the camera module 10. The motion sensor 820 may be embodied as a dual-axis or triple-axis gyro sensor or an angular speed sensor.

The memory 512 may store code values according to displacement of the bobbin 110 in the optical-axis direction for AF feedback operation. Furthermore, the memory 512 may store code values according to displacement of the OIS movable unit in a direction perpendicular to the optical-axis direction for OIS feedback operation. In addition, the memory 512 may store an algorithm or a program for operation of the controller 830.

For example, although the memory 512 may be, for example, an EEPROM (Electrically Erasable Programmable Read-Only Memory), the disclosure is not limited thereto.

The controller 830 may be conductively connected to the first position sensor 170 and the second position sensor 240.

The controller 830 may control the output signal of the first position sensor 170 and drive signals, which are supplied to the first coil 120 using first code values stored in the memory 512, thereby performing a feedback autofocusing operation.

Furthermore, the controller 830 may control the output signal, supplied from the second position sensor 240, and drive signals, which are supplied to the second coil 230 using second code values stored in the memory 512, thereby performing a feedback OIS operation.

Although the controller 830 may be of a driver IC type, the disclosure is not limited thereto. For example, the controller 830 may be conductively connected to the terminal 262 of the first circuit board 250.

Referring to FIG. 14, the first circuit board 250 may include the terminal 262, which is conductively connected to the connective elastic member 280. The second terminal 262 may be alternatively referred to as a "second terminal portion" or a "second terminal unit".

For example, the terminal 262 of the first circuit board 250 may be coupled to the connective elastic member 270 via solder or a conductive adhesive member. For example, the terminal 262 may be embodied as a plurality of terminals.

For example, the second terminal 262 of the first circuit board 250 may be disposed on the second surface (for example, the lower surface) 60B of the first circuit board 250, and may correspond to or face the connecting spring 281 of the connective elastic member 270 in the optical-axis direction.

The second terminal 262 of the first circuit board 250 may overlap at least a portion of a corresponding connecting spring 281. Although the first circuit board 250 may be a printed circuit board or a flexible printed circuit board (FPCB), the disclosure is not limited with regard thereto.

The first circuit board 250 may be disposed between the holder 270 and the connective elastic member 280.

The connective elastic member 280 may be coupled to the holder 270. The connective elastic member 280 may serve to allow the OIS movable unit to be moved and to allow conductive transmission of signals. In other words, the connective elastic member 280 may conductively connect the support member 220 to the terminal 262 of the first circuit board 250.

For example, the connective elastic member 280 may be disposed under the holder 270.

For example, the connective elastic member 280 may be coupled to the lower surface 42B of the holder 270 via an adhesive member. For example, the connective elastic member 280 may be coupled to the first surface 36A of the lower surface 42B of the holder 270.

The connective elastic member 280 may conductively connect the support member 220 to the first circuit board 250, and may include an elastic deformation portion, which is elastically deformable. The elastic deformation portion of the connective elastic member 280 may be coupled to the support member 220.

The connective elastic member 280 may include the connecting spring 281, corresponding to the support member 220.

For example, the connective elastic member 280 may include a plurality of connecting springs 281. The plurality of connecting springs 281 may correspond to respective ones of the support members 220.

The plurality of connecting springs 281 may be disposed so as to be conductively isolated or spaced apart from each other.

The connecting spring 281 may be made of a conductive material, for example, metal such as copper or a copper alloy.

For example, the connecting spring 281 may be made of at least one selected from among gold (Au), silver (Ag), platinum (Pt), titanium (Ti), tin (Sn), copper (Cu), and zinc (Zn). Furthermore, the connective elastic member 280 may be made of paste or solder paste including at least one selected from among gold (Au), silver (Ag), platinum (Pt), titanium (Ti), tin (Sn), copper (Cu) and zinc (Zn), which have excellent bonding force.

For example, the connecting spring 281 may be made of a metal material having a tensile strength of 1000 MPa or higher. For example, the connecting spring 281 may be made of a binary alloy or a ternary alloy including copper.

Referring to FIGS. 15 to 18, the connecting spring 281 may include a first coupler 31 coupled to the terminal 262 of the first circuit board 250, a second coupler 32 coupled to the support member 220, and a connector 33 connecting the first coupler 31 to the second coupler 32.

The first coupler 31 of the connecting spring 281 may be supported by the holder 270. For example, the first coupler 31 may be disposed on the first surface 36A of the lower surface 42B of the holder 270, and may be supported by the lower surface 42B of the holder 270.

For example, the first coupler 31 may be disposed on the first surface 36A of the lower surface 42B of the holder 270 adjacent to at least one groove 272 in the holder 270.

For example, the first coupler 31 may include a first portion 31a, which is supported by the holder 270 and is connected to the connector 33, and a second portion 31b, which is connected to the first portion 31a and is coupled to the terminal 262 of the first circuit board 250.

For example, the first portion 31a of the first coupler 31 may overlap the first surface 36A of the lower surface 42B of the holder 270 in the optical-axis direction, and may be coupled to the first surface 36A.

The second portion 31b of the first coupler 31 may not overlap the lower surface 42B of the holder 270 in the optical-axis direction. At least a portion of the second portion 31b of the first coupler 31 may overlap the terminal 262 of the first circuit board 250 in the optical-axis direction.

For example, the second portion 31b may project from the inner surface of the holder 270 in a direction toward the terminal 262 of the first circuit board 250.

For example, the second portion 31b of the first coupler 31 may be positioned opposite the portion 19A at which the first coupler 31 meets the connector 33.

The first portion 31a of the first coupler 31 may have a width greater than those of other portions 31b and 33 in order to increase the bonding force with the insulation member 285 and the holder 270.

For example, the width W1 of the first portion 31a of the first coupler 31 may be greater than the width W2 of the second portion 31b. In other words, the surface area of the first portion 31a of the first coupler 31 may be larger than the surface area of the second portion 31b. The reason for this is to comparatively increase the width W1 (or the surface area) of the first portion 31 to thereby increase the surface area of the first portion 31a, which is supported by the holder 270, in order to stably support the first portion 31a by the holder 270.

Here, the width W1 and W2 may be the lengths of the first coupler 31 in a direction perpendicular to a direction toward the terminal 262 of the first circuit board 250.

In another embodiment, the width W1 of the first portion 31a may be equal to or less than the width W2 of the second portion 31b.

The second coupler 32 may be coupled to one end (for example, the lower end) of the support member 220 via solder 902 or a conductive adhesive member.

For example, the second coupler 32 may be disposed so as to overlap the hole 270a in the holder 270 in the optical-axis direction.

The second coupler 32 may have a hole 32A through which the support member 220 extends.

The end of the support member 220 that has passed through the hole 32A in the second coupler 32 may be directly coupled to the second coupler 32 via a conductive adhesive member or the solder 902, and the second coupler 32 may be conductively connected to the support member 220.

For example, the second coupler 32 may include the hole 32A and a region around the hole 32A, which serve as regions in which the solder 902 is disposed in order to couple the coupler 32 to the support member 220. Although the second coupler 32 is configured to have a circular shape in FIG. 16, the disclosure is not limited thereto. In another embodiment, the second coupler 32 may be configured to have a polygonal shape (for example, a quadrangular shape) or an elliptical shape.

For example, the diameter K of the second coupler 32 may be less than the width W1 of the first portion 31a of the first coupler 31. In another embodiment, the diameter K of the second coupler 32 may be equal to or greater than the width W1 of the first portion 31a of the first coupler 31.

The connector 33 may connect the first portion 31a of the first coupler 31 to the second coupler 32, and may include at least one linear portion and at least one curved portion.

For example, the curved portion may be configured so as to curvedly extend from the linear portion perpendicular to the optical axis leftwards or rightwards. For example, although the connector 33 may be configured to have a spiral shape, the disclosure is not limited thereto.

For example, the connector 33 may include a bent portion, which curvedly extends clockwise or counterclockwise. In other words, the connector 33 may be bent in a direction corresponding to the rotation of the image sensor in the z-axis direction. Accordingly, the connector 33 is capable of minimizing damage to the connecting spring 281 when the image sensor is rotated in the z-axis direction, with the result that it is possible to prevent cracks from being generated in the connecting spring 281 and to prevent the connecting spring 281 from being separated from the insulation member 285.

For example, the connector 33 may include a first linear portion 33-1 connected to the first coupler 31, a first curved portion 34-1, which curvedly extends in a first lateral direction from the first linear portion 33-1, a second linear portion 33-2 connected to the first curved portion 34-1, a second curved portion 34-2, which curvedly extends in a second lateral direction from the second linear portion 33-2, a third linear portion 33-3 connected to the second curved portion 34-2, a third curved portion 34-3, which curvedly extends in a third lateral direction from the third linear portion 33-3, a fourth linear portion 33-3 connected to the third curved portion 34-3, a fourth curved portion 34-4, which curvedly extends in a fourth lateral direction from the fourth linear portion 33-4, and a fifth linear portion 33-5 connecting the fourth curved portion 34-4 to the second coupler 32. For example, although each of the first to fourth lateral directions may be a leftward direction, the disclosure is not limited thereto. In another embodiment, at least one of the first to fourth lateral directions may be a rightward direction.

At least one of the curved portions 34-1 to 34-5 of the connector 33 may be configured to have a round shape.

The width of each of the first to fifth linear portions 33-1 to 33-5 may be different from the width of each of the first to fourth curved portions 34-1 to 34-4. For example, because stress is concentrated in the curved portions, the width of each of the first to fourth curved portions 34-1 to 34-4 may be greater than the width of each of the first to fifth linear portions 33-1 to 33-5, thereby preventing damage to the connector 33 caused by stress applied to the connector 33.

The connecting spring 281 may have different widths at different portions thereof.

The connector 33 may have a width less than that of the first portion 31a in order to exert elastic force.

The width W3 of the connector 33 may be less than any of the width W1 of the first portion 31a of the first coupler 31, the width W2 of the second portion 31b of the first coupler 31, and the diameter K of the second coupler 32. Therefore, the connecting spring 281 is capable of flexibly supporting the OIS movable unit and of allowing the OIS movable unit to be easily moved in a direction perpendicular to the optical axis.

For example, the connector 33 may have a width of 20 μm to 1000 μm.

For example, if the width of the connector 33 is less than 20 μm, the overall rigidity of the connecting spring 281 may be lowered, and thus the reliability of the connecting spring 281 may be lowered. Meanwhile, if the width of the connector 33 is greater than 100 μm, the elastic force of the connecting spring 281 may be lowered, and thus the voltage required to activate the second coil 230, configured to shift the OIS movable unit, may be increased, thereby increasing power consumption.

In another embodiment, the width of the connector 33 may be equal to or greater than the diameter K of the second coupler 32.

The thickness t1 of the first coupler 31, the thickness t2 of the connector 33, and the thickness of the second coupler 32 may be the same. In another embodiment, at least one of the thickness t1 of the first coupler 31, the thickness t2 of the connector 33, and the thickness of the second coupler 32 may be different from the remaining ones thereof. For example, the thickness t2 of the connector 33 may be less than the thickness of the first coupler 31 and the thickness of the second coupler 32.

The second coupler 32 and the connector 33 may overlap the groove 272 in the holder 270 in the optical-axis direction. For example, the second coupler 32 and the connector 33 may be disposed in the groove 272 in the holder 270. For example, the second coupler 32 and/or the connector 33 may be disposed so as to be spaced apart from the holder 270.

Referring to FIGS. 15 and 16, the connective elastic member 280 may include a plurality of connecting springs. The plurality of connecting springs may be sorted into a plurality of groups. For example, the plurality of groups may alternatively be referred to as a "plurality of connectors", a "plurality of elastic portions" or a "plurality of connective elastic members".

For example, the connective elastic member 280 may include four groups 1A to 4A corresponding to the four side portions (the four lateral side surfaces) of the first circuit board 250 or the four side portions (or the four lateral side surfaces) of the holder 270.

Each of the plurality of groups 1A to 4A may include a plurality of connecting springs 1-1 to 1-9, 2-1 to 2-9, 3-1 to 3-9, or 4-1 to 4-9.

Furthermore, the terminals 262 of the first circuit board 250 may be sorted into a plurality of groups corresponding to the groups 1A to 4A of the connective elastic member 280. Each of the plurality of groups of the first circuit board 250 may include a plurality of terminals P1 to P9, S1 to S9, R1 to R9, or Q1 to Q9.

For example, each of the plurality of terminals P1 to P9, S1 to S9, R1 to R9, and Q1 to Q9 of the first circuit board 250 may be coupled to a corresponding one of the plurality of connecting springs 1-1 to 1-9, 2-1 to 2-9, 3-1 to 3-9, and 4-1 to 4-9 via solder.

For example, the numbers of connecting springs included in of the plurality of groups 1A to 4A may be the same.

In another embodiment, the numbers of connecting springs included in two groups, which are positioned opposite each other, may be the same.

In a further embodiment, the numbers of connecting springs included in two adjacent groups of the connective elastic member 280 may be different from each other. In another embodiment, the number of connecting springs included in at least one of the plurality of groups 1A to 4A may be different from the number of connecting springs included in each of the remaining groups.

For example, in order to flexibly support the OIS movable unit in an equilibrium state, the plurality of groups 1A to 4A of the connective elastic member 280 may be disposed so as to be biradially symmetrical about the center point 403.

In another embodiment, the plurality of groups 1A to 4A of the connective elastic member 280 may be disposed so as to be tetraradially symmetrical about the center point 403.

For example, the holder 270 may include four corners 30A to 30D. The first and third groups 1A and 3A may be disposed opposite each other in a transverse direction, and the second and fourth groups 2A and 4A may be disposed opposite each other in a longitudinal direction. The transverse direction and the longitudinal direction may intersect each other.

The first group 1A may be disposed in the first region of the second surface 70B of the holder 270 between the first corner 30A and the second corner 30B, and the second group 2A may be disposed in the second region of the second surface 70B of the holder 270 between the second corner 30B and the third corner 30C. The third group 3A may be disposed in the third region of the second surface 70B of the holder 270 between the third corner 30C and the fourth corner 30D, and the fourth group 4A may be disposed in the fourth region of the second surface 70B of the holder 270 between the fourth corner 30D and the first corner 30A.

The first corner 30A and the third corner 30C of the holder 270 may be positioned opposite each other in a first diagonal direction, and the second corner 30B and the fourth corner 30D of the holder 270 may be positioned opposite each other in a second diagonal direction. The first diagonal direction and the second diagonal direction may be perpendicular to each other.

The centers of the first and third groups 1A and 3A may be positioned so as to deviate in opposite directions with respect to a first central line 401, and the centers of the second and fourth groups 2A and 4A may be positioned so as to deviate in opposite direction with respect to a second central line 402.

Here, the center of each of the groups may be the spatial center of the overall length of each of the groups in the direction in which the connecting springs included in the group are arranged. The overall length may be the distance between the first connecting spring and the last connecting spring of each of the groups.

For example, the first central line 401 may be a line that extends through the center 403 and is parallel to a direction toward the third region of the holder 270, in which the third group 3A is disposed, from the first region of the holder 270, in which the first group 1A is disposed. Alternatively, the first central line 401 may be a line that extends through the center 403 and is parallel to the first outer surface of the holder 270.

For example, the second central line 402 may be a line that extends through the center 403 and is parallel to a direction toward the fourth region of the holder 270, in which the fourth group is disposed, from the second region of the holder 270, in which the second group is disposed. Alternatively, the second central line 402 may be a line that extends through the center 403 and is perpendicular to the first outer surface of the holder 270.

For example, the center 403 may be the center of the bore 70 in the holder 270, the center of the first circuit board 250, or the spatial center of the connective elastic member.

For example, the number of connecting springs of the first group 1A (or the third group 3A), which is disposed at one side (for example, a right side) of the first central line 401, and the number of connecting springs of the first group 1A (or the third group 3A), which is disposed at the other side (for example, a left side) of the first central line 401, may be different from each other.

For example, the number of connecting springs of the second group 2A (or the fourth group 4A), which is disposed at one side (for example, a right side) of the second central line 402, and the number of connecting springs of the second group 2A (or the fourth group 4A), which is disposed at the other side (for example, a left side) of the second central line 402, may be different from each other.

Referring to FIG. 16, the connective elastic member 280 may further include the insulation member 285. The insulation member 285 may be alternatively referred to as an "insulation layer". For example, the insulation member 285 may include polyimide.

The insulation member 285 may surround at least a portion of the connecting spring 281. For example, the insulation member 285 may surround at least a portion of the first portion 31*a* of the connecting spring 281. For example, the upper surface of the first portion 31*a* of the connecting spring 281 may be coupled to the first surface 36A of the lower surface 42A of the holder 270, and the insulation member 285 may cover the lower surface of the first portion 31*a* of the connecting spring 281.

An adhesive member may be interposed or disposed between the insulation member 285 and the connecting spring 281 and between the insulation member 285 and dummy members 28-1 to 28-4 so as to attach the same to each other.

For example, the second portion 31*b* of the first coupler 31 of the connecting spring 281, the second coupler 32, and the connector 33 may be exposed from the insulation member 285.

The insulation member 285 may connect the connecting springs 1-1 to 1-9, 2-1 to 2-9, 3-1 to 3-9, and 4-1 to 4-9 of the groups 1A to 4A to each other.

The insulation member 285 may support the connecting springs 1-1 to 1-9, 2-1 to 2-9, 3-1 to 3-9, and 4-1 to 4-9 of the connective elastic member 280, and may be coupled or attached to the first surface 36A of the lower surface 42B of the holder 270.

The connective elastic member 280 may further include one or more dummy members 28-1 to 28-4.

For example, the dummy members 28-1 to 28-4 may be spaced apart from the connecting springs 1-1 to 1-9, 2-1 to 2-9, 3-1 to 3-9, and 4-1 to 4-9, and may be disposed on the lower surface 42B of the holder 270.

The insulation member 285 may surround or cover at least a portion of the dummy members 28-1 to 28-4. As a result, it is possible to securely maintain the shape of the insulation member 285 so as to improve the adhesive force between the insulation member 285 and the holder 270.

The dummy members 28-1 to 28-4 may be alternatively referred to as a "reinforcing portion" or a "reinforcing pattern" because they reinforce the rigidity of the connective elastic member 280.

Each of the dummy members 28-1 to 28-4 may be coupled to the lower surface 42B of the holder 270 via an adhesive, and may have at least one through hole 28A or groove in order to increase the coupling force between the dummy member and the holder 270.

The dummy members 28-1 to 28-4 may not be conductively connected to the connecting springs 1-1 to 1-9, 2-1 to 2-9, 3-1 to 3-9, and 4-1 to 4-9. Although the dummy members 28-1 to 28-4 are not conductively connected to each other, the disclosure is not limited thereto. In another embodiment, the dummy members may be connected to each other.

For example, the insulation member 285 may have therein a bore or a cavity. For example, although the insulation member 285 may be configured to have a polygonal shape, for example, a quadrangular ring shape overall, when viewed from above, the disclosure is not limited thereto.

For example, although the connective elastic member 280 may include four dummy members 28-1 to 28-4, the number of dummy members is not limited thereto. In another embodiment, the number of dummy members may be any number greater than or equal to one.

For example, each of the dummy members 28-1 to 28-4 may be disposed between two adjacent groups 1A and 2A, 2A and 3A, 3A and 4A, or 4A and 1A of the connective elastic member 280.

For example, the connective elastic member 280 may include a dummy member 28-3 disposed at the first corner or the first corner region of the insulation member 285 between the first group 1A and the second group 2A, a dummy member 28-2 disposed at the second corner or the second corner region of the insulation member 285 between the second group 2A and the third group 3A, a dummy member 28-1 disposed at the third corner or the third corner region of the insulation member 285 between the third group 3A and the fourth group 4A, and a dummy member 28-4 disposed at the fourth corner or the fourth corner region of the insulation member 285 between the fourth group 4A and the first group 1A.

Each of the dummy members 28-1 to 28-4 may have an escape portion configured to avoid spatial interference with the projection 275 of the holder 270. Although the escape portion 27A may be configured to have the form of a groove or a hole, the disclosure is not limited thereto.

Referring to FIG. 16, the insulation member 285 may include a body 85A, which is disposed on the first portions 31*a* of the first coupler 31 of the connecting springs 1-1 to 1-9, 2-1 to 2-9, 3-1 to 3-9, and 4-1 to 4-9, a portion of the lower surface 43B of the holder 270, and portions of the dummy members 28-1 to 28-4, and an extension 85B extending toward other portions of the dummy members 28-1 to 28-4.

For example, the body 85A of the insulation member 285 may be disposed on the first surface 36A of the lower surface 42B of the holder 270 adjacent to the bore 70 in the holder 270, and may be configured to have the form a ring having a closed curve shape. For example, although the body 85A may be configured to have the form of a quadrangular ring, the disclosure is not limited thereto. In another embodiment, the body 85A may be configured to have the form of a circular or polygonal ring.

For example, the body 85A may have therein a bore or a cavity, which corresponds to, overlaps, or is aligned with the bore 800A in the second circuit board 800 and the bore in the holder 270 in the optical-axis direction.

Although the extension 85B may be configured to have a linear shape, the disclosure is not limited thereto. In another embodiment, the extension 85B may be configured to have at least one of a linear shape and a curved shape. For example, the extension 85B may include a plurality of extensions, which may be disposed so as to be spaced apart from each other. For example, the extension 85B may extend from the body 85A toward the outer surface of the holder 270. For example, the extension may be disposed so as to surround the groove 272 in the holder 270.

The extension 85B may serve to increase the contact area with each of the dummy members 28-1 to 28-4 to thus further increase the rigidity of the connective elastic member 280.

The support member 220 may conductively connect the second circuit board 800 to the connective elastic member 280.

The support member 220 may include a plurality of groups of support members, which correspond to the groups 1A to 4A of the connective elastic member 280. Each of the plurality of groups may include a plurality of support members (or wires).

For example, the support member 220 may include a plurality of support members corresponding to the plurality of connecting springs. The support member may be alternatively referred to as a "wire".

The support member 220 may be coupled at one end thereof to the second circuit board 800 and at the other end thereof to the second coupler 32 of the connecting spring 281.

For example, the one end of the support member 220 may be coupled to the first surface (for example, the upper surface) 44A of the second circuit board 800 through the bore 800A in the second circuit board 800 via a first solder 901. For example, the one end of the support member 220 may be coupled and conductively connected to the terminal 800B of the second circuit board 800.

The other end of the support member 220 may be coupled to the lower portion or the lower surface of the second coupler 32 of the connecting spring 281 through the hole 32A in the second coupler 32 via second solder 902.

The support member 220 may extend through the escape region 45 in the housing 450 and the hole 270a in the holder 270, thereby avoiding spatial interference with the housing 450 and the holder 270.

Each of the support members 220 may be embodied as a member that is conductive and offers elastic support, for example, a suspension wire, a leaf spring, or a coil spring.

The image sensor unit 350 may further include the filter 610. The image sensor unit 350 may further include the filter holder 600 in which the filter 610 is disposed, seated or received. The filter holder 600 may alternatively be referred to as a "sensor base".

The filter 610 may serve to prevent light within a specific frequency band that passes through the lens barrel 400 from being introduced into the image sensor 810.

The filter 610 may be, for example, an infrared-light-blocking filter, without being limited thereto. For example, the filter 610 may be oriented parallel to the X-Y plane perpendicular to the optical axis OA.

The filter 610 may be disposed under the lens module 400.

The filter holder 600 may be disposed under the AF operation unit 100. For example, the filter holder 600 may be disposed on the first circuit board 250.

The filter holder 600 may be coupled to a region of the first surface 60A of the first circuit board 250 surrounding the image sensor 810, and may be exposed through the bore 800A in the second circuit board 800 and the bore 70 in the holder 270. For example, the filter holder 600 may be exposed through the bore 800A in the second circuit board 800 and the bore 70 in the holder 270.

For example, the filter holder 600 may be coupled to a region of the first surface (for example, the upper surface) surrounding the seating region 260A of the first circuit board 250. Although the seating region 260A is the same surface as the first surface 60A of the first circuit board 250 in FIG. 12A, the disclosure is not limited thereto. In another embodiment, the seating region 260A may be a groove or a projection.

In another embodiment, the filter holder 600 may be coupled to the holder 270 or the AF operation unit 100.

The bore 70 in the holder 270 may expose the filter holder 600 disposed at the first circuit board 250 and the filter 610 disposed at the filter holder 600 therethrough.

The filter holder 600 may have therein a bore 61A, which is formed in a region thereof in which the filter 610 is mounted or disposed, so as to allow the light that has passed through the filter 610 to enter the image sensor 810. The bore 61A in the filter holder 600 may be configured to have the form of a through hole, which is formed through the filter holder 600 in the optical-axis direction. For example, the bore 61A in the filter holder 600 may be formed through the center of the filter holder 600, and may be positioned so as to correspond to or face the image sensor 810.

The filter holder 600 may have a seating portion 500, in which the filter 610 is seated. The filter 610 may be disposed, seated or mounted in the seating portion 500. The seating portion 500 may be formed so as to surround the bore 61A. In another embodiment, the seating portion 500 of the filter holder 600 may be configured to have the form of a projection, which projects from the upper surface of the filter 610.

The image sensor unit 350 may further include an adhesive member 612 disposed between the filter 610 and the seating portion 500, and the filter 610 may be coupled or attached to the filter holder 600 via the adhesive member 612.

The image sensor unit 350 may further include an adhesive member 61 disposed between the filter holder 600 and the first circuit board 250, and the filter holder 600 may be coupled or attached to the first circuit board 260 via the adhesive member 61.

For example, the adhesive member 612 and 61 may be epoxy, thermohardening adhesive, or ultraviolet-hardening adhesive.

The camera module 10 may further include at least one of the cover member 300, the base 210, and the bottom cover 219 in order to accommodate therein the AF operation unit 100 and the image sensor unit 350, to protect the AF operation unit 100 and the image sensor unit 350 from external impacts and to prevent the introduction of external foreign substances.

The cover member 300 may be configured to have the form of a box, which is open at the bottom and which includes the upper plate 301 and the side plates 302. The side plates 302 of the cover member 300 may be coupled to the outer surface of the housing 140 of the AF operation unit 100. In another embodiment, the lower portions of the side plates 302 of the cover member 300 may be coupled to the base 210.

The upper plate 301 of the cover member 300 may be configured to have a polygonal shape, for example, a quadrangular shape, an octagonal shape or the like. The cover member 300 may have therein a bore 303, which is formed through the upper plate 301 so as to expose the lens (not shown), which is coupled to the bobbin 110 to external light. One of the side plates 302 of the cover member 300 may be provided with a groove 304 through which the terminal member 95 of the circuit board 910 is exposed.

The base 210 may be disposed under the holder 270. The base 210 may be configured to have a shape, for example, a quadrangular shape, which coincides with or corresponds to the shape of the cover member 300, the housing 450, or the holder 270.

For example, the base 210 may include a lower plate 210A disposed under the holder 270 and a side plate 210B extending toward the second circuit board 800 from the lower plate 210A. The base 210 may have a bore 210C formed through the lower plate 210A.

The bore 210C in the base 210 may be a through hole, which is formed through the base 210 in the optical-axis direction. In another embodiment, the base 210 may not have the bore 210C therein.

For example, the side plate 210B of the base 210 may be coupled to the housing 450. In another embodiment, the side plate 210B of the base 210 may be coupled to the side plates 302 of the cover member 300.

The bottom cover 219 may be disposed under the base 210 so as to close the bore 210C in the base 210. In another embodiment, the bottom cover 219 may be omitted.

Hereinafter, the stationary part (for example, the "OIS stationary part") and the movable part (for example, the "OIS movable part") of the image sensor unit 350 will be described in terms of OIS operation.

The image sensor unit 350 may include the OIS stationary part, the OIS movable part, and the elastic support member 220 and 280, which is coupled to the two parts so as to connect the two parts to each other. The OIS movable part may be moved relative to the OIS stationary part in a direction perpendicular to the optical axis OA. The elastic support member 220 and 280 may be alternatively referred to as a "support member" or an "elastic member".

The OIS movable part, which is disposed under the OIS stationary part, may be spaced apart from the OIS stationary part by a predetermined distance by means of the elastic support member 220 and 280. Specifically, the OIS movable part may be moved relative to the OIS stationary part via the support member 220 and the connective elastic member 280 by the electromagnetic force resulting from the interaction between the magnet 23 and the coil 230.

One end of the elastic support member 220 and 280 (for example, one end of the support member 220) may be coupled to the second circuit board 800, and the other end of the elastic support member 220 and 280 (for example, the first coupler 31 of the connecting spring 281) may be coupled to the first circuit board 250.

The second circuit board 800 and the first circuit board 250 may be conductively connected to each other via the elastic support member 220 and 280.

The OIS movable part may be moved relative to the OIS stationary part in a direction perpendicular to the optical axis by the electromagnetic force resulting from the interaction between the second coil 230 and the magnet 23.

For example, by the interaction between the magnet 23 and the second coil 230, the image sensor 810 may be shifted or tilted in a direction perpendicular to the optical axis OA, or may be rotated about the optical axis OA. For example, the optical-axis direction may be a direction perpendicular to one surface of the image sensor 810. For example, the one surface of the image sensor 810 may be the upper surface of the image sensor 810. Alternatively, the one surface of the image sensor 810 may be a surface that corresponds to or faces the lower surface of the lens module 400 or the filter 610. For example, the one surface of the image sensor 810 may be an active region.

By virtue of the support member 220 and the connective elastic member 280, the OIS movable part may be elastically supported, and may be moved in a direction perpendicular to the optical axis.

The OIS stationary part may include the second circuit board 800, the housing 450, and the magnet 23. Furthermore, the OIS stationary part may include at least one of the base 210, the cover member 300, and the bottom cover 219. Furthermore, the OIS stationary part may include elements that are coupled to the second circuit board 800, for example, the motion sensor 820 and the capacitor 81A.

The OIS movable part may include the first circuit board 250, the holder 270, the second coil 230, and the image sensor 810.

Furthermore, the OIS movable part may include elements that are coupled to the first circuit board 250, for example, the second position sensor 240, the controller 830, the memory 512, and the capacitor 81B. Furthermore, the OIS movable part may include the filter holder 600 and the filter 610.

For example, the OIS movable part may include the first circuit board 250, which is coupled to the connective elastic member 280, the holder 270, which is coupled to the first circuit board 260, and the image sensor 810, which is disposed at the first circuit board 250, and may be elastically supported by the support member 220 and the connective elastic member 280.

The magnet 23 may be disposed at the OIS stationary part, and the second coil 230 may be disposed at the OIS movable part. By virtue of the interaction between the magnet 23 and the second coil 230, the OIS movable part may be moved or tilted relative to the OIS stationary part.

Referring to FIG. 19A, in order to move and tilt the OIS movable part relative to the OIS stationary part using the electromagnetic force resulting from the interaction between the magnet 23 and the second coil 230, the OIS movable part may be spaced apart from the OIS stationary part.

For example, the first circuit board 250 and the image sensor 801 may be spaced apart from the second circuit board 800, the housing 450, and the base 210.

For example, at the initial position of the OIS movable part, the outer surface of the holder 270 may be spaced apart from the inner surface of the base 210 by a predetermined distance dl.

Furthermore, for example, at the initial position of the OIS movable part, the lower surface of the holder 270 and the lower surface of the first circuit board 250 may be spaced apart from the front surface (or the upper surface) of the base 210 by a predetermined distance H1. Furthermore, at the initial position of the OIS movable part, the lower surface of the holder 270 and the lower surface of the first circuit board 250 may be spaced apart from the front surface (or the upper surface) of the bottom cover 219.

Furthermore, at the initial position of the OIS movable part, the solder 902 may be spaced apart from the front surface (or the upper surface) of the base 210 by a predetermined distance.

The initial position of the OIS movable part may be the original position of the OIS movable part in the state in which no electric power is applied to the second coil 230 or the position at which the OIS movable part is located as the result of the support member 220 and the connective elastic member 280 being elastically deformed due only to the weight of the OIS movable part.

In addition, the initial position of the OIS movable part may be the position at which the OIS movable part is located when gravity acts in the direction from the second circuit board 800 to the first circuit board 250 or when gravity acts in the direction from the first circuit board 250 to the second circuit board 800.

The image sensor 810 may be any one of a charge-coupled device (CCD), a metal oxide semiconductor (MOS), a CPD image sensor and a CID image sensor, without being limited thereto.

Although the first circuit board 250 may be embodied as a single board in an embodiment, the disclosure is not limited thereto. In another embodiment, the first circuit board may include the third board and the fourth board, each of the third and fourth boards may include additional terminals configured to be conductively connected to each other, and the first coupler 31 of the connective elastic member 280 may be conductively connected to one of the third board and the fourth board.

Figure 22:
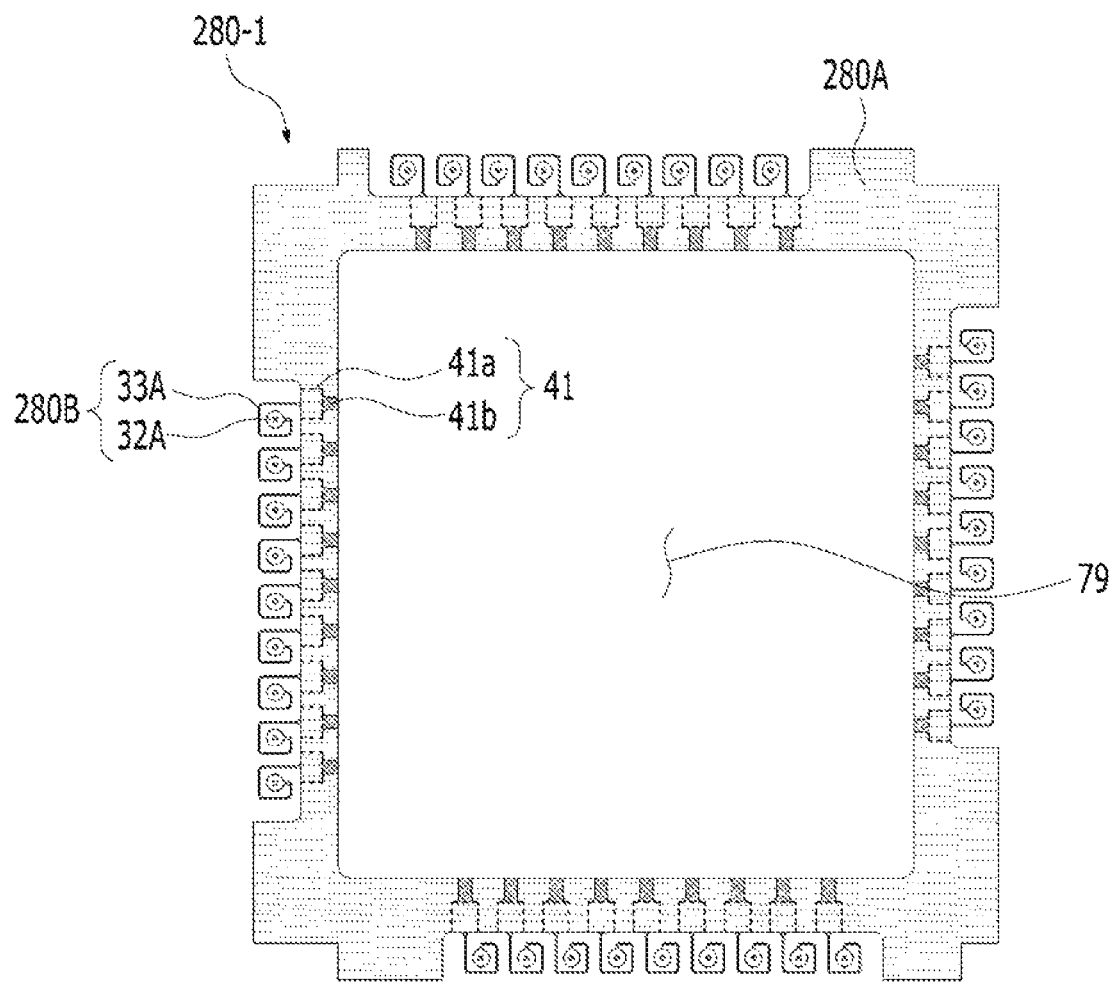
FIG. 22 is a view illustrating a connective elastic member according to another embodiment.

FIG. 22 illustrates a connective elastic member 280-1 according to another embodiment.

Referring to FIG. 22, the connective elastic member 280-1 may include a board portion 280A and an elastic portion 280B. The board portion 280A may be alternatively referred to as a "board member", a "circuit board", a "board" or a "circuit member".

The board portion 280A may include a plurality of terminals 41 corresponding to the terminals 262 of the first circuit board 250.

The board portion 280A may have therein a bore 79 corresponding to the bore 70 in the holder 270. The bore 79 in the board portion 280A may be a through hole, which is formed through the board portion 280A in the optical-axis direction.

For example, the bore 79 in the board portion 280A may expose the second surface 60B of the first circuit board 250, and may expose the terminals 262 of the first circuit board 250.

The terminal 41 of the board portion 280A may include a first portion 41a and a second portion 41b. The first portion 41a of the terminal 41 may be disposed in the board portion 280A, and the second portion 41b of the terminal 41 may be exposed to the outside from the board portion 280A, and may be coupled to the terminal 262 of the first circuit board 250 via solder.

The board portion 280A may be disposed on the first surface 36A of the lower surface 42B of the holder 270, and may be coupled or attached to the first surface 36A of the lower surface 42B of the holder 270 via an adhesive member.

For example, the board portion 280A may be embodied as a printed circuit board or an FPCB.

The elastic portion 280B may be exposed from the board portion 280A, and may be connected to the terminal 41 of the board portion 280A.

The elastic portion 280B may include a coupler 32A coupled to the support member 220 and a connector 33A connecting the coupling portion 32A to the terminal 41.

The elastic portion 280B and the terminal 41 of the board portion 280A may correspond to the connecting spring 281 shown in FIG. 18.

For example, the first portion 41a of the terminal 41 may correspond to the first portion 31a of the connecting spring 281 shown in FIG. 18, and the second portion 41b of the terminal 41 may correspond to the second portion 31b of the connecting spring 281 shown in FIG. 18. The description of the first and second portions 31a and 31b of the connecting spring 281 may be applied to the first and second portions 41a and 41b of the terminal 41, with or without modification.

Furthermore, the coupler 32A of the elastic portion 280B may correspond to the second coupler 32 of the connecting spring 281 shown in FIG. 18, and the connector 33A of the elastic portion 280B may correspond to the connector 33 of the connecting spring 281 shown in FIG. 18. The description of the second coupler 32 and the connector 33 of the connecting spring 281 may be applied to the coupler 32A and the connector 33A of the elastic portion 280B with or without modification.

Figure 24:
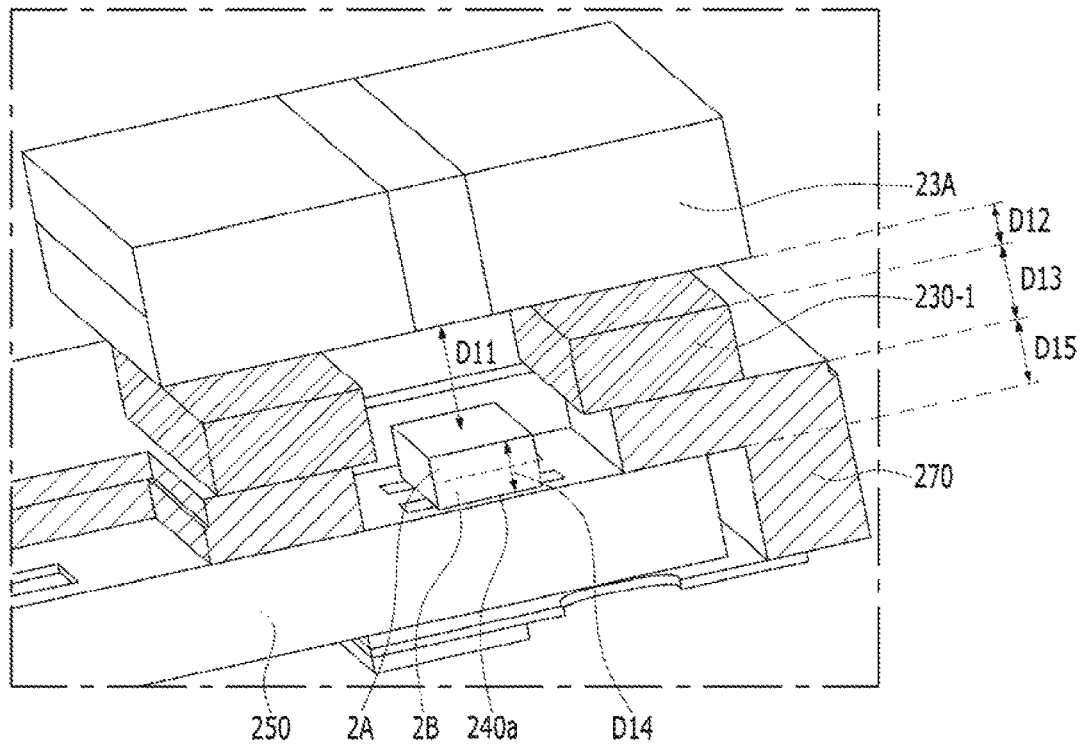
FIG. 24 is a view illustrating the arrangement of the magnet, the OIS coil unit, the OIS position sensor, the holder, and the first circuit board according to an embodiment.

The description of the groups 1A to 4A of the connective elastic member 280 shown in FIGS. 15 and 16 may be applied to the connective elastic member 280-1 shown in FIG. 24 with or without modification.

The board portion 280A may include the dummy members 28-1 to 28-4 shown in FIGS. 15 and 16, and the description of the dummy members 28-1 to 28-4 may be applied to the dummy members of the board portion 280A with or without modification.

Figure 23:
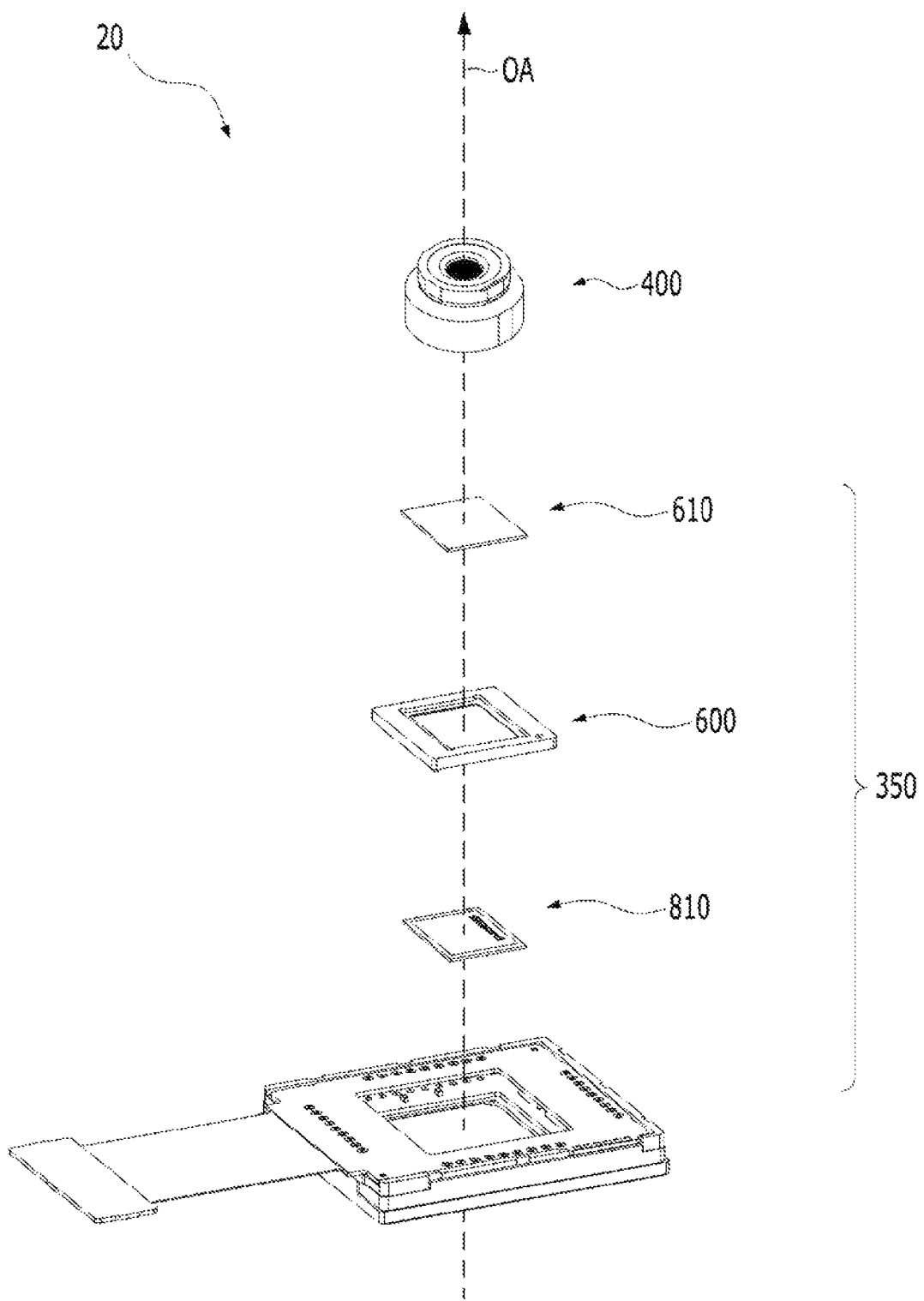
FIG. 23 is an exploded perspective view of a camera module according to another embodiment of the present invention.

FIG. 23 is an exploded perspective view of a camera module 20 according to another embodiment of the present invention. Reference numerals in FIG. 23, which are the same as those in FIG. 2, denote the same components, and description of the same components is given briefly or omitted.

Referring to FIG. 23, the camera module 20 may include the lens module 400 and the image sensor unit 350.

The lens module 400 of the camera module 20 shown in FIG. 23 may or may not move in the optical-axis direction, and may be fixed in the optical-axis direction.

Furthermore, the lens module 400 shown in FIG. 23 may or may not move in a direction perpendicular to the optical axis OA, and may be fixed in a direction perpendicular to the optical axis OA.

The camera module 20 may further include the cover member 300 shown in FIG. 2.

For example, the lens module 400 may be coupled, attached or fixed to the holder 600 and the second circuit board 800. For example, the lower portion, the lower end or the lower surface of the lens module 400 may be coupled, attached or fixed to the upper surface of the holder 600 or the upper surface of the second circuit board 800.

Furthermore, the lens module 400 may be coupled, attached or fixed to the cover member 300.

With the development of camera technology, resolution of an image becomes high, and thus the size of an image sensor is being increased. Because the size of an image sensor is being increased, the size of a lens module and the size of an actuator for shifting the lens module are also being increased. Consequently, not only the weight of a lens module but also the weight of other actuator components for moving the lens module increase.

According to an embodiment of the present invention, autofocusing is performed using the AF operation unit (or the first actuator) 100, which is operated in a lens shift manner, and optical image stabilization (OIS) is performed using the image sensor unit (or the second actuator) 350, which is operated in an image sensor shift manner, thereby improving the reliability of the camera device.

The embodiment is able to perform 5-axis handshake correction using the sensor shift manner. For example, the 5-axis handshake may include two angular handshakes (for example, pitch and yaw), two shift handshakes (for example, x-axis shift and y-axis shift), and one rotational handshake (for example, roll).

Figure 25:
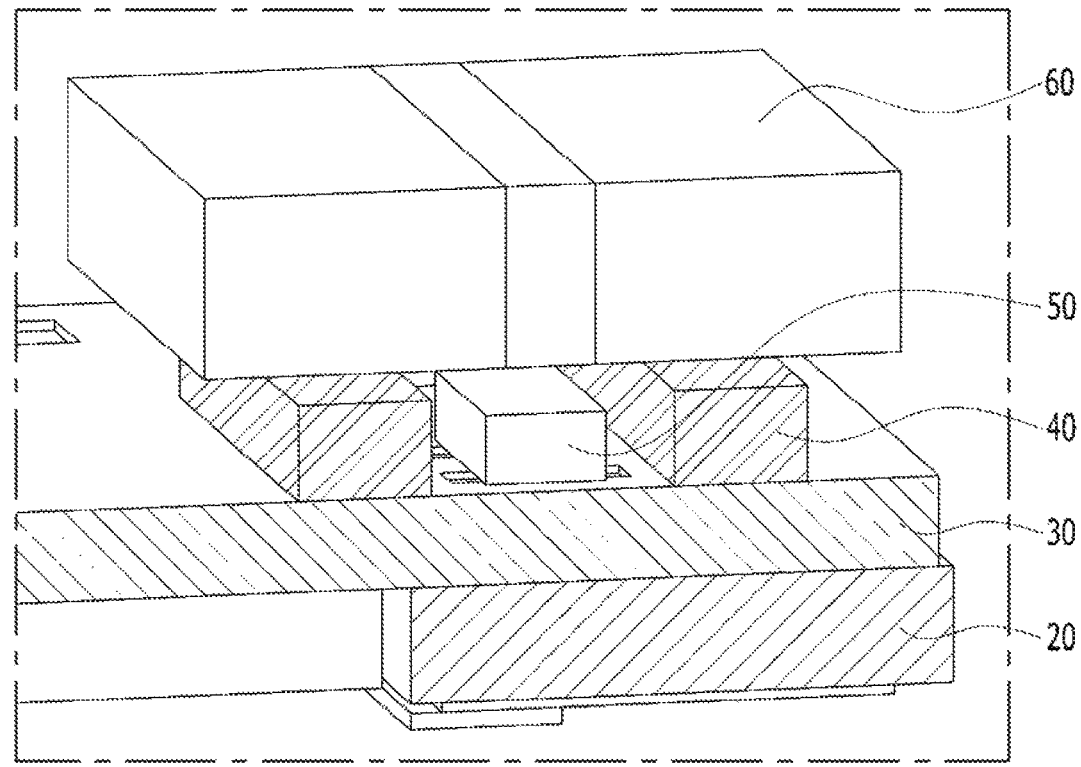
FIG. 25 is a view illustrating the arrangement of a magnet, an OIS coil unit, an OIS position sensor, a first circuit board, and a holder according to a comparative example.

FIG. 24 illustrates the arrangement of the magnet 23A, the OIS coil unit 230-1, the OIS position sensor 240a, the holder 270, and the first circuit board 250 according to an embodiment. FIG. 25 illustrates the arrangement of a magnet 60, an OIS coil unit 40, an OIS position sensor 50, a first circuit board 30, and a holder 30 according to a comparative example.

In the comparative example shown in FIG. 25, the OIS coil unit 40 and the OIS position sensor 50 may be disposed or mounted on the first surface (for example, the upper surface) of the first circuit board 30. The holder 20 may be disposed under the first circuit board 30.

The OIS coil unit 40 may have an opening or a hole formed in the center thereof, and the OIS position sensor 50 may be disposed in the opening or the holder in the OIS coil unit 40. The OIS position sensor 50 may overlap the OIS coil unit 40 in a direction perpendicular to the optical axis or in a direction parallel to the upper surface of the first circuit board 30. In other words, the OIS coil unit 50 and the OIS position sensor 50 may be disposed adjacent to the first surface (for example, the upper surface) of the first circuit board 30.

When a drive signal is applied to the OIS coil unit 40 for OIS operation, a magnetic field may be generated from the OIS coil unit 40. In order to perform accurate OIS feedback operation, the OIS position sensor 50 must output an output corresponding to the result of detection of only the magnetic field generated from the magnet 60 that is fixed to the OIS stationary part. However, because the OIS coil unit 40 and the OIS position sensor 50 are disposed adjacent to each other in the comparative example shown in FIG. 25, the output of the OIS position sensor 50 may be greatly influenced by the magnetic field generated from the OIS coil unit 40, thereby deteriorating the accuracy and reliability of the OIS feedback operation.

Furthermore, because the OIS position sensor 50 and the OIS coil unit 40 overlap each other in a direction perpendicular to the optical axis, the output of the OIS position sensor 50 may be greatly influenced by the magnetic field generated by the OIS coil unit 40, thereby deteriorating the accuracy and reliability of the OIS feedback operation.

Figure 26:
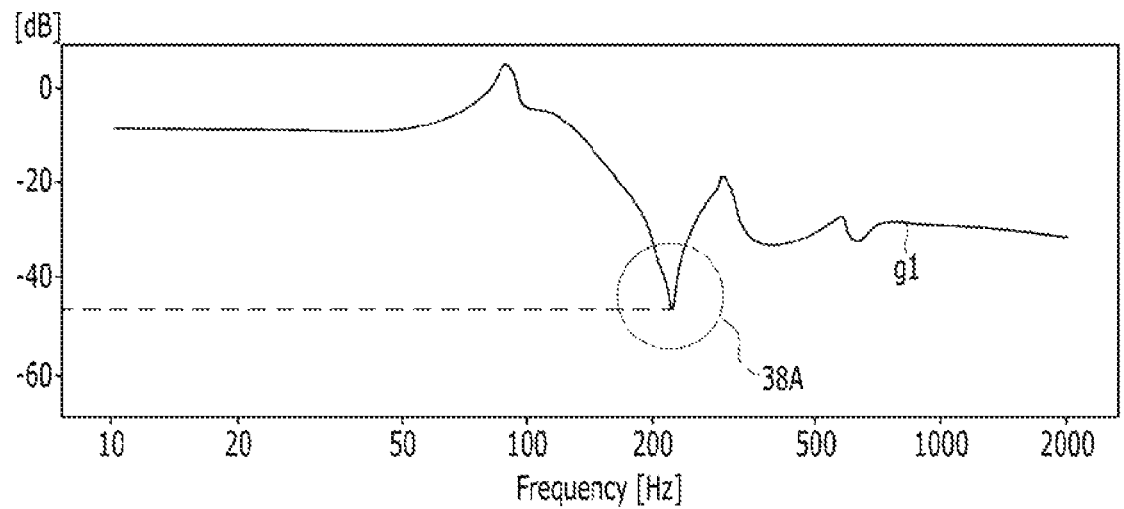
FIG. 26 is a view illustrating frequency response characteristics with respect to a drive signal input to the OIS coil unit and the output of the OIS position sensor.

FIG. 26 illustrates frequency response characteristics with respect to a drive signal input to the OIS coil unit 40 and the output of the OIS position sensor 50. In FIG. 26, the x-axis indicates frequency, and the y-axis indicates gain. g1 indicates frequency response characteristics with gain.

Referring to FIG. 26, owing to the influence caused by a magnetic field generated from the OIS coil unit 40, there may be a phenomenon 38A in which the output of the OIS position sensor 50 decreases abnormally in a certain frequency range (for example, 200 Hz to 300 Hz). Due to this phenomenon 38A, the reliability of OIS feedback operation may be deteriorated.

In contrast, in the embodiment shown in FIG. 24, the OIS position sensor (for example, 240a) may be disposed under the OIS coil unit (for example, 230-1), and the OIS position sensor (for example, 240a) and the OIS coil unit (for example, 230-1) may not overlap each other in a direction perpendicular to the optical axis or in a direction parallel to the upper surface of the first circuit board 250.

For example, the distance D12 between the magnet 23A and the OIS coil unit 230-1 in the optical-axis direction may be within a range of 0.05 mm to 0.2 mm. For example, D12 may be in a range of 0.1 mm to 0.18 mm. Specifically, D12 may be in a range of 0.12 mm to 0.15 mm.

Furthermore, for example, the length D13 of the OIS coil unit 230-1 in the optical-axis direction may be in a range of 0.1 mm to 0.5 mm. Specifically, D13 may be in a range of 0.2 mm to 0.4 mm. More specifically, D13 may be in a range of 0.25 mm to 0.3 mm.

For example, the distance D11 between the magnet 23A and the OIS position sensor (for example, 240a) in the optical-axis direction may be in a range of 0.25 mm to 0.8 mm. Specifically, D11 may be in a range of 0.3 mm to 0.5 mm. More specifically, D11 may be in a range of 0.35 mm to 0.47 mm.

If D11 is greater than 0.8 mm, the intensity of the magnetic field of the magnet 23A detected by the OIS position sensor 240a may be attenuated, and thus the sensitivity of the OIS position sensor 240a may be deteriorated.

IF D11 is less than 0.25 mm, the length D13 of the OIS coil unit 230-1 in the optical-axis direction must be reduced in order to prevent the OIS coil unit and the OIS position sensor from overlapping each other in a direction perpendicular to the optical axis. In this case, the electromagnetic force resulting from the interaction between the OIS coil unit and the magnet may be reduced.

Meanwhile, the thickness D14 of the PIS position sensor 240a may be in a range of 0.2 mm to 0.4 mm. Specifically, D14 may be in a range of 0.23 mm to 0.3 mm.

For example, the thickness D15 of the upper plate of the holder 270 may be in a range of 0.2 mm to 0.3 mm. Specifically, D15 may be in a range of 0.2 mm to 0.25 mm. For example, D15 may be the distance between the upper surface 42A of the holder 270 and the second surface 36B of the lower surface 42B of the holder 270.

For example, the distance (hereinafter, referred to as a "first distance") between the lower surface (or the end) of the OIS coil unit 230-1 and the upper surface of the OIS position sensor 240a may be in a range of 0.01 mm to 0.2 mm. Specifically, the first distance may be in a range of 0.02 mm to 0.1 mm. More specifically, the first distance may be in a range of 0.02 mm to 0.05 mm.

If the first distance is greater than 0.2 mm, the distance between the OIS position sensor 240a and the magnet 23A may excessively increase, and the output of the OIS position sensor 240a may be lowered, thereby lowering the sensitivity. If the first distance is less than 0.01 mm, the extent to which the output of the OIS position sensor 240a is influenced by the magnetic field of the OIS coil unit 230-1 may increase as the first distance increases. However, the extent to which the output of the OIS position sensor 240a is influenced by the magnetic field of the OIS coil unit 230-1 may be smaller than that in the comparative example shown in FIG. 26.

In another embodiment, the lower surface (or the lower end) of the OIS coil unit 230-1 and the upper surface of the OIS position sensor 240a may be flush with each other, and the first distance may be zero.

In comparison with the comparative example, the OIS position sensor 240a may be spaced apart from the OIS coil unit 230-1 by a greater distance, and may not overlap the OIS coil unit 230-1 in a direction perpendicular to the optical axis. Consequently, according to the embodiment of the present invention, it is possible to suppress or reduce the influence on the output of the OIS position sensor by the magnetic field of the OIS coil unit 40, and it is possible to ensure the accuracy and reliability of OIS feedback operation.

Figure 27:
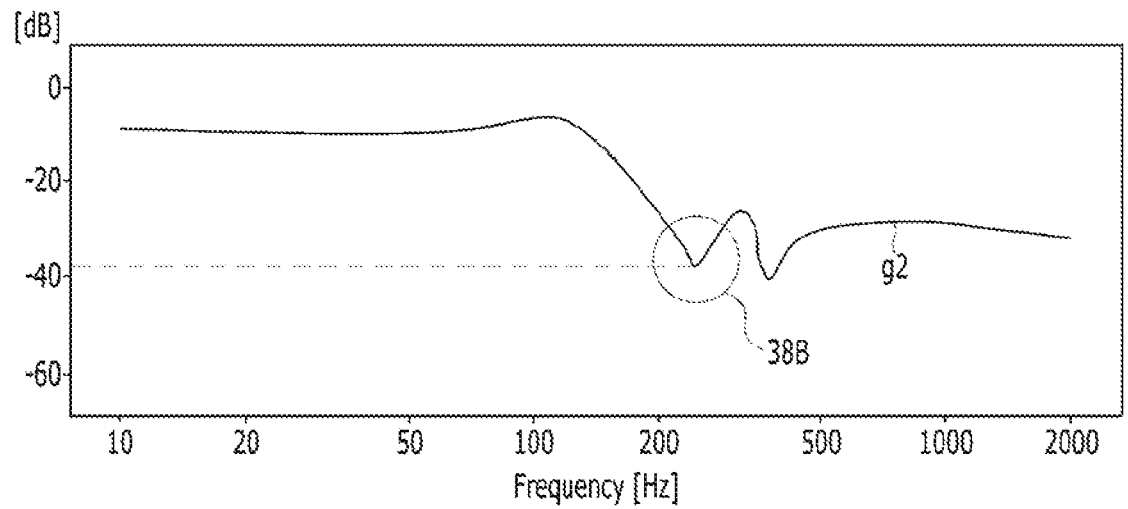
FIG. 27 is a view illustrating frequency response characteristics with respect to a drive signal input to the OIS coil unit and the output of the OIS position sensor according to the embodiment shown in FIG. 24.

FIG. 27 illustrates frequency response characteristics with respect to a drive signal input to the OIS coil unit 230-1 and the output of the OIS position sensor 240a according to the embodiment shown in FIG. 24. In FIG. 27, the x-axis indicates frequency, and the y-axis indicates gain. g2 indicates frequency response characteristic with gain. Hereinafter, the frequency response in FIG. 26 is referred to as "CASE1", and the frequency response characteristic in FIG. 27 is referred to as "CASE2".

In CASE2, the phenomenon 38A, which had occurred in CASE1, is diminished or does not occur (38B).

In CASE1, owing to the influence by the magnetic field of the OIS coil unit 40, it is found that the gain in a range of 200 Hz to 300 Hz is abnormally lowered (by about −47 dB). Hence, the reliability of OIS feedback operation may be deteriorated.

In contrast, because the influence of the magnetic field of the OIS coil unit 230-1 is diminished or attenuated, it is found that the gain in a range of 200 Hz to 300 Hz is increased more than the gain in CASE1 (about −37 dB). In other words, because the influence of the magnetic field of the OIS coil unit 230-1 is diminished or attenuated, it is possible to obtain normal frequency response characteristics.

According to the embodiment of the present invention, because the influence on the output of the OIS position sensor 240a by the magnetic field of the OIS coil unit 230-1 is reduced, it is possible to improve the recognition rate of the OIS position sensor 240a with respect to the magnetic field of the magnet 23A. Consequently, it is possible to prevent occurrence of the phenomenon 38A shown in FIG. 26, and it is possible to perform an OIS feedback operation with high accuracy and reliability. As a result, it is possible to ensure the reliability of handshake correction by the camera module.

The description of FIGS. 23 to 27 may be applied to the coil units 230-2 to 230-4, the OIS position sensors 240b and 240c, and the magnets 23B to 23D with or without modification.

Figure 28:
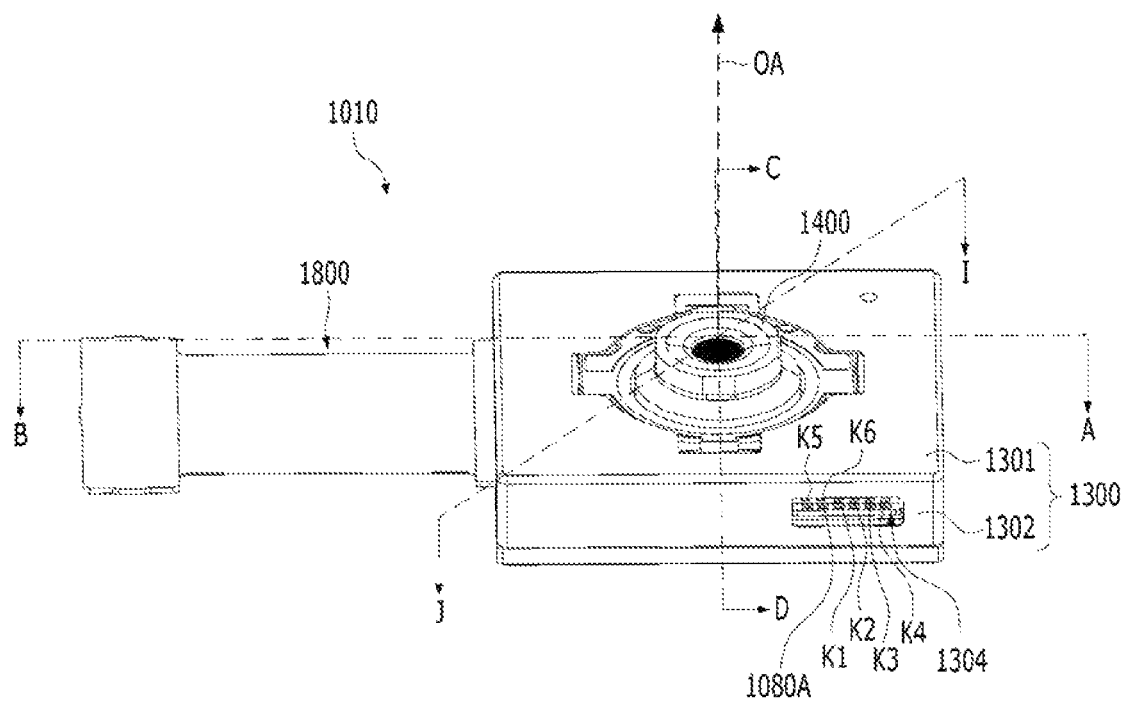
FIG. 28 is a perspective view of a camera module according to an embodiment.
Figure 29:
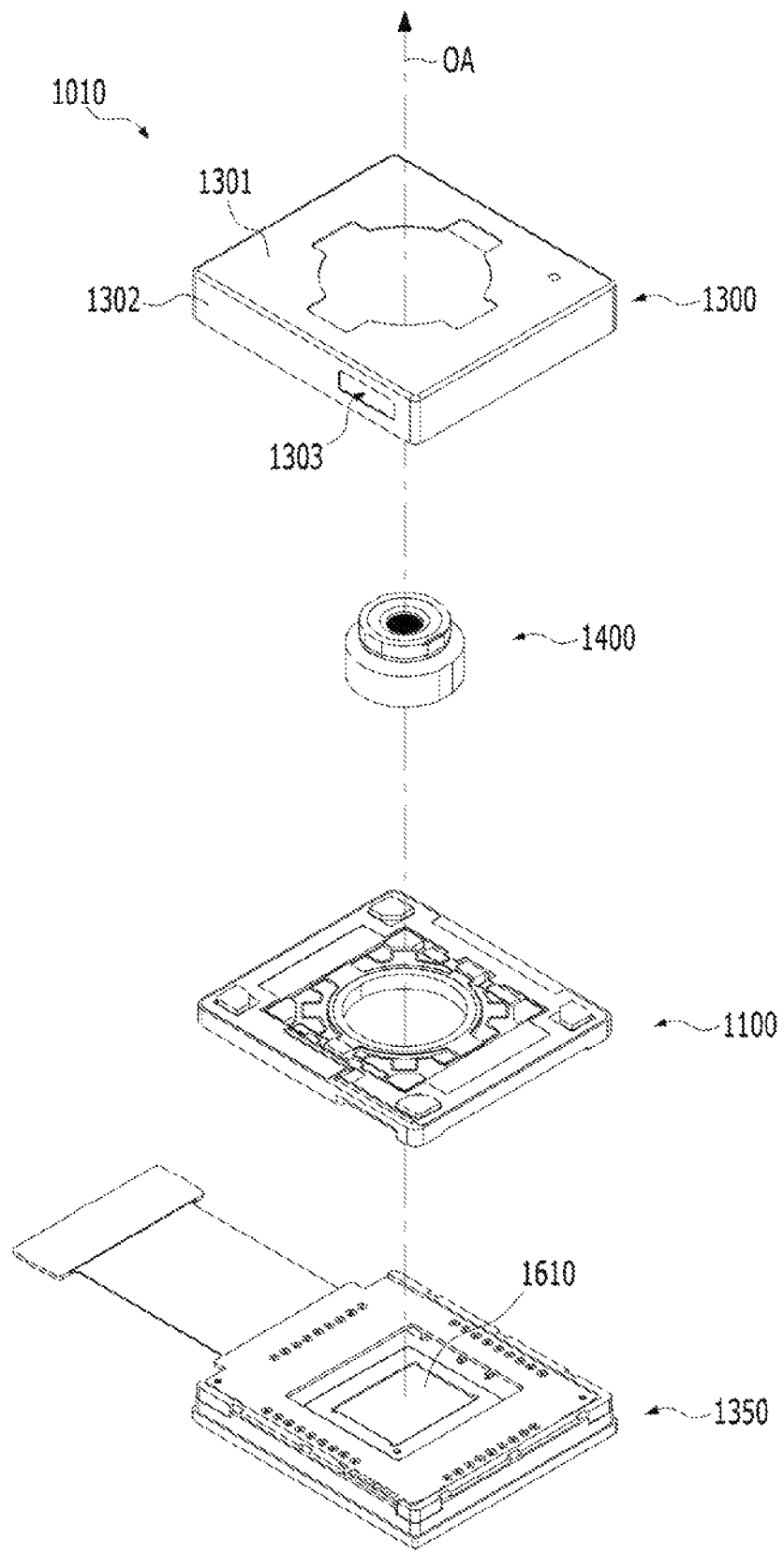
FIG. 29 is an exploded perspective view of the camera module shown in FIG. 28.
Figure 30:
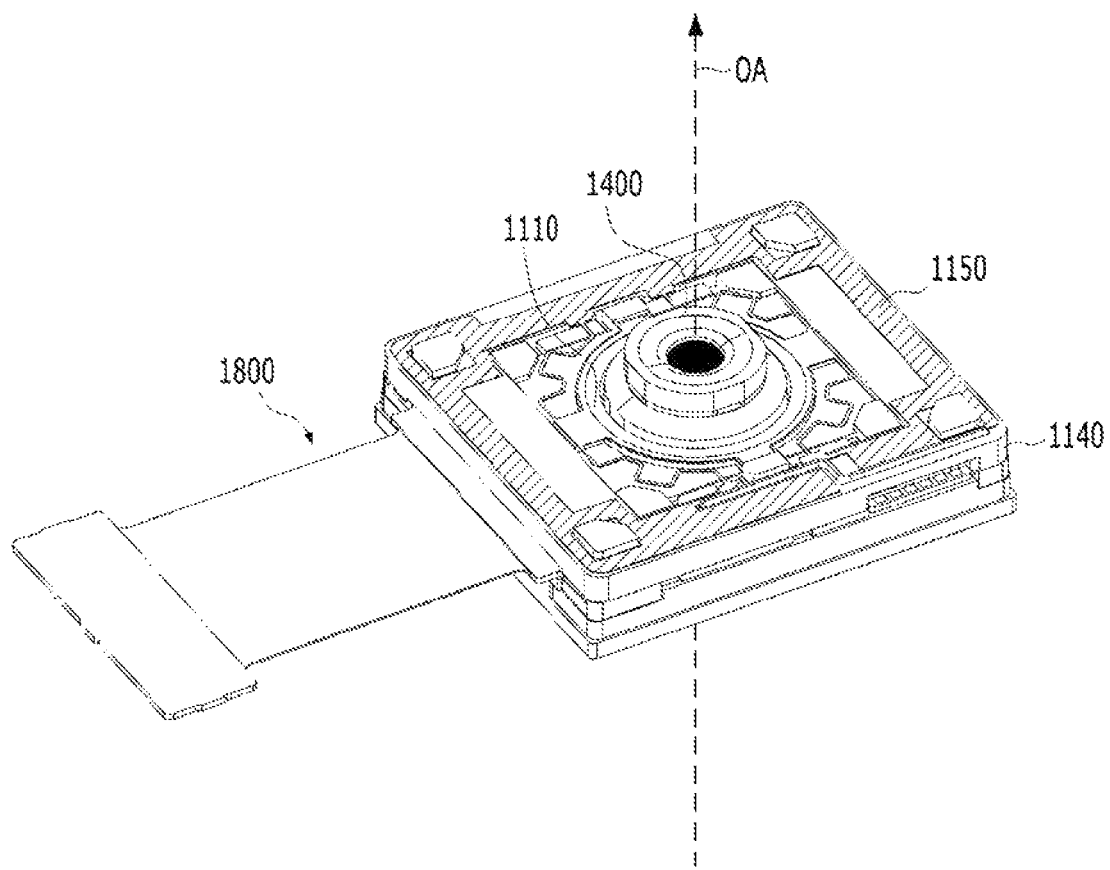
FIG. 30 is an assembled perspective view of the camera module shown in FIG. 28, from which a cover member is removed.
Figure 31:
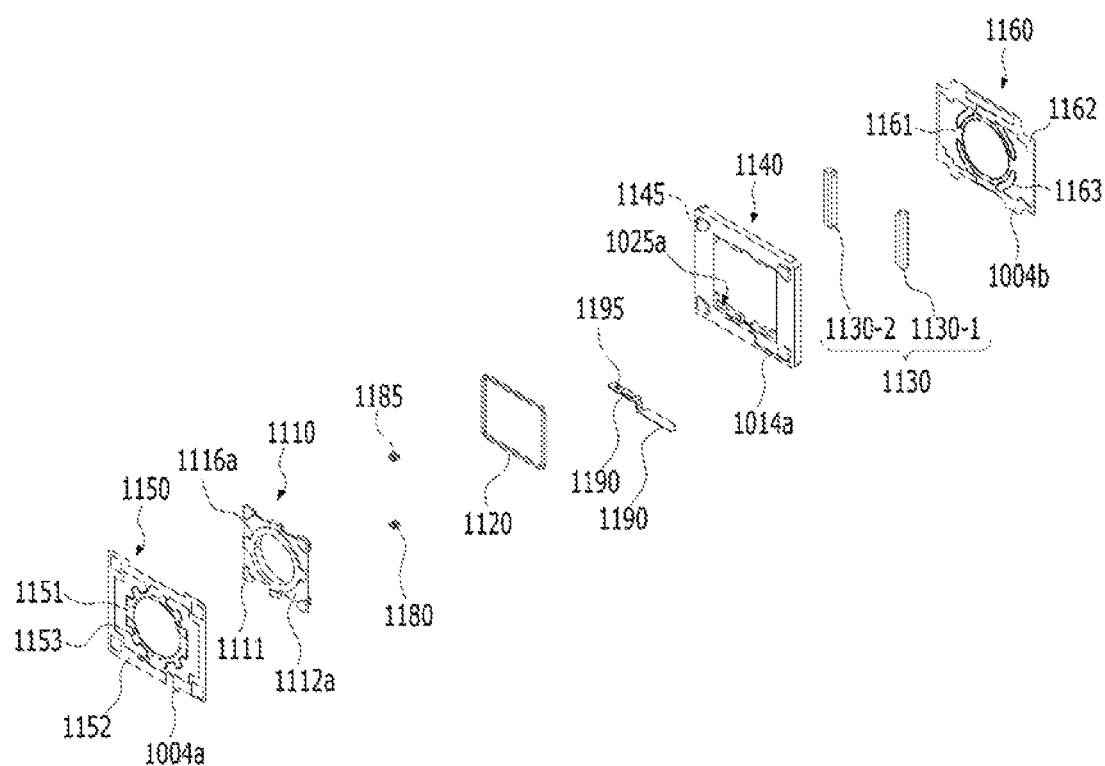
FIG. 31 is an exploded perspective view of the AF operation unit shown in FIG. 29.
Figure 32:
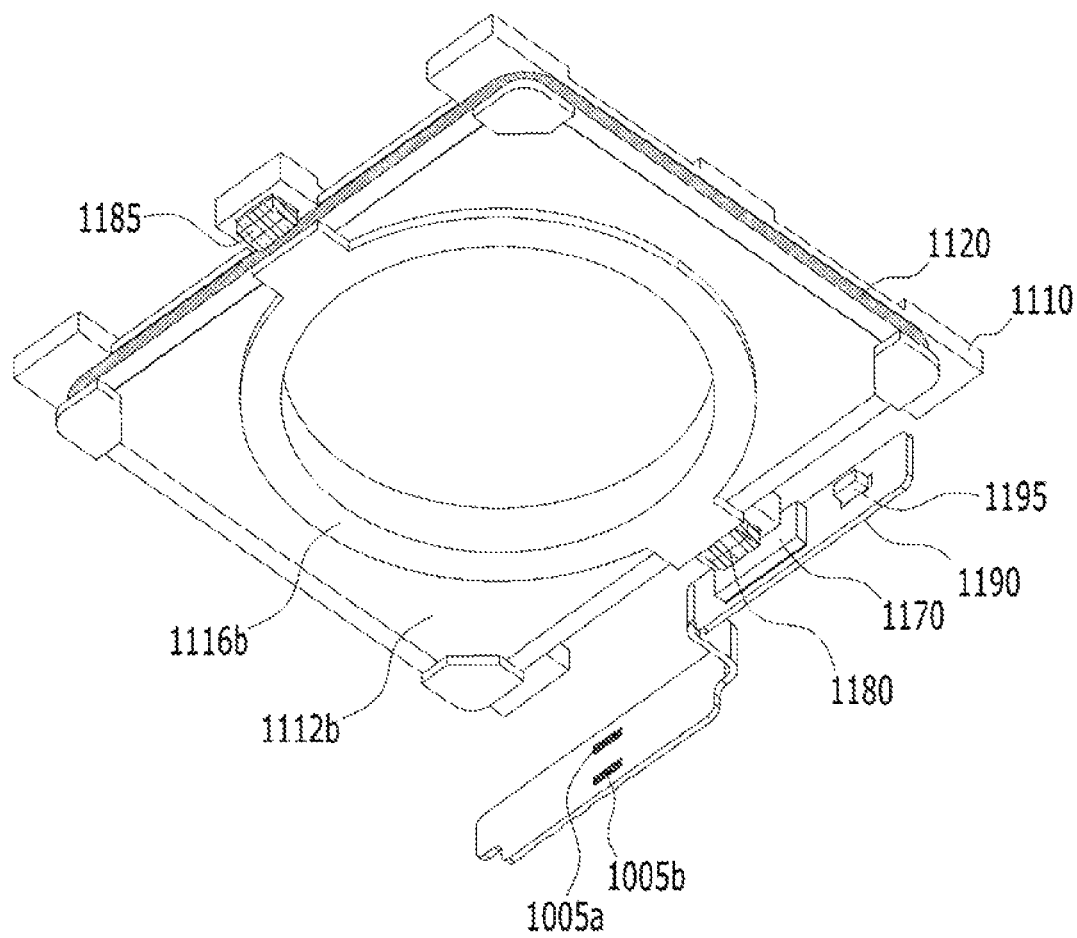
FIG. 32 is a perspective view of the bobbin, the sensing magnet, the balancing magnet, the first coil, the circuit board, the first position sensor, and the capacitor shown in FIG. 31.
Figure 33:
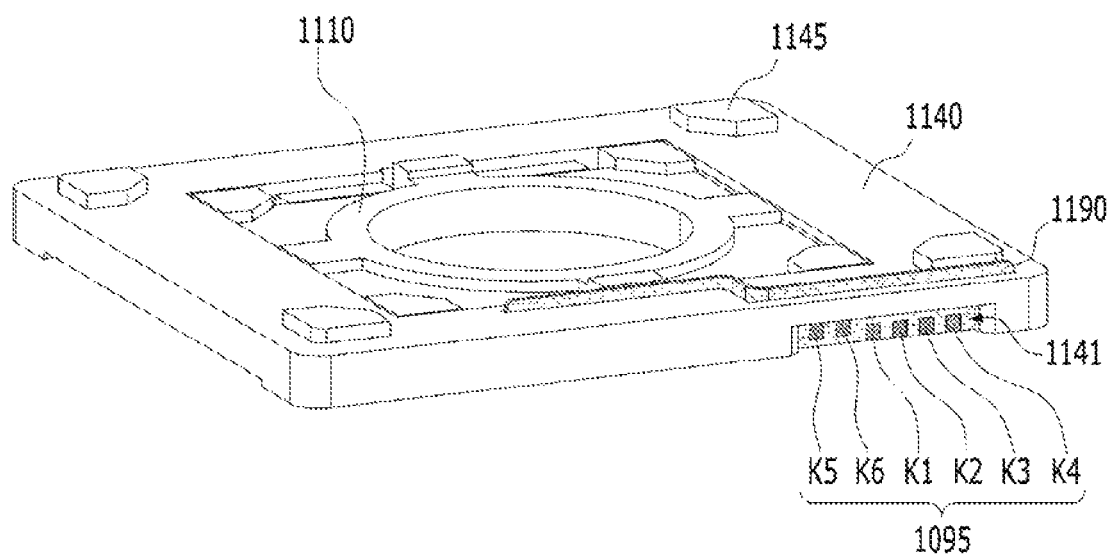
FIG. 33 is a perspective view of the bobbin, the housing, and the circuit board.
Figure 34:
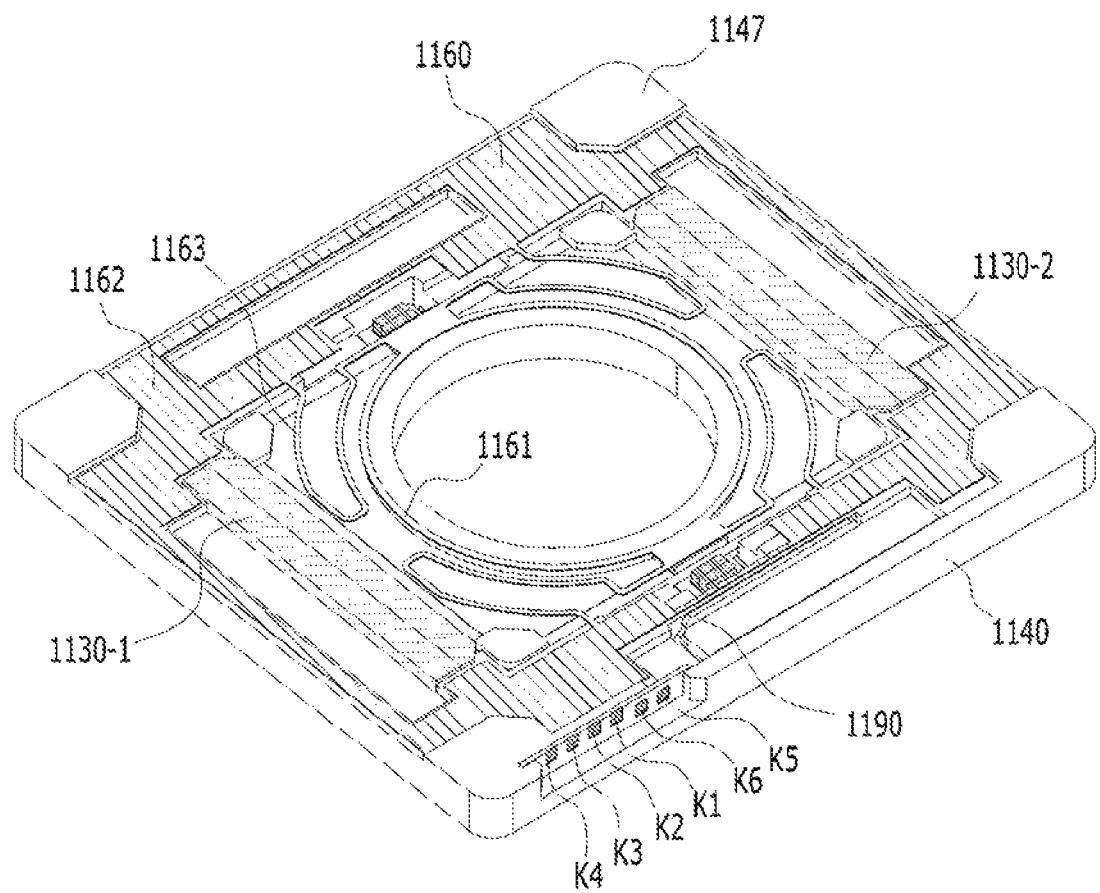
FIG. 34 is a bottom perspective view of the housing, the bobbin, the lower elastic member, the magnet, and the circuit board.

FIG. 28 is a perspective view of a camera module 1010 according to an embodiment. FIG. 29 is an exploded perspective view of the camera module 1010 shown in FIG. 28. FIG. 30 is an assembled perspective view of the camera module shown in FIG. 28, from which a cover member 1300 is removed. FIG. 31 is an exploded perspective view of the AF operation unit 1100 shown in FIG. 29. FIG. 32 is a perspective view of the bobbin 1110, the sensing magnet 1180, the balancing magnet 1185, the first coil 1120, the circuit board 1190, the first position sensor 1170, and the capacitor 1195 shown in FIG. 31. FIG. 33 is a perspective view of the bobbin 1110, the housing 1140, and the circuit board 1190. FIG. 34 is a bottom perspective view of the housing 1140, the bobbin 1110, the lower elastic member 1160, the magnet 1130, and the circuit board 1190.

Referring to FIGS. 28 to 34, the camera module 1010 may include the AF operation unit 1100 and an image sensor unit 1350.

The camera module 1010 may include at least one of the cover member 1300, a lens module 1400, and a base 1210. The cover member 1300 and the base 1210 may define the case.

The AF operation unit 1100 may be coupled to the lens module 1400 so as to move the lens module 1400 in the direction of the optical axis OA or in a direction parallel to the optical axis OA, and may perform an autofocusing function of the camera module 1010.

The image sensor unit 1350 may include an image sensor 1810. The image sensor unit 1350 may move the image sensor 1810 in a direction perpendicular to the optical axis and may tilt or rotate the image sensor 1810 about the optical axis. It is possible to perform handshake correction of the camera module 1010 using the image sensor unit 1350.

For example, the image sensor 1810 may be rotated about at least one of the x-axis, the y-axis and the z-axis.

For example, the image sensor 1810 may be moved in at least one direction among the x-axis direction, the y-axis direction and the z-axis direction.

For example, the image sensor 1810 may be tilted with respect to at least one of the x-axis, the y-axis and the z-axis.

The AF operation unit 1100 may be alternatively referred to as a "lens moving unit" or a "lens moving apparatus". Alternatively, the AF operation unit 1100 may be alternatively referred to as a "first actuator" or an "AF driving unit"

For OIS (Optical Image Stabilization) operation, the image sensor 1810 rather than the lens module 1400 may be moved in a direction perpendicular to the optical axis by the image sensor unit 1350.

The image sensor unit 1350 may be alternatively referred to as an "image-sensor moving unit", an "image-sensor shifting unit", a "sensor moving unit" or a "sensor shift unit". Alternatively, the image sensor unit 1350 may be alternatively referred to as a "second actuator" or an "OIS drive unit".

Referring to FIG. 31, the AF operation unit 1100 may include the bobbin 1110, the first coil 1120, the magnet 1130, and the housing 1140.

The AF operation unit 1100 may further include an upper elastic member 1150 and a lower elastic member 1160.

For AF feedback operation, the AF operation unit 1100 may include the first position sensor 1170, the circuit board 1190 and the sensing magnet 1180. The AF operation unit 1100 may further include at least one of the balancing magnet 1185 and the capacitor 1195.

The bobbin 1110 may be disposed in the housing 1140, and may be moved in the direction of the optical axis OA or in the first direction (for example, in the z-axis direction) by the electromagnetic interaction between the first coil 1120 and the magnet 1130.

The bobbin 1110 may have a bore to which a lens module 1400 is coupled or mounted. For example, the bore in the bobbin 1110 may be a through hole formed through the bobbin 1110 in the optical-axis direction, and may have a circular shape, an elliptical shape, or a polygonal shape without being limited thereto.

The lens module 1400 may include at least one lens and/or a lens barrel.

For example, the lens module 1400 may include one or more lenses and a lens barrel receiving the one or more lenses. However, the construction of the lens module is not limited to the lens barrel. The lens module may have any construction, as long as the construction is capable of supporting one or more lenses.

For example, the lens module 1400 may be, for example, threadedly engaged with the bobbin 1110. Alternatively, the lens module 1400 may be coupled to the bobbin 1110 via an adhesive (not shown). The light that has passed through the lens module 1400 may be radiated to the image sensor 1810 through a filter 1610.

The bobbin 1110 may include a projection 1111 formed on the outer surface thereof.

For example, although the projection 1111 may project in a direction that is parallel to a line perpendicular to the optical axis OA, the disclosure is not limited thereto.

The projection 1111 of the bobbin 1110 may correspond to a groove portion 1025a in the housing 1140, and may be fitted or disposed in the groove portion 1025a in the housing 1140 so as to suppress or prevent the bobbin 1110 from being rotated about the optical axis beyond a predetermined range. Furthermore, the projection 1111 may serve as a stopper configured to cause the bobbin 1110 to move only within a predetermined range in the optical-axis direction (for example, in a direction toward the lower elastic member 1160 from the upper elastic member 1150) in response to an external impact or the like.

The bobbin 1110 may have a first escape groove 1112a formed in the upper surface thereof so as to avoid spatial interference with a first connector 1153 of the upper elastic member 1150. Furthermore, the bobbin 1110 may have a second escape groove 1112b formed in the lower surface thereof so as to avoid spatial interference with a second frame connector 1163 of the lower elastic member 1160.

The bobbin 1110 may include a first coupler 1116a configured to be coupled or fixed to the upper elastic member 1150. For example, although the first coupler 1116a of the bobbin 1110 may be configured to have a flat shape, the disclosure is not limited thereto. In another embodiment, the first coupler 1116a may take the form of a protrusion or a groove.

The bobbin 1110 may include a second coupler 1116b configured to be coupled and fixed to the lower elastic member 1160. For example, although the second coupler 1116b may be configured to have a flat shape, the disclosure is not limited thereto. In another embodiment, the second coupler 1116b may take the form of a protrusion or a groove.

Referring to FIG. 32, the outer surface of the bobbin 1110 may have formed therein a groove in which the first coil 1120 is seated, fitted or disposed. The groove in the bobbin 1110 may have a shape corresponding to the shape of the first coil 1120, that is, a closed curve shape (for example, a ring shape).

The bobbin 1110 may be provided therein with a first seating groove in which the sensing magnet 1180 is seated, fitted, fixed, or disposed. Furthermore, the outer surface of the bobbin 1110 may be provided with a second seating groove in which the balancing magnet 1185 is seated, fitted, fixed or disposed. For example, the first and second seating grooves in the bobbin 1110 may be formed in outer surfaces of the bobbin 1110 that face each other.

The first coil 1120 may be disposed at or coupled to the bobbin 1110. For example, the first coil 1120 may be disposed at the outer surface of the bobbin 1110.

For example, although the first coil 1120 may surround the outer surface of the bobbin 1110 in a rotational direction about the optical axis OA, the disclosure is not limited thereto.

Although the first coil 1120 may be directly wound around the outer surface of the bobbin 1110, the disclosure is not limited thereto. In another embodiment, the first coil 1120 may be embodied as a coil ring or an angular ring, and may be provided around the bobbin 1110.

Power or drive signals may be supplied to the first coil 1120.

The power or drive signal supplied to the first coil 1120 may be a DC signal, an AC signal, or a signal containing both DC and AC components, and may be of a voltage type or a current type.

When a drive signal (for example, a drive current) is supplied to the first coil 1120, an electromagnetic force may be created by the electromagnetic interaction between the first coil 1120 and the magnet 1130, and the bobbin 1110 may be moved in the optical-axis direction OA by the created electromagnetic force.

The bobbin 1110 may be moved upwards or downwards from the initial position of the AF operation unit, which is referred to as bidirectional driving of the AF operation unit. Alternatively, the bobbin 1110 may be moved upwards (or forwards) from the initial position of the AF operation unit, which is referred to as unidirectional driving of the AF operation unit.

At the initial position of the AF operation unit, the first coil 1120 may correspond to or overlap the magnet 1130 disposed at the housing 1140 in a direction parallel to a line that is perpendicular to the optical axis OA and extends along the optical axis.

For example, the AF operation unit may include the bobbin 1110 and the components (for example, the first coil 1120, the sensing magnet 1180, and the balancing magnet 1185) coupled to the bobbin 1110. The AF operation unit may further include the lens module 1400.

The initial position of the AF operation unit may be the original position of the AF operation unit in the state in which no electric power is applied to the coil 120 or the position at which the AF operation unit is located as the result of the upper and lower elastic members 150 and 160 being elastically deformed due only to the weight of the AF operation unit.

In addition, the initial position of the bobbin 110 may be the position at which the AF operation unit is located when gravity acts in the direction from the bobbin 110 to the base 210 or when gravity acts in the direction from the base 210 to the bobbin 110.

The sensing magnet 1180 may provide a magnetic field, which is detected by the first position sensor 1170, and the balancing magnet 1185 may serve to cancel out the influence of the magnetic field of the sensing magnet 1180 and to establish weight equilibrium with respect to the sensing magnet 1180.

The sensing magnet 1180 may be alternatively referred to as a "sensor magnet".

The sensing magnet 1180 may be disposed at the bobbin 1110 or may be coupled to the bobbin 1110.

The sensing magnet 1180 may be disposed so as to face the first position sensor 1170.

The balancing magnet 1185 may be disposed at the bobbin 1110 or may be coupled to the bobbin 1110. For example, the balancing magnet 1185 may be disposed opposite the sensing magnet 1180.

Although each of the sensing magnet and the balancing magnet 1180 and 1185 may be a monopolar magnetized magnet having one N pole and one S pole, the disclosure is not limited thereto. In another embodiment, each of the sensing magnet and the balancing magnet 1180 and 1185 may be a bipolar magnetized magnet, which has two N poles and two S poles, or a tetrapolar magnetized magnet.

The sensing magnet 1180 may be moved together with the bobbin 1110 in the optical-axis direction, and the first position sensor 1170 may detect the intensity or magnetic force of the magnetic field of the sensing magnet 1180, which is moved in the optical-axis direction, and may output an output signal corresponding to the result of the detection.

For example, in accordance with displacement of the bobbin 1110 in the optical-axis direction, the intensity or magnetic force of the magnetic field detected by the first position sensor 1170 may vary. Consequently, the first position sensor 1170 may output an output signal proportional to the detected intensity of the magnetic field, and the displacement of the bobbin 1110 in the optical-axis direction may be detected using the output signal from the first position sensor 1170.

The housing 1140 accommodates therein the bobbin 1110, and supports the magnet 1130, the first position sensor 1170, and the circuit board 1190.

Referring to FIGS. 31, 33 and 34, the housing 1140 may be configured to have a hollow column overall. For example, the housing 1140 may have a polygonal (for example, a rectangular or octagonal) or circular bore, and the bore in the housing 1140 may be a through hole, which is formed through the housing 1140 in the optical-axis direction.

The housing 1140 may include side portions, which correspond to or face the side plate 1302 of the cover member 1300, and corners, which correspond to or face the corners of the cover member 1300.

In order to prevent a direct collision with the inner surface of the upper plate 1301 of the cover member 1300, the housing 1140 may include a stopper 1145 provided at the upper portion, the upper surface, or the upper end thereof.

In order to prevent the lower surface of the housing 1140 from colliding with the circuit board 1800 of the image sensor 1350, the housing 1140 may further include a stopper 1147 projecting from the lower surface thereof. Here, the stopper 1147 may be alternatively referred to as a "boss" or a "protrusion".

Referring to FIG. 31, the housing 1140 may have a mounting groove (or a seating groove) 1014a configured to receive the circuit board 1190 therein. The mounting groove 1014a may have a shape corresponding to the shape of the circuit board 1190.

Referring to FIG. 33, the housing 1140 may have an opening 141 through which terminals K1 to K6 of a terminal member 1195 of the circuit board 1190 are exposed. The opening 1141 may be formed in the side portion of the housing 1140.

The upper portion, the upper end, or the upper surface of the housing 1140 may be provided with at least one first coupler, which is to be coupled to a first outer frame 1152 of the upper elastic member 1150.

The lower portion, the lower end, or the lower surface of the housing 1140 may be provided with a second coupler, which is to be coupled and fixed to a second outer frame 1162 of the lower elastic member 1160. For example, each of the first and second couplers of the housing 1140 may have the shape of a protrusion, a groove, or a flat surface.

The magnet 1130 may be disposed at the housing 1140. For example, the magnet 1130 may be disposed at the side portion of the housing 1140. The magnet 1130 may be an AF operation magnet for AF operation.

For example, although the magnet 1130 may include first and second magnets, which are disposed at two side portions which are positioned opposite each other, the disclosure is not limited thereto. In another embodiment, the magnet 1130 may be disposed at the corner of the housing 1140.

The magnet 1130 may include two or more magnets.

At the initial position of the AF operation unit, the first magnet 1130 may be disposed at the housing 1140 so as to partially overlap the first coil 1120 in a direction parallel to a line which is perpendicular to the optical axis OA and extends through the optical axis OA.

Although each of the first and second magnets 1130-1 and 1130-2 may be a monopolar magnetized magnet, the disclosure is not limited thereto. In another embodiment, each of the first and second magnets 1130-1 and 1130-2 may be a bipolar magnetized magnet, which has two N poles and two S poles, or a tetrapolar magnetized magnet.

The circuit board 1190 may be disposed at the housing 1140, and the first position sensor 1170 may be disposed at or mounted to the circuit board 1190. For example, the circuit board 1190 may be disposed in the mounting groove 1014a in the housing 1140, and the terminals of the circuit board 1190 may be exposed to the outside of the housing 1140 through the opening 1141 in the housing 1140.

The circuit board 1190 may include the terminal member (or terminal unit) 1095 including the plurality of terminals K1 to K6, which are to be conductively connected to external terminals or external devices, and the plurality of terminals K1 to K6 may be conductively connected to the first position sensor 1170.

The first position sensor 1170 may be disposed on a first surface of the circuit board 1190, and the plurality of terminals K1 to K6 may be disposed on a second surface of the circuit board 1190. Here, the second surface of the circuit board 1190 may be the surface opposite the first surface of the circuit board 1190. For example, the first surface of the circuit board 1190 may be the surface of the circuit board 1190 that faces the bobbin 1110 or the sensing magnet 1180.

For example, the circuit board 1190 may be embodied as a printed circuit board or an FPCB.

The circuit board 1190 may include a circuit pattern or a wire (not shown) for conductively connecting the first to sixth terminals K1 to K6 to the first position sensor 1170.

The first position sensor 1170 may detect the magnetic field or the intensity of the magnetic field of the sensing magnet 1180 mounted on the bobbin 1110 during movement of the bobbin 1110, and may output an output signal corresponding to the result of the detection.

The first position sensor 1170 may be embodied as only one Hall sensor. The first position sensor 1170 may include two input terminals, to which drive signals or power are supplied, and two output terminals, through which a sensing voltage (or an output voltage) is output.

For example, drive signals may be supplied to the first position sensor 1170 through the first and second terminals K1 and K2 of the circuit board 1190, and the output of the first position sensor 1170 may be output to the outside through the third and fourth terminals K3 and K4.

The fifth and sixth terminals K5 and K6 of the circuit board 1190 may be conductively connected to at least one of the upper elastic member 1150 and the lower elastic member 1160 so as to supply drive signals to the first coil 1120.

In another embodiment, the first position sensor 1170 may be embodied as a driver IC including a Hall sensor. For example, the first position sensor 1170 may include a Hall sensor and a driver. Here, the first position sensor 1170 may include the first to fourth terminals, through which data is transmitted to and received from the outside through data communication using a protocol such as, for example, I2C communication, and the fifth and sixth terminals, through which drive signals are directly supplied to the first coil 1120. The first to fourth terminals of the first position sensor 1170 may be conductively connected to the first to fourth terminals K1 to K4 of the circuit board 1190. The fifth and sixth terminals of the first position sensor 1170 may be conductively connected to the first coil 1120 through at least one of the upper elastic member 1150 and the lower elastic member 1160 so as to supply drive signals to the first coil 1120.

The capacitor 1195 may be disposed or mounted on the first surface of the circuit board 1190. The capacitor 1195 may be configured to have a chip shape. Here, the chip may include a first terminal, which corresponds to one end of the capacitor 1195, and a second terminal, which corresponds to the other end of the capacitor 1195. The capacitor 1195 may be alternatively referred to as a "capacitive element" or "condenser".

The capacitor 1195 may be conductively connected in parallel to first and second terminals K1 and K2 of the circuit board 1190 through which power (or a drive signal) is supplied to the position sensor 1170 from the outside. Alternatively, the capacitor 1195 may be conductively connected in parallel to the terminals of the first position sensor 1170, which is conductively connected to the first and second terminals K1 and K2 of the circuit board 1190.

Since the capacitor 1195 is conductively connected in parallel to the first and second terminals K1 and K2 of the circuit board 1190, the capacitor 1195 is capable of serving as a smoothing circuit for eliminating ripple components included in the power signals GND and VDD, which are supplied to the first position sensor 1170 from the outside, and is thus capable of supplying stable and consistent power signals to the first position sensor 1170.

The upper elastic member 1150 may be coupled to the upper portion, the upper end or the upper surface of the bobbin 1110 and the upper portion, the upper end or the upper surface of the housing 1140, and the lower elastic member 1160 may be coupled to the lower portion, the lower end or the lower surface of the bobbin 1110 or the upper portion, the upper end or the upper surface of the housing 1140.

The upper elastic member 1150 and the lower elastic member 1160 may elastically support the bobbin 1110 with respect to the housing 1140.

Although each of the upper elastic member 1150 and the lower elastic member 1160 is embodied as a single unit or a single structure in FIG. 31, the disclosure is not limited thereto.

In another embodiment, at least one of the upper elastic member and the lower elastic member may include a plurality of elastic units or springs, which are conductively isolated or spaced apart from each other.

The upper elastic member 1150 may further include a first inner frame 1151 coupled or fixed to the upper portion, the upper surface or the upper end of the bobbin 1110, a first outer frame 1152 coupled or fixed to the upper portion, the upper surface or the upper end of the housing 1140, and a first frame connector 1153 connecting the first inner frame 1151 to the first outer frame 1152.

The lower elastic member 1160 may include a second inner frame 1161 coupled or fixed to the lower portion, the lower surface or the lower end of the bobbin 1110, a second outer frame 1162 coupled or fixed to the lower portion, the lower surface or the lower end of the housing 1140, and a second frame connector 1163 connecting the second inner frame 1161 to the second outer frame 1162.

Each of the first frame connector 1153 and the second frame connector 1163 of the upper elastic member 150 and the lower elastic member 160 may be bent or curved (or may be formed into a curved line) at least once so as to define a predetermined pattern.

Each of the upper elastic member 1150 and the lower elastic member 1160 may be made of a conductive material.

Referring to FIGS. 31 and 32, the first surface of the circuit board 1190 may be provided with two pads 1005a and 1005b, which are connectively connected to the fifth and sixth terminals K5 and K6 of the circuit board 1190. The upper elastic member 1150 may include a first bonding portion 1004a, which is coupled or conductively connected to the first pad 1005a, and the lower elastic member 1160 may include a second bonding portion 1004b, which is conductively connected to the second pad 1005b. The first coil 1120 may be coupled at one end thereof to the upper elastic member 1150 and at the other end to the lower elastic member 1160.

In another embodiment, the upper elastic member 1150 or the lower elastic member 1160 may include two elastic members, and each of the two elastic members may be coupled or conductively connected to a corresponding one of the first and second pads of the circuit board 1190. The first coil 1120 may be conductively connected to the two elastic members.

Figure 35:
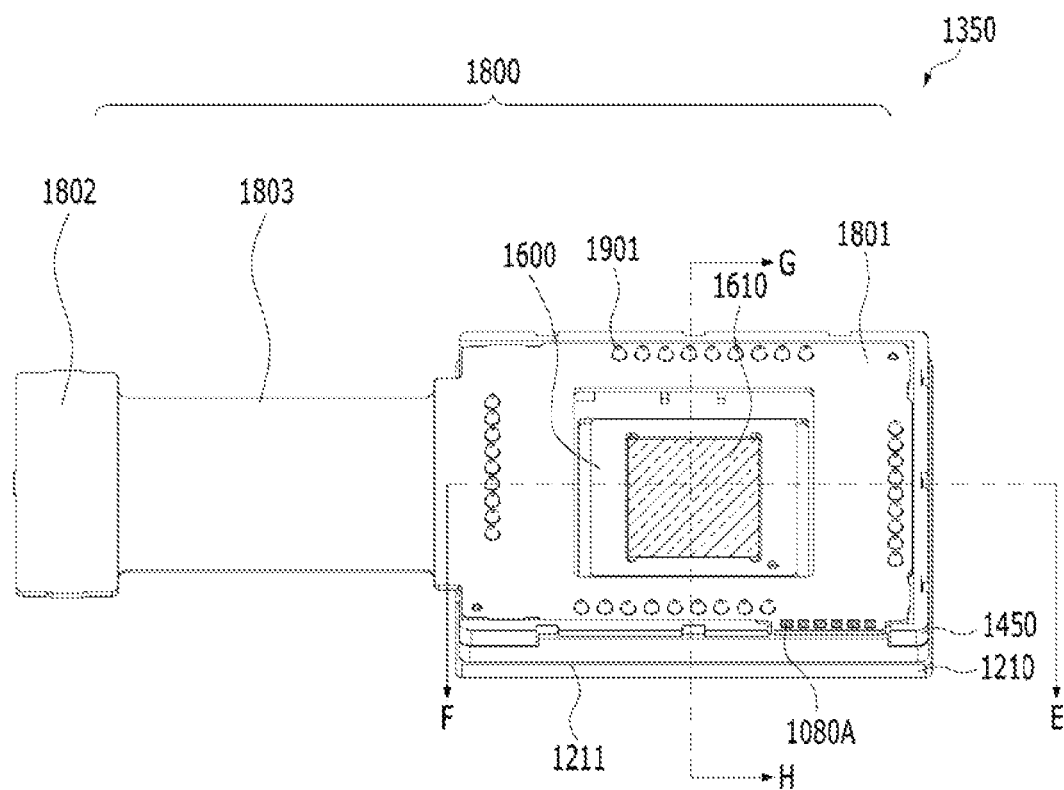
FIG. 35 is a plan view of the image sensor unit shown in FIG. 29.
Figure 36:
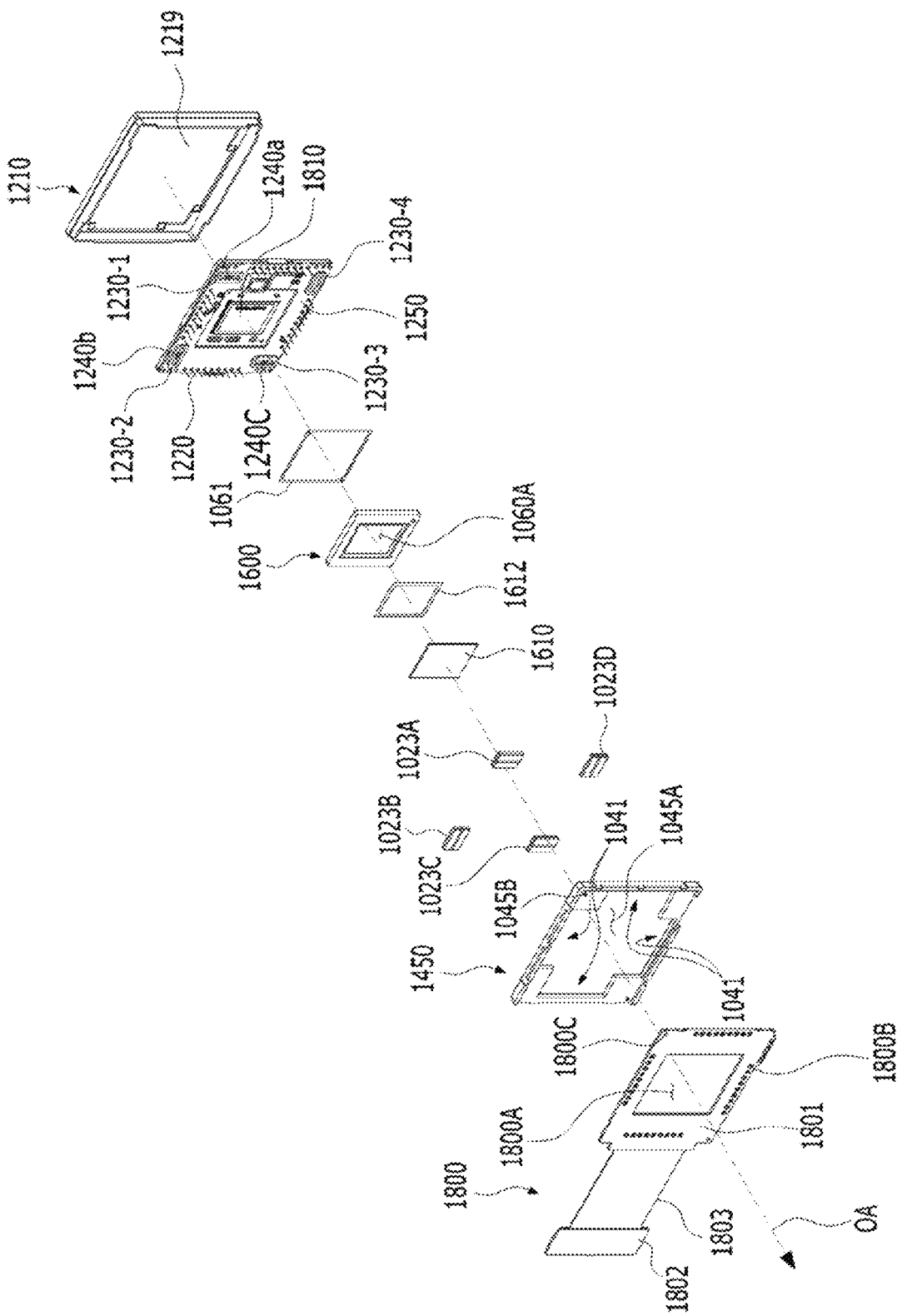
FIG. 36 is an exploded perspective view of the image sensor unit shown in FIG. 35.
Figure 37:
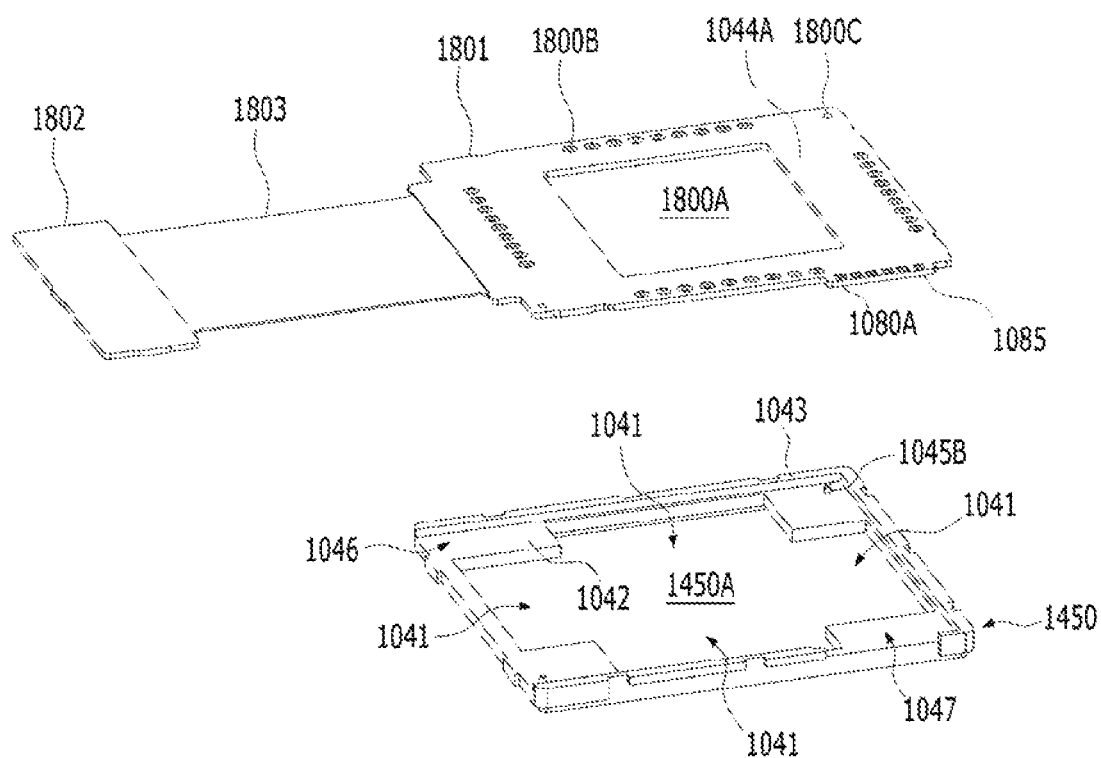
FIG. 37 is a perspective view of the first circuit board and the housing.
Figure 38:
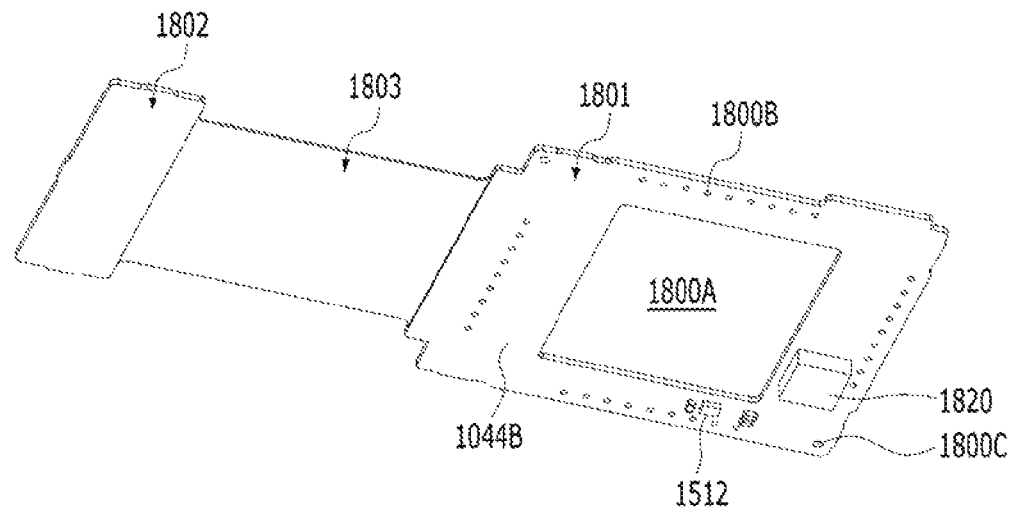
FIG. 38 is a perspective view of the first circuit board, the housing, and the magnet shown in FIG. 36.
Figure 38:
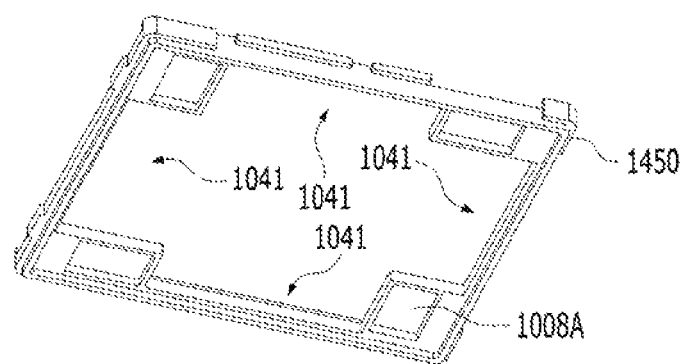
Figure 38:
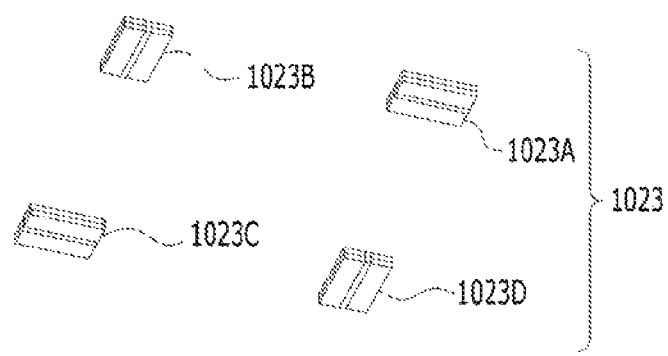
Figure 39A:
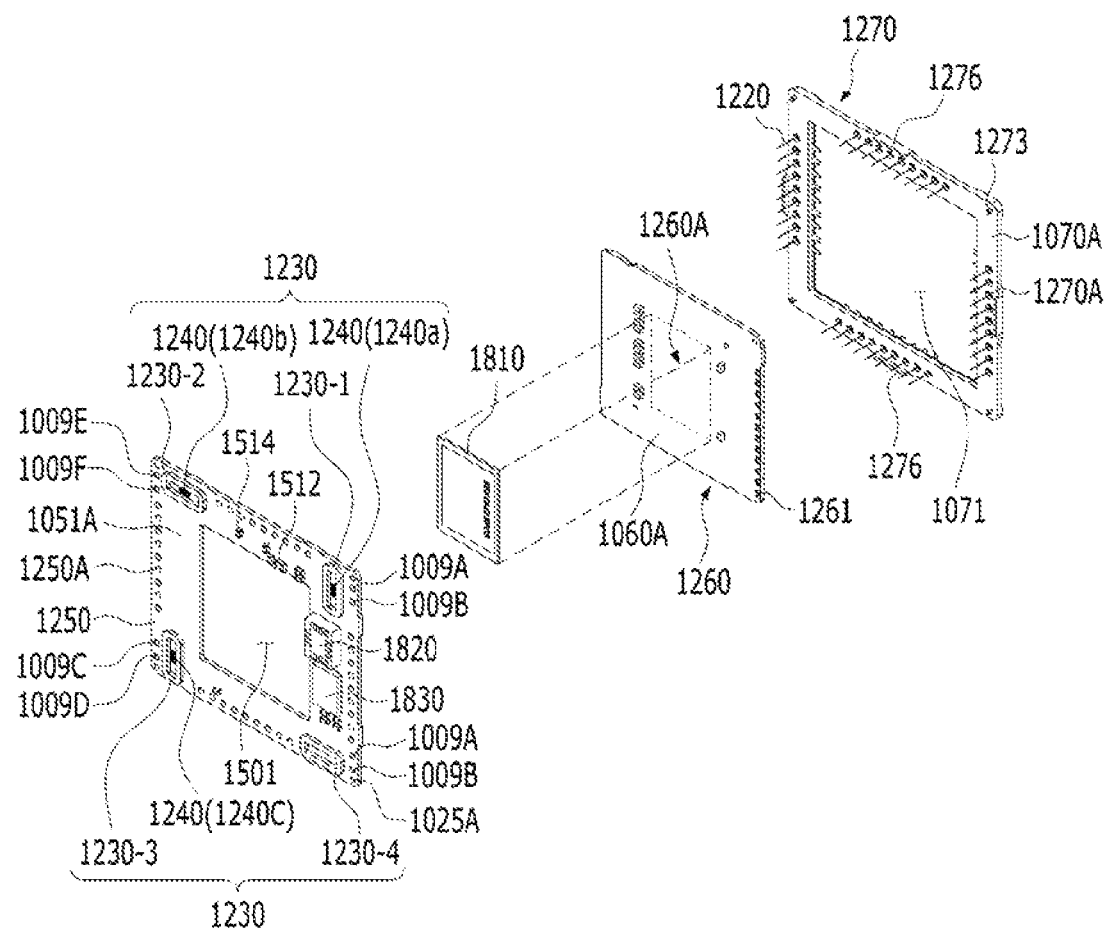
FIG. 39A is an exploded perspective view of the second circuit board, the second coil, the second position sensor, the image sensor, the support member, and the holder.
Figure 39B:
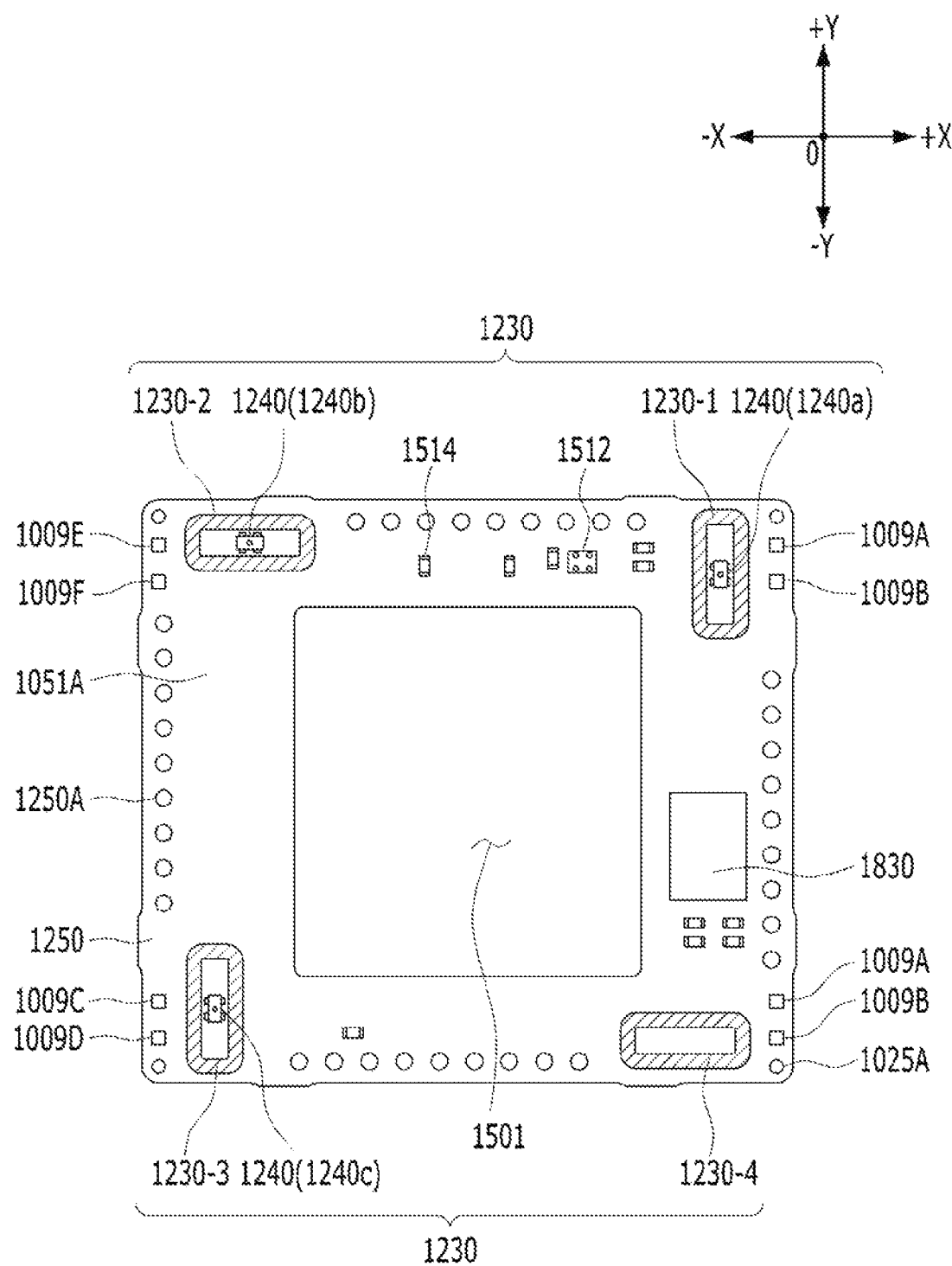
FIG. 39B is a plan view of the third circuit board, the second coil, and the second position sensor shown in FIG. 39A.
Figure 40:
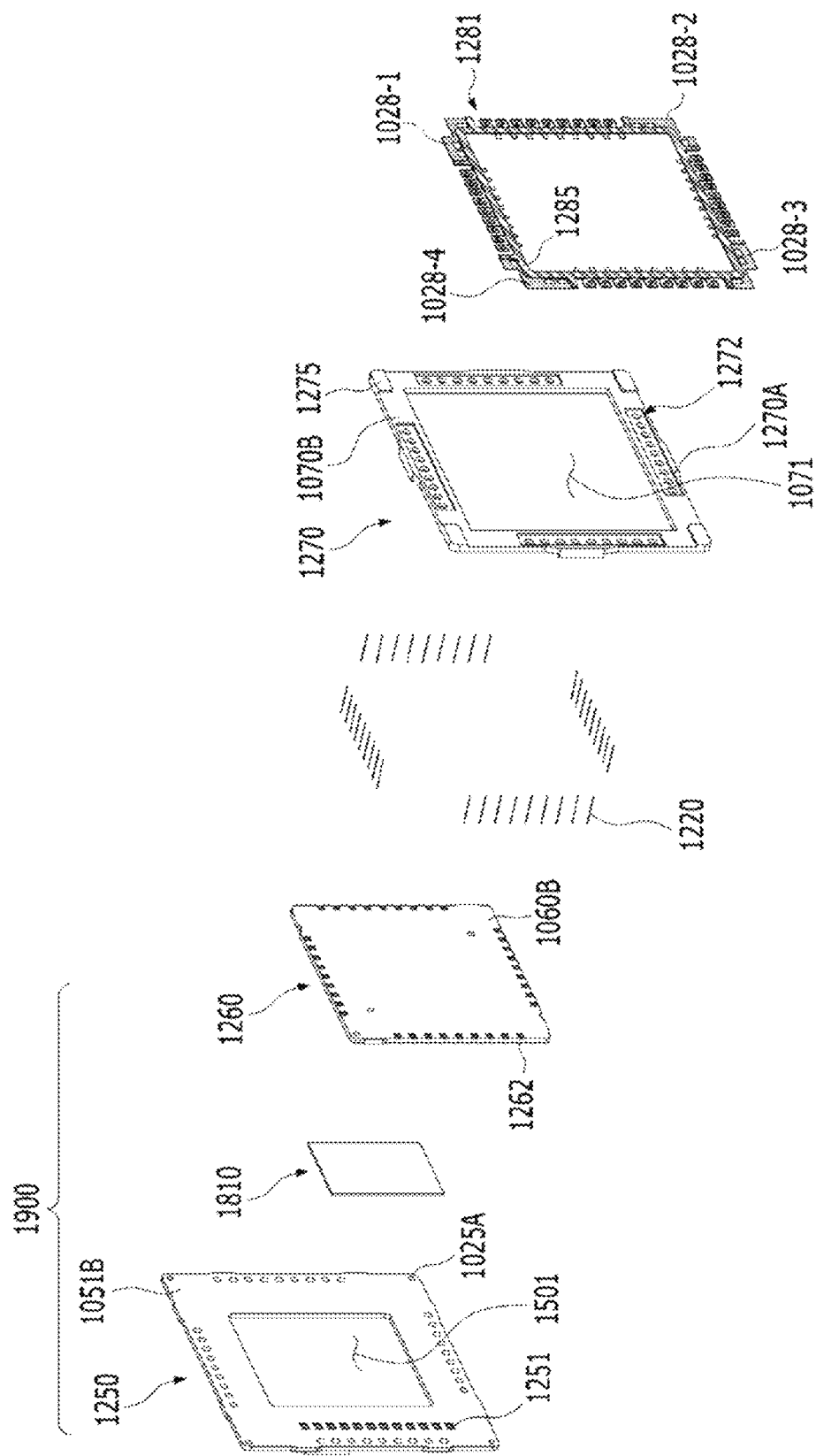
FIG. 40 is an exploded perspective view of the second circuit board, the image sensor, the support member, the holder, and the connective elastic member shown in FIG. 36.
Figure 41:
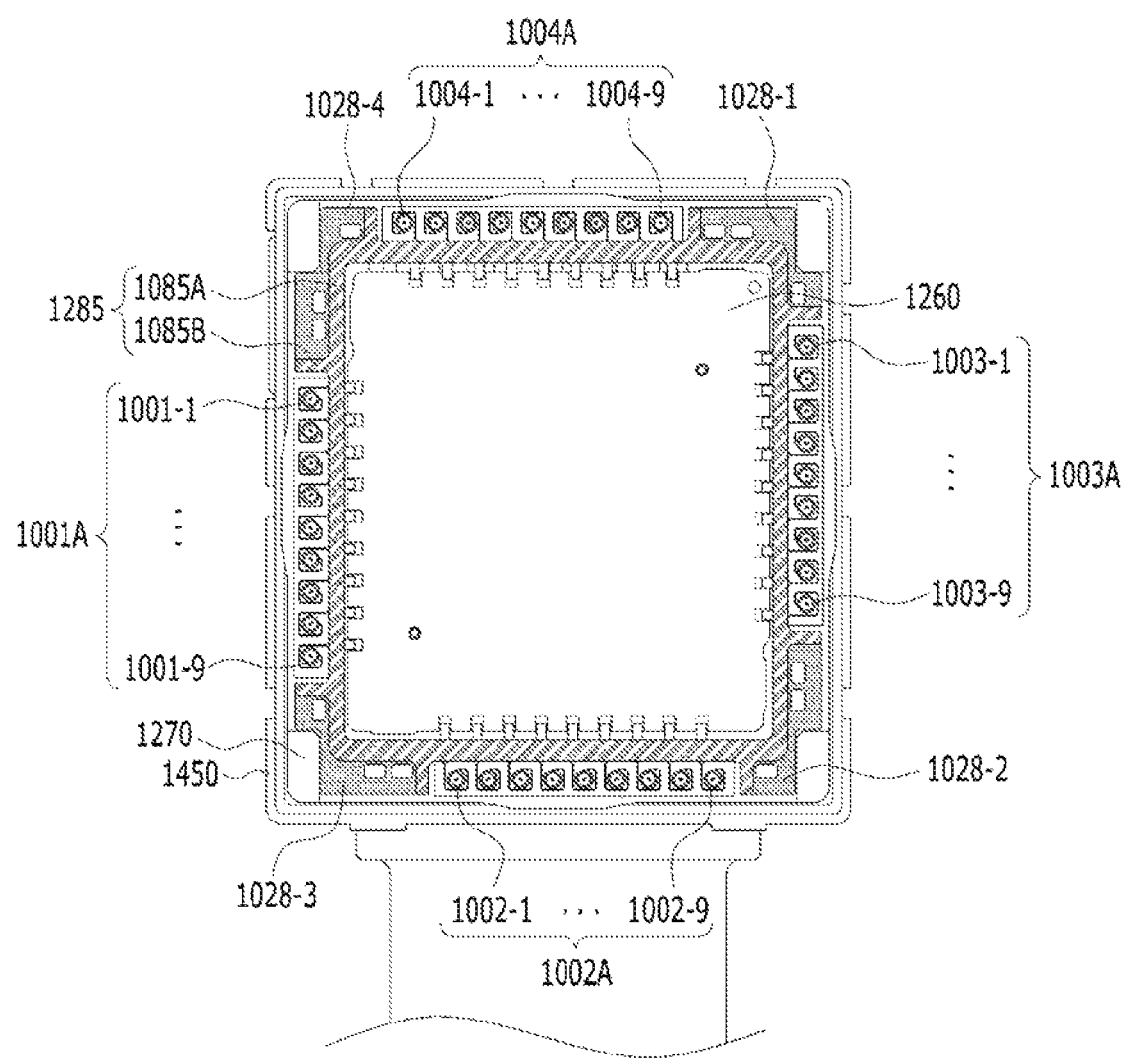
FIG. 41 is a bottom view of the image sensor unit shown in FIG. 35, from which the bottom cover is removed.
Figure 42:
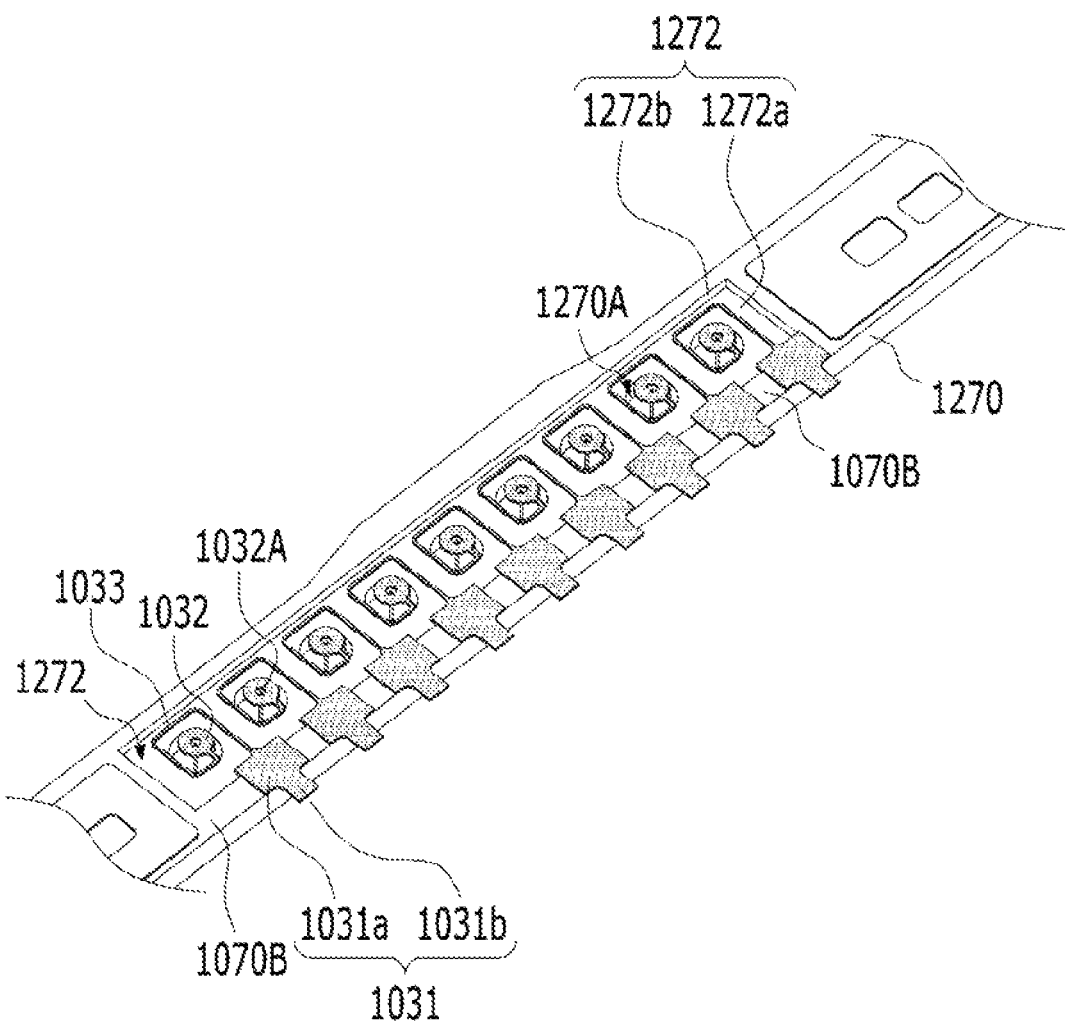
FIG. 42 is a fragmentary enlarged view of the connective elastic member.
Figure 43:
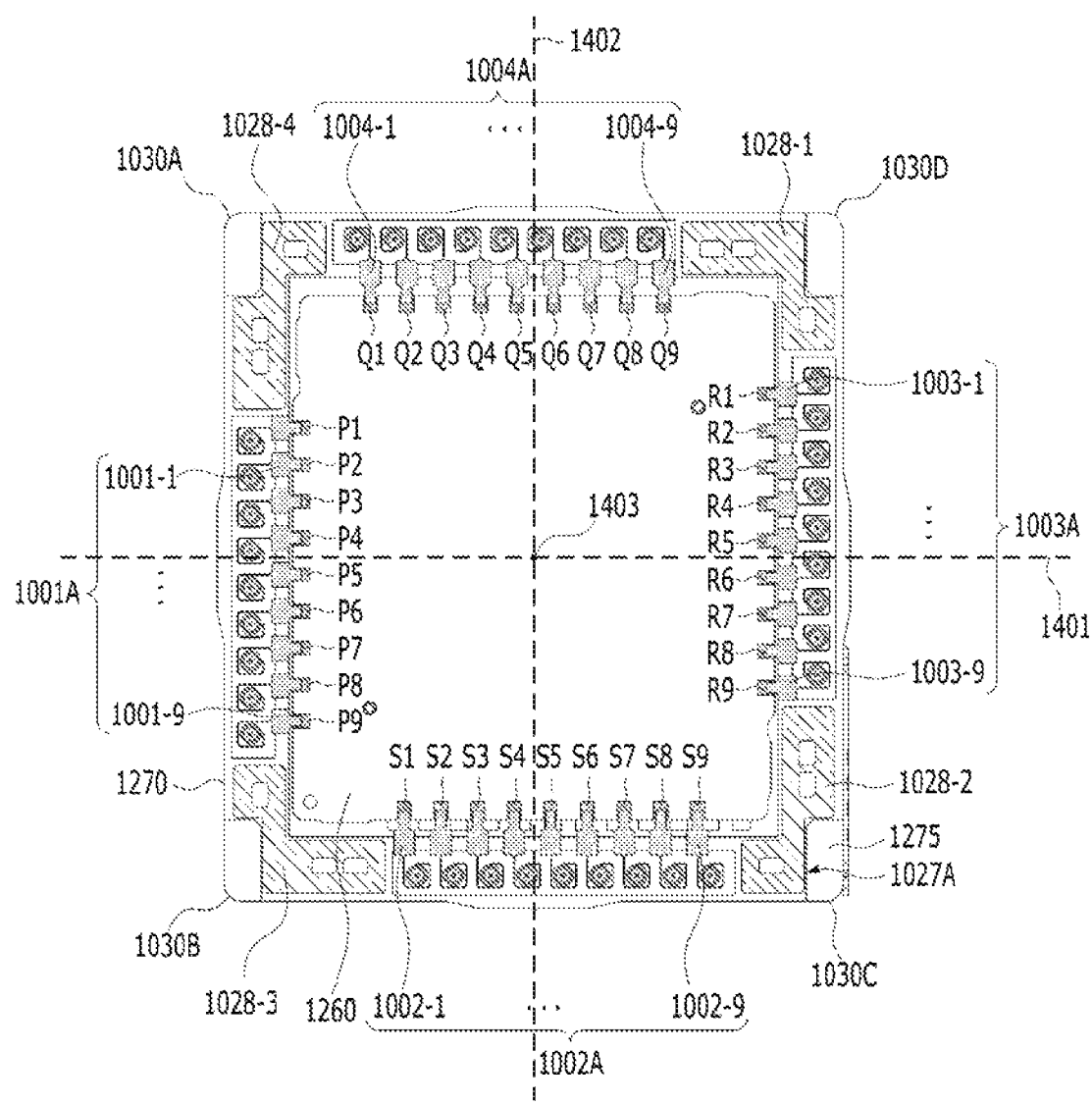
FIG. 43 is a view illustrating connecting springs of the connective elastic member.
Figure 44A:
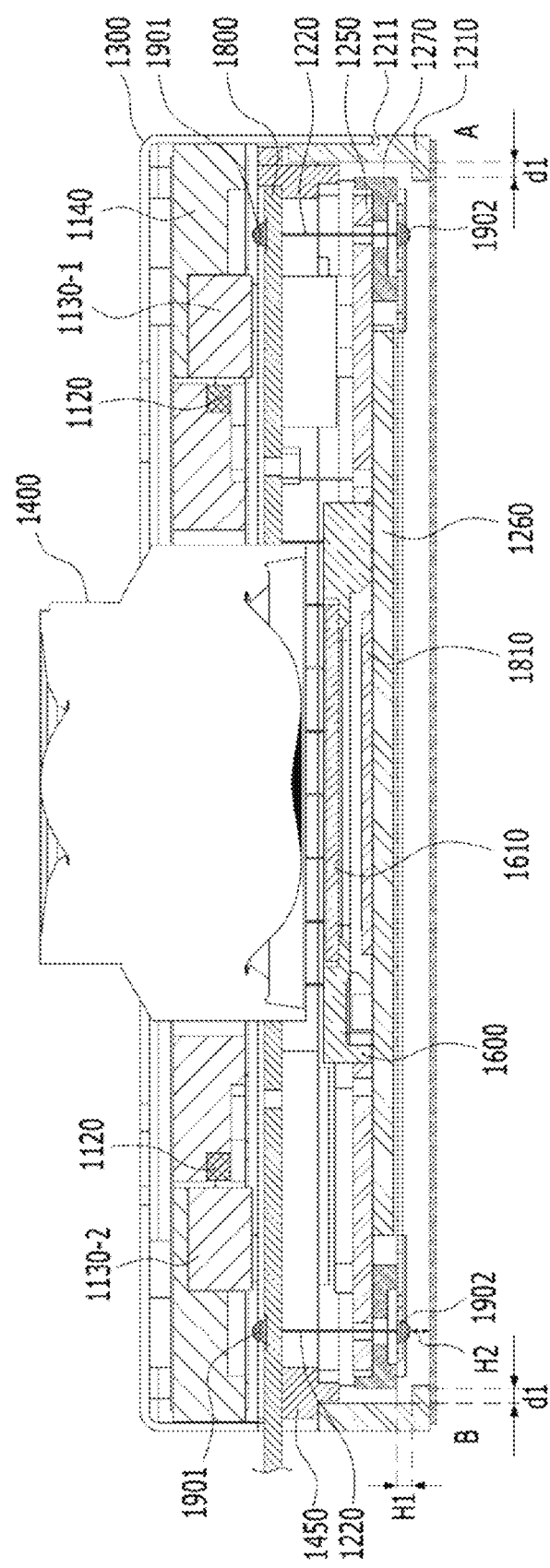
FIG. 44A is a cross-sectional view of the camera module shown in FIG. 28, taken along line A-B.
Figure 44B:
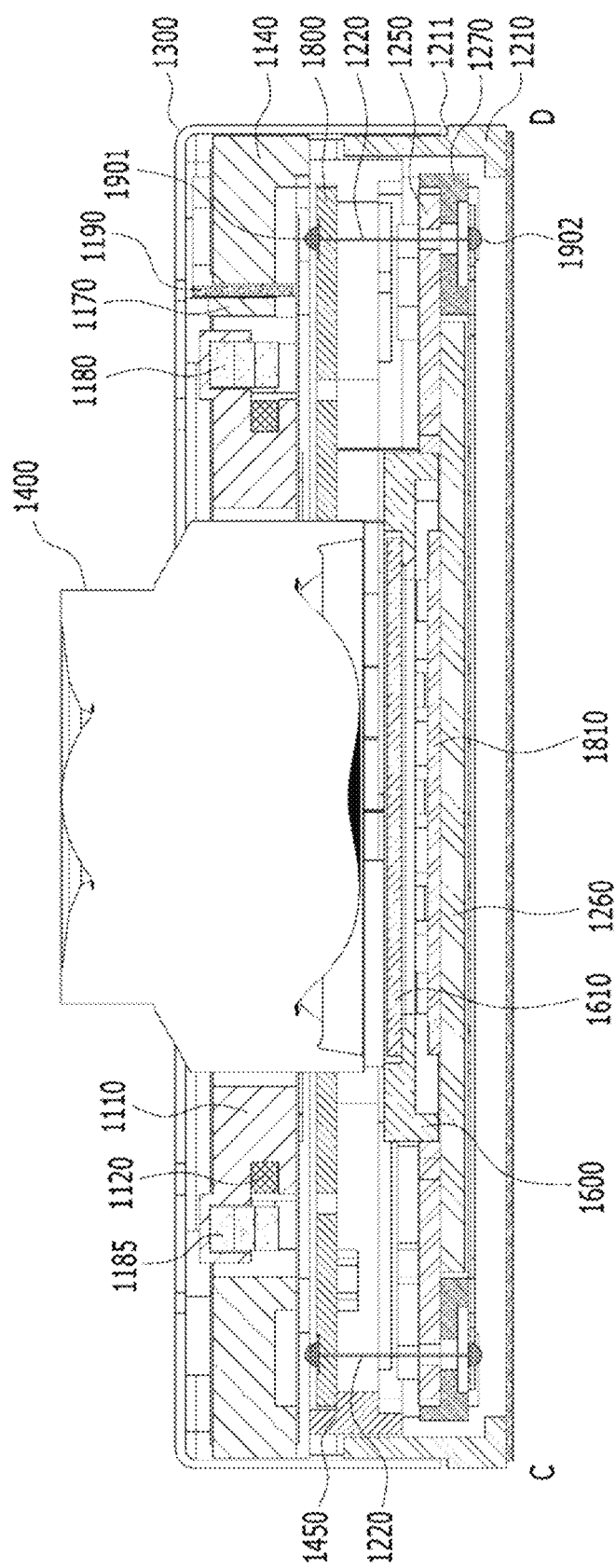
FIG. 44B is a cross-sectional view of the camera module shown in FIG. 28, taken along line C-D.
Figure 45:
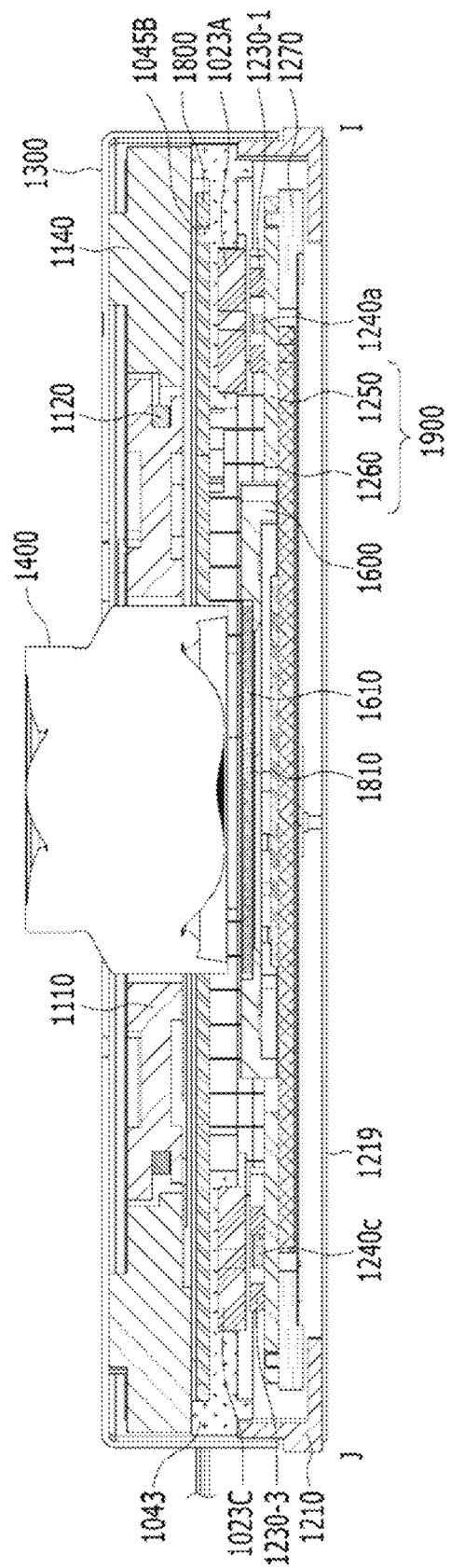
FIG. 45 is a cross-sectional view of the camera module shown in FIG. 28, taken along line I-J.
Figure 46:
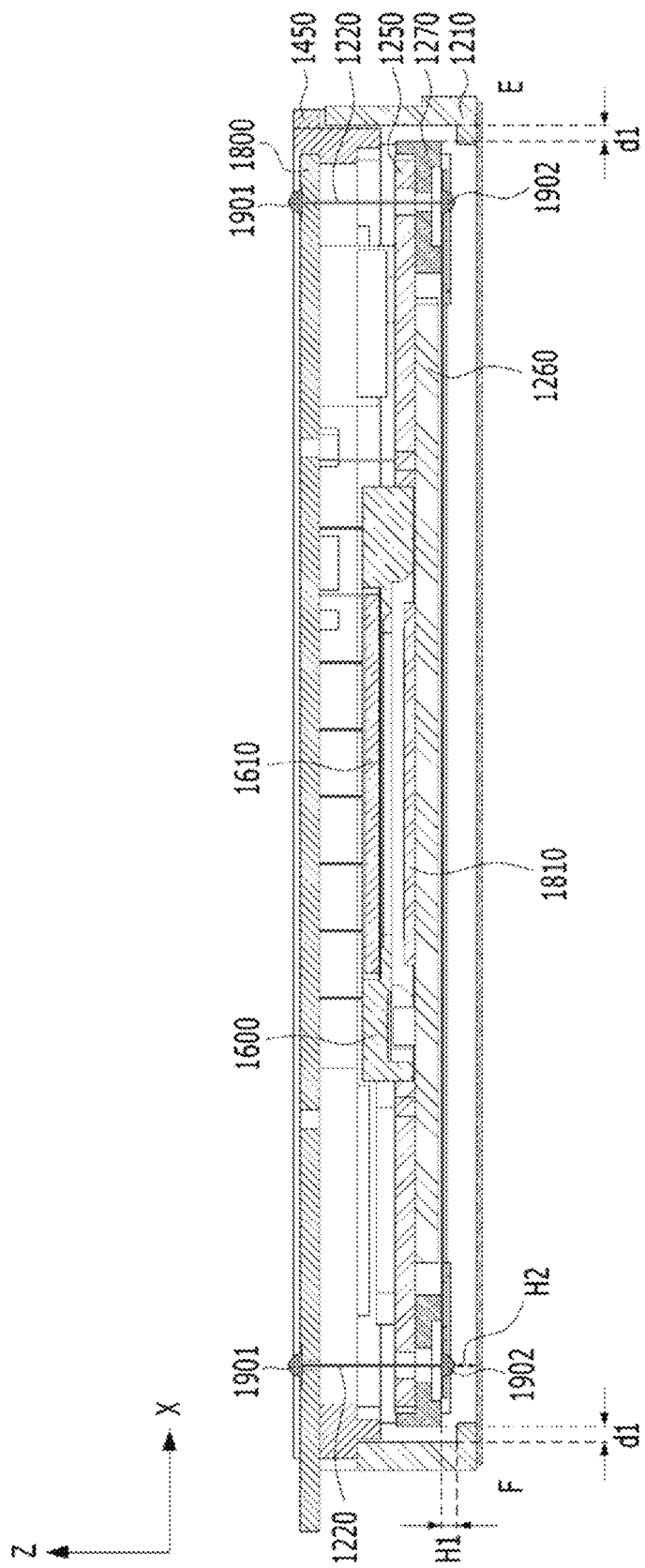
FIG. 46 is a cross-sectional view of the image sensor unit shown in FIG. 35, taken along line E-F.
Figure 47:
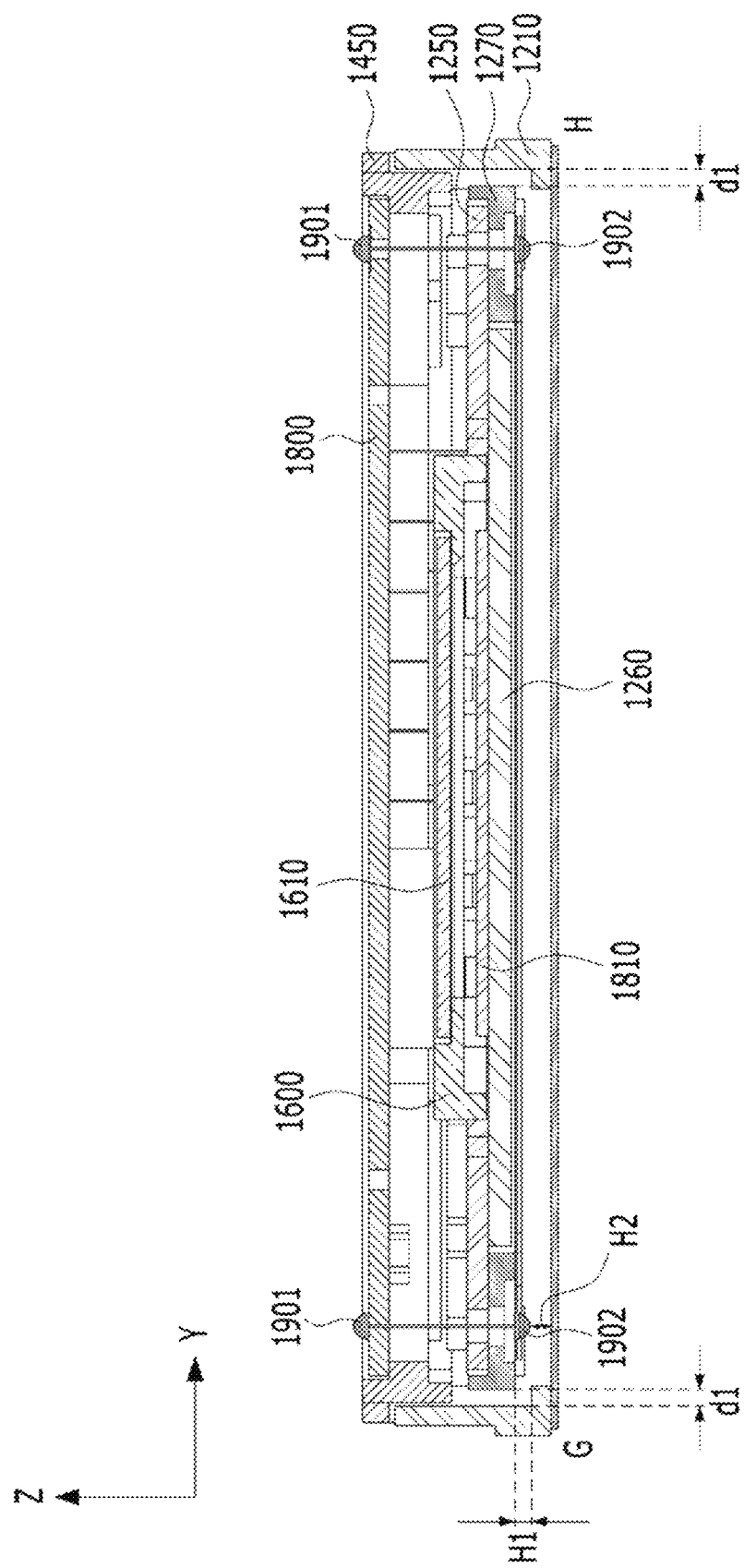
FIG. 47 is a cross-sectional view of the image sensor shown in FIG. 35, taken along line G-H.
Figure 48:
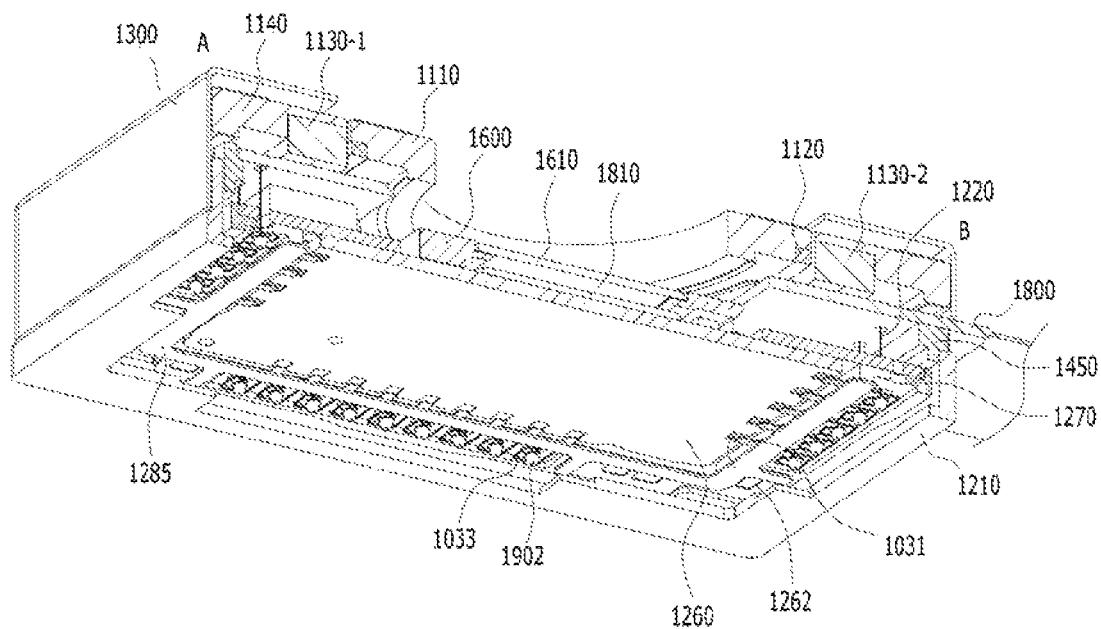
FIG. 48 is a perspective view of the camera module, from which the bottom cover is removed and which is broken away.

FIG. 35 is a plan view of the image sensor unit 1350 shown in FIG. 29. FIG. 36 is an exploded perspective view of the image sensor unit 1350 shown in FIG. 35. FIG. 37 is a perspective view of the first circuit board 1800 and the housing 1450. FIG. 38 is a perspective view of the first circuit board 1800, the housing 1450, and the magnet 1023 shown in FIG. 36. FIG. 39A is an exploded perspective view of the second circuit board 1900, the second coil 1230, the second position sensor 1240, the image sensor 1810, the support member 1220, and the holder 1270. FIG. 39B is a plan view of the third circuit board 1250, the second coil 1230, and the second position sensor 1240 shown in FIG. 39A. FIG. 40 is an exploded perspective view of the second circuit board 1900, the image sensor 1810, the support member 1220, the holder 1270, and the connective elastic member 1280 shown in FIG. 36. FIG. 41 is a bottom view of the image sensor unit 1350 shown in FIG. 35, from which the bottom cover 1219 is removed. FIG. 42 is a fragmentary enlarged view of the connective elastic member 1280 shown in FIG. 42. FIG. 43 is a view illustrating connecting springs 1001A, 1002A, 1003A and 1004A of the connective elastic member 1280. FIG. 44A is a cross-sectional view of the camera module 1010 shown in FIG. 28, taken along line A-B. FIG. 44B is a cross-sectional view of the camera module 1010 shown in FIG. 28, taken along line C-D. FIG. 45 is a cross-sectional view of the camera module 1010 shown in FIG. 28, taken along line I-J. FIG. 46 is a cross-sectional view of the image sensor unit 1350 shown in FIG. 35, taken along line E-F. FIG. 47 is a cross-sectional view of the image sensor 1801 shown in FIG. 35, taken along line G-H. FIG. 48 is a perspective view of the camera module 1010, from which the bottom cover 1219 is removed and which is broken away.

Referring to FIGS. 35 to 48, the image sensor unit 1350 may include the first circuit board 1800, the magnet 1023, the second circuit board 1900, the second coil 1230, the image sensor 1810, the connective elastic member 1280, and the support member 1220.

The image sensor unit 1350 may further include the housing 1450, configured to receive at least a portion of the first circuit board 1800.

The first circuit board 1800 may serve to supply a signal to the image sensor unit 1350 from the outside or to output a signal to the outside from the image sensor unit 1350.

Referring to FIGS. 36 and 37, the first circuit board 1800 may include a first region 1801 corresponding to the AF operation unit 1100, a second region 1802 at which a connector is disposed, and a third region 1803 connecting the first region 1801 to the second region 1802. The connector may be conductively connected to the second region 1802 of the second circuit board 1800, and may include a port configured to be conductively connected to an external device.

Although each of the first region 1801 and the second region 1802 of the second circuit board 1800 may include a flexible substrate and a rigid substrate and the third region 803 may include a flexible substrate, the disclosure is not limited thereto. In another embodiment, at least one of the first to third regions 1801 to 1803 of the first circuit board 1800 may include at least one of a rigid substrate and a flexible substrate.

The first circuit board 1800 may include a bore 1800A, which corresponds to the bore in the bobbin 1110 of the AF operation unit 1100, the lens module 1400, and/or the image sensor 1810. For example, the bore 1800A in the first circuit board 1800 may be formed in the first region 1801.

Referring to FIG. 44A, at least a portion of the lens module 1400 may extend through the bore 1800A in the first circuit board 1800, and may be positioned under the second surface 1044B of the first circuit board 1800.

The lens module 1400 may be disposed on the second circuit board 1900. For example, the lens module 1400 may be positioned on the third circuit board 1250. For example, the lens module 1400 may be positioned above the bore 1501 in the third circuit board 1250.

For example, the lower portion, the lower end, or the lower surface of the lens or the lens barrel of the lens module 1400 may extend through the bore 1800A in the first circuit board 1800, and may be positioned under the second surface 1044B of the first circuit board 1800.

Furthermore, the lower portion, the lower end, or the lower surface of the lens or the lens barrel of the lens module 1400 may be positioned on the first surface (for example, the upper surface) 1051A of the second circuit board 1900 (or the third circuit board 1250).

Furthermore, the lower portion, the lower end, or the lower surface of the lens or the lens barrel of the lens module 1400 may be positioned above the bore 1501 in the third circuit board 1250.

Although the first circuit board 1800 may be configured to have a polygonal shape (for example, a quadrangular shape, a square shape, or a rectangular shape) when viewed from above, the disclosure is not limited thereto. In another embodiment, the first circuit board 1800 may be configured to have a circular shape or the like. Furthermore, although the bore 1800A in the first circuit board 1800 may be configured to have a polygonal shape (for example, a quadrangular shape, a square shape, or a rectangular shape) when viewed from above, the disclosure is not limited thereto. In another embodiment, the bore 1800A may be configured to have a circular shape or the like.

The first circuit board 1800 may include at least one pad corresponding to the support member 1220. For example, the at least one pad of the first circuit board 1800 may include a plurality of pads 1800B. Here, the pad 1800B may be alternatively referred to as a "lead pattern", a "lead member" or a "hole".

The first circuit board 1800 may have therein at least one hole corresponding to the support member 1220, and the hole may be formed through the first circuit board 1800. For example, the first circuit board 1800 may have therein a plurality of through holes corresponding to the plurality of support members.

For example, each of the plurality of pads 1800B may have therein a hole, which is formed through the first circuit board 1800 in the direction of the optical axis OA. Each of the plurality of pads 1800B may surround the hole, and may further include a lead pattern or a conductive layer.

The support member 1220 may extend through the hole in the pad 1800B, and may be soldered thereto so as to be conductively connected to the lead pattern disposed around the hole in the pad 1800B.

For example, the plurality of pads 1800B may be spaced apart from each other at regular intervals so as to surround the bore 1800A in the first circuit board 1800. For example, the plurality of pads 1800B may be disposed in a region between the bore 1800A in the first circuit board 1800 and the sides of the first circuit board 1800.

The first circuit board 1800 may have at least one coupling hole 1800C configured to be coupled to a coupling protrusion 1045B of the housing 1450. Although the coupling hole 1800C may be a through hole, which is formed through the first circuit board 1800 in the optical-axis direction, the disclosure is not limited thereto. In another embodiment, the coupling hole 1800C may take the form of a groove.

For example, although the coupling holes 1800C may be formed in corners of the first circuit board 1800 that are opposite each other in a diagonal direction, the disclosure is not limited thereto. In another embodiment, the coupling holes may be positioned adjacent to the sides of the circuit board 1800 or between the sides of the circuit board and the bore 1800A.

The first circuit board 1800 may include at least one terminal, for example, a plurality of terminals 1080A.

The plurality of terminals 1080A may be formed on the first surface (for example, the upper surface) 44A of the first circuit board 1800. For example, the plurality of terminals 1080A may be disposed at one side of the first circuit board 1800 adjacent to one corner of the first circuit board 1800.

Each of the plurality of terminals 1080A may be conductively connected to a corresponding one of the terminals K1 to K6 of the circuit board 1190 via a conductive adhesive member or solder.

For example, the first circuit board 1800 may include a terminal member 1085 on which the plurality of terminals 1080A are formed. The terminal member 1085 may project from one side of the first circuit board 1800 in a direction perpendicular to the optical axis.

The image sensor unit 1350 may further include the housing 1450, in which the first circuit board 1800 is disposed, seated or received.

The housing 1450 may receive therein at least a portion (for example, the first region) of the first circuit board 1800. The housing 1450 may receive the magnet 1023 therein, and may be alternatively referred to as a "magnet holder".

The housing 1450 may be disposed under the housing 1140 of the AF operation unit 1100, and may be coupled to the housing 1140 of the image sensor unit 1350. For example, the upper portion, the upper end, or the upper surface of the housing 1450 may be coupled to the lower portion, the lower end, or the lower surface of the housing 1140 of the AF operation unit 1100 via an adhesive member or a coupling structure.

Here, the coupling structure may include a first coupler provided at the lower portion, the lower end, or the lower surface of the housing 1140 of the AF operation unit 1100 and a second coupler provided at the upper portion, the upper end, or the upper surface of the housing 1450 of the image sensor unit 1350. The first coupler may be configured to have a protrusion shape or a groove (or hole) shape, and the second coupler may be configured to have a groove (or hole) shape or a protrusion shape.

In another embodiment, the housing 1140 of the AF operation unit 1100 may be coupled to the first circuit board 1800 via an adhesive member.

The housing 1450 may be disposed under the first circuit board 1800. For example, the AF operation unit 1100 may be disposed above the first circuit board 1800, and the housing 1450 may be disposed under the first circuit board 1800.

The housing 1450 may have a shape that corresponds to or coincides with the first region 1801 of the first circuit board 1800. Although the housing 1450 may be configured to have a polygonal shape (for example, a quadrangular shape, a square shape, or a rectangular shape) when viewed from above, the disclosure is not limited thereto. In another embodiment, the housing 1450 may be configured to have a circular shape or an elliptical shape.

The housing 1450 may have therein a bore 1450A. At least a portion of the bore 1450A in the housing 1450 may correspond to or overlap the bore 1800A in the first circuit board 1800.

Although the bore 1450A in the housing 1450 may be configured to have a polygonal shape (for example, a quadrangular shape or an octagonal shape), a circular shape, or a crisscross shape when viewed from above, the disclosure is not limited thereto. The bore 1450A in the housing 1450 may be a through hole, which is formed through the housing 1450 in the optical-axis direction.

For example, the housing 1450 may include a body 1042 configured to support at least a portion (for example, the first region 1801) of the first circuit board 1800, a projection 1043 projecting from the body 1042 in the direction of the optical axis OA, and a bore 1450A formed through the body 1042.

The housing 1450 may include at least one coupling protrusion 1045B projecting from the upper surface of the body 1042. For example, the coupling protrusion 1045B may project from the upper surface of the body 1042 in a direction toward the second surface (for example, the lower surface) 1044B of the first circuit board 1800.

The housing 1450 may include escape regions 1041 corresponding to the plurality of pads 1800B. The escape regions 1041 may be formed at positions corresponding to the support members 1220 so as to avoid spatial interference between the housing 1450 and the support members 1220.

The projection 1043 of the housing 1450 may include a first opening 1046, configured to expose a portion of the first region 1801 of the first circuit board 1800 to the outside, and a second opening 1047, configured to expose the terminals 1080A formed at the terminal member 1085 to the outside.

For example, the second opening 1047 in the housing 1450 may be formed at a position corresponding to the opening 1141 in the housing 1140 of the AF operation unit 1100 in the direction of the optical axis OA.

Referring to FIGS. 28 and 37, the first circuit board 1800 may include the terminals 1080A corresponding to the terminals K1 to K6 of the circuit board 1190 of the AF operation unit 1100.

Each of the terminals 1080A of the first circuit board 1800 may be coupled to a corresponding one of the terminals K1 to K6 of the circuit board 1190 of the AF operation unit 1100 via solder or a conductive member.

Each of the terminals 1080A of the first circuit board 1800 may be conductively connected to a corresponding one or the terminals K1 to K6 of the circuit board 1190 of the AF operation unit 1100. Drive signals or power may be supplied to the first position sensor 1170 through the first circuit board 1800, and the output of the first position sensor 1170 may be output to the first circuit board 1800. Furthermore, drive signals or power may be supplied to the first coil 1120 through the first circuit board 1800.

Referring to FIG. 28, the first circuit board 1800 may include the connector disposed in the second region 1802. For example, the connector may be disposed on one surface (for example, the lower surface of the upper surface) of the second region 1802 of the first circuit board 1800.

The housing 1450 may include a seating portion 1008A in which the magnet 1023 is received, disposed or seated. The seating portion 1008A may be provided at the body 1042 of the housing 1450.

For example, the seating portion 1008A may be formed in a corner of the housing 1450. For example, the seating portion 1008A may be configured to have the form of a groove, which is depressed from the lower surface of the body 1042, and may have a shape corresponding to the magnet 1023. For example, although the housing 1450 may include the seating portions 1008A, which are respectively formed in the four corners of the housing 1450, the disclosure is not limited thereto. In another embodiment, the housing 1450 may include a number of seating portions corresponding to the number of magnets 1023.

The magnet 1023 may be disposed at the housing 1450. For example, although the magnet 1023 may be disposed at a corner of the housing 1140, the disclosure is not limited thereto. In another embodiment, the magnet 1023 may be disposed at a side portion of the housing 1450.

The magnet 1023 may serve to supply a magnetic field, which interacts with the second coil 1230 in order to perform OIS (Optical Image Stabilization) for the purpose of handshake correction.

For example, the magnet 1023 may include a plurality of magnets 1023A to 1023D. Each of the magnets 1023A to 1023D may be disposed at a corresponding one of the corners of the housing 1450.

Although each of the magnets 1023A to 1023D may be a monopolar magnetized magnet having one N pole and one S pole, the disclosure is not limited thereto. In another embodiment, each of the magnets 1023A to 1023D may be a bipolar magnetized magnet, which has two N poles and two S poles, or a tetrapolar magnetized magnet.

For example, each of the four magnets 1023A to 1023D may be disposed at a corresponding one of the four corners of the housing 1450. For example, although two magnets (for example, 1023A and 1023B), which are disposed at two adjacent corners of the housing 1450, may be oriented so as to be perpendicular to each other and two magnets (for example, 1023A and 1023C; 1023B and 1023D), which are disposed at two corners of the housing 1450 which face each other in a diagonal direction, may be oriented so as to be parallel to each other, the disclosure is not limited thereto.

For example, the inner portions of the magnets 1023A to 1023D may have the same polarity. Furthermore, the outer portions of the magnets 1023A to 1023D may have the same polarity.

For example, the inner portion of each of the magnets 1023A to 1023D may be magnetized into an N pole, and the outer portion of each of the magnets 1023A to 1023D may be magnetized into an S pole. In a modification, the inner portion of each of the magnets 1023A to 1023D may be magnetized into an S pole, and the outer portion of each of the magnets 1023A to 1023D may be magnetized into an N pole.

Referring to FIGS. 36 to 40, the second circuit board 1900 may be disposed under the first circuit board 1800. The second circuit board 1900 may include a third circuit board 1250 and a fourth circuit board 1260. The fourth circuit board 1260 may be alternatively referred to as a "connecting board".

For example, the third circuit board 1250 may be disposed under the first circuit board 1800.

The third circuit board 1250 may have therein the bore 1501, which corresponds to or faces the bore in the bobbin 1110, the bore in the housing 1450 and/or the bore 1800A in the first circuit board 1800.

For example, the bore 1501 in the third circuit board 1250 may be a through hole, which is formed through the third circuit board 1250 in the optical-axis direction, and may be positioned at the center of the third circuit board 1250.

Although the shape, for example, the outer peripheral shape of the third circuit board 1250 may be a shape such as a quadrangular shape, which coincides with or corresponds to the upper surface of the base 1210 when viewed from above, the disclosure is not limited thereto.

Furthermore, although the bore 1501 in the third circuit board 1250 may have a polygonal shape, for example, a quadrangular shape, a circular shape, or an elliptical shape, the disclosure is not limited thereto.

The third circuit board 1250 may have therein a plurality of holes 1250A corresponding to the plurality of pads 1800B of the first circuit board 1800. Although the plurality of holes 1250A in the third circuit board 1250 may be through holes, which are formed through the third circuit board 1250 in the direction of the optical axis OA, the disclosure is not limited thereto. In another embodiment, the plurality of holes in the third circuit board 1250 may be escape grooves or escape portions configured to avoid spatial interference with the support member 1220.

For example, the plurality of holes 1250A in the third circuit board 1250 may be arranged so as to surround the bore 1501 in the third circuit board 1250 and to be spaced apart from each other at regular intervals. For example, the plurality of holes 1250A may be formed in the bore 1501 in the third circuit board 1250 and in the sides of the third circuit board 1250.

The third circuit board 1250 may have at least one coupling hole 1025A configured to be coupled to a protrusion 1273 of the holder 1270. Although the coupling hole 1025A in the third circuit board 1250 may be a through hole, which is formed through the third circuit board 1250 in the optical-axis direction, the disclosure is not limited thereto. In another embodiment, the coupling hole 1025A may take the form of a groove.

For example, although the coupling hole 1025A may be formed in at least one of the corners of the third circuit board 1250, the disclosure is not limited thereto. The coupling hole 1025A may also be positioned adjacent to a side of the third circuit board 1250 or between a side of the third circuit board 1250 and the bore 1501.

Referring to FIG. 40, the third circuit board 1250 may include a plurality of terminals 1251. For example, the plurality of terminals 1251 may be disposed on the second surface 1051B (for example, the lower surface) of the third circuit board 1250 so as to be spaced apart from each other. The second surface 1051B may be a surface opposite the first surface 1051A. The number of terminals 1251 is not limited to that shown in FIG. 40, and may be greater or less than that shown in FIG. 40.

For example, the plurality of terminals 1251 may be disposed in a region between the bore 1501 in the third circuit board 1250 and one side of the third circuit board 1250. For example, the plurality of terminals 1251 may be disposed closer to the bore 1501 in the third circuit board 1250 than to the plurality of holes 1250A.

The third circuit board 1250 may include pads 1009A to 1009H configured to be conductively connected to the second coil 1230. Here, the pads may be alternatively referred to as "terminals" or "bonding portions". The pads 1009A to 1009A of the third circuit board 1250 may be conductively connected to the plurality of terminals 1251 of the third circuit board 1250.

The third circuit board 1250 may be a printed circuit board or a flexible printed circuit board (FPCB).

The second coil 1230 may be disposed or mounted on the first surface (for example, the upper surface) 1051A of the third circuit board 1250.

The second coil 1230 may be disposed under the housing 1450. The second coil 1230 may be disposed under the magnet 1023.

For example, the second coil 1230 may be disposed on the circuit board 1250 so as to correspond to, face, or overlap the magnet 1023 disposed at the housing 1450 in the direction of the optical axis OA.

For example, the second coil 1230 may include a plurality of coil units 1230-1 to 1230-4. For example, the second coil 1230 may include four coil units.

Each of the plurality of coil units 1230-1 to 1230-4 may face or overlap a corresponding one of the magnets 1023A to 1023D disposed at the housing 1450 in the direction of the optical axis OA.

Although each of the coil units may have the form of a coil block having a closed curve shape or a ring shape, the disclosure is not limited thereto. For example, each of the coil units may be composed of an FP (fine pattern) coil. In another embodiment, the coil units may be formed at an additional circuit member, other than the third circuit board 1250. In a further embodiment, the coil units may be directly formed in the circuit board 1250.

For example, four coil units 1230-1 to 1230-4 may be disposed or formed at the corners or the corner regions of the quadrangular circuit board 1250.

The second coil 1230 may be conductively connected to the third circuit board 1250, and thus power or drive signals may be supplied to the second coil 1230 through the third circuit board 1250. The power or drive signal supplied to the second coil 1230 may be a DC signal, an AC signal or a signal containing both DC and AC components, and may be of a voltage type or a current type.

Here, current may be independently applied to at least three coil units, among the four coil units.

In a first embodiment, the second coil 1230 may be controlled through three channels.

For example, only the first to third coil units, among the first to fourth coil units, may be conductively isolated from each other, and the fourth coil unit may be conductively connected to one of the first to third coil units in series. Here, three pairs of lead wires, that is, a total of six lead wires, may be taken from the second coil 1230.

In a second embodiment, the second coil 1230 may be controlled through four individual channels. Here, the four coil units may be conductively isolated from each other. One of forward current and reverse current may be selectively applied to each of the coil units. Here, four pair of lead wires, that is, a total of eighth lead wires, may be taken from the second coil 1230.

For example, two coil units 1230-1 and 1230-3, which face each other in a diagonal direction, may extend or be oriented in a first axial direction (for example, in the y-axis direction), and two other coil units 1230-2 and 1230-4, which face each other in a diagonal direction, may extend or be oriented in a second axial direction (for example, in the x-axis direction). Here, the first axial direction may be perpendicular to the second axial direction.

The long side of the first coil unit 1230-1 and the long side of the third coil unit 1230-3 may be disposed parallel to each other. The long side of the second coil unit 1230-2 and the long side of the fourth coil unit 1230-4 may be disposed parallel to each other. The long side of the first coil unit 1230-1 and the long side of the second coil unit 1230-2 may not be disposed parallel to each other. Here, the long side of the first coil unit 1230-1 and the long side of the second coil unit 1230-2 may be disposed such that the imaginary lines extending therefrom intersect each other. For example, the direction in which the first coil unit 1230-1 is oriented and the direction in which the second coil unit 1230-2 is oriented may be perpendicular to each other.

In another embodiment, at least one of the four coil units may be driven separately from the rest. In a further embodiment, the four coil units may be individually driven.

For example, the first coil unit 1230-1 may be connected at one end thereof to the first pad 1009A and at the other end thereof to the second pad 1009B. A first drive signal may be supplied to the first and second pads 1009A and 1009B so as to activate the first coil unit 1230-1.

The third coil unit 1230-3 may be connected at one end thereof to the third pad 1009C and at the other end thereof to the fourth pad 1009D. A second drive signal may be supplied to the third and fourth pads 1009C and 1009D so as to activate the third coil unit 1230-3.

The second coil unit 1230-2 may be connected at one end thereof to the fifth pad 1009E and at the other end thereof to the sixth pad 1009F. A third drive signal may be supplied to the fifth and sixth pads 1009E and 1009F so as to activate the second coil unit 1230-2.

The fourth coil unit 1230-4 may be connected at one end thereof to the seventh pad 1009G and at the other end thereof to the eighth pad 1009H. A fourth drive signal may be supplied to the seventh and eighth pads 1009G and 1009H so as to activate the fourth coil unit 1230-4.

In an embodiment, two coil units (for example, 1230-1 and 1230-3), which face each other in a diagonal direction, may be directly connected to each other in series, and may be activated by a single drive signal. Meanwhile, two coil units (for example, 1230-2 and 1230-4), which face each other in a diagonal direction, may be conductively isolated from each other, and may be individually activated by different drive signals.

In a further embodiment, the four coil units 1230-1 to 1230-4 may be conductively isolated from one another, and may be individually activated by different respective drive signals.

By virtue of the interaction between the magnets 1023A to 1023D and the coil units 1230-1 to 1230-4, to which drive signals are applied, the OIS movable unit including the image sensor 1810 may be movable in the second and/or third direction, for example, in the x-axis direction and/or in the y-axis direction, thereby performing handshake correction. The description of the OIS movable unit will be given later.

The image sensor unit 1350 may further include the second position sensor 1240 for feedback OIS operation.

The second position sensor 1240 may be disposed, coupled or mounted to the first surface (for example, the upper surface) 1051A of the third circuit board 1250. The second position sensor 1240 may detect displacement of the OIS movable unit in a direction perpendicular to the optical axis OA, for example, shifting or tilting of the OIS movable unit in a direction perpendicular to the optical axis, or rotation of the OIS movable unit about the optical axis.

Here, the first position sensor 1170 may be alternatively referred to as an "AF position sensor", and the second position sensor 1240 may be alternatively referred to as an "OIS position sensor".

The second position sensor 1240 may include one or more sensors 1240a, 1240b and 1240c.

For example, the second position sensor 1240 may include three sensors 1240a, 1240b and 1240c.

Each of the first to third sensors 1240a, 1240b, and 1240c may be embodied as only one Hall sensor, or may be embodied as a driver IC including a Hall sensor. The description of the first position sensor 1170 may be applied to the first to third sensors 1240a, 1240b and 1240c with or without modification.

Each of the first to third sensors 1240a, 1240b and 1240c may be conductively connected to predetermined corresponding terminals among the terminals 262 of the first circuit board 1250. For example, drive signals may be respectively applied to each of the first to third sensors 1240a, 1240b and 240c via the terminals 1251, and the output signal of each of the first to third sensors may be output to other predetermined terminals among the terminals 1251.

For example, because four coil units 1230-1 to 1230-4 are controlled through three channels, each of the first to third sensors 1240a, 1240b and 1240c may be disposed in a corresponding one of the three coil units 1230-1 to 1230-3, and the remaining coil unit 1230-4 may not be provided with a sensor.

For example, each of the coil units 1230-1 to 1230-4 may be configured to have the form of a ring having therein an opening, hole or cavity. For example, each of the first to third sensors 1240a, 1240b and 1240c may be disposed in the opening, hole or cavity in a corresponding one of the coil units 1230-1 to 1230-3.

For example, the coil units 1230-1 to 1230-4 and the sensors 1240a, 1240b and 1240c may be disposed on the same flat surface as the first surface of the first circuit board 1900.

All of movement of the image sensor 1810 in the x-axis and y-axis directions and rotation of the image sensor 1810 about the z-axis may be detected by the three sensors 1240a, 1240b and 1240c.

One (for example, 1240a) of the three sensors 1240a, 1240b and 1240c may detect a movement amount and/or displacement of the OIS movable unit in the x-axis direction. Another one (for example, 1240b) of the three sensors 1240a, 1240b and 1240c may detect a movement amount and/or displacement of the OIS movable unit in the y-axis direction. The remaining one of the three sensors 1240a, 1240b and 1240c may detect a movement amount and/or displacement of the OIS movable unit in the x-axis direction and/or in the y-axis direction. It is possible to detect rotational movement of the OIS movable unit about the z-axis using the outputs of two or more of the three sensors 1240a, 1240b and 1240c.

When a drive signal (for example, drive current) is applied to the first coil unit 1230-1 and the third coil unit 1230-3 but is not applied to the second coil unit 1230-2 or the fourth coil unit 1230-4, the direction of first electromagnetic force resulting from the interaction between the first coil unit 1230-1 and the first magnet 1023A and the direction of third electromagnetic force resulting from the interaction between the third coil unit 1230-3 and the third magnet 1023C may be the same direction, for example, the x-axis direction (for example, the +x-axis direction or the −x-axis direction), and the OIS movable unit may be moved (shifted) in the x-axis direction (for example, in the +x-axis direction or in the −x-axis direction).

For example, when a drive signal (for example, drive current) is applied to the second coil unit 1230-2 and the fourth coil unit 1230-4 but is not applied to the first coil unit 1230-1 or to the third coil 1230-3, the direction of second electromagnetic force resulting from the interaction between the second coil unit 1230-2 and the second magnet 1023B and the direction of fourth electromagnetic force resulting from the interaction between the fourth coil unit 1230-4 and the fourth magnet 1023D may be the same direction, for example, the y-axis direction (for example, the +y-axis direction or the −y-axis direction), and the OIS movable unit may be moved (shifted) in the y-axis direction (for example, in the +y-axis direction or in the −y-axis direction).

For example, when a drive signal is applied to each of the first to fourth coil units 1230-1 to 1230-4, the direction of the first electromagnetic force and the direction of the third electromagnetic force are opposite each other, the direction of the second electromagnetic force and the direction of the fourth electromagnetic force are opposite each other, and the rotational direction of the OIS movable unit due to the first electromagnetic force and the third electromagnetic force and the rotational direction of the OIS movable unit due to the second electromagnetic force and the fourth electromagnetic force are the same, the OIS movable unit may be rotated or rolled about the optical axis or the z-axis.

When the second coil 1230 is controlled through three channels, it is possible to roll the OIS movable unit using the first and third coil units 1230-1 and 1230-3 or the second and fourth coil units 1230-2 and 1230-4.

In the embodiment shown in FIGS. 39A and 39B, the second position sensor 1240 may include three sensors 1240a, 1240b and 1240c.

For example, the first sensor 1240a may be disposed on the first surface (for example, the upper surface) 1051A of the circuit board 1250 in the first coil unit 1230-1, the third sensor 1240c may be disposed on the first surface (for example, the upper surface) 1051A of the circuit board 1250 in the third coil unit 1230-3, and the second sensor 1240b may be disposed on the upper surface of the circuit board 1250 in the second coil unit 1230-2.

For example, although the first sensor 1240a may not overlap the first coil unit 1230-1 in the direction of the optical axis OA, the third sensor 1240c may not overlap the third coil unit 1230-3 in the direction of the optical axis OA, and the second sensor 1240b may not overlap the second coil unit 1230-2 in the direction of the optical axis OA, the disclosure is not limited thereto. In another embodiment, both the sensor and the coil unit may at least partially overlap each other in the optical-axis direction.

The first sensor 1240a may overlap the magnet 1023A in the optical-axis direction, the third sensor 1240c may overlap the magnet 1023C in the optical-axis direction, and the second sensor 1240b may overlap the magnet 1023B in the optical-axis direction.

Furthermore, the first sensor 1240a may overlap the first coil unit 1230-1 in a direction perpendicular to the optical axis OA, the third sensor 1240c may overlap the third coil unit 1230-3 in a direction perpendicular to the optical axis OA, and the second sensor 1240b may overlap the second coil unit 1230-2 in a direction perpendicular to the optical axis OA. In another embodiment, the sensor and the coil unit may not overlap each other in a direction perpendicular to the optical axis OA.

In another embodiment, the second position sensor 1240 may include one first sensor and one second sensor. In another embodiment, one of the first sensor 1240a and the third sensor 1240c may be omitted.

The image sensor unit 1350 may include at least one of a motion sensor 1820, a controller 1830, a memory 1512, and a capacitor 1514.

The motion sensor 1820, the controller 1830, the memory 1512 and the capacitor 1514 may be disposed or mounted to one of the first circuit board 1800 and the third circuit board 1250.

For example, the motion sensor 1820 and the memory 1512 may be disposed on the second surface 1044B of the first circuit board 1800, and the controller 1830 and the capacitor 1514 may be disposed on the first surface 1051A of the third circuit board 1250.

The motion sensor 1820 may be conductively connected to the controller 1830 via a wire or a circuit pattern formed at the third circuit board 1250.

The motion sensor 1820 may output information about a rotational angular speed caused by motion of the camera module 1010. The motion sensor 1820 may be embodied as a dual-axis or triple-axis gyro sensor or an angular speed sensor.

The memory 1512 may store code values according to displacement of the bobbin 1110 in the optical-axis direction for AF feedback operation. Furthermore, the memory 1512 may store code values according to displacement of the OIS movable unit in a direction perpendicular to the optical-axis direction for OIS feedback operation. In addition, the memory 1512 may store an algorithm or a program for operation of the controller 1830.

Furthermore, the memory 1512 may store a correction value CV. The correction value CV may be alternatively referred to as an "error correction value". A description of the correction value CV will be given later.

For example, although the memory 1512 may be, for example, an EEPROM (Electrically Erasable Programmable Read-Only Memory), the disclosure is not limited thereto.

The controller 1830 may be conductively connected to the first position sensor 1170 and to the second position sensor 1240.

The controller 1830 may control the output signal of the first position sensor 1170, and drive signals, which are supplied to the first coil 1120 using first code values stored in the memory 1512, thereby performing a feedback auto-focusing operation.

Furthermore, the controller 1830 may control the output signal supplied from the second position sensor 1240, and drive signals, which are supplied to the second coil 1230 using second code values stored in the memory 1512, thereby performing a feedback OIS operation.

Although the controller 1830 may be of a driver IC type, the disclosure is not limited thereto. For example, the controller 1830 may be conductively connected to the terminal 1251 of the first circuit board 1250.

The fourth circuit board 1260 may be disposed under the third circuit board 1250. The fourth circuit board 1260 may be alternatively referred to as a "third circuit board".

Although the fourth circuit board 1260 may be configured to have a polygonal shape (for example, a quadrangular shape, a square shape, or a rectangular shape) when viewed from above, the disclosure is not limited thereto. In another embodiment, the fourth circuit board 1260 may be formed to have a circular shape or an elliptical shape.

For example, the surface area of the front surface of the fourth quadrangular circuit board 1260 may be larger than the surface area of the bore 1501 in the third circuit board 1250. For example, the lower side of the bore 1501 in the third circuit board 1250 may be closed or blocked by the fourth circuit board 1260.

When viewed from above or below, the outer surface (or the outer side) of the fourth circuit board 1260 may be positioned between the outer surface (or the outer side) of the third circuit board 1250 and the bore 1501 in the third circuit board 1250.

The fourth circuit board 1260 may include a seating region 1260A in which the image sensor 1810 is disposed. For example, the first surface (for example, the upper surface) 1060A of the fourth circuit board 1260 may be provided with the seating region 1260A, in which the image sensor 1810 is disposed or coupled. For example, the seating region 1260A may be disposed so as to be aligned with the bore 1501 in the third circuit board 1250.

Referring to FIGS. 39A and 39B, the fourth circuit board 1260 may include a first terminal 1261 configured to be conductively connected to the terminal 1251 of the third circuit board 1250. The first terminal 1261 may be alternatively referred to as a "first terminal portion" or a "first terminal unit". For example, the first terminal 1261 may include a plurality of first terminals.

For example, the first terminal 1261 of the fourth circuit board 1260 may be coupled to the terminal 1251 of the third circuit board 1250 via solder or a conductive adhesive member.

For example, the first terminal 1261 of the fourth circuit board 1260 may be disposed on the first surface (for example, the upper surface) 1060A of the fourth circuit board 1260, and may correspond to, face or overlap the terminal 1251 of the third circuit board 1250 in the optical-axis direction.

Referring to FIG. 40, the fourth circuit board 1260 may include a second terminal 1262, which is conductively connected to the connective elastic member 1280. The second terminal 1262 may be alternatively referred to as a "second terminal portion" or a "second terminal unit".

For example, the second terminal 1262 of the fourth circuit board 1260 may be coupled to the connective elastic member 1280 via solder 1038 (see FIG. 41) or a conductive adhesive member. For example, the second terminal 1262 may include a plurality of second terminals.

For example, the second terminal 1262 of the fourth circuit board 1260 may be disposed on the second surface (for example, the lower surface) 1060B of the fourth circuit board 1260, and may correspond to, face, or overlap the connecting spring 1281 of the connective elastic member 1280 in the optical-axis direction. The second surface 1060B may be a surface opposite the first surface 1060A.

Although the fourth circuit board 1260 may be a printed circuit board or an FPCB, the disclosure is not limited thereto.

The holder 1270 may be disposed under the third circuit board 1250 so as to support the third circuit board 1250. For example, the second surface 1051B of the third circuit board 1250 may be in contact with the upper surface of the holder 1270.

For example, the holder 1270 may be disposed between the third circuit board 1250 and the connective elastic member 1280.

The holder 1270 may include a projection 1276, which projects toward the third circuit board 1250 from the upper surface thereof. The projection 1276 may serve to support the lateral side surface of the third circuit board 1250, or may serve as an assembly guide configured to allow the third circuit board 1250 to be easily disposed or seated at the holder 1270. The projection 1276 may be alternatively referred to as a "guide portion" or a "guide protrusion".

The projection 1276 may be in contact with the outer surface of the third circuit board 1250 in the state in which the third circuit board 1250 is seated on the holder 1270. For example, the projection 1276 may include a plurality of (for example, four) projections, and the plurality of projections 1276 may be in contact with all the four outer surfaces of the third circuit board 1250.

For example, although the projections 1276 are shown in FIG. 39A as being formed on the outer surfaces of sides of the holder 1270 that face each other, the disclosure is not limited thereto.

When viewed from above or below, although the outer periphery of the holder 1270 may have a quadrangular shape, for example, a square shape or a rectangular shape, the disclosure is not limited thereto. In another embodiment, the outer periphery of the holder 1270 may have a circular shape or an elliptical shape.

The holder 1270 may include a protrusion 1273, which corresponds to or faces the coupling hole 1025A in the third circuit board 1250. The protrusion 1273 on the holder 1270 may project from the first surface 1070A of the holder 1270, and may be coupled to the coupling hole 1025A in the third circuit board 1250. The holder 1270 and the third circuit board 1250 may thereby be coupled to each other. The first surface 1070A of the holder 1270 may be a surface that faces the second surface 1060B of the third circuit board 1250.

The holder 1270 may have a bore 1071 corresponding to the fourth circuit board 1260.

Although the bore 1071 in the holder 1270 may have a quadrangular shape, for example, a square shape or a rectangular shape, the disclosure is not limited thereto. In another embodiment, the bore 1071 may have a circular shape or an elliptical shape.

For example, although the bore 1071 in the holder 1270 may have a shape that coincides with or is identical to the shape of the fourth circuit board 1260, the disclosure is not limited thereto. The size or surface area of the bore 1071 in the holder 1270 may be larger than the size or surface area of the first surface 1060A or the second surface 1060B of the fourth circuit board 1260. The fourth circuit board 1260 may be disposed inside the bore 1071 in the holder 1270.

For example, the holder 1270 may be shaped to surround the fourth circuit board 1260.

The holder 1270 may have a plurality of holes 1270A corresponding to the plurality of holes 1250A in the third circuit board 1250. Although the plurality of holes 1270A in the holder 1270 may be through holes, which are formed through the holder 1270 in the direction of the optical axis OA, the disclosure is not limited thereto. In another embodiment, the plurality of holes 1270A in the holder 1270 may be escape grooves or escape portions in order to avoid spatial interference with the support member 1220.

For example, the plurality of holes 1270A in the holder 1270 may be arranged so as to surround the bore 1071 in the holder 1270 and to be spaced apart from each other at regular intervals. For example, the plurality of holes 1270A may be positioned in a region between the bore 1071 in the holder 1270 and the sides of the holder 1270.

Referring to FIG. 40, the second surface 1070B of the holder 1270 may be provided with a projection 1275. The projection 1275 of the holder 1270 may project toward the bottom of the base 1210 from the second surface 1070B of the holder 1270.

The projection 1275 of the holder 1270 may project toward the bottom of the base 1210 further than the connective elastic member 1280. Alternatively, the projection 1275 of the holder 1270 may project toward the bottom of the base 1210 further than a solder 1902 that couples the connective elastic member 1280 to the support member 1220.

For example, the first distance between the projection 1275 of the holder 1270 and the bottom of the base 1210 in the optical-axis direction may be less than the second distance between the connective elastic member 1280 and the bottom of the base 120. For example, the first distance may be less than the third distance between the solder 1902 and the bottom of the base 120.

The projection 1275 may serve as a stopper, configured to prevent the second surface 1070B of the holder 1270, the connective elastic member 1280 and/or the solder 1902 from directly colliding with the bottom of the base 1210.

For example, although the projection 1275 may be disposed at a corner of the second surface 1070B of the holder 1270, the disclosure is not limited thereto. In another embodiment, the projection 1275 may be disposed at a side of the second surface 1070B of the holder 1270 or between a side of the second surface 1070B of the holder 1270 and the bore 1071.

Referring to FIG. 42, the holder 1270 may have at least one groove 1272, which is depressed from the second surface 1070B thereof.

For example, the holder 1270 may have a plurality of grooves (for example, four grooves) corresponding to the plurality of sides (for example, four sides) of the second surface 1070B.

Each of the grooves 1272 may include a bottom 1272*a*, which has a height difference with respect to the second surface 1070B in the direction of the optical axis OA, and a side wall 1272*b* connecting the bottom 1272*a* to the second surface 1070B.

For example, the bottom 1272*a* of the groove 1272 may be positioned closer to the first surface 1070A of the holder 1270 than to the second surface 1070B of the holder 1270.

The plurality of holes 1270A in the holder 1270 may overlap the grooves 1272 in the holder 1270 in the optical-axis direction. For example, each of the plurality of holes 1270A may have an opening formed in the bottom 1272*a* of the groove 1272. The openings of each of the plurality of holes 1270A formed in the bottom 1272*a* may have a height difference with respect to the second surface 1070B of the holder 1270 in the optical-axis direction.

For example, the plurality of holes 1270A may be formed through the bottoms 1272*a* of the grooves 1272 in the holder 1270.

Here, the grooves 1272 in the holder 1270 may serve to avoid spatial interference between the connective elastic member 1280 and the holder 1270 to thus allow easy elastic deformation when the connective elastic member 1280 is elastically deformed during OIS operation.

The connective elastic member 1280 may be coupled to the holder 1270. The connective elastic member 1280 may serve to allow the OIS movable unit to be moved and to allow transmission of a conductive signal. For example, the connective elastic member 1280 may conductively connect the support member 1220 to the terminal 1262 of the fourth circuit board 1260.

For example, the connective elastic member 1280 may be disposed under the holder 1270.

The connective elastic member 1280 may be coupled to the second surface 1070B of the holder 1270 via an adhesive member or the like.

The connective elastic member 1280 may conductively connect the support member 1220 to the fourth circuit board 1260, and may include an elastic deformation portion, which is elastically deformable. The elastic deformation portion of the connective elastic member 1280 may be coupled to the support member 1220.

The connective elastic member 1280 may include the connecting spring 1281 (see FIG. 40) corresponding to the support member 1220. The description of the connecting spring 1281 shown in FIG. 18 may be applied to the connecting spring 1281 with or without modification.

For example, the connective elastic member 1280 may include a plurality of connecting springs 1281. The plurality of connecting springs 1281 may correspond to respective support members 1220. The plurality of connecting springs 1281 may be disposed so as to be conductively isolated or spaced apart from each other.

Each of the connecting springs 1281 may include a first coupler 31 coupled to the second terminal 1262 of the fourth circuit board 1260, a second coupler 32 coupled to the support member 1220, and a connector 33 connecting the first coupler 31 to the second connector 32.

The first coupler 31 of the connecting spring 1281 may be supported by the holder 1270. For example, the first coupler 31 may be disposed on the second surface 1070B of the holder 1270, and may be supported by the second surface 1070B of the holder 1270.

For example, the first coupler 31 may be disposed on the second surface 1070B of the holder 1270 adjacent to at least one groove 1272 in the holder 1270.

For example, the first coupler 31 may include a first portion 31*a*, which is supported by the holder 1270 and is connected to the connector 33, and a second portion 31*b*, which is connected to the first portion 31*a* and is coupled to the second terminal 1262 of the fourth circuit board 1260.

For example, the first portion 31*a* of the first coupler 31 may overlap the second surface 1070B of the holder 1270 in the optical-axis direction, and the second portion 31*b* may not overlap the second surface 1070B of the holder 1270 in the optical-axis direction. At least a portion of the second portion 31*b* of the first coupler 31 may overlap the second terminal 1252 of the fourth circuit board 1260 in the optical-axis direction. For example, the second portion 31*b* may project in a direction toward the second terminal 1252 of the fourth circuit board 1260 from the inner surface of the holder 1270.

The second coupler 32 may be coupled to one end (for example, the lower end) of the support member 1220 via the solder 1902 or a conductive adhesive member. For example, the second coupler 32 may be disposed so as to overlap the hole 1270A in the holder 1270 in the optical-axis direction. The second coupler 32 may have a hole 32A through which the support member 1220 extends.

One end of the support member 1220, which has passed through the hole 32A in the second coupler 32, may be directly coupled to the second coupler 32 via a conductive adhesive member or the solder 1902, whereby the second coupler 32 may be conductively connected to the support member 1220.

For example, the second coupler 32, which is a region at which the solder 1902 is disposed so as to be coupled to the support member 1220, may include the hole 32A and a region around the hole 32A. Although the second coupler 32 may be configured to have a circular shape, the disclosure is not limited thereto. In another embodiment, the second coupler 32 may be configured to have a polygonal shape (for example, a quadrangular shape) or an elliptical shape.

The second coupler 32 and the connector 33 may overlap the groove 1272 in the holder 1270 in the optical-axis direction. For example, the second coupler 32 and the connector 33 may be disposed in the groove 1272 in the holder 1270. For example, the second coupler 32 and/or the connector 33 may be disposed so as to be spaced apart from the holder 1270.

For example, the connective elastic member 1280 may include four groups 1001A, 1002A, 1003A and 1004A, which correspond to the four side portions (the lateral side surfaces) of the fourth circuit board 1260 or the four side portions (or the lateral side surfaces) of the holder 1270.

Each of the plurality of groups 1001A, 1002A, 1003A and 1004A may include a plurality of connecting springs 1001-1 to 1001-9, 1002-1 to 1002-9, 1003-1 to 1003-9, and 1004-1 to 1004-9.

Furthermore, the terminals 262 of the fourth circuit board 1260 may be sorted into a plurality of groups corresponding to the groups 1001A to 1004A of the connective elastic member 1280. Each of the plurality of groups of the fourth circuit board 1260 may include a plurality of terminals P1 to P9, S1 to S9, R1 to R9, or Q1 to Q9.

For example, each of the plurality of terminals P1 to P9, S1 to S9, R1 to R9, and Q1 to Q9 of the fourth circuit board 1260 may be coupled to a corresponding one of the plurality of connecting springs 1001-1 to 1001-9, 1002-1 to 1002-9, 1003-1 to 1003-9, and 1004-1 to 1004-9 via solder.

The description of the groups 1A, 2A, 3A, and 4A of the connective elastic member 280 shown in FIG. 15 may be applied to the plurality of groups 1001A, 1002A, 1003A, and 1004A of the connective elastic member 1280 shown in FIG. 43 with or without modification.

Referring to FIG. 41, the connective elastic member 1280 may further include a body 1085A and an insulation member 1285 including an extension 1085B. The connective elastic member 1280 may further include one or more dummy members (or dummy patterns) 1028-1 to 1028-4. The description of the insulation member 285 and the dummy members 28-1 to 28-4 may be applied to the insulation member 1285 and the dummy members 1028-1 to 1028-4, with or without modification.

For example, the insulation member 1285 may support the connecting springs 1001-1 to 1001-9, 1002-1 to 1002-9, 1003-1 to 1003-9, and 1004-1 to 1004-9, and may be coupled or attached to the second surface 1070B of the holder 1270.

For example, the insulation member 1285 may have therein a bore or a cavity. The bore or the cavity in the insulation member 1285 may correspond to, overlap, or be aligned with the bore 1800A in the first circuit board 1800, the bore 1501 in the third circuit board 1250, and the bore 1071 in the holder 1270 in the optical-axis direction.

For example, the body 1085A may have a bore or a cavity, which corresponds to, overlaps or is aligned with at least one of the bore 1800A in the first circuit board 1800, the bore 1501 in the third circuit board 1250, and the bore 1071 in the holder 1270 in the optical-axis direction.

The extension 1085B may extend toward the outer surface of the holder 1270 from the body 1085A. For example, the extension 1085B may be disposed so as to surround the groove 1272 in the holder 1270.

The support member 1220 may conductively connect the first circuit board 1800 to the connective elastic member 1280.

The support member 1220 may include a plurality of groups corresponding to the groups 1001A, 1002A, 1003A, and 1004A of the connective elastic member 1280. Each of the plurality of groups of the support member may include a plurality of support members (or wires).

For example, the support member 1220 may include a plurality of support members corresponding to the plurality of connecting springs. The support member 1220 may be alternatively referred to as a "wire".

The support member 1220 may be coupled at one end thereof to the first circuit board 1800 and at the other end thereof to the second coupler 32 of the connecting spring 1281.

For example, the one end of the support member 1220 may extend through the hole 1800B in the first circuit board 1800 and may be coupled to the first surface (for example, the upper surface) 1044A of the first circuit board 1800 via the first solder 1901, and the other end of the support member 1220 may extend through the hole 32A in the second coupler 32 of the connecting spring 1281 and may be coupled to the lower portion or the lower surface of the second coupler 32 via the first solder 1901. For example, the one end of the support member 1220 may be coupled and conductively connected to the terminal 1800B of the first circuit board 1800.

The support member 1220 may extend through the escape region 1041 of the housing 1450, the hole 1250A in the third circuit board 1250 and the hole 270A in the holder 1270, and may avoid spatial interference with the housing 1450, the second circuit board 1250, and the holder 1270.

The support member 1220 may be embodied as a member that is conductive and confers elastic support, for example, a suspension wire, a leaf spring, or a coil spring.

The image sensor unit 1350 may further include the filter 1610. The image sensor unit 1350 may further include a filter holder 1600 in which the filter 1610 is disposed, seated or received. The filter holder 1600 may be alternatively referred to as a "sensor base".

The filter 1610 may serve to prevent light in a certain frequency range, among the light that passes through the lens barrel 1400, from being incident on the image sensor 1810. The description of the filter shown in FIG. 9 may be applied to the filter 1610 with or without modification.

For example, the filter holder 1600 may be disposed under the AF operation unit 1100. For example, the filter holder 1600 may be disposed above the fourth circuit board 1260.

The filter holder 1600 may be coupled to a region of the fourth circuit board around the image sensor 1810, and may be exposed through the bore 1800A in the first circuit board 1800 and the bore 1501 in the third circuit board 1250. For example, the filter holder 1600 may be visible through the bore 1800A in the first circuit board 1800 and the bore 1501 in the third circuit board 1250.

For example, the filter holder may be coupled to a region of the first surface (for example, the upper surface) around the seating region 1260A of the fourth circuit board 1260. Although the seating region 1260A may be the same surface as the first surface of the fourth circuit board 1260 in FIG.

39A, the disclosure is not limited thereto. In another embodiment, the seating region 1260A may be a groove or a projection.

The bore 1501 in the third circuit board 1250 may expose the filter holder 1600 disposed at the fourth circuit board 1260 and the filter 1610 disposed at the filter holder 1600 therethrough.

The filter holder 1600 may have a bore 1061A formed in a region in which the filter 1610 is mounted or disposed in order to allow the light that has passed through the filter 1610 to be incident on the image sensor 1810. The bore 1061A in the filter holder 1600 may have the form of a through hole which is formed through the filter holder 1600 in the optical-axis direction. For example, the bore 1061A in the filter holder 1600 may be formed through the center of the filter holder 1600 so as to correspond to or face the image sensor 1810. The filter holder 1600 may have a seating portion 1500, which is depressed from the upper surface thereof so as to receive therein the filter 1610. The filter 1610 may be disposed, seated or mounted in the seating portion 1500. The seating portion 1500 may be configured to surround the bore 1061A. In another embodiment, the seating portion 1500 of the filter holder 1600 may be configured to have the form of a projection projecting from the upper surface of the filter 1610.

The image sensor 1350 may further include an adhesive member 1612 disposed between the filter 1610 and the seating portion 1500. Accordingly, the filter 1610 may be coupled or attached to the filter holder 1600 via the adhesive member 1612. For example, the adhesive members 1612 and 1061 may be epoxy, thermohardening adhesive, or ultraviolet-hardening adhesive.

The camera module 1010 may further include the cover member 1300 and the base 1210 in order to receive the AF operation unit 1100 and the image sensor unit 1350 therein, protect the AF operation unit 1100 and the image sensor unit 1350 from external impacts, and prevent the introduction of foreign substances from the outside.

The cover member 1300 may be configured to have the form of a box, which is open at the lower surface thereof and includes the upper plate 1301 and the side plates 1302. The lower portions of the side plates 1302 of the cover member 1300 may be coupled to the base 1210. The upper plate 1301 of the cover member 1300 may be configured to have a polygonal shape, for example, a quadrangular shape or an octagonal shape.

The cover member 1300 may have a bore 1303 formed in the upper plate 1301 thereof through which the lens (not shown), coupled to the bobbin 1110 is exposed to external light. One of the side plates 1302 of the cover member 1300 may be provided with a hole 1304 through which the terminal member 1905 of the circuit board 1190 is exposed.

The base 1210 may be disposed under the holder 1270. The base 1210 may have a shape that coincides with or corresponds to the cover member 1300, for example, a quadrangular shape.

For example, although the base 1210 may have the bore having the form of a through hole which is formed through the base 1210 in the optical direction, the bore may be omitted in another embodiment.

The base 1210 may have a step 1211 (see FIG. 44A) to which adhesive is applied when the cover member 1300 is adhesively fixed thereto. Here, the step 1211 may guide the side plates 1302 of the cover member 1300 coupled thereto. The step 1211 of the base 1210 may be attached or fixed to the lower ends of the side plates 1302 of the cover member 1300 using an adhesive or the like.

Although the lower portion or the lower side of the base 1210 may be closed or blocked by the bottom cover 1219, the disclosure is not limited thereto. In another embodiment, the bottom cover 1219 may be omitted.

The stationary part and the movable part of the image sensor unit 1350 according to an embodiment will be described with regard to OIS operation.

The image sensor unit 1350 may include the stationary part, the movable part (or the moving part), and the elastic support member 1220 and 1280 configured to couple and connect the stationary part to the movable part. The movable part may be alternatively referred to as an "OIS movable part" (or "OIS-moving part"). The OIS movable part may be movable in a direction perpendicular to the optical axis OA with respect to the stationary part.

By virtue of the elastic support member 1220 and 1280, the OIS movable part, which is disposed under the OIS stationary part, may be positioned in the state of being spaced apart from the stationary part by a predetermined distance. In other words, the movable part may be movable relative to the stationary part by the electromagnetic force resulting from the interaction between the magnet 1023 and the coil in the state in which the movable part is suspended from the stationary part via the support member 1220.

One end of the elastic support member 1220 and 1280 (for example, one end of the support member 1220) may be coupled to the first circuit board 1800, and the other end of the elastic support member 1220 and 1280 (for example, the first coupler 31 of the connecting spring 1281) may be coupled to the second circuit board 1900, for example, the fourth circuit board 1260.

Via the elastic support member 1220 and 1280, the first circuit board 1800 may be conductively connected to the second circuit board 1900, for example, the fourth circuit board 1260.

The OIS movable part may be movable relative to the stationary part in a direction perpendicular to the optical axis by the electromagnetic force resulting from the interaction between the second coil 1230 and the magnet 1023.

For example, by virtue of the interaction between the magnet 1023 and the coil 1230, the image sensor 1810 may be shifted or tilted in a direction perpendicular to the optical axis OA, or may be rotated about the optical axis OA. For example, the optical-axis direction may be a direction perpendicular to one surface of the image sensor 1810. For example, the one surface of the image sensor 1810 may be the upper surface of the image sensor 1810. Alternatively, the one surface of the image sensor 1810 may be a surface that corresponds to or faces the lower surface of the lens module 1400 or the filter 1610. For example, the one surface of the image sensor 1810 may be an active region.

By virtue of the support member 1220 and the connective elastic member 1280, the OIS movable unit may be elastically supported, and may be movable in a direction perpendicular to the optical axis.

The stationary part may include the first circuit board 1800, the housing 1450, and the magnet 1023. Furthermore, the stationary part may include at least one of the base 1210, the cover member 1300, and the bottom cover 1219. Furthermore, the stationary part may include elements coupled to the first circuit board 1800, for example, the motion sensor 1820 and the capacitor.

The OIS movable part may include the third circuit board 1250, the second coil 1230, the fourth circuit board 1260, and the image sensor 1810. Furthermore, the OIS movable part may include the holder 1270.

Furthermore, the OIS movable part may include elements coupled to the third circuit board 1250, for example, the second position sensor 1240, the motion sensor 1820, the controller 1830, the memory 1512, and the capacitor 1514. Furthermore, the OIS movable part may include the filter holder 1600 and the filter 1610.

For example, the OIS movable part may include the fourth circuit board 1260 coupled to the connective elastic member 1280, the image sensor 1810 and the third circuit board 1260 coupled to the fourth circuit board 1260, and the holder 1270 coupled to the third circuit board 1250, and may be elastically supported by the support member 1220 and the connective elastic member 1280.

The magnet 1023 may be disposed at the stationary part, and the second coil 1230 may be disposed at the OIS movable unit. The OIS movable part may be moved or tilted relative to the stationary part by the electromagnetic force resulting from the interaction between the magnet 1023 and the second coil 1230.

Referring to FIGS. 46 and 47, in order to allow the OIS movable part to be moved or tilted relative to the stationary part by the electromagnetic force resulting from the interaction between the magnet 1023 and the second coil 1230, the OIS movable part may be spaced apart from the OIS stationary part.

For example, the holder 1270, the second circuit board 1900, and the image sensor 1810 may be spaced apart from the first circuit board 1800, the housing 1450, and the base 1210.

For example, at the initial position of the OIS movable part, the outer surface of the holder 1270 may be spaced apart from the inner surface of the base 1210 by a predetermined distance dl.

Furthermore, at the initial position of the OIS movable part, the lower surface of the holder 1270 and the lower surface of the fourth circuit board 1260 may be spaced apart from the front surface (or the upper surface) of the base 1210 by a predetermined distance H1. For example, at the initial position of the OIS movable part, the lower surface of the holder 1270 and the lower surface of the fourth circuit board 1260 may be spaced apart from the front surface (or the upper surface) of the bottom cover 1219.

For example, at the initial position of the OIS movable part, the solder 1902 may be spaced apart from the front surface (or the upper surface) of the bottom cover 1219 by a predetermined distance H2. Furthermore, at the initial position of the OIS movable part, the solder 1902 may be spaced apart from the front surface (or the upper surface) of the base 1210.

The initial position of the OIS movable unit may be the original position of the OIS movable part in the state in which no electric power or drive signal is applied to the second coil 1230 or the position at which the OIS movable unit is located as the result of the support member 1220 and the connective elastic member 1280 being elastically deformed due only to the weight of the OIS movable part.

In addition, the initial position of the OIS movable part may be the position at which the OIS movable part is located when gravity acts in the direction from the first circuit board 1800 to the third circuit board 1250 or when gravity acts in the direction from the third circuit board 1250 to the first circuit board 1800.

Figure 49:
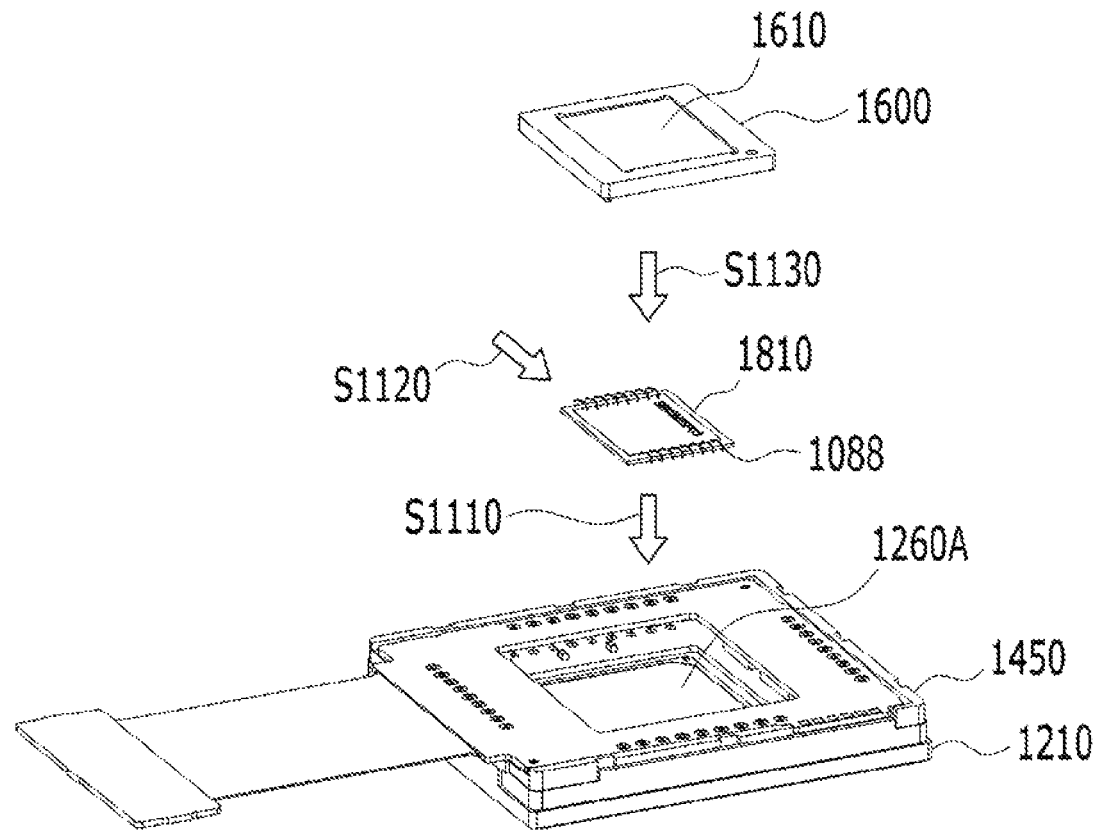
FIG. 49 is a view illustrating a process of mounting the image sensor, the filter holder, and the filter to the fourth circuit board.

FIG. 49 illustrates a process of mounting the image sensor 1810, the filter holder 1600, and the filter 1610 to the fourth circuit board 1260.

Referring to FIG. 49, the image sensor 1810 may be first coupled, fixed, or attached to the seating region 1260A of the fourth circuit board 1260 through die bonding (S110).

Although the image sensor 1810 may be one of a charge-coupled device (CCD), a metal oxide semiconductor MOS, a CPD image sensor, and a CID image sensor, the disclosure is not limited thereto.

Subsequently, the image sensor 1810 may be bonded to the fourth circuit board 1260 via a wire 1088 such that the image sensor 1810 is conductively connected to the fourth circuit board 1260 (S120).

Subsequently, the filter holder 1600 with the filter 1601 mounted thereon may be mounted on the third circuit board 1260 via the adhesive member 1061 (S130). For example, the filter 1610 may be coupled to the filter holder 1600 via the adhesive member 1612, and then the filter holder 1600 may be coupled to the fourth circuit board 1260. In another embodiment, the filter holder 1600 may be coupled to the fourth circuit board 1260, and then the filter 1610 may be coupled to the filter holder 1600.

In a comparative example, the image sensor may be mounted on an additional sensor board, and then the sensor board may be connected to the fourth circuit board.

In the comparative example, the sensor board may be connected to the fourth circuit board through soldering. The soldering is an additional process, and makes it difficult to connect the sensor board to the fourth circuit board. Furthermore, in the comparative example, noise may be generated at the image sensor and the image sensor may be influenced by the noise during the process of soldering the sensor board to the fourth circuit board. In addition, in the comparative example, due to tolerance stacking in the process of soldering the sensor board, there may be difficulties in alignment between the lens module and the image sensor and between the lens module and the cover member.

In the embodiment, the sensor board in the comparative example is fused to the fourth circuit board so as to realize a single integrated fourth circuit board 1260. In the example, the image sensor 1810 is moved to the fourth circuit board from above the image sensor unit 1350 and is then bonded to the fourth circuit board 1260 through die bonding, and the image sensor is conductively connected to the fourth circuit board through wire bonding. Subsequently, the filter holder 1600 and the filter 1610 are moved to the fourth circuit board 1260 from above the image sensor unit 1350, and are coupled to the fourth circuit board 1260.

In comparison with the comparative example, the embodiment is able to simplify a process of assembling a camera. Furthermore, it is possible to reduce the number of soldering points in the signal path of the image sensor, and it is possible to prevent the image sensor from becoming inoperable or to suppress image noise.

In addition, in comparison with the comparative example, the embodiment is able to simplify an assembly process and thus to eliminate tolerance stacking. Therefore, it is also advantageous in managing alignment of the lens module 1400.

Furthermore, in comparison with the comparative example, the embodiment is able to offer effect of reducing material cost and manufacturing costs by reducing the number of components and the number of processes.

Although FIGS. 39A and 40 illustrate an embodiment in which the third circuit board 1250 and the fourth circuit board 1260 are separately provided and the terminal 1251 of the third circuit board 1250 and the terminal 1261 of the fourth circuit board 1260 are coupled to each other so as to conductively connect the third circuit board 1250 to the fourth circuit board 1260, the embodiment of the present invention is not limited thereto. In another embodiment, the third circuit board and the fourth circuit board may be integrally formed into a single board. Here, the terminal 1262 of the fourth circuit board may be formed on the rear surface of the single board, and may be coupled to the connective elastic member 1280.

The connective elastic member 280-1 shown in FIG. 22 may be another embodiment of the connective elastic member 1280. Accordingly, the description of the connective elastic member 280-1 shown in FIG. 22 may be applied to the connective elastic member 1280, with or without modification.

For example, the surface area of the bore 79 in the board portion 280A may be larger than the surface area of the second surface 1060B of the fourth circuit board 1260. For example, the bore in the board portion 280A may expose the second surface 1060B of the fourth circuit board 1260 and the terminal 262 of the fourth circuit board 1260 therethrough.

The board portion 280A may be disposed on the second surface 1070B of the holder 1270, and may be coupled or attached to the second surface 1070B of the holder 1270 via an adhesive member or the like.

In another embodiment, the image sensor unit 1350 shown in FIG. 29 may be applied in place of the image sensor unit 250 shown in FIG. 23. For example, the camera module 20 according to another embodiment may include the lens module 1400 and the image sensor unit 1350, and the description of FIG. 23 may be applied with or without modification.

For example, the lens module 1400 of the camera module 20 according to another embodiment may not be movable in the optical-axis direction, but may be fixed in the optical-axis direction. For example, in another embodiment, the lens module 1400 may not be movable in a direction perpendicular to the optical axis, and may be held in a direction perpendicular to the optical axis. The camera module 20 may further include the cover member 1300 shown in FIG. 29. For example, the lens module 1400 may be coupled, attached or fixed to the holder 1600 or the first circuit board 1800. For example, the lower portion, the lower end or the lower surface of the lens module 1400 may be coupled, attached or fixed to the upper surface of the holder 1600 or the upper surface of the first circuit board 1800. Alternatively, for example, the lens module 1400 may be coupled, attached or fixed to the cover member 1300.

With the development of camera technology, resolution of an image becomes high, and thus the size of an image sensor is being increased. Because the size of an image sensor is being increased, the size of a lens module and the size of an actuator for shifting the lens module are also being increased. Consequently, not only the weight of a lens module but also the weight of other actuator components for shifting the lens module also increase.

According to an embodiment of the present invention, autofocusing is performed using the AF operation unit (or the first actuator) 1100, which is operated in a lens shift manner, and optical image stabilization (OIS) is performed using the image sensor unit (or the second actuator) 1350, which is operated in an image sensor shift manner, thereby improving the reliability of the camera device.

The embodiment is able to perform 5-axis handshake correction using the sensor shift manner. For example, the 5-axis handshake may include two angular handshakes (for example, pitch and yaw), two shift handshakes (for example, x-axis shift and y-axis shift), and one rotational handshake (for example, roll).

Figures 50, 51:
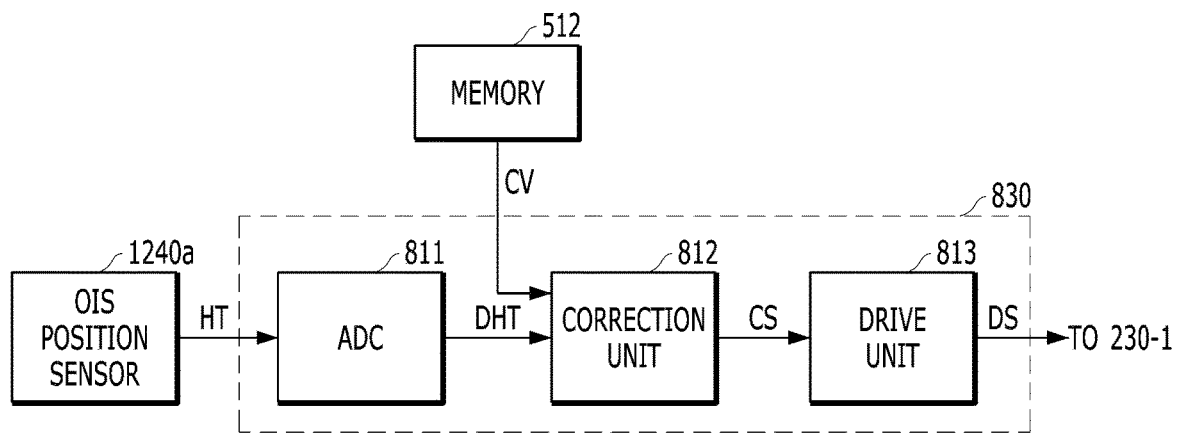
FIG. 50 is a view illustrating the controller according to an embodiment.
FIG. 51 is a view illustrating an embodiment of correction values stored in the memory.
Figures 52, 53:
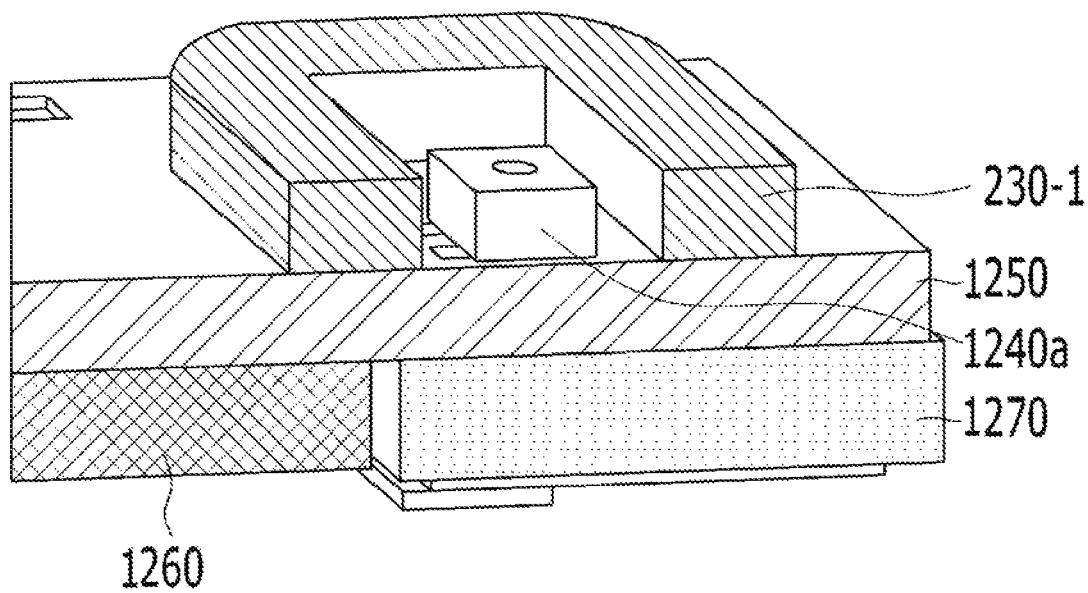
FIG. 52 is a view illustrating a method of setting the correction values shown in FIG. 51.
FIG. 53 illustrates another embodiment of the correction values stored in the memory.

FIG. 50 illustrates the controller 820 according to an embodiment. FIG. 51 illustrates an embodiment of correction values stored in the memory 1512. FIG. 52 is a view illustrating a method of setting the correction values shown in FIG. 51.

Referring to FIGS. 50 to 52, the controller 830 may include a correction unit 812 and a drive unit 813. The controller 830 may further include an analog-digital converter 811.

The controller 830 may receive the output of the OIS position sensor. The controller 830 may receive the correction values CV stored in the memory 1512. For example, the OIS position sensor may be the first sensor 1240a, the second sensor 1240b, or the third sensor 1240c.

For example, the output of the OIS position sensor may be an analog signal or a digital signal.

For example, when the OIS position sensor is composed of only a Hall sensor, the output of the OIS position sensor may be an analog signal, and the controller 830 may further include the analog-digital converter 811, configured to convert the output of the OIS position sensor, which is an analog signal, into a digital signal (or a digital value). Hereinafter, the digital value may be alternatively referred to as a "digital code".

For example, when the OIS position sensor is a driver IS including a Hall sensor, the output of the OIS position sensor may be a digital signal or a digital value, and the analog-digital converter 811 may be omitted.

The correction unit 812 may correct the output of the OIS position sensor based on the correction value CV received from the memory 1512.

For example, the correction unit 812 may output the result CS obtained by subtracting the correction value CV from the output of the OIS position sensor. In another embodiment, the correction unit 812 may output the result obtained by adding the correction value CV to the output of the OIS position sensor. The reason for this is to eliminate the output of the OIS position sensor caused by influence or interference of a magnetic field of the OIS coil 1230. Here, the OIS coil 1230 may be a coil corresponding to the OIS position sensor. For example, the first OIS coil unit 1230-1 may correspond to the first sensor 1240a, the second OIS coil unit 1230-2 may correspond to the second sensor 1240b, and the third OIS coil unit 1230-3 may correspond to the third sensor 1240c.

For example, although the correction unit 812 may include at least one of a logical gate, a comparator, a subtractor, and an adder, the disclosure is not limited thereto. The correction unit 812 may have any other construction, as long as it has a circuit construction capable of changing or correcting the output of the OIS position sensor based on the correction value CV.

The drive unit 813 may receive the output CS of the correction unit 812, control a drive signal DS for driving the OIS coil 1230 corresponding to the OIS position sensor based on the received output of the correction unit 812, and supply the controller drive signal DS to the OIS coil 1230.

Referring to FIG. 51, the memory 1512 may store therein correction values corresponding to drive values for driving the OIS coils 1230-1, 1230-2 and 1230-3. The correction values may be stored in the form of a lookup table. Here, the drive value may be alternatively referred to as a "drive code value", a "code value" or a "control value".

The drive values for driving the OIS coils 1230-1, 1230-2 and 1230-3 may include drive code values (A1 to An, n being a natural number or a rational number greater than 1) corresponding to an OIS stroke range. For example, the drive value may be a digital value or a digital code, which is composed of K bits (K, for example, being a natural number or a rational number greater than 1). Here, the OIS stroke may be a displacement of the OIS movable part in a direction perpendicular to the optical axis, and the OIS stroke range may be a moving range (or a moving region) of the OIS movable part in a direction perpendicular to the optical axis.

The correction value may include correction code values (C1 to Cn) corresponding to the drive code values (A1 to An, n being a natural number or a rational number greater than 1).

When drive current is applied to the OIS coil (for example, 1230-1) corresponding to the drive values A1 to An under the condition that the magnets (for example, 1023A to 1023D) are not present, a magnetic field may be generated from the OIS coil (for example, 1230-1) by the applied drive current. The OIS position sensor (for example, 1240*a*) may output the output (or the output signal) corresponding to the result of detection of the magnetic field of the OIS coil (for example, 1230-1).

Here, the output of the first sensor 1240*a* may be caused by the magnetic field, which is generated by the applied drive current. Because the magnetic field is an undesired factor, which impedes correct OIS operation, it is preferable to eliminate the magnetic field for the purpose of correct OIS operation.

The correction values C1 to Cn may be set based on the output of the first sensor 1240*a*. For example, the correction values C1 to Cn may be outputs of the position sensor corresponding to the result of detection of the magnetic field of the OIS coil (for example, 1230-1), and may be digital values.

Although FIG. 52 illustrates the first sensor 1240*a* and the first OIS coil 1230-1 corresponding to the first sensor 1240*a*, the description thereof may be applied to the second sensor 1240*b* and the second OIS coil 1230-2 corresponding to the second sensor 1240*b* and the third sensor 1240*c* and the third OIS coil 1230-3 corresponding to the third sensor 1240*c*.

For example, although the memory 1512 may include a lookup table storing therein correction values respectively corresponding to the first to third OIS position sensors 1240*a*, 1240*b* and 1240*c*, the disclosure is not limited thereto. In another embodiment, it is possible to correct the respective outputs of the first to third sensors 1240*a*, 1240*b* and 1240*c* using the single lookup table shown in FIG. 52.

Figure 54:
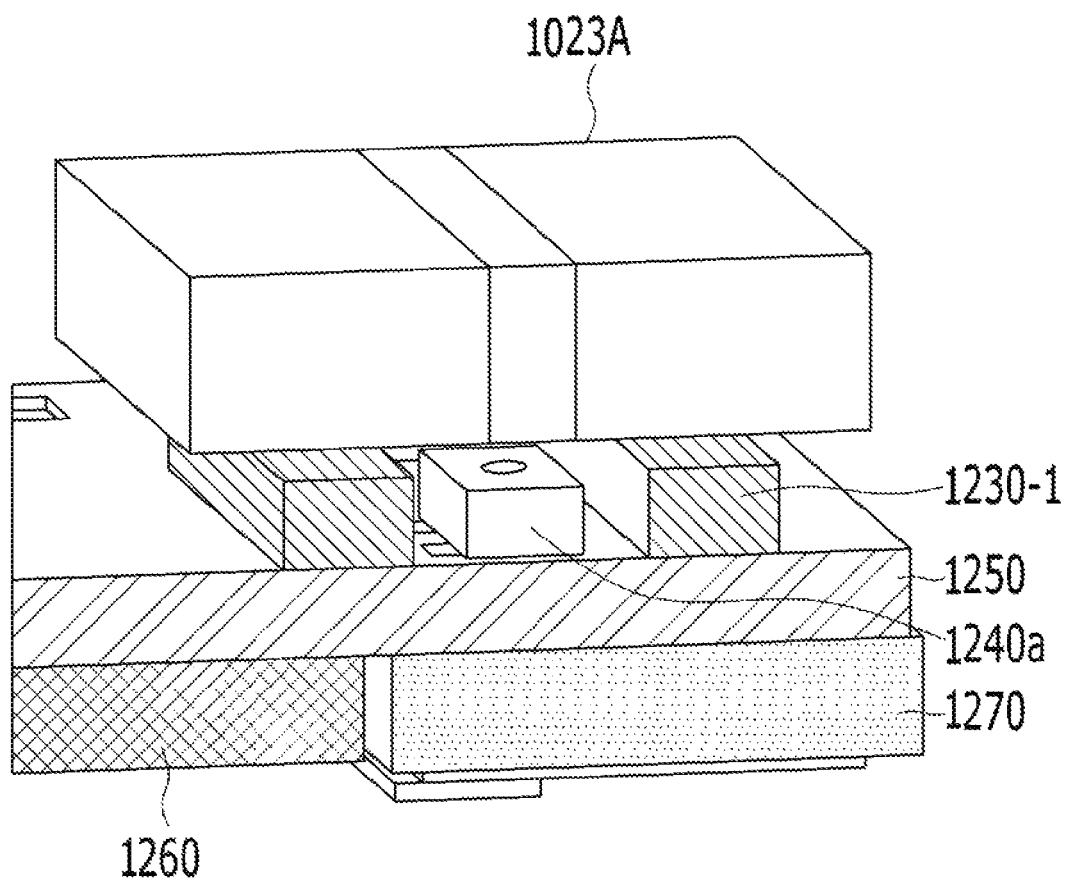
FIG. 54 is a view illustrating a method of setting the correction values shown in FIG. 53.

FIG. 53 illustrates another embodiment of the correction values CV1 stored in the memory 1512. FIG. 54 is a view illustrating a method of setting the correction values CV1 shown in FIG. 53. Although the correction value CV is set in the state in which the magnets 1023A to 1023D are removed from the camera module 1010 in FIG. 52, the correction values CV1 may be set in the state in which the magnets 1023A to 1023D are provided in the camera module 1010 in FIG. 54.

First, at the initial position of the OIS movable part, the OIS position sensor (for example, 1240*a*) may detect the intensity of the magnetic field of the magnet (for example, 1023A) corresponding to the OIS position sensor (for example, 1240*a*), and may output the output corresponding to the result of the detection. The digital value M1 or the digital code corresponding to the output of the OIS position sensor (for example, 1240*a*) at the initial position of the OIS movable part may be stored in the memory 1512.

M1 may be the output of the OIS position sensor (for example, 1240*a*) caused by the magnetic field of the magnet (for example, 1023A) in the state in which no drive signal is applied to the OIS coils 1230-1 to 1230-4.

For example, the output of the OIS position sensor at the initial position of the OIS movable part may be a digital value, and the digital value may be converted from an analog signal.

For example, the correction value CV1 may be referred to as a "first correction value", and M1 may be referred to as a "second correction value". The memory 1512 may store therein the first correction value CV1 and the second correction value M1. The first correction value CV1 and the second correction value M1 may be digital values or digital codes, and may be stored in the form of a lookup table in the memory 1512.

Subsequently, the magnet (for example, 1023A) provided in the camera module 1010 may be fixed so as to be immobile by means of a fixing device such as a jig. When drive current corresponding to the drive values A1 to An is applied to the OIS coil (for example, 1230-1), a magnetic field may be generated from the OIS coil (for example, 1230-1) by the drive current applied thereto.

The position sensor (for example, 1240*a*) may output an output (or an output signal) corresponding to the result of detection of a first magnetic field and a second magnetic field.

For example, the first magnetic field may be the magnetic field of the magnet (for example, 1023A) at the initial position of the OIS movable part, and the second magnetic field may be the magnetic field of the OIS coil (for example, 1230-1) generated by drive current corresponding to the drive values A1 to An.

The first correction value CV1 may be set based on the output of the first sensor 1240*a*. For example, the first correction value CV1 may be the output of the OIS position sensor (for example, 1240*a*) corresponding to the result of detection of the magnetic field of the magnet (for example, 23A) at the initial position of the OIS movable part and the magnetic field of the OIS coil (for example, 1230-1) generated by drive current corresponding to the drive values A1 to An, and may be a digital value.

For example, the first correction values B1 to Bn may be values obtained by adding the output of the OIS position sensor (for example, 1240*a*) caused by the first magnetic field to the output of the OIS position sensor (for example, 1240*a*) caused by the second magnetic field.

In another embodiment, the memory 1512 may store therein a third correction value. The third correction value may be one of values (B1-M1 to Bn-M1) obtained by subtracting the second correction value M1 from the first correction value CV1.

Although FIG. 53 illustrates the first sensor 1240*a* and the first OIS coil 1230-1 corresponding to the first sensor 1240*a*, the description thereof may be applied to the second sensor 1240*b* and the second OIS coil 1230-2 corresponding to the second sensor 1240*b* and the third sensor 1240*c* and the third OIS coil 1230-3 corresponding to the third sensor 1240*c*, with or without modification.

Figure 55:
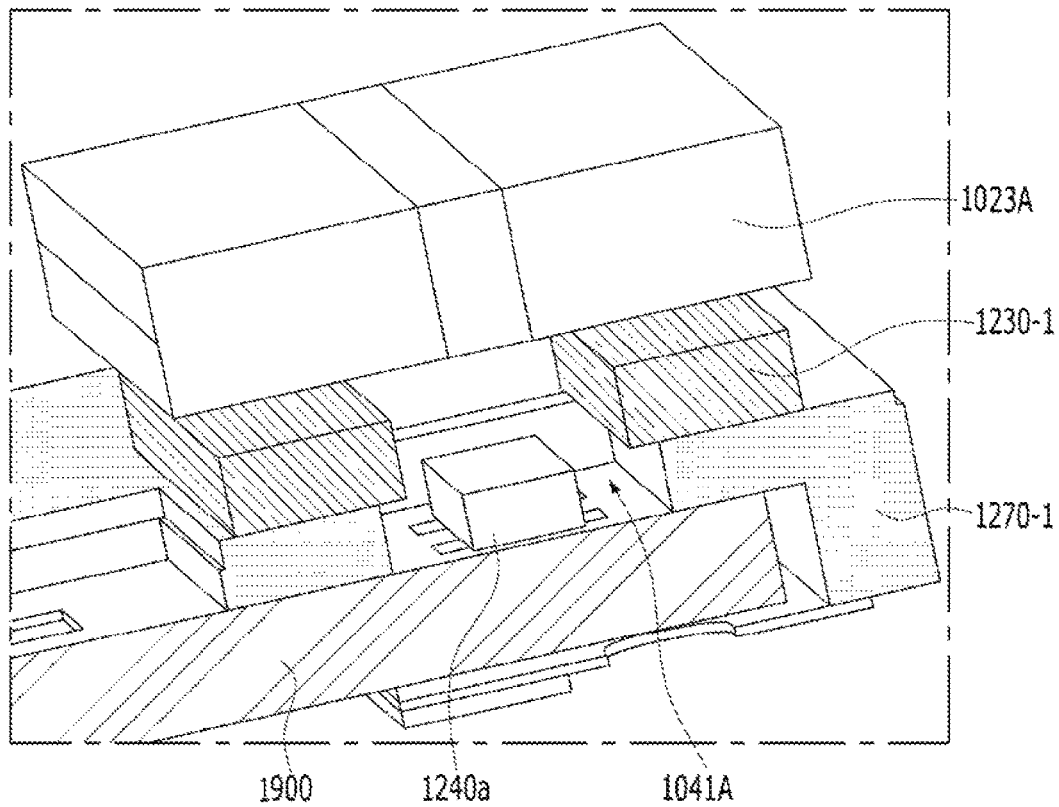
FIG. 55 is a view illustrating disposition of the OIS position sensor according to another embodiment.

FIG. 55 illustrates disposition of the OIS position sensor 1240*a* according to another embodiment. The description of the OIS position sensor 1240*a* shown in FIG. 55 may be applied to other sensors 1240*b* and 1230*c*, with or without modification.

Referring to FIG. 55, the OIS position sensor (for example, 1240a) may be disposed under a corresponding OIS coil (for example, 1230-1). The reason for this is to reduce the influence on the output of the position sensor caused by the magnetic field of the OIS coil unit (for example, 1230-1).

For example, the OIS position sensor 1240a may not overlap the OIS coil unit 1230-1 in a direction perpendicular to the optical-axis direction. For example, the OIS position sensor (for example, 1240a) may be disposed under the second circuit board 1900, and may not overlap the OIS coil unit (for example, 1230-1) in the optical-axis direction.

The embodiment shown in FIG. 55 may include a holder 1270-1 in place of the holder 1270 shown in FIG. 39A.

The holder 1270-1 may be disposed under the first circuit board 1800. The holder 1270-1 may be disposed so as to be spaced apart from the first circuit board 1800, and the holder 1270 may be coupled to the second circuit board 1900.

The holder 1270-1 may receive or support the second coil 1230. The holder 1270-1 may serve to support the second coil 1240 in order to space the second coil 1230 apart from the second circuit board 1900.

For example, the lower portion, the lower surface, or the lower end of the holder 1270-1 may be coupled to the upper portion, the upper surface, or the upper end of the second circuit board 1900.

The holder 1270-1 may have a hole 1041A corresponding to the OIS position sensor 1240. For example, the holder 1270-1 may have the hole 1041A formed at a position corresponding to each of the first to third sensors 1240a, 1240b, and 1240c. For example, the hole 1041A may be a through hole formed through the holder 1270-1. The OIS position sensor 1240 may be disposed in the hole 1041A in the holder 1270-1.

Although the influence on the output of the OIS position sensor caused by the magnetic field of the OIS coil unit (for example, 1230-1) is reduced in the embodiment shown in FIG. 55, the output may still be influenced by the magnetic field. Accordingly, for more accurate OIS feedback operation, the description of FIGS. 50 to 54 and FIGS. 56 to 58 may also be applied to the embodiment shown in FIG. 55.

In another embodiment, the description of FIGS. 50 to 54 and FIGS. 54 to 58 may be applied to the embodiment shown in FIGS. 1 to 27, with or without modification.

Figure 56:
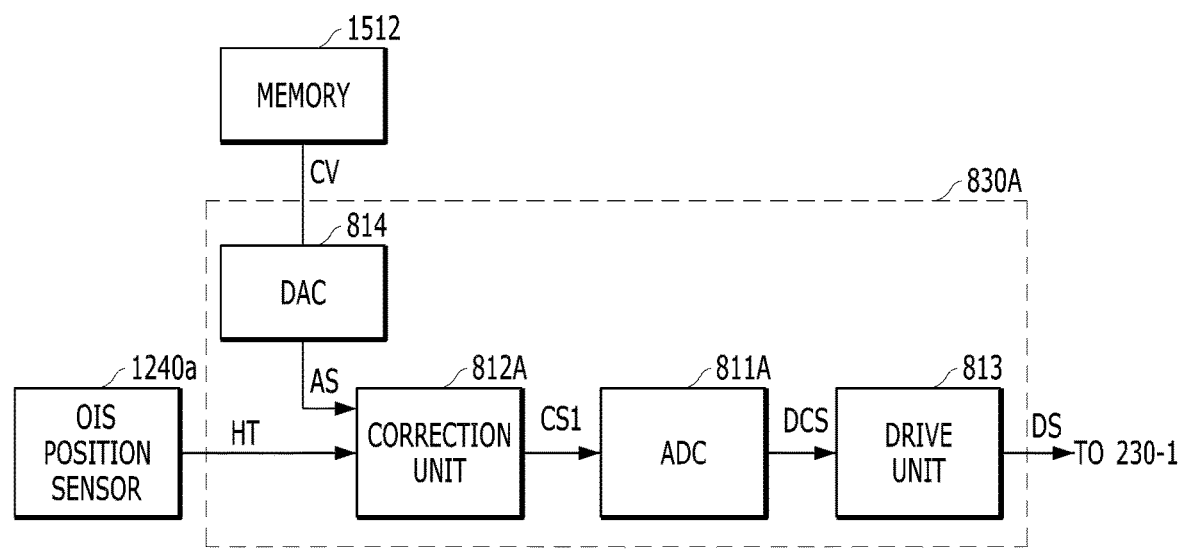
FIG. 56 is a view illustrating a controller according to another embodiment.

FIG. 56 illustrates a controller 830A according to another embodiment.

Referring to FIG. 56, the controller 830A may include a correction unit 812A, an analog-digital converter (ADC) 811A, the drive unit 813, and a digital-analog converter (DAC) 814.

When the output of the first sensor 1240a is an analog signal (for example, an analog voltage or current), the correction unit 812A may receive the output of the OIS position sensor 1240a, which is an analog signal.

The digital-analog converter (DAC) 814 may receive the correction value CV, CV1 from the memory 1512, and may create an analog signal AS using the received correction value CV, CV1.

The correction unit 812A may receive the output of the OIS position sensor (for example, 1240a) and the output of the digital-analog converter 814, which correspond to the drive values (for example, A1 to An).

For example, the correction unit 812A may output the difference between the output of the OIS position sensor (for example, 1240a) and the output of the digital-analog converter 814.

For example, the correction unit 812A may output the result CS1 obtained by subtracting the output AS of the digital-analog converter 814 from the output HT of the OIS position sensor (for example, 1240a). For example, the correction unit 812A may be embodied as a comparator, a differential amplifier, an operational amplifier, or the like.

For example, the correction unit 812A may perform differential amplification of the output HT of the OIS position sensor (for example, 1240a) and the output AS of the digital-analog converter 814, and may output the differential-amplified signal CS1.

The analog-digital converter 811A may perform analog-digital conversion on the output CS1 of the correction unit 812A, and may output the digital value DCS or the digital code corresponding to the result of the analog-digital conversion.

The drive unit 813 may receive the output DCS of the analog-digital converter 811A, may control the drive signal DS for activating the OIS coil 230 corresponding to the OIS position sensor based on the received output DCS, and may supply the controlled drive signal DS to the OIS coil 230.

The description of FIGS. 50 and 56 may be applied to other position sensors 1240b and 1240c.

Figure 57:
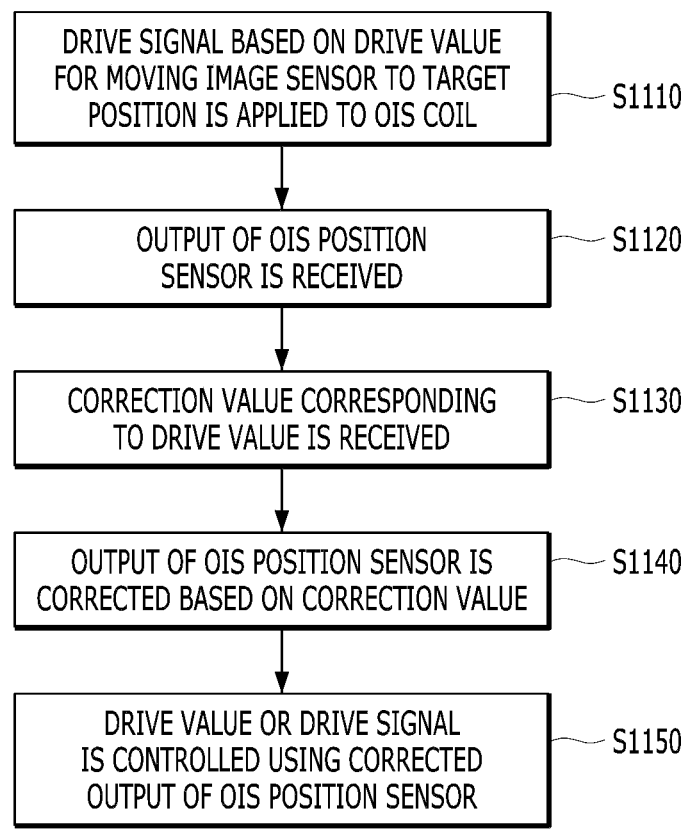
FIG. 57 is a flowchart illustrating the operation of the controller according to an embodiment.

FIG. 57 is a flowchart illustrating the operation of the controller 830, 830A according to an embodiment.

Referring to FIG. 57, the controller 830, 830A applies or supplies a drive signal, corresponding to a drive value (for example, A2) for moving the OIS drive unit, for example, the image sensor 1810, to a target position in the OIS stroke range, to the OIS coil unit (for example, 1230-1) (S1110).

The controller 830, 830A receives the output of the OIS position sensor (for example, 1240a) corresponding to the OIS coil unit (for example, 1230-1) (S1120).

The controller 830, 830A receives the correction value (for example, C2) corresponding to the drive value (for example, A2) from the memory 1512 (S1130).

The controller 830, 830A corrects the output of the OIS position sensor (for example, 1240a) based on the correction value (for example, H2) (S1140).

For example, the controller 830, 830A may subtract the correction value (for example, C2) from the output of the OIS position sensor (for example, 1240a), and may output the result of subtraction.

FIG. 58 is a table illustrating an embodiment of correcting the output of the OIS position sensor (for example, 1240a). FIG. 58 may utilize the lookup table shown in FIG. 51.

Referring to FIG. 58, the controller 830, 830A may subtract the correction values C1 to Cn stored in the lookup table from the outputs H1 to Hn of the OIS position sensor (for example, 1240a) corresponding to the drive values A1 to An, and may output the result of subtraction (H1-C1 to Hn-Cn).

FIG. 59 is a table illustrating another embodiment of correcting the output of the OIS position sensor (for example, 1240a). FIG. 59 may utilize the lookup table shown in FIG. 53.

Referring to FIG. 59, the controller 830, 830A may correct the outputs H1 to Hn of the OIS position sensor (for example, 1240a) corresponding to the drive values A1 to An using the first correction values B1 to Bn and the second correction value stored in the lookup table, and may output the result of correction.

For example, the controller 830, 830A may subtract the first correction values B1 to Bn from the outputs H1 to Hn of the OIS position sensor (for example, 1240a) corresponding to the drive values A1 to An, and may output the values H1−B1+M1 to Hn−Bn+M1, which are obtained by adding the second correction value M1 to the result of subtraction.

In another embodiment, the controller 830, 830A may correct the outputs H1 to Hn of the OIS position sensor (for example, 1240*a*) corresponding to the drive values A1 to An using the third correction values shown in FIG. 53, and may output the result of correction.

For example, the controller 830, 830A may subtract the third correction values B1 to Bn from the outputs H1 to Hn of the OIS position sensor (for example, 1240*a*) corresponding to the drive values A1 to An, and may output the result of subtraction.

The controller 830, 830A controls the drive value or the drive signal for activating the OIS coil using the corrected output of the OIS position sensor (for example, 1240*a*) (S1150).

The memory 1512 may store therein the code values of the output of the OIS position sensor, which correspond to or match the displacements of the OIS movable part for OIS feedback operation.

For example, the memory 1512 may store therein the code values of the output of the OIS position sensor, which correspond to or match the displacements of the OIS movable part in the x-axis direction and the code values of the output of the OIS position sensor (for example, the second sensor 1240*b*), which correspond to or match the displacements of the OIS movable part in the y-axis direction.

Alternatively, for example, the memory 1512 may store therein the code values of the output of the OIS position sensor (for example, the third sensor 1240*c*), which correspond to or match the displacements of the OIS movable part in the x-axis direction or in the y-axis direction.

Figures 60, 61:
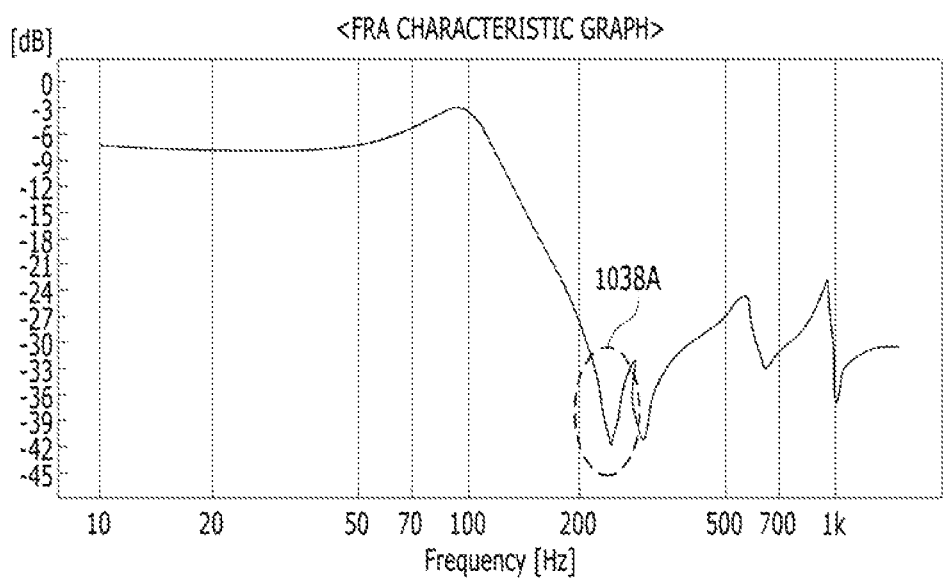
FIG. 60 is a view illustrating the code values of the output of the first sensor, which correspond to or match the displacements of the OIS movable part in the x-axis direction.
FIG. 61 is a view illustrating frequency response characteristics with respect to a drive signal input to the OIS coil unit and the output of the OIS position sensor.

FIG. 60 illustrates the code values Code 1 to Code n of the output of the first sensor 1240*a*, which correspond to or match the displacements DP1 to DPn of the OIS movable part in the x-axis direction.

When a drive signal is supplied to the coil unit (for example, 1230-1) by the drive values A1 to An through simulation or experimentation, the OIS movable part is moved, and the code value (or "coordinate code value") of the output of the first sensor 1240*a* that matches the displacement of the OIS movable part is obtained. This procedure is referred to as "calibration".

Furthermore, through the calibration, it is possible to obtain the code values of the output of the second sensor 1240*b*, which correspond to or match the displacements of the OIS movable part in the y-axis direction.

The displacements of the OIS movable part may be defined or determined by coordinate code values, which are created through the calibration, and the reliability of the coordinate code values may be ensured through repeated simulations and experimentation. The OIS feedback operation may be performed based on the reliable coordinate code values.

For example, the controller 830, 830A may compare the outputs of the OIS position sensor (for example, 1240*a*), which are corrected in the manner illustrated in FIGS. 51 to 53, with the coordinate code values Code 1 to Code n shown in FIG. 60, and may control the drive values or the drive signals for activating the OIS coil based on the result of the comparison.

In another embodiment, the correction values CV shown in FIG. 51 or the first correction values, the second correction value or the third correction values shown in FIG. 53 may be applied to the coordinated code values, which are created through the calibration. In other words, it is possible to amend or correct the coordinate code values, which are created through the calibration, and it is possible to control the drive values or the drive signals for activating the OIS coil using the corrected coordinate code values.

For example, it is possible to set new coordinate code values from the result obtained by subtracting the correction values CV (or the third correction values) from the coordinate code values Code 1 to Code n, which are created through the calibration, and to control the drive values or the drive signals for activating the OIS coil using the new set coordinate code values.

As illustrated in FIGS. 39A, 39B and 45, the OIS coil units 1230-1 to 1230-4 and the OIS position sensors 1240*a* to 1240*c* may be disposed or mounted on the first surface 1051A of the third circuit board 1250.

For example, the OIS coil unit (for example, 1230-1) may have the opening or hole formed in the center thereof, and the OIS position sensor (for example, 1240*a*) may be disposed in the opening or the hole in the OIS coil unit (for example, 1230-1) corresponding to the OIS position sensor (for example, 1240*a*).

For example, the OIS position sensor (for example, 1240*a*) may overlap the OIS coil unit (for example, 1230-1) corresponding to the OIS position sensor (for example, 1240*a*) in a direction perpendicular to the optical axis or in a direction parallel to the upper surface of the second circuit board 1900.

As described above, the OIS coil units 1230-1 to 1230-4 and the OIS position sensors 1240*a* to 1240*c*, which respectively correspond to the OIS coil units 1230-1 to 1230-4, may be disposed adjacent to the first surface 1051A of the third circuit board 1250.

When a drive signal is applied to the OIS coil unit (for example, 1230-1) for OIS operation, a magnetic field may be generated from the OIS coil unit (for example, 1230-1). In order to perform accurate OIS feedback operation, the output of the OIS position sensor 1240*a* must correspond to the result of detection of only the magnetic field, which is generated by the magnet 1023A fixed to the OIS stationary part. However, because the OIS coil unit 1230-1 and the OIS position sensor 1240*a* are disposed adjacent to each other, the output of the OIS position sensor 1240*a* may be greatly influenced by the magnetic field generated by the OIS coil unit 1230-1, and thus the accuracy and reliability of the OIS feedback operation may be deteriorated.

FIG. 61 illustrates frequency response characteristics with respect to a drive signal input to the OIS coil unit (for example, 1230-1) and the output of the OIS position sensor (for example, 1240*a*). In FIG. 61, the X axis indicates frequency, and the Y axis indicates gain.

Referring to FIG. 61, in the OIS coil unit (for example, 1230-1), a phenomenon 1038A (referred to as a "cabri phenomenon") in which the output of the OIS position sensor abnormally increases or decreases in a frequency range between 200 Hz to 300 Hz due to the influence of a magnetic field may occur.

In the embodiment, by correcting or eliminating the influence on the output of the OIS position sensor (for example, 1240*a*) caused by a magnetic field generated from the OIS coil unit during OIS operation, it is possible to prevent the occurrence of the above-mentioned cabri phenomenon, and it is possible to perform OIS feedback operation with accuracy and reliability, with the result that it is possible to ensure reliability of handshake correction by the camera module.

Furthermore, because it is possible to ensure reliability of OIS feedback operation by virtue of the technology for correcting the output of the OIS position sensor even when the OIS position sensor and the OIS coil unit are disposed adjacent to each other, it is possible to improve freedom to dispose the OIS position sensor and the OIS coil unit, to decrease the mechanical height of the camera module, and to ensure a sufficient space on the third circuit board 1250 in which to dispose other elements.

The camera module 10 or 20 according to the embodiment may be included in an optical instrument, which is designed to form the image of an object in a space using reflection, refraction, absorption, interference, diffraction or the like, which are characteristics of light, to extend eyesight, to record an image obtained through a lens or to reproduce the image, to perform optical measurement, or to propagate or transmit an image. For example, although the optical instrument according to the embodiment may be a mobile phone, cellular phone, smart phone, portable smart instrument, digital camera, laptop computer, digital broadcasting terminal, PDA (Personal Digital Assistant), PMP (Portable Multimedia Player), navigation device, or the like, the disclosure is not limited thereto. Furthermore, any device capable of taking images or photographs is possible.

Figure 62:
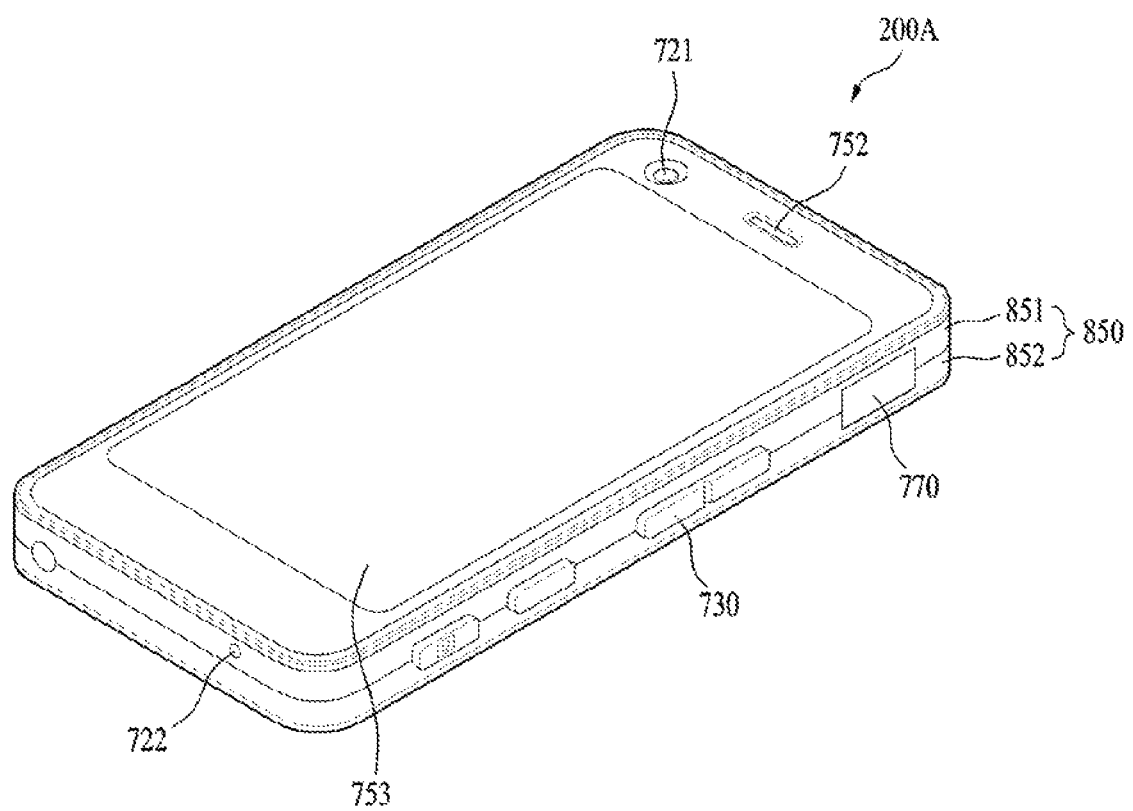
FIG. 62 is a perspective view illustrating an optical device according to an embodiment.
Figure 63:
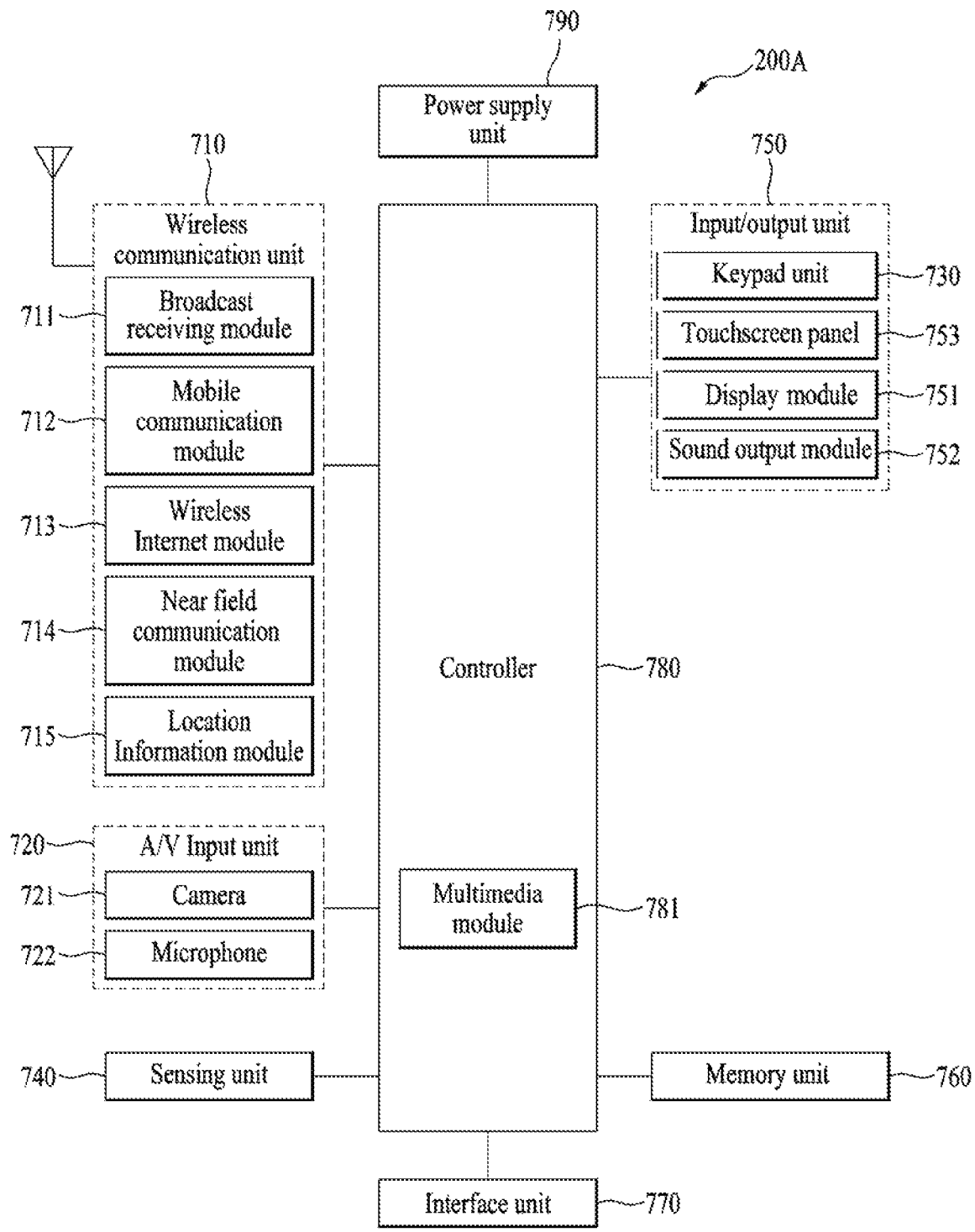
FIG. 63 is a view illustrating the configuration of the optical device illustrated in FIG. 62.

FIG. 62 is a perspective view illustrating an optical device 200A according to an embodiment. FIG. 63 is a view illustrating the configuration of the optical device illustrated in FIG. 62.

Referring to FIGS. 62 and 63, the optical device 200A may include a body 850, a wireless communication unit 710, an audio/video (A/V) input unit 720, a sensing unit 740, an input/output unit 750, a memory unit 760, an interface unit 770, a controller 780, and a power supply unit 790.

The body 850 illustrated in FIG. 62 has a bar shape, without being limited thereto, and may be any of various types, such as, for example, a slide type, a folder type, a swing type, or a swivel type, in which two or more subbodies are coupled so as to be movable relative to each other.

The body 850 may include a case (a casing, housing, cover or the like) defining the external appearance of the terminal. For example, the body 850 may be divided into a front case 851 and a rear case 852. Various electronic components of the terminal may be accommodated in the space defined between the front case 851 and the rear case 852.

The wireless communication unit 710 may include one or more modules, which enable wireless communication between the optical device 200A and a wireless communication system or between the optical device 200A and a network in which the optical device 200A is located. For example, the wireless communication unit 710 may include a broadcast-receiving module 711, a mobile communication module 712, a wireless Internet module 713, a nearfield communication module 714, and a location information module 715.

The A/V input unit 720 serves to input audio signals or video signals, and may include, for example, a camera 721 and a microphone 722.

The camera 721 may include the camera module 10, 20 or 1010 according to the embodiment.

The sensing unit 740 may sense the current state of the optical device 200A, such as, for example, the opening or closing of the optical device 200A, the location of the optical device 200A, the presence of a user's touch, the orientation of the optical device 200A, or the acceleration/deceleration of the optical device 200A, and may generate a sensing signal to control the operation of the optical device 200A. When the optical device 200A is, for example, a slide-type cellular phone, the sensing unit 740 may sense whether the slide-type cellular phone is opened or closed. Furthermore, the sensing unit 740 may sense the supply of power from the power supply unit 790, coupling of the interface unit 770 to an external device, and the like.

The input/output unit 750 serves to generate, for example, visual, audible, or tactile input or output. The input/output unit 750 may generate input data to control the operation of the optical device 200A, and may display information processed in the optical device 200A.

The input/output unit 750 may include a keypad unit 730, a display module 751, a sound output module 752, and a touchscreen panel 753. The keypad unit 730 may generate input data in response to input on a keypad.

The display module 751 may include a plurality of pixels, the color of which varies depending on the electrical signals applied thereto. For example, the display module 751 may include at least one among a liquid crystal display, a thin-film transistor liquid crystal display, an organic light-emitting diode, a flexible display and a 3D display.

The sound output module 752 may output audio data received from the wireless communication unit 710 in, for example, a call-signal reception mode, a call mode, a recording mode, a voice recognition mode, or a broadcast reception mode, or may output audio data stored in the memory unit 760.

The touchscreen panel 753 may convert variation in capacitance, caused by a user's touch on a specific region of a touchscreen, into electrical input signals.

The memory unit 760 may temporarily store programs for the processing and control of the controller 780, and input/output data (for example, telephone numbers, messages, audio data, stationary images, moving images and the like). For example, the memory unit 760 may store images captured by the camera 721, for example, pictures or moving images.

The interface unit 770 serves as a path through which the lens moving apparatus is connected to an external device connected to the optical device 200A. The interface unit 770 may receive power or data from the external component, and may transmit the same to respective constituent elements inside the optical device 200A, or may transmit data inside the optical device 200A to the external component. For example, the interface unit 770 may include a wired/wireless headset port, an external charger port, a wired/wireless data port, a memory card port, a port for connection to a device equipped with an identification module, an audio input/output (I/O) port, a video input/output (I/O) port, an earphone port and the like.

The controller 780 may control the general operation of the optical device 200A. For example, the controller 780 may perform control and processing related to, for example, voice calls, data communication, and video calls.

The controller 780 may include a multimedia module 781 for multimedia playback. The multimedia module 781 may be embodied in the controller 780, or may be embodied separately from the controller 780.

The controller 780 may perform a pattern recognition process capable of recognizing writing input or drawing input carried out on a touch screen as a character and an image, respectively.

The power supply unit 790 may supply power required to operate the respective constituent elements upon receiving external power or internal power under the control of the controller 780.

The features, configurations, effects and the like described above in the embodiments are included in at least one embodiment, but the invention is not limited only to the embodiments. In addition, the features, configurations, effects and the like exemplified in the respective embodiments may be combined with other embodiments or modified by those skilled in the art. Accordingly, content related to these combinations and modifications should be construed as falling within the scope of the disclosure.

As is apparent from the above description, since the embodiments are constructed such that the OIS position sensor is disposed so as not to overlap the OIS coil unit in a direction perpendicular to the optical axis, it is possible to reduce the influence on the output of the OIS position sensor caused by the magnetic field of the OIS coil unit, perform accurate OIS feedback operation, and ensure reliability of OIS operation.

Furthermore, since the embodiments eliminate the influence on the output of the position sensor caused by the magnetic field generated from the coil, it is possible to perform accurate OIS feedback operation and ensure reliability of OIS operation.

INDUSTRIAL APPLICABILITY

The embodiments are applicable to a camera module and an optical device including the camera module, which are capable of performing accurate OIS feedback operation and thus of ensuring reliability of OIS operation.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A camera module comprising:
   a stationary part comprising a magnet; and
   a movable part comprising:
     a first circuit board spaced apart from the stationary part;
     a position sensor disposed on the first circuit board;
     an image sensor disposed on the first circuit board;
     a coil disposed so as to face the magnet; and
     a spacer disposed between the first circuit board and the coil,
   wherein the movable part is configured to move in a direction perpendicular to an optical axis direction by an interaction between the magnet and the coil,
   wherein the spacer has a hole, and at least a portion of the position sensor is disposed in the hole of the spacer and overlaps the magnet in the optical-axis direction,
   wherein the coil is disposed on an upper surface of the spacer, and
   wherein the coil does not overlap the hole of the spacer in the direction perpendicular to the optical-axis direction.

2. The camera module according to claim 1, wherein the hole in the spacer overlaps at least a portion of the coil in the optical-axis direction.

3. The camera module according to claim 1, wherein the position sensor does not overlap the coil in the optical-axis direction.

4. The camera module according to claim 1, wherein the coil has a hole formed in a center thereof, and the hole in the spacer overlaps the hole in the coil in the optical-axis direction.

5. The camera module according to claim 1, wherein the position sensor overlaps both the hole in the coil and the hole in the spacer in the optical-axis direction.

6. The camera module according to claim 1, wherein a space is defined between the magnet and the position sensor.

7. The camera module according to claim 1, further comprising an elastic support member coupled both to the stationary part and to the movable part.

8. The camera module according to claim 7, wherein the stationary part includes a second circuit board, and the elastic support member conductively connects the first circuit board to the second circuit board.

9. The camera module according to claim 1, wherein the coil is coupled to the spacer, and is conductively connected to the first circuit board.

10. The camera module according to claim 1, wherein the coil is positioned higher than the hole of the spacer.

11. The camera module according to claim 1, wherein the spacer comprises a part which is overlapped with the coil in the optical-axis direction and contacts the coil.

12. The camera module according to claim 1, wherein the coil is disposed under the magnet, and the spacer is disposed under the coil, and the first circuit board is disposed under the spacer.

13. The camera module according to claim 1, wherein the coil is configured to have the form of a closed curve shape or a ring shape.

14. The camera module according to claim 1, wherein the first circuit board is coupled to the spacer.

15. The camera module according to claim 1, wherein an upper surface of the first circuit board is coupled to a lower surface of the spacer.

16. The camera module according to claim 1, further comprising:
   a lens module disposed above the first circuit board; and
   a filter disposed between the lens module and the image sensor.

17. An optical instrument comprising the camera module according to claim 1.

* * * * *